United States Patent
Bernstein et al.

(10) Patent No.: US 12,067,229 B2
(45) Date of Patent: Aug. 20, 2024

(54) DEVICE, METHOD, AND GRAPHICAL USER INTERFACE FOR PROVIDING FEEDBACK FOR CHANGING ACTIVATION STATES OF A USER INTERFACE OBJECT

(71) Applicant: Apple Inc., Cupertino, CA (US)

(72) Inventors: Jeffrey Traer Bernstein, San Francisco, CA (US); Julian K. Missig, Burlingame, CA (US); Avi E. Cieplinski, San Francisco, CA (US); B. Michael Victor, Castro Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/728,909

(22) Filed: Apr. 25, 2022

(65) Prior Publication Data

US 2022/0261131 A1 Aug. 18, 2022

Related U.S. Application Data

(63) Continuation of application No. 16/921,083, filed on Jul. 6, 2020, now Pat. No. 11,314,407, which is a
(Continued)

(51) Int. Cl.
*G06F 3/0484* (2022.01)
*G06F 3/01* (2006.01)
(Continued)

(52) U.S. Cl.
CPC ............ *G06F 3/0488* (2013.01); *G06F 3/016* (2013.01); *G06F 3/03547* (2013.01);
(Continued)

(58) Field of Classification Search
CPC ..... G06F 3/0488; G06F 3/016; G06F 3/03547
See application file for complete search history.

(56) References Cited

U.S. PATENT DOCUMENTS

| 4,864,520 A | 9/1989 | Setoguchi et al. |
| 5,184,120 A | 2/1993 | Schultz |

(Continued)

FOREIGN PATENT DOCUMENTS

| CA | 2780765 A1 | 5/2011 |
| CN | 1356493 A | 7/2002 |

(Continued)

OTHER PUBLICATIONS

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

(Continued)

*Primary Examiner* — Linh K Pham
(74) *Attorney, Agent, or Firm* — Morgan, Lewis & Bockius LLP

(57) ABSTRACT

An electronic device detects a contact on a touch-sensitive surface of the electronic device, including a first portion of a gesture made with the contact, a second portion of the gesture that follows the first portion, and lift-off of the contact from the touch-sensitive surface during or after the second portion of the gesture. In response to detecting the second portion of the gesture, if a modifier input was detected while detecting the first portion of the gesture made with the contact, the electronic device performs a first operation and generates a first tactile output on the touch-sensitive surface. If the modifier input was not detected while detecting the first portion of the gesture, the electronic device performs a second operation different from the first operation and generates a second tactile output on the touch-sensitive surface, wherein the second tactile output is different from the first tactile output.

39 Claims, 89 Drawing Sheets

Related U.S. Application Data continuation of application No. 15/889,115, filed on Feb. 5, 2018, now Pat. No. 10,782,871, which is a continuation of application No. 14/536,141, filed on Nov. 7, 2014, now Pat. No. 9,886,184, which is a continuation of application No. PCT/US2013/040072, filed on May 8, 2013.

(60) Provisional application No. 61/778,287, filed on Mar. 12, 2013, provisional application No. 61/747,278, filed on Dec. 29, 2012, provisional application No. 61/688,227, filed on May 9, 2012.

(51) Int. Cl.

| | | |
|---|---|---|
| *G06F 3/0354* | (2013.01) | |
| *G06F 3/0482* | (2013.01) | |
| *G06F 3/04842* | (2022.01) | |
| *G06F 3/04847* | (2022.01) | |
| *G06F 3/0486* | (2013.01) | |
| *G06F 3/0488* | (2022.01) | |
| *G06F 3/04883* | (2022.01) | |

(52) U.S. Cl.
CPC ........ *G06F 3/0482* (2013.01); *G06F 3/04842* (2013.01); *G06F 3/04847* (2013.01); *G06F 3/0486* (2013.01); *G06F 3/04883* (2013.01); *G06F 2203/014* (2013.01)

(56) References Cited

U.S. PATENT DOCUMENTS

| | | |
|---|---|---|
| 5,374,787 A | 12/1994 | Miller et al. |
| 5,428,730 A | 6/1995 | Baker et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,589,855 A | 12/1996 | Blumstein et al. |
| 5,664,210 A | 9/1997 | Fleming et al. |
| 5,710,896 A | 1/1998 | Seidl |
| 5,717,438 A | 2/1998 | Kim et al. |
| 5,793,360 A | 8/1998 | Fleck et al. |
| 5,793,377 A | 8/1998 | Moore |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,825,352 A | 10/1998 | Bisset et al. |
| 5,844,560 A | 12/1998 | Crutcher et al. |
| 5,870,683 A | 2/1999 | Wells et al. |
| 5,872,922 A | 2/1999 | Hogan et al. |
| 5,946,647 A | 8/1999 | Miller et al. |
| 5,956,032 A | 9/1999 | Argiolas |
| 5,973,670 A | 10/1999 | Barber et al. |
| 6,002,397 A | 12/1999 | Kolawa et al. |
| 6,031,989 A | 2/2000 | Cordell |
| 6,088,019 A | 7/2000 | Rosenberg |
| 6,088,027 A | 7/2000 | Konar et al. |
| 6,111,575 A | 8/2000 | Martinez et al. |
| 6,121,960 A | 9/2000 | Carroll et al. |
| 6,208,329 B1 | 3/2001 | Ballare |
| 6,208,340 B1 | 3/2001 | Amin et al. |
| 6,219,034 B1 | 4/2001 | Elbing et al. |
| 6,223,188 B1 | 4/2001 | Albers et al. |
| 6,232,891 B1 | 5/2001 | Rosenberg |
| 6,243,080 B1 | 6/2001 | Molne |
| 6,252,594 B1 | 6/2001 | Xia et al. |
| 6,292,233 B1 | 9/2001 | Erba et al. |
| 6,300,936 B1 | 10/2001 | Braun et al. |
| 6,313,836 B1 | 11/2001 | Russell, Jr. et al. |
| 6,396,523 B1 | 5/2002 | Segal et al. |
| 6,429,846 B2 | 8/2002 | Rosenberg et al. |
| 6,448,977 B1 | 9/2002 | Braun et al. |
| 6,459,442 B1 | 10/2002 | Edwards et al. |
| 6,489,978 B1 | 12/2002 | Gong et al. |
| 6,512,530 B1 | 1/2003 | Rzepkowski et al. |
| 6,563,487 B2 | 5/2003 | Martin et al. |
| 6,567,102 B2 | 5/2003 | Kung |
| 6,583,798 B1 | 6/2003 | Hoek et al. |
| 6,590,568 B1 | 7/2003 | Astala et al. |
| 6,661,438 B1 | 12/2003 | Shiraishi et al. |
| 6,734,882 B1 | 5/2004 | Becker |
| 6,735,307 B1 | 5/2004 | Volckers |
| 6,750,890 B1 | 6/2004 | Sugimoto |
| 6,806,893 B1 | 10/2004 | Kolawa et al. |
| 6,822,635 B2 | 11/2004 | Shahoian et al. |
| 6,906,697 B2 | 6/2005 | Rosenberg |
| 6,919,927 B1 | 7/2005 | Hyodo |
| 6,943,778 B1 | 9/2005 | Astala et al. |
| 7,036,088 B2 | 4/2006 | Tunney |
| 7,138,983 B2 | 11/2006 | Wakai et al. |
| 7,312,791 B2 | 12/2007 | Hoshino et al. |
| 7,411,575 B2 | 8/2008 | Hill et al. |
| 7,434,177 B1 | 10/2008 | Ording et al. |
| 7,453,439 B1 | 11/2008 | Kushler et al. |
| 7,471,284 B2 | 12/2008 | Bathiche et al. |
| 7,479,949 B2 | 1/2009 | Jobs et al. |
| 7,500,127 B2 | 3/2009 | Fleck et al. |
| 7,516,404 B1 | 4/2009 | Colby et al. |
| 7,533,352 B2 | 5/2009 | Chew et al. |
| 7,552,397 B2 | 6/2009 | Holecek et al. |
| 7,577,530 B2 | 8/2009 | Vignalou-Marche |
| 7,614,008 B2 | 11/2009 | Ording |
| 7,619,616 B2 | 11/2009 | Rimas Ribikauskas et al. |
| 7,629,966 B2 | 12/2009 | Anson |
| 7,656,413 B2 | 2/2010 | Khan et al. |
| 7,683,889 B2 | 3/2010 | Rimas Ribikauskas et al. |
| 7,702,733 B2 | 4/2010 | Fleck et al. |
| 7,743,348 B2 | 6/2010 | Robbins et al. |
| 7,760,187 B2 | 7/2010 | Kennedy |
| 7,787,026 B1 | 8/2010 | Flory et al. |
| 7,797,642 B1 | 9/2010 | Karam et al. |
| 7,801,950 B2 | 9/2010 | Eisenstadt et al. |
| 7,812,826 B2 | 10/2010 | Ording et al. |
| 7,890,862 B2 | 2/2011 | Kompe et al. |
| 7,903,090 B2 | 3/2011 | Soss et al. |
| 7,952,566 B2 | 5/2011 | Poupyrev et al. |
| 7,956,847 B2 | 6/2011 | Christie |
| 7,973,778 B2 | 7/2011 | Chen |
| 8,000,694 B2 | 8/2011 | Labidi et al. |
| 8,040,142 B1 | 10/2011 | Bokma et al. |
| 8,059,104 B2 | 11/2011 | Shahoian et al. |
| 8,059,105 B2 | 11/2011 | Rosenberg et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,271,900 B2 | 9/2012 | Walizaka et al. |
| 8,300,005 B2 | 10/2012 | Tateuchi et al. |
| 8,311,514 B2 | 11/2012 | Bandyopadhyay et al. |
| 8,325,398 B2 | 12/2012 | Satomi et al. |
| 8,363,020 B2 | 1/2013 | Li et al. |
| 8,390,583 B2 | 3/2013 | Forutanpour et al. |
| 8,423,089 B2 | 4/2013 | Song et al. |
| 8,446,376 B2 | 5/2013 | Levy et al. |
| 8,446,382 B2 | 5/2013 | Goto et al. |
| 8,453,057 B2 | 5/2013 | Stallings et al. |
| 8,456,431 B2 | 6/2013 | Victor |
| 8,466,889 B2 | 6/2013 | Tong et al. |
| 8,482,535 B2 | 7/2013 | Pryor |
| 8,499,243 B2 | 7/2013 | Yuki |
| 8,504,946 B2 | 8/2013 | Williamson et al. |
| 8,508,494 B2 | 8/2013 | Moore |
| 8,542,205 B1 | 9/2013 | Keller |
| 8,553,092 B2 | 10/2013 | Tezuka et al. |
| 8,570,296 B2 | 10/2013 | Birnbaum et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |

(56) References Cited

U.S. PATENT DOCUMENTS

| | | |
|---|---|---|
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,698,765 B1 | 4/2014 | Keller |
| 8,706,172 B2 | 4/2014 | Priyantha et al. |
| 8,713,471 B1 | 4/2014 | Rowley et al. |
| 8,717,305 B2 | 5/2014 | Williamson et al. |
| 8,726,198 B2 | 5/2014 | Rydenhag et al. |
| 8,743,069 B2 | 6/2014 | Morton et al. |
| 8,760,425 B2 | 6/2014 | Crisan |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,816,989 B2 | 8/2014 | Nicholson et al. |
| 8,830,188 B2 * | 9/2014 | Verthein ............. G06F 3/04847 340/407.1 |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,932,412 B2 | 1/2015 | Ferragut, II et al. |
| 8,952,987 B2 | 2/2015 | Momeyer et al. |
| 8,954,889 B2 | 2/2015 | Fujibayashi |
| 8,959,430 B1 | 2/2015 | Spivak et al. |
| 8,963,853 B2 | 2/2015 | Sirpal et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,032,321 B1 | 5/2015 | Cohen et al. |
| 9,043,732 B2 | 5/2015 | Nurmi et al. |
| 9,046,999 B1 | 6/2015 | Teller et al. |
| 9,052,820 B2 | 6/2015 | Jarrett et al. |
| 9,052,925 B2 | 6/2015 | Chaudhri |
| 9,063,563 B1 | 6/2015 | Gray et al. |
| 9,063,731 B2 | 6/2015 | Heo et al. |
| 9,069,460 B2 | 6/2015 | Moore |
| 9,078,208 B1 | 7/2015 | Dutta et al. |
| 9,086,755 B2 | 7/2015 | Cho et al. |
| 9,086,757 B1 | 7/2015 | Desai et al. |
| 9,086,875 B2 | 7/2015 | Harrat et al. |
| 9,092,058 B2 | 7/2015 | Kasahara et al. |
| 9,098,188 B2 | 8/2015 | Kim |
| 9,104,260 B2 | 8/2015 | Marsden et al. |
| 9,111,076 B2 | 8/2015 | Park et al. |
| 9,116,569 B2 | 8/2015 | Stacy et al. |
| 9,116,571 B2 | 8/2015 | Zeliff et al. |
| 9,122,364 B2 | 9/2015 | Kuwabara et al. |
| 9,128,605 B2 | 9/2015 | Nan et al. |
| 9,141,262 B2 | 9/2015 | Nan et al. |
| 9,146,914 B1 | 9/2015 | Dhaundiyal |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,178,971 B2 | 11/2015 | Nemoto |
| 9,218,105 B2 | 12/2015 | Mansson et al. |
| 9,230,393 B1 * | 1/2016 | Davies .................... G06F 3/016 |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,244,606 B2 | 1/2016 | Kocienda et al. |
| 9,246,487 B2 | 1/2016 | Casparian et al. |
| 9,262,002 B2 | 2/2016 | Momeyer et al. |
| 9,280,286 B2 | 3/2016 | Commarford et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,383,887 B1 | 7/2016 | Khafizov et al. |
| 9,389,718 B1 | 7/2016 | Letourneur |
| 9,389,722 B2 | 7/2016 | Matsuki et al. |
| 9,395,800 B2 | 7/2016 | Liu et al. |
| 9,400,581 B2 | 7/2016 | Bokma et al. |
| 9,405,367 B2 | 8/2016 | Jung et al. |
| 9,405,428 B2 | 8/2016 | Roh et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,436 B2 | 1/2017 | Ohki et al. |
| 9,569,093 B2 | 2/2017 | Lipman et al. |
| 9,582,178 B2 | 2/2017 | Grant et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,619,076 B2 | 4/2017 | Bernstein et al. |
| 9,619,113 B2 | 4/2017 | Mark |
| 9,625,987 B1 | 4/2017 | LaPenna et al. |
| 9,645,722 B1 | 5/2017 | Stasior et al. |
| 9,665,762 B2 | 5/2017 | Thompson et al. |
| 9,671,943 B2 | 6/2017 | Van Der Velden |
| 9,678,571 B1 | 6/2017 | Robert et al. |
| 9,733,716 B2 | 8/2017 | Shaffer |
| 9,740,381 B1 | 8/2017 | Chaudhri et al. |
| 9,753,527 B2 | 9/2017 | Connell et al. |
| 9,760,241 B1 | 9/2017 | Lewbel |
| 9,785,305 B2 | 10/2017 | Alonso Ruiz et al. |
| 9,798,443 B1 | 10/2017 | Gray |
| 9,804,665 B2 | 10/2017 | DeBates et al. |
| 9,829,980 B2 | 11/2017 | Lisseman et al. |
| 9,891,747 B2 | 2/2018 | Jang et al. |
| 10,037,138 B2 | 7/2018 | Bernstein et al. |
| 10,055,066 B2 | 8/2018 | Lynn et al. |
| 10,057,490 B2 | 8/2018 | Shin et al. |
| 10,095,396 B2 | 10/2018 | Kudershian et al. |
| 10,133,388 B2 | 11/2018 | Sudou |
| 10,133,397 B1 | 11/2018 | Smith |
| 10,180,722 B2 | 1/2019 | Lu |
| 10,222,980 B2 | 3/2019 | Alonso Ruiz et al. |
| 10,235,023 B2 * | 3/2019 | Gustafsson ......... G06F 3/04842 |
| 10,275,087 B1 | 4/2019 | Smith |
| 10,331,769 B1 | 6/2019 | Hill et al. |
| 10,386,960 B1 | 8/2019 | Smith |
| 10,469,767 B2 | 11/2019 | Shikata |
| 10,496,151 B2 | 12/2019 | Kim et al. |
| 10,547,895 B1 | 1/2020 | Morris |
| 10,564,792 B2 * | 2/2020 | Kim ..................... G06F 3/0488 |
| 10,739,896 B2 | 8/2020 | Kim et al. |
| 10,771,274 B2 | 9/2020 | Reimann et al. |
| 10,782,871 B2 | 9/2020 | Bernstein et al. |
| 11,112,961 B2 * | 9/2021 | Ikeda .................... G06F 3/0488 |
| 2001/0024195 A1 | 9/2001 | Hayakawa et al. |
| 2001/0045965 A1 | 11/2001 | Orbanes et al. |
| 2002/0006822 A1 | 1/2002 | Krintzman |
| 2002/0008691 A1 | 1/2002 | Hanajima et al. |
| 2002/0015064 A1 | 2/2002 | Robotham et al. |
| 2002/0042925 A1 | 4/2002 | Ebisu et al. |
| 2002/0054011 A1 | 5/2002 | Bruneau et al. |
| 2002/0057256 A1 | 5/2002 | Flack |
| 2002/0101447 A1 * | 8/2002 | Carro .................... G06Q 10/10 715/205 |
| 2002/0109668 A1 | 8/2002 | Rosenberg et al. |
| 2002/0109678 A1 | 8/2002 | Marmolin et al. |
| 2002/0128036 A1 | 9/2002 | Yach et al. |
| 2002/0140680 A1 | 10/2002 | Lu |
| 2002/0140740 A1 | 10/2002 | Chen |
| 2002/0163498 A1 | 11/2002 | Chang et al. |
| 2002/0180763 A1 | 12/2002 | Kung |
| 2002/0186257 A1 | 12/2002 | Cadiz et al. |
| 2003/0001869 A1 | 1/2003 | Nissen |
| 2003/0013492 A1 | 1/2003 | Bokhari et al. |
| 2003/0058241 A1 | 3/2003 | Hsu |
| 2003/0068053 A1 | 4/2003 | Chu |
| 2003/0086496 A1 | 5/2003 | Zhang et al. |
| 2003/0112269 A1 | 6/2003 | Lentz et al. |

(56) References Cited

U.S. PATENT DOCUMENTS

| | | |
|---|---|---|
| 2003/0117440 A1 | 6/2003 | Hellyar et al. |
| 2003/0122779 A1 | 7/2003 | Martin et al. |
| 2003/0128242 A1 | 7/2003 | Gordon |
| 2003/0151589 A1 | 8/2003 | Bensen et al. |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0201914 A1 | 10/2003 | Fujiwara et al. |
| 2003/0206169 A1 | 11/2003 | Springer et al. |
| 2003/0222915 A1 | 12/2003 | Marion et al. |
| 2004/0015662 A1 | 1/2004 | Cummings |
| 2004/0021643 A1 | 2/2004 | Hoshino et al. |
| 2004/0056849 A1 | 3/2004 | Lohbihler et al. |
| 2004/0108995 A1 | 6/2004 | Hoshino et al. |
| 2004/0138849 A1 | 7/2004 | Schmidt et al. |
| 2004/0141010 A1 | 7/2004 | Fitzmaurice et al. |
| 2004/0150631 A1 | 8/2004 | Fleck et al. |
| 2004/0150644 A1 | 8/2004 | Kincaid et al. |
| 2004/0155752 A1 | 8/2004 | Radke |
| 2004/0155869 A1 | 8/2004 | Robinson et al. |
| 2004/0168131 A1 | 8/2004 | Blumberg |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0039141 A1 | 2/2005 | Burke et al. |
| 2005/0064911 A1 | 3/2005 | Chen et al. |
| 2005/0066207 A1 | 3/2005 | Fleck et al. |
| 2005/0076256 A1 | 4/2005 | Fleck et al. |
| 2005/0078093 A1 | 4/2005 | Peterson, Jr. et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0134578 A1 | 6/2005 | Chambers et al. |
| 2005/0156892 A1 | 7/2005 | Grant |
| 2005/0183017 A1 | 8/2005 | Cain |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0283726 A1 | 12/2005 | Lunati |
| 2005/0289476 A1 | 12/2005 | Tokkonen |
| 2006/0001650 A1 | 1/2006 | Robbins et al. |
| 2006/0001657 A1 | 1/2006 | Monney et al. |
| 2006/0012577 A1 | 1/2006 | Kyrola |
| 2006/0022955 A1 | 2/2006 | Kennedy |
| 2006/0026536 A1 | 2/2006 | Hotelling et al. |
| 2006/0031776 A1 | 2/2006 | Glein et al. |
| 2006/0036945 A1 | 2/2006 | Radtke et al. |
| 2006/0036971 A1 | 2/2006 | Mendel et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0101581 A1 | 5/2006 | Blanchard et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1* | 6/2006 | Rimas-Ribikauskas .................. G06F 3/0488 345/173 |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161870 A1 | 7/2006 | Hotelling et al. |
| 2006/0187215 A1* | 8/2006 | Rosenberg ............. A63F 13/20 345/173 |
| 2006/0190834 A1 | 8/2006 | Marcjan |
| 2006/0195438 A1 | 8/2006 | Galuten |
| 2006/0197753 A1 | 9/2006 | Hotelling |
| 2006/0210958 A1 | 9/2006 | Rimas-Ribikauskas et al. |
| 2006/0212812 A1 | 9/2006 | Simmons et al. |
| 2006/0213754 A1 | 9/2006 | Jarrett et al. |
| 2006/0224989 A1 | 10/2006 | Pettiross et al. |
| 2006/0233248 A1 | 10/2006 | Rynderman et al. |
| 2006/0236263 A1 | 10/2006 | Bathiche et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0003134 A1 | 1/2007 | Song et al. |
| 2007/0024595 A1 | 2/2007 | Baker et al. |
| 2007/0024646 A1 | 2/2007 | Saarinen et al. |
| 2007/0036456 A1 | 2/2007 | Hooper |
| 2007/0080953 A1 | 4/2007 | Lii |
| 2007/0113681 A1 | 5/2007 | Nishimura et al. |
| 2007/0120834 A1 | 5/2007 | Boillot |
| 2007/0120835 A1 | 5/2007 | Sato |
| 2007/0124699 A1 | 5/2007 | Michaels |
| 2007/0152959 A1 | 7/2007 | Peters |
| 2007/0157089 A1 | 7/2007 | Van Os et al. |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1* | 8/2007 | Schiller ................. G06F 3/0486 715/838 |
| 2007/0200713 A1* | 8/2007 | Weber ..................... H04L 67/52 340/539.13 |
| 2007/0222768 A1 | 9/2007 | Geurts et al. |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0270182 A1 | 11/2007 | Gulliksson et al. |
| 2007/0271513 A1 | 11/2007 | Andren et al. |
| 2007/0288862 A1 | 12/2007 | Ording |
| 2007/0294295 A1 | 12/2007 | Finkelstein et al. |
| 2007/0299923 A1 | 12/2007 | Skelly et al. |
| 2008/0001924 A1 | 1/2008 | dos los Reyes et al. |
| 2008/0010610 A1 | 1/2008 | Lim et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0165141 A1 | 7/2008 | Christie |
| 2008/0165160 A1 | 7/2008 | Kocienda et al. |
| 2008/0168379 A1 | 7/2008 | Forstall et al. |
| 2008/0168395 A1 | 7/2008 | Ording et al. |
| 2008/0168403 A1 | 7/2008 | Westerman et al. |
| 2008/0168404 A1 | 7/2008 | Ording |
| 2008/0189605 A1 | 8/2008 | Kay et al. |
| 2008/0202824 A1 | 8/2008 | Philipp et al. |
| 2008/0204427 A1 | 8/2008 | Heesemans et al. |
| 2008/0219493 A1 | 9/2008 | Tadmor |
| 2008/0222569 A1 | 9/2008 | Champion et al. |
| 2008/0225007 A1 | 9/2008 | Nakadaira et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |

(56) References Cited

U.S. PATENT DOCUMENTS

| | | |
|---|---|---|
| 2008/0307359 A1 | 12/2008 | Louch et al. |
| 2008/0307361 A1 | 12/2008 | Louch et al. |
| 2008/0317378 A1 | 12/2008 | Steinberg et al. |
| 2008/0320419 A1 | 12/2008 | Matas et al. |
| 2009/0007017 A1 | 1/2009 | Anzures et al. |
| 2009/0016645 A1 | 1/2009 | Sako et al. |
| 2009/0028359 A1 | 1/2009 | Terada et al. |
| 2009/0046110 A1 | 2/2009 | Sadler et al. |
| 2009/0058828 A1 | 3/2009 | Jiang et al. |
| 2009/0061837 A1 | 3/2009 | Chaudhri et al. |
| 2009/0064031 A1 | 3/2009 | Bull et al. |
| 2009/0066668 A1 | 3/2009 | Kim et al. |
| 2009/0073118 A1 | 3/2009 | Yamaji et al. |
| 2009/0075738 A1 | 3/2009 | Pearce |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0150775 A1 | 6/2009 | Miyazaki et al. |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0164905 A1 | 6/2009 | Ko |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167701 A1 | 7/2009 | Ronkainen |
| 2009/0167704 A1 | 7/2009 | Terlizzi et al. |
| 2009/0169061 A1 | 7/2009 | Anderson et al. |
| 2009/0178008 A1* | 7/2009 | Herz .................. G06F 9/542 715/840 |
| 2009/0187824 A1 | 7/2009 | Hinckley et al. |
| 2009/0189866 A1 | 7/2009 | Haffenden et al. |
| 2009/0195959 A1 | 8/2009 | Ladouceur et al. |
| 2009/0198767 A1 | 8/2009 | Jakobson et al. |
| 2009/0201260 A1 | 8/2009 | Lee et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0231453 A1 | 9/2009 | Huang |
| 2009/0237374 A1 | 9/2009 | Li et al. |
| 2009/0244357 A1 | 10/2009 | Huang |
| 2009/0247112 A1 | 10/2009 | Lundy et al. |
| 2009/0247230 A1* | 10/2009 | Lundy .................. G06F 3/0237 455/566 |
| 2009/0251410 A1 | 10/2009 | Mori et al. |
| 2009/0251421 A1 | 10/2009 | Bloebaum |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0273563 A1* | 11/2009 | Pryor .................. G06F 3/016 345/157 |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0284478 A1 | 11/2009 | De la Torre Baltierra et al. |
| 2009/0288032 A1 | 11/2009 | Chang et al. |
| 2009/0289779 A1 | 11/2009 | Braun et al. |
| 2009/0293009 A1 | 11/2009 | Meserth et al. |
| 2009/0295713 A1 | 12/2009 | Piot et al. |
| 2009/0295739 A1 | 12/2009 | Nagara |
| 2009/0295943 A1 | 12/2009 | Kim et al. |
| 2009/0298546 A1 | 12/2009 | Kim et al. |
| 2009/0303187 A1 | 12/2009 | Pallakoff |
| 2009/0307583 A1 | 12/2009 | Tonisson |
| 2009/0307633 A1 | 12/2009 | Haughay, Jr. et al. |
| 2009/0322893 A1 | 12/2009 | Stallings et al. |
| 2009/0325566 A1 | 12/2009 | Bell et al. |
| 2010/0005390 A1* | 1/2010 | Bong .................. G06F 3/0482 715/702 |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0020035 A1 | 1/2010 | Ryu et al. |
| 2010/0020221 A1 | 1/2010 | Tupman et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0060548 A1 | 3/2010 | Choi et al. |
| 2010/0060605 A1 | 3/2010 | Rimas-Ribikauskas et al. |
| 2010/0061637 A1 | 3/2010 | Mochizuki et al. |
| 2010/0062803 A1 | 3/2010 | Yun et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088634 A1* | 4/2010 | Tsuruta .................. G06F 3/0481 715/788 |
| 2010/0088654 A1 | 4/2010 | Henhoeffer |
| 2010/0102832 A1 | 4/2010 | Bartling et al. |
| 2010/0110082 A1 | 5/2010 | Myrick et al. |
| 2010/0111434 A1 | 5/2010 | Madden |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0141606 A1* | 6/2010 | Bae .................. G06F 3/016 345/173 |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156807 A1 | 6/2010 | Stallings et al. |
| 2010/0156809 A1* | 6/2010 | Nutaro .................. G06F 3/0488 340/407.1 |
| 2010/0156813 A1 | 6/2010 | Duarte et al. |
| 2010/0156818 A1* | 6/2010 | Burrough .................. G06F 3/04883 345/173 |
| 2010/0156823 A1 | 6/2010 | Paleczny et al. |
| 2010/0156825 A1 | 6/2010 | Sohn et al. |
| 2010/0156830 A1 | 6/2010 | Homma et al. |
| 2010/0159995 A1 | 6/2010 | Stallings et al. |
| 2010/0171713 A1 | 7/2010 | Kwok et al. |
| 2010/0175023 A1 | 7/2010 | Gatlin et al. |
| 2010/0180136 A1 | 7/2010 | Thompson et al. |
| 2010/0180225 A1 | 7/2010 | Chiba et al. |
| 2010/0188327 A1* | 7/2010 | Frid .................. G06F 3/0483 340/407.2 |
| 2010/0199227 A1 | 8/2010 | Xiao et al. |
| 2010/0211872 A1 | 8/2010 | Rolston et al. |
| 2010/0214135 A1 | 8/2010 | Bathiche et al. |
| 2010/0214239 A1 | 8/2010 | Wu |
| 2010/0218663 A1 | 9/2010 | Choi |
| 2010/0220065 A1 | 9/2010 | Ma |
| 2010/0225456 A1 | 9/2010 | Eldering |
| 2010/0225604 A1 | 9/2010 | Homma et al. |
| 2010/0231533 A1 | 9/2010 | Chaudhri |
| 2010/0231534 A1 | 9/2010 | Chaudhri et al. |
| 2010/0231539 A1 | 9/2010 | Cruz-Hernandez et al. |
| 2010/0235118 A1 | 9/2010 | Moore et al. |
| 2010/0235726 A1 | 9/2010 | Ording et al. |
| 2010/0235733 A1 | 9/2010 | Drislane et al. |
| 2010/0235746 A1 | 9/2010 | Anzures |
| 2010/0240415 A1 | 9/2010 | Kim et al. |
| 2010/0241955 A1 | 9/2010 | Price et al. |
| 2010/0248787 A1 | 9/2010 | Smuga et al. |
| 2010/0251168 A1 | 9/2010 | Fujita et al. |
| 2010/0259500 A1 | 10/2010 | Kennedy |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |

(56) References Cited

U.S. PATENT DOCUMENTS

| | | |
|---|---|---|
| 2010/0281379 A1 | 11/2010 | Meaney et al. |
| 2010/0281385 A1 | 11/2010 | Meaney et al. |
| 2010/0287486 A1 | 11/2010 | Coddington |
| 2010/0289807 A1 | 11/2010 | Yu et al. |
| 2010/0293460 A1 | 11/2010 | Budelli |
| 2010/0295789 A1 | 11/2010 | Shin et al. |
| 2010/0295805 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313050 A1 | 12/2010 | Harrat et al. |
| 2010/0313124 A1 | 12/2010 | Privault et al. |
| 2010/0313146 A1 | 12/2010 | Nielsen et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0317410 A1 | 12/2010 | Song et al. |
| 2010/0321301 A1 | 12/2010 | Casparian et al. |
| 2010/0321312 A1 | 12/2010 | Han et al. |
| 2010/0325578 A1 | 12/2010 | Mital et al. |
| 2010/0328229 A1 | 12/2010 | Weber et al. |
| 2011/0010626 A1 | 1/2011 | Fino et al. |
| 2011/0012851 A1 | 1/2011 | Ciesla et al. |
| 2011/0016390 A1 | 1/2011 | Oh et al. |
| 2011/0018695 A1 | 1/2011 | Bells et al. |
| 2011/0026099 A1 | 2/2011 | Kwon et al. |
| 2011/0035145 A1 | 2/2011 | Yamasaki |
| 2011/0037706 A1 | 2/2011 | Pasquero et al. |
| 2011/0038552 A1 | 2/2011 | Lam |
| 2011/0039602 A1 | 2/2011 | McNamara et al. |
| 2011/0047368 A1 | 2/2011 | Sundaramurthy et al. |
| 2011/0047459 A1* | 2/2011 | Van Der Westhuizen ............ G06F 3/04883 345/173 |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050628 A1 | 3/2011 | Homma et al. |
| 2011/0050629 A1 | 3/2011 | Homma et al. |
| 2011/0050630 A1* | 3/2011 | Ikeda ............... G06F 3/0488 345/174 |
| 2011/0050653 A1 | 3/2011 | Miyazawa et al. |
| 2011/0050687 A1 | 3/2011 | Alyshev et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061021 A1 | 3/2011 | Kang et al. |
| 2011/0061029 A1 | 3/2011 | Yeh et al. |
| 2011/0063236 A1 | 3/2011 | Arai et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080349 A1 | 4/2011 | Holbein et al. |
| 2011/0080350 A1* | 4/2011 | Almalki ............. G06F 3/0488 345/173 |
| 2011/0080367 A1 | 4/2011 | Marchand et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0102829 A1 | 5/2011 | Jourdan |
| 2011/0107272 A1 | 5/2011 | Aquilar |
| 2011/0109617 A1 | 5/2011 | Snook et al. |
| 2011/0116716 A1 | 5/2011 | Kwon et al. |
| 2011/0119610 A1 | 5/2011 | Hackborn et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145752 A1 | 6/2011 | Fagans |
| 2011/0145753 A1 | 6/2011 | Prakash |
| 2011/0145759 A1 | 6/2011 | Leffert et al. |
| 2011/0145764 A1 | 6/2011 | Higuchi et al. |
| 2011/0149138 A1 | 6/2011 | Watkins |
| 2011/0154199 A1 | 6/2011 | Maffitt et al. |
| 2011/0159469 A1 | 6/2011 | Hwang et al. |
| 2011/0163971 A1 | 7/2011 | Wagner et al. |
| 2011/0163978 A1 | 7/2011 | Park et al. |
| 2011/0169765 A1 | 7/2011 | Aono |
| 2011/0175826 A1 | 7/2011 | Moore et al. |
| 2011/0175832 A1 | 7/2011 | Miyazawa et al. |
| 2011/0181521 A1 | 7/2011 | Reid et al. |
| 2011/0181526 A1 | 7/2011 | Shaffer et al. |
| 2011/0181538 A1 | 7/2011 | Aono |
| 2011/0181751 A1 | 7/2011 | Mizumori |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0191675 A1 | 8/2011 | Kauranen |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210834 A1 | 9/2011 | Pasquero et al. |
| 2011/0210926 A1 | 9/2011 | Pasquero et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0234491 A1* | 9/2011 | Nurmi ............. G06F 3/0488 345/157 |
| 2011/0234639 A1 | 9/2011 | Shimotani et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246801 A1 | 10/2011 | Seethaler et al. |
| 2011/0246877 A1 | 10/2011 | Kwak et al. |
| 2011/0248916 A1 | 10/2011 | Griffin et al. |
| 2011/0248930 A1* | 10/2011 | Kwok ............. G06F 3/0488 345/173 |
| 2011/0248942 A1 | 10/2011 | Yana et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0252369 A1 | 10/2011 | Chaudhri |
| 2011/0252380 A1 | 10/2011 | Chaudhri |
| 2011/0258537 A1 | 10/2011 | Rives et al. |
| 2011/0260994 A1 | 10/2011 | Saynac et al. |
| 2011/0263298 A1 | 10/2011 | Park |
| 2011/0265035 A1 | 10/2011 | Lepage et al. |
| 2011/0265045 A1 | 10/2011 | Hsieh |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296334 A1 | 12/2011 | Ryu et al. |
| 2011/0296351 A1 | 12/2011 | Ewing, Jr. et al. |

(56) References Cited

U.S. PATENT DOCUMENTS

| | | |
|---|---|---|
| 2011/0304559 A1 | 12/2011 | Pasquero |
| 2011/0304577 A1 | 12/2011 | Brown et al. |
| 2011/0310049 A1 | 12/2011 | Homma et al. |
| 2011/0319136 A1 | 12/2011 | Labowicz et al. |
| 2012/0001856 A1 | 1/2012 | Davidson |
| 2012/0005622 A1 | 1/2012 | Park et al. |
| 2012/0007857 A1 | 1/2012 | Noda et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0013607 A1 | 1/2012 | Lee |
| 2012/0019448 A1 | 1/2012 | Pitkanen et al. |
| 2012/0023591 A1 | 1/2012 | Sahita et al. |
| 2012/0026110 A1 | 2/2012 | Yamano |
| 2012/0030623 A1 | 2/2012 | Hoellwarth |
| 2012/0032979 A1 | 2/2012 | Blow et al. |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0047380 A1 | 2/2012 | Nurmi |
| 2012/0056837 A1 | 3/2012 | Park et al. |
| 2012/0056848 A1 | 3/2012 | Yamano et al. |
| 2012/0057039 A1 | 3/2012 | Gardiner et al. |
| 2012/0060123 A1 | 3/2012 | Smith |
| 2012/0062470 A1 | 3/2012 | Chang |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066636 A1* | 3/2012 | Kaprani ............... G06F 9/48 715/779 |
| 2012/0066648 A1 | 3/2012 | Rolleston et al. |
| 2012/0081326 A1 | 4/2012 | Heubel et al. |
| 2012/0081375 A1 | 4/2012 | Robert et al. |
| 2012/0084644 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092381 A1 | 4/2012 | Hoover et al. |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139844 A1 | 6/2012 | Ramstein et al. |
| 2012/0139864 A1 | 6/2012 | Sleeman et al. |
| 2012/0144330 A1 | 6/2012 | Flint |
| 2012/0146945 A1 | 6/2012 | Miyazawa et al. |
| 2012/0147052 A1 | 6/2012 | Homma et al. |
| 2012/0154303 A1 | 6/2012 | Lazaridis et al. |
| 2012/0154328 A1 | 6/2012 | Kono |
| 2012/0158629 A1 | 6/2012 | Hinckley et al. |
| 2012/0159380 A1 | 6/2012 | Kocienda et al. |
| 2012/0162093 A1* | 6/2012 | Buxton ............... G06F 3/0482 345/173 |
| 2012/0174042 A1 | 6/2012 | Chang |
| 2012/0169646 A1 | 7/2012 | Berkes et al. |
| 2012/0169716 A1 | 7/2012 | Mihara |
| 2012/0169768 A1* | 7/2012 | Roth ............... G06F 3/0486 345/629 |
| 2012/0176403 A1 | 7/2012 | Cha et al. |
| 2012/0179967 A1 | 7/2012 | Hayes |
| 2012/0180001 A1 | 7/2012 | Griffen et al. |
| 2012/0182226 A1 | 7/2012 | Tuli |
| 2012/0183271 A1 | 7/2012 | Forutanpour et al. |
| 2012/0192108 A1 | 7/2012 | Kolb |
| 2012/0192114 A1 | 7/2012 | DeLuca |
| 2012/0200528 A1 | 8/2012 | Ciesla et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0235912 A1 | 9/2012 | Laubach |
| 2012/0236037 A1 | 9/2012 | Lessing et al. |
| 2012/0240044 A1 | 9/2012 | Johnson et al. |
| 2012/0242584 A1 | 9/2012 | Tuli |
| 2012/0242599 A1* | 9/2012 | Seo ............... G06F 3/04847 345/173 |
| 2012/0245922 A1 | 9/2012 | Koslova et al. |
| 2012/0249575 A1 | 10/2012 | Krolczyk et al. |
| 2012/0249853 A1 | 10/2012 | Krolczyk et al. |
| 2012/0250598 A1 | 10/2012 | Lonnfors et al. |
| 2012/0256829 A1 | 10/2012 | Dodge |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260208 A1 | 10/2012 | Jung |
| 2012/0260219 A1 | 10/2012 | Piccolotto |
| 2012/0260220 A1 | 10/2012 | Griffin |
| 2012/0274578 A1 | 11/2012 | Snow et al. |
| 2012/0274591 A1 | 11/2012 | Rimas-Ribikauskas et al. |
| 2012/0274662 A1 | 11/2012 | Kim et al. |
| 2012/0278744 A1 | 11/2012 | Kozitsyn et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0303548 A1 | 11/2012 | Johnson et al. |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306632 A1 | 12/2012 | Fleizach et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2012/0311504 A1 | 12/2012 | van Os et al. |
| 2012/0313847 A1 | 12/2012 | Boda et al. |
| 2013/0002561 A1 | 1/2013 | Wakasa |
| 2013/0011065 A1* | 1/2013 | Yoshida ............... G06F 3/0304 382/187 |
| 2013/0014057 A1 | 1/2013 | Reinpoldt et al. |
| 2013/0016042 A1 | 1/2013 | Makinen et al. |
| 2013/0016056 A1 | 1/2013 | Shinozaki et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0042199 A1 | 2/2013 | Fong et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0050518 A1 | 2/2013 | Takemura et al. |
| 2013/0061172 A1 | 3/2013 | Huang et al. |
| 2013/0063364 A1 | 3/2013 | Moore |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0069889 A1 | 3/2013 | Pearce et al. |
| 2013/0069991 A1 | 3/2013 | Davidson |
| 2013/0074003 A1 | 3/2013 | Dolenc |
| 2013/0076649 A1 | 3/2013 | Myers et al. |
| 2013/0076676 A1 | 3/2013 | Gan |
| 2013/0077804 A1 | 3/2013 | Glebe et al. |
| 2013/0082824 A1 | 4/2013 | Colley |
| 2013/0082937 A1 | 4/2013 | Liu et al. |

(56) References Cited

U.S. PATENT DOCUMENTS

| | | |
|---|---|---|
| 2013/0086056 A1 | 4/2013 | Dyor et al. |
| 2013/0088455 A1 | 4/2013 | Jeong |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0102366 A1 | 4/2013 | Teng et al. |
| 2013/0111345 A1 | 5/2013 | Newman et al. |
| 2013/0111378 A1 | 5/2013 | Newman et al. |
| 2013/0111398 A1 | 5/2013 | Lu et al. |
| 2013/0111415 A1 | 5/2013 | Newman et al. |
| 2013/0111579 A1 | 5/2013 | Newman et al. |
| 2013/0113715 A1 | 5/2013 | Grant et al. |
| 2013/0113720 A1 | 5/2013 | Van Eerd et al. |
| 2013/0113760 A1 | 5/2013 | Gossweiler, III et al. |
| 2013/0120278 A1 | 5/2013 | Cantrell |
| 2013/0120280 A1 | 5/2013 | Kukulski |
| 2013/0120295 A1 | 5/2013 | Kim et al. |
| 2013/0120306 A1 | 5/2013 | Furukawa |
| 2013/0125039 A1 | 5/2013 | Murata |
| 2013/0127755 A1 | 5/2013 | Lynn et al. |
| 2013/0135243 A1 | 5/2013 | Hirsch et al. |
| 2013/0135288 A1 | 5/2013 | King et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145290 A1 | 6/2013 | Weber et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0159930 A1 | 6/2013 | Paretti et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0185642 A1 | 7/2013 | Gammons |
| 2013/0187869 A1 | 7/2013 | Rydenhag et al. |
| 2013/0191791 A1 | 7/2013 | Rydenhag et al. |
| 2013/0194217 A1 | 8/2013 | Lee et al. |
| 2013/0194480 A1 | 8/2013 | Fukata et al. |
| 2013/0198690 A1 | 8/2013 | Barsoum et al. |
| 2013/0201139 A1 | 8/2013 | Tanaka |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222323 A1 | 8/2013 | McKenzie |
| 2013/0222333 A1 | 8/2013 | Miles et al. |
| 2013/0222671 A1 | 8/2013 | Tseng et al. |
| 2013/0225238 A1 | 8/2013 | He |
| 2013/0227413 A1 | 8/2013 | Thorsander et al. |
| 2013/0227419 A1 | 8/2013 | Lee et al. |
| 2013/0227450 A1 | 8/2013 | Na et al. |
| 2013/0228023 A1 | 9/2013 | Drasnin et al. |
| 2013/0232353 A1 | 9/2013 | Belesiu et al. |
| 2013/0232402 A1 | 9/2013 | Lu et al. |
| 2013/0234929 A1 | 9/2013 | Libin |
| 2013/0239057 A1 | 9/2013 | Ubillos et al. |
| 2013/0246954 A1 | 9/2013 | Gray et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0263252 A1 | 10/2013 | Lien et al. |
| 2013/0265246 A1 | 10/2013 | Tae |
| 2013/0265452 A1 | 10/2013 | Shin et al. |
| 2013/0268875 A1 | 10/2013 | Han et al. |
| 2013/0271395 A1 | 10/2013 | Tsai et al. |
| 2013/0275422 A1 | 10/2013 | Silber et al. |
| 2013/0278520 A1 | 10/2013 | Weng et al. |
| 2013/0293496 A1 | 11/2013 | Takamoto |
| 2013/0305184 A1 | 11/2013 | Kim et al. |
| 2013/0307790 A1 | 11/2013 | Konttori et al. |
| 2013/0307792 A1 | 11/2013 | Andres et al. |
| 2013/0314359 A1 | 11/2013 | Sudou |
| 2013/0314434 A1 | 11/2013 | Shetterly et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0326583 A1 | 12/2013 | Freihold et al. |
| 2013/0328770 A1 | 12/2013 | Parham |
| 2013/0328793 A1 | 12/2013 | Chowdhury |
| 2013/0328796 A1 | 12/2013 | Al-Dahle et al. |
| 2013/0332836 A1 | 12/2013 | Cho |
| 2013/0332892 A1 | 12/2013 | Matsuki |
| 2013/0335373 A1 | 12/2013 | Tomiyasu |
| 2013/0338847 A1 | 12/2013 | Lisseman et al. |
| 2013/0339001 A1 | 12/2013 | Craswell et al. |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0013271 A1 | 1/2014 | Moore et al. |
| 2014/0015784 A1 | 1/2014 | Oonishi |
| 2014/0019786 A1 | 1/2014 | Green et al. |
| 2014/0024414 A1 | 1/2014 | Fuji |
| 2014/0026098 A1 | 1/2014 | Gilman |
| 2014/0026099 A1 | 1/2014 | Andersson Reimer et al. |
| 2014/0028554 A1 | 1/2014 | De Los Reyes et al. |
| 2014/0028571 A1 | 1/2014 | St. Clair |
| 2014/0028601 A1 | 1/2014 | Moore |
| 2014/0028606 A1 | 1/2014 | Giannetta |
| 2014/0035804 A1 | 2/2014 | Dearman |
| 2014/0035826 A1 | 2/2014 | Frazier et al. |
| 2014/0049491 A1 | 2/2014 | Nagar et al. |
| 2014/0053116 A1 | 2/2014 | Smith et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0063316 A1 | 3/2014 | Lee et al. |
| 2014/0063541 A1 | 3/2014 | Yamazaki |
| 2014/0067293 A1 | 3/2014 | Parivar et al. |
| 2014/0068475 A1 | 3/2014 | Li et al. |
| 2014/0071060 A1 | 3/2014 | Santos-Gomez |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0092031 A1 | 4/2014 | Schwartz et al. |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0123080 A1 | 5/2014 | Gan |
| 2014/0139456 A1 | 5/2014 | Wigdor et al. |
| 2014/0139471 A1 | 5/2014 | Matsuki |
| 2014/0145970 A1 | 5/2014 | Cho |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0160168 A1 | 6/2014 | Ogle |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168110 A1 | 6/2014 | Araki et al. |

(56) References Cited

U.S. PATENT DOCUMENTS

| | | |
|---|---|---|
| 2014/0168153 A1 | 6/2014 | Deichmann et al. |
| 2014/0173517 A1 | 6/2014 | Chaudhri |
| 2014/0179377 A1 | 6/2014 | Song et al. |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210741 A1* | 7/2014 | Komatsu ............ G06F 3/0418 345/173 |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0223376 A1 | 8/2014 | Tarvainen et al. |
| 2014/0223381 A1 | 8/2014 | Huang et al. |
| 2014/0232669 A1 | 8/2014 | Ohlsson et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0253305 A1 | 9/2014 | Rosenberg et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282211 A1 | 9/2014 | Ady et al. |
| 2014/0282214 A1 | 9/2014 | Shirzadi et al. |
| 2014/0298258 A1 | 10/2014 | Doan et al. |
| 2014/0300569 A1 | 10/2014 | Matsuki et al. |
| 2014/0304599 A1 | 10/2014 | Alexandersson |
| 2014/0304646 A1 | 10/2014 | Rossman |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0351744 A1 | 11/2014 | Jeon et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0361982 A1 | 12/2014 | Shaffer |
| 2014/0365882 A1 | 12/2014 | Lemay |
| 2014/0365945 A1 | 12/2014 | Karunamuni et al. |
| 2014/0365956 A1 | 12/2014 | Karunamuni et al. |
| 2014/0368436 A1 | 12/2014 | Abzarian et al. |
| 2014/0380247 A1 | 12/2014 | Tecarro et al. |
| 2015/0002664 A1 | 1/2015 | Eppinger et al. |
| 2015/0012861 A1 | 1/2015 | Loginov |
| 2015/0015763 A1 | 1/2015 | Lee et al. |
| 2015/0019997 A1 | 1/2015 | Kim et al. |
| 2015/0020032 A1 | 1/2015 | Chen |
| 2015/0020033 A1 | 1/2015 | Newham et al. |
| 2015/0020036 A1 | 1/2015 | Kim et al. |
| 2015/0022328 A1* | 1/2015 | Choudhury ............ G06F 1/163 340/12.5 |
| 2015/0022482 A1 | 1/2015 | Hewitt et al. |
| 2015/0026584 A1 | 1/2015 | Kobayakov et al. |
| 2015/0026592 A1 | 1/2015 | Mohammed et al. |
| 2015/0026642 A1 | 1/2015 | Wilson et al. |
| 2015/0029149 A1 | 1/2015 | Andersson et al. |
| 2015/0033184 A1 | 1/2015 | Kim et al. |
| 2015/0040065 A1 | 2/2015 | Bianco et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0052464 A1 | 2/2015 | Chen et al. |
| 2015/0055890 A1 | 2/2015 | Lundin et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0066950 A1 | 3/2015 | Tobe et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0082162 A1 | 3/2015 | Cho et al. |
| 2015/0082238 A1 | 3/2015 | Meng |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0128092 A1 | 5/2015 | Lee et al. |
| 2015/0135108 A1 | 5/2015 | Pope et al. |
| 2015/0135109 A1 | 5/2015 | Zambetti et al. |
| 2015/0135132 A1* | 5/2015 | Josephson ............ H04W 4/021 715/784 |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0143294 A1 | 5/2015 | Piccinato et al. |
| 2015/0143303 A1 | 5/2015 | Sarrazin et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0169059 A1 | 6/2015 | Behles et al. |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205342 A1 | 7/2015 | Ooi et al. |
| 2015/0205495 A1 | 7/2015 | Koide et al. |
| 2015/0205775 A1 | 7/2015 | Berdahl et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268802 A1 | 9/2015 | Kim et al. |
| 2015/0268813 A1 | 9/2015 | Bos |
| 2015/0309573 A1 | 10/2015 | Brombach et al. |
| 2015/0321607 A1 | 11/2015 | Cho et al. |
| 2015/0332107 A1 | 11/2015 | Paniaras |
| 2015/0332607 A1 | 11/2015 | Gardner, Jr. et al. |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011725 A1 | 1/2016 | D'Argenio et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0077721 A1 | 3/2016 | Laubach et al. |
| 2016/0085385 A1 | 3/2016 | Gao et al. |
| 2016/0092071 A1 | 3/2016 | Lawson et al. |
| 2016/0124924 A1 | 5/2016 | Greenberg et al. |
| 2016/0125234 A1 | 5/2016 | Ota et al. |
| 2016/0132139 A1 | 5/2016 | Du et al. |
| 2016/0188181 A1 | 6/2016 | Smith |
| 2016/0188186 A1 | 6/2016 | Yea |

(56) References Cited

U.S. PATENT DOCUMENTS

| | | |
|---|---|---|
| 2016/0196028 A1 | 7/2016 | Kenney et al. |
| 2016/0210025 A1 | 7/2016 | Bernstein et al. |
| 2016/0246478 A1 | 8/2016 | Davis et al. |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0306507 A1 | 10/2016 | Defazio et al. |
| 2016/0320906 A1 | 11/2016 | Bokma et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0090617 A1 | 3/2017 | Jang et al. |
| 2017/0090699 A1 | 3/2017 | Pennington et al. |
| 2017/0091153 A1 | 3/2017 | Thimbleby |
| 2017/0109011 A1 | 4/2017 | Jiang |
| 2017/0115867 A1 | 4/2017 | Bargmann |
| 2017/0123497 A1 | 5/2017 | Yonezawa |
| 2017/0124699 A1 | 5/2017 | Lane |
| 2017/0139565 A1 | 5/2017 | Choi |
| 2017/0315694 A1 | 11/2017 | Alonso Ruiz et al. |
| 2017/0357403 A1 | 12/2017 | Geary et al. |
| 2018/0024681 A1 | 1/2018 | Bernstein et al. |
| 2018/0059866 A1 | 3/2018 | Drake et al. |
| 2018/0082522 A1 | 3/2018 | Bartosik |
| 2018/0188920 A1 | 7/2018 | Bernstein et al. |
| 2018/0342103 A1 | 11/2018 | Schwartz et al. |
| 2018/0349362 A1 | 12/2018 | Sharp et al. |
| 2018/0364898 A1 | 12/2018 | Chen |
| 2019/0012059 A1 | 1/2019 | Kwon et al. |
| 2019/0018562 A1 | 1/2019 | Bernstein et al. |
| 2019/0042075 A1 | 2/2019 | Bernstein et al. |
| 2019/0042078 A1 | 2/2019 | Bernstein et al. |
| 2019/0065043 A1 | 2/2019 | Zambetti et al. |
| 2019/0121493 A1 | 4/2019 | Bernstein et al. |
| 2019/0121520 A1 | 4/2019 | Cieplinski et al. |
| 2019/0138101 A1 | 5/2019 | Bernstein |
| 2019/0138102 A1 | 5/2019 | Missig |
| 2019/0138189 A1 | 5/2019 | Missig |
| 2019/0146643 A1 | 5/2019 | Foss et al. |
| 2019/0155503 A1 | 5/2019 | Alonso Ruiz et al. |
| 2019/0158727 A1 | 5/2019 | Penha et al. |
| 2019/0163358 A1 | 5/2019 | Dascola et al. |
| 2019/0171353 A1 | 6/2019 | Missig et al. |
| 2019/0171354 A1 | 6/2019 | Dascola et al. |
| 2019/0212896 A1 | 7/2019 | Karunamuni et al. |
| 2019/0332257 A1 | 10/2019 | Kudurshian et al. |
| 2019/0364194 A1 | 11/2019 | Penha et al. |
| 2019/0391658 A1 | 12/2019 | Missig et al. |
| 2020/0081614 A1 | 3/2020 | Zambetti |
| 2020/0142548 A1 | 5/2020 | Karunamuni et al. |
| 2020/0201472 A1 | 6/2020 | Bernstein et al. |
| 2020/0210059 A1 | 7/2020 | Hu et al. |
| 2020/0218445 A1 | 7/2020 | Alonso Ruiz et al. |
| 2020/0301556 A1 | 9/2020 | Alonso Ruiz et al. |
| 2020/0333936 A1 | 10/2020 | Khoe et al. |
| 2020/0371683 A1 | 11/2020 | Zambetti et al. |
| 2020/0394413 A1 | 12/2020 | Bhanu et al. |
| 2020/0396375 A1 | 12/2020 | Penha et al. |
| 2021/0081082 A1 | 3/2021 | Dascola et al. |
| 2021/0117054 A1 | 4/2021 | Karunamuni et al. |
| 2021/0191602 A1 | 6/2021 | Brown et al. |
| 2021/0191975 A1 | 6/2021 | Lu et al. |
| 2021/0311598 A1 | 10/2021 | Bernstein et al. |
| 2021/0326039 A1 | 10/2021 | Alonso Ruiz et al. |
| 2021/0382613 A1 | 12/2021 | Kudurshian et al. |
| 2022/0011932 A1 | 1/2022 | Khoe et al. |
| 2022/0070359 A1 | 3/2022 | Clarke et al. |
| 2022/0187985 A1 | 6/2022 | Dascola et al. |
| 2022/0365671 A1 | 11/2022 | Bernstein et al. |
| 2023/0133870 A1 | 5/2023 | Penha et al. |
| 2024/0019999 A1 | 1/2024 | Dascola et al. |
| 2024/0103694 A1 | 3/2024 | Foss et al. |

FOREIGN PATENT DOCUMENTS

| | | |
|---|---|---|
| CN | 1534991 A | 6/2004 |
| CN | 1620327 A | 5/2005 |
| CN | 1808362 A | 7/2006 |
| CN | 101068310 A | 7/2007 |
| CN | 101118469 A | 2/2008 |
| CN | 101192097 A | 6/2008 |
| CN | 101202866 A | 6/2008 |
| CN | 101222704 A | 7/2008 |
| CN | 101227764 A | 7/2008 |
| CN | 101241397 A | 8/2008 |
| CN | 101320303 A | 12/2008 |
| CN | 101356493 A | 1/2009 |
| CN | 101384977 A | 3/2009 |
| CN | 101390039 A | 3/2009 |
| CN | 101421707 A | 4/2009 |
| CN | 101464777 A | 6/2009 |
| CN | 101498979 A | 8/2009 |
| CN | 101526876 A | 9/2009 |
| CN | 101527745 A | 9/2009 |
| CN | 101562703 A | 10/2009 |
| CN | 101593077 A | 12/2009 |
| CN | 101609380 A | 12/2009 |
| CN | 101620507 A | 1/2010 |
| CN | 101627359 A | 1/2010 |
| CN | 101630230 A | 1/2010 |
| CN | 101685370 A | 3/2010 |
| CN | 101692194 A | 4/2010 |
| CN | 101727179 A | 6/2010 |
| CN | 101739206 A | 6/2010 |
| CN | 101763193 A | 6/2010 |
| CN | 101784981 A | 7/2010 |
| CN | 101809526 A | 8/2010 |
| CN | 101840299 A | 9/2010 |
| CN | 101896962 A | 11/2010 |
| CN | 101937304 A | 1/2011 |
| CN | 101945212 A | 1/2011 |
| CN | 101952796 A | 1/2011 |
| CN | 101971603 A | 2/2011 |
| CN | 101998052 A | 3/2011 |
| CN | 102004575 A | 4/2011 |
| CN | 102004576 A | 4/2011 |
| CN | 102004577 A | 4/2011 |
| CN | 102004593 A | 4/2011 |
| CN | 102004602 A | 4/2011 |
| CN | 102004604 A | 4/2011 |
| CN | 102016777 A | 4/2011 |
| CN | 102053790 A | 5/2011 |
| CN | 102067068 A | 5/2011 |
| CN | 102112946 A | 6/2011 |
| CN | 102150018 A | 8/2011 |
| CN | 102160021 A | 8/2011 |
| CN | 102171629 A | 8/2011 |
| CN | 102195514 A | 9/2011 |
| CN | 102203702 A | 9/2011 |

(56) References Cited

FOREIGN PATENT DOCUMENTS

| | | |
|---|---|---|
| CN | 102214038 A | 10/2011 |
| CN | 102223476 A | 10/2011 |
| CN | 102243662 A | 11/2011 |
| CN | 102257460 A | 11/2011 |
| CN | 102301322 A | 12/2011 |
| CN | 102349038 A | 2/2012 |
| CN | 102349040 A | 2/2012 |
| CN | 102354269 A | 2/2012 |
| CN | 102365666 A | 2/2012 |
| CN | 102375605 A | 3/2012 |
| CN | 102385478 A | 3/2012 |
| CN | 102388351 A | 3/2012 |
| CN | 102438092 A | 5/2012 |
| CN | 102483666 A | 5/2012 |
| CN | 102483677 A | 5/2012 |
| CN | 102546925 A | 7/2012 |
| CN | 102566908 A | 7/2012 |
| CN | 102576251 A | 7/2012 |
| CN | 102576282 A | 7/2012 |
| CN | 102625931 A | 8/2012 |
| CN | 102646013 A | 8/2012 |
| CN | 102662571 A | 9/2012 |
| CN | 102662573 A | 9/2012 |
| CN | 102722312 A | 10/2012 |
| CN | 102752441 A | 10/2012 |
| CN | 102792255 A | 11/2012 |
| CN | 102819331 A | 12/2012 |
| CN | 102819401 A | 12/2012 |
| CN | 102841677 A | 12/2012 |
| CN | 102880417 A | 1/2013 |
| CN | 103019586 A | 4/2013 |
| CN | 103092386 A | 5/2013 |
| CN | 103092406 A | 5/2013 |
| CN | 103097992 A | 5/2013 |
| CN | 103139473 A | 6/2013 |
| CN | 103186345 A | 7/2013 |
| CN | 103201714 A | 7/2013 |
| CN | 103268184 A | 8/2013 |
| CN | 103279295 A | 9/2013 |
| CN | 103390017 A | 11/2013 |
| CN | 103518176 A | 1/2014 |
| CN | 103562828 A | 2/2014 |
| CN | 103562841 A | 2/2014 |
| CN | 103581544 A | 2/2014 |
| CN | 103620531 A | 3/2014 |
| CN | 103649885 A | 3/2014 |
| CN | 103699292 A | 4/2014 |
| CN | 103699295 A | 4/2014 |
| CN | 103777850 A | 5/2014 |
| CN | 103777886 A | 5/2014 |
| CN | 103793134 A | 5/2014 |
| CN | 103838465 A | 6/2014 |
| CN | 103870190 A | 6/2014 |
| CN | 103888681 A | 6/2014 |
| CN | 103970474 A | 8/2014 |
| CN | 103984501 A | 8/2014 |
| CN | 104011637 A | 8/2014 |
| CN | 104020868 A | 9/2014 |
| CN | 104020955 A | 9/2014 |
| CN | 104021021 A | 9/2014 |
| CN | 104024985 A | 9/2014 |
| CN | 104038838 A | 9/2014 |
| CN | 104049861 A | 9/2014 |
| CN | 104077014 A | 10/2014 |
| CN | 104090979 A | 10/2014 |
| CN | 104142798 A | 11/2014 |
| CN | 104160362 A | 11/2014 |
| CN | 104205098 A | 12/2014 |
| CN | 104238904 A | 12/2014 |
| CN | 104267902 A | 1/2015 |
| CN | 104270565 A | 1/2015 |
| CN | 104331239 A | 2/2015 |
| CN | 104349124 A | 2/2015 |
| CN | 104392292 A | 3/2015 |
| CN | 104412201 A | 3/2015 |
| CN | 104471521 A | 3/2015 |
| CN | 104487928 A | 4/2015 |
| CN | 104487929 A | 4/2015 |
| CN | 104487930 A | 4/2015 |
| CN | 105264476 A | 1/2016 |
| DE | 100 59 906 A1 | 6/2002 |
| EP | 0 364178 A2 | 4/1990 |
| EP | 0 859 307 A1 | 3/1998 |
| EP | 0 880 090 A2 | 11/1998 |
| EP | 1 028 583 A1 | 8/2000 |
| EP | 1 406 150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 112 586 A1 | 10/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 284 675 A2 | 2/2011 |
| EP | 2 299 351 A2 | 3/2011 |
| EP | 2 302 496 A1 | 3/2011 |
| EP | 2 363 790 A1 | 9/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 445 182 A2 | 4/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 615 535 A1 | 7/2013 |
| EP | 2 631 737 A1 | 8/2013 |
| EP | 2 674 834 A2 | 12/2013 |
| EP | 2 674 846 A2 | 12/2013 |
| EP | 2 708985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| EP | 3 664 092 A1 | 6/2020 |
| GB | 2 402 105 A | 12/2004 |
| JP | 58-182746 | 10/1983 |
| JP | H05-204583 | 8/1993 |
| JP | H06-161647 A | 6/1994 |
| JP | H07-098769 A | 4/1995 |
| JP | H07-104915 | 4/1995 |
| JP | H07-151512 | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2001-078137 A | 3/2001 |
| JP | 2001-202192 A | 7/2001 |
| JP | 2001-222355 A | 8/2001 |
| JP | 2001-306207 A | 11/2001 |
| JP | 2002-044536 A | 2/2002 |
| JP | 2002-149312 A | 5/2002 |
| JP | 3085481 U | 5/2002 |
| JP | 2002-182855 A | 6/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-078957 A | 3/2004 |
| JP | 2004-086733 A | 3/2004 |
| JP | 2004-120576 A | 4/2004 |
| JP | 2004-152217 A | 5/2004 |
| JP | 2004-288208 A | 10/2004 |
| JP | 2005-031786 A | 2/2005 |
| JP | 2005-092386 A | 4/2005 |

(56) References Cited

FOREIGN PATENT DOCUMENTS

| | | |
|---|---|---|
| JP | 2005-102106 A | 4/2005 |
| JP | 2005-135106 A | 5/2005 |
| JP | 2005-157842 A | 6/2005 |
| JP | 2005-196810 A | 7/2005 |
| JP | 2005-317041 A | 11/2005 |
| JP | 2005-352927 | 12/2005 |
| JP | 2006-059238 A | 3/2006 |
| JP | 2006-185443 A | 7/2006 |
| JP | 2007-116384 A | 5/2007 |
| JP | 2007-148104 A | 6/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-516348 A | 5/2008 |
| JP | 2008-146453 A | 6/2008 |
| JP | 2008-191086 A | 8/2008 |
| JP | 2008-537615 A | 9/2008 |
| JP | 2008-305174 A | 12/2008 |
| JP | 2009-500761 A | 1/2009 |
| JP | 2009-110243 A | 5/2009 |
| JP | 2009-129171 A | 6/2009 |
| JP | 2009-129443 A | 6/2009 |
| JP | 2009-169452 A | 7/2009 |
| JP | 2009-211704 A | 9/2009 |
| JP | 2009-217543 A | 9/2009 |
| JP | 2009-294688 A | 12/2009 |
| JP | 2009-545805 A | 12/2009 |
| JP | 2010-009321 A | 1/2010 |
| JP | 2010-503126 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-181940 A | 8/2010 |
| JP | 2010-198385 A | 9/2010 |
| JP | 2010-536077 A | 11/2010 |
| JP | 2010-541071 A | 12/2010 |
| JP | 2011-501307 A | 1/2011 |
| JP | 2011-028635 A | 2/2011 |
| JP | 2011-048023 A | 3/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-054196 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-170538 A | 9/2011 |
| JP | 2011-192179 A | 9/2011 |
| JP | 2011-192215 A | 9/2011 |
| JP | 2011-197848 A | 10/2011 |
| JP | 2011-221640 A | 11/2011 |
| JP | 2011-232947 A | 11/2011 |
| JP | 2011-242386 A | 12/2011 |
| JP | 2011-250004 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-033061 A | 2/2012 |
| JP | 2012-043266 A | 3/2012 |
| JP | 2012-043267 A | 3/2012 |
| JP | 2012-053687 A | 3/2012 |
| JP | 2012-053754 | 3/2012 |
| JP | 2012-053926 A | 3/2012 |
| JP | 2012-073785 A | 4/2012 |
| JP | 2012-073873 A | 4/2012 |
| JP | 2012-509605 A | 4/2012 |
| JP | 2012-093820 A | 5/2012 |
| JP | 2012-118825 A | 6/2012 |
| JP | 2012-118993 A | 6/2012 |
| JP | 2012-123564 A | 6/2012 |
| JP | 2012-128825 A | 7/2012 |
| JP | 2012-168620 A | 9/2012 |
| JP | 2012-212473 A | 11/2012 |
| JP | 2012-527685 A | 11/2012 |
| JP | 2013-025357 A | 2/2013 |
| JP | 2013-030050 A | 2/2013 |
| JP | 2013-058149 A | 3/2013 |
| JP | 2013-077270 A | 4/2013 |
| JP | 2013-080521 A | 5/2013 |
| JP | 2013-093020 A | 5/2013 |
| JP | 2013-098826 A | 5/2013 |
| JP | 2013-101465 A | 5/2013 |
| JP | 2013-105410 C | 5/2013 |
| JP | 2013-520727 A | 6/2013 |
| JP | 2013-131185 A | 7/2013 |
| JP | 2013-529339 A | 7/2013 |
| JP | 2013-200879 A | 10/2013 |
| JP | 2013-236298 A | 11/2013 |
| JP | 2013-542488 A | 11/2013 |
| JP | 2013-250602 A | 12/2013 |
| JP | 2014-504419 | 2/2014 |
| JP | 2014-052852 A | 3/2014 |
| JP | 2014-130567 A | 7/2014 |
| JP | 2014-140112 A | 7/2014 |
| JP | 2014-149833 A | 8/2014 |
| JP | 2014-519109 A | 8/2014 |
| JP | 2014-529137 A | 10/2014 |
| JP | 2014-232347 A | 12/2014 |
| JP | 2015-099555 A | 5/2015 |
| JP | 2015-521315 A | 7/2015 |
| JP | 2015-153420 A | 8/2015 |
| JP | 2015-185161 A | 10/2015 |
| KR | 20020041828 A | 6/2002 |
| KR | 2006-0071353 A | 6/2006 |
| KR | 2006-0117870 A | 11/2006 |
| KR | 100807738 B1 | 2/2008 |
| KR | 20080026138 A | 3/2008 |
| KR | 2008-0045143 A | 4/2008 |
| KR | 100823871 B1 | 4/2008 |
| KR | 2008-0054346 A | 6/2008 |
| KR | 2009-0066319 A | 6/2009 |
| KR | 2009-0108065 A | 10/2009 |
| KR | 2010-0010860 A | 2/2010 |
| KR | 2010-0014095 A | 2/2010 |
| KR | 2010 0133246 A | 12/2010 |
| KR | 2011 0026176 A | 3/2011 |
| KR | 2011 0086501 A | 7/2011 |
| KR | 20120130972 A | 1/2012 |
| KR | 2012 0103670 A | 9/2012 |
| KR | 20120135488 A | 12/2012 |
| KR | 20120135723 A | 12/2012 |
| KR | 20130027017 A | 3/2013 |
| KR | 20130076397 A | 7/2013 |
| KR | 2013 0099647 A | 9/2013 |
| KR | 20130135871 A | 12/2013 |
| KR | 2014 0016495 A | 2/2014 |
| KR | 2014 0029720 A | 3/2014 |
| KR | 2014 0043760 A | 4/2014 |
| KR | 2014 0067965 A | 6/2014 |
| KR | 2014 0079110 A | 6/2014 |
| KR | 2014 0122000 A | 10/2014 |
| KR | 20150013263 A | 2/2015 |
| KR | 20150021977 A | 3/2015 |
| RU | 2007145218 A | 7/2009 |
| RU | 2503989 C2 | 1/2014 |
| TW | 201447740 A | 12/2014 |
| WO | WO 2005/106637 A2 | 11/2005 |
| WO | WO 2006/013485 A2 | 2/2006 |
| WO | WO 2006/042309 A1 | 4/2006 |

(56) References Cited

FOREIGN PATENT DOCUMENTS

| | | |
|---|---|---|
| WO | WO 2006/094308 A2 | 9/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/155981 A1 | 12/2009 |
| WO | WO 2009/158549 A2 | 12/2009 |
| WO | WO 2010/013876 A1 | 2/2010 |
| WO | WO 2010/032598 A1 | 3/2010 |
| WO | WO 2010/090010 A1 | 8/2010 |
| WO | WO 2010/122813 A1 | 10/2010 |
| WO | WO 2010/134729 A2 | 11/2010 |
| WO | WO 2011/024389 A1 | 3/2011 |
| WO | WO 2011/024465 A1 | 3/2011 |
| WO | WO 2011/024521 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 A1 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/137946 A1 | 10/2012 |
| WO | WO 2012/150540 A2 | 11/2012 |
| WO | WO 2012/153555 A1 | 11/2012 |
| WO | WO 2013/022486 A1 | 2/2013 |
| WO | WO 2013/035725 A1 | 3/2013 |
| WO | WO 2013/112453 A1 | 8/2013 |
| WO | WO 2013/127055 A1 | 9/2013 |
| WO | WO 2013/169302 A1 | 11/2013 |
| WO | WO 2013/169845 A1 | 11/2013 |
| WO | WO 2013/169846 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/034706 A1 | 3/2014 |
| WO | WO 2014/105275 A1 | 7/2014 |
| WO | WO 2014/105276 A1 | 7/2014 |
| WO | WO 2014/105277 A2 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/152601 A1 | 9/2014 |
| WO | WO 2014/200733 A1 | 12/2014 |
| WO | WO 2013/145804 | 12/2015 |
| WO | WO 2016/200584 A2 | 12/2016 |

OTHER PUBLICATIONS

Angelov, "Sponsor Flip Wall with Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "Acer Liquid Z5 Duo User's Manual", https://global-download.acer.com, Feb. 21, 2014, 65 pages.
Anonymous, "Android—What Should Status Bar Toggle Button Behavior Be?", https://ux.stackechange.com/questions/34814, Jan. 15, 2015, 2 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Anonymous, "[new] WMP12 with Taskbar Toolbar for Windows 7—Windows Customization—WinMatrix", http://www.winmatrix.com/forums/index/php?/topic/25528-new-wmp12-with-taskbar-toolbar-for-windows-7, Jan. 27, 2013, 6 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia 808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Apple, "Final Cut Express 4 User Manual", https://wsi.li.dl/mBGZWEQ8fh556f/, Jan. 1, 2007, 1,152 pages.
Apple, "Apple—September Event 2014", https://www.youtube.com/watch?v=38lqQpqwPe7s, Sep. 10, 2014, 5 pages.
Azundris, "A Fire in the Pie," http://web.archive.org/web/20140722062639/http://blog.azundrix.com/archives/168-A-fire-in-the-sky.html, Jul. 22, 2014, 8 pages.
Billibi, "Android 5.0 Lollipop", https://www.bilibili.comvideo/av1636046?from=search&seid=3128140235778895126, Oct. 19, 2014, 6 pages.
b-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Boring, "The Fat Thumb: Using the Thumb's Contact Size for Single-Handed Mobile Interaction", https://www.youtube.com/watch?v=E9vGU5R8nsc&feature=youtu.be, Jun. 14, 2012, 2 pages.
Borowska, "6 Types of Digital Affordance that Impact Your Ux", https://www.webdesignerdepot.com/2015/04/6-types-of-digital-affordance-that-implact-your-ux, Apr. 7, 2015, 6 pages.
Brewster, "The Design and Evaluation of a Vibrotactile Progress Bar", Glasgow Interactive Systems Group, University of Glasgow, Glasgow, G12 8QQ, UK, 2005, 2 pages.
Brownlee, "Android 5.0 Lollipop Feature Review!", https//www.youtube.com/watch?v=pEDQ1z1-PvU, Oct. 27, 2014, 5 pages.
Cheng, "iPhone 5: a little bit taller, a little bit baller", https://arstechnica.com/gadgets/2012/09/iphone-5-a-little-bit-taller-a little-bit-baller, Oct. 14, 2021, 22 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gestures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.

(56) References Cited

OTHER PUBLICATIONS

Dzyre, "10 Android Notification Features You Can Fiddle With", http://www.hongkiat.com/blog/android-notification-features, Mar. 10, 2014, 10 pages.
Easton-Ellett, "Three Free Cydia Utilities to Remove iOS Notification Badges", http://www.ijailbreak.com/cydia/three-free-cydia-utilities-to-remove-ios-notification-badges, Apr. 14, 2012, 2 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs-Preview And Convert Pictures From Windows Context Menu", https://web.addictivetips.com/windows-tips/sagethumbs-preview-and-convert-photos-from-windows-context-menu, Aug. 8, 2011, 5 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flaherty, "Is Apple Watch's Pressure-Sensitive Screen a Bigger Deal Than The Gadget Itself?", http://www.wired.com/2014/09/apple-watchs-pressure-sensitive-screen-bigger-deal-gadget, Sep. 15, 2014, 3 pages.
Flixel, "Cinemagraph Pro for Mac", https://flixel.com/products/mac/cinemagraph-pro, 2014, 7 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Garcia-Hernandez et al., "Orientation Discrimination of Patterned Surfaces through an Actuated and Non-Actuated Tactile Display", 2011 IEEE World Haptics Conference, Istanbul, Jun. 21-24, 2011, 3 pages.
Forlines, et al., "Glimpse: a Novel Input Model for Multi-level Devices", Chi '05 Extended Abstracts on Human Factors in Computing Systems, Apr. 2, 2005, 4 pages.
Gardner, "Recenz—Recent Apps in One Tap", You Tube, https://www.youtube.com/watch?v-qailSHRgsTo, May 15, 2015, 1 page.
Geisler, "Enriched Links: A Framework for Improving Web Navigation Using Pop-Up Views", Journal of the American Society for Information Science, Chapel Hill, NC, Jan. 1, 2000, 13 pages.
Gonzalo et al., "Zliding: Fluid Zooming and Sliding for High Precision Parameter Manipulation", Department of Computer Science, University of Toronto, Seattle, Washington, Oct. 23, 2005, 10 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Grant, "Android's Notification Center", https://www.objc.io/issues/11-android/android-notifications, Apr. 30, 2014, 26 pages.
Gurman, "Force Touch on iPhone 6S Revealed: Expect Shortcuts, Faster Actions, iOS", 9To5Mac Aug. 10, 2015, 31 pages.
Henderson et al., "Opportunistic User Interfaces for Augmented Reality", Department of Computer Science, New York, NY, Jan. 2010, 13 pages.
IBM et al., "Pressure-Sensitive Icons", IBM Technical Disclosure Bulletin, vol. 33, No. 1B, Jun. 1, 1990, 3 pages.
iCIMS Recruiting Software, "Blackberry Playbook Review," http://www.tested.com/tech.tablets/5749-blackberry-playbook-review/, 2015, 11 pages.
iPhoneHacksTV, "Confero allows you to easily manage your Badge notifications—iPhone Hacks", youtube, https://wwwyoutube.com/watch?v=JCk61pnL4SU, Dec. 26, 2014, 3 pages.
iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Jauregui, "Design and Evaluation of 3D Cursors and Motion Parallax for the Exploration of Desktop Virtual Environments", IEEE Symposium on 3D User Interfaces 2012, Mar. 4, 2012, 8 pages.
Jones, "Touch Screen with Feeling", IEEE Spectrum, , spectrum.ieee.org/commuting/hardware/touch-screens-with-feeling, May 1, 2009, 2 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside The Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
MacKenzie et al., "The Tactile Touchpad", Chi '97 Extended Abstracts on Human Factors in Computing Systems Looking to the Future, Chi '97, Mar. 22, 1997, 5 pages.
Mahdi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Matthew, "How to Preview Photos and Images From Right-Click Context Menue in Windows [Tip]", http://www.dottech.org/159009/add-image-preview-in-windows-context-menu-tip, Jul. 4, 2014, 5 pages.
McGarry, "Everything You Can Do With Force Touch on Apple Watch", Macworld, www.macworld.com, May 6, 2015, 4 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Lumia—How to Personalize Your Start Screen", https://www.youtube.com/watch?v=6GI5Z3TrSEs, Nov. 11, 2014, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics the *Sandpaper* System for Synthesizing Texture for a Force-Feedback Display," Massachusetts Institute of Technology, Jun. 1978, 217 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Neuburg, "Detailed Explanation iOS SDK", Oreilly Japan, Dec. 22, 2014, vol. 4, P175-186, 15 pages.
Nickinson, How to Use Do Not Disturb on the HTC One M8, https://www.androidcentral.com/how-to-use-do-not-disturb-htc-one-m8, Apr. 7, 2014, 9 pages.
Nickinson, "Inside Android 4.2: Notifications and Quick Settings", https://www.andrloidcentral.com/inside-android-42-notifications-and-quick-settings, Nov. 3, 2012, 3 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Nishino, "A Touch Screen Interface Design with Tactile Feedback", Computer Science, 2011 International Conference on Complex, Intelligent, and Software Intensive Systems, 2011, 4 pages.

(56) References Cited

OTHER PUBLICATIONS

Ogino, "iOS 7 Design Standard", Japan, Impress Japan Corporation, 1st edition, Nov. 21, 2013, 2 pages.
Oh, et al., "Moving Objects with 2D Input Devices in CAD Systems and Desktop Virtual Environments", Proceedings of Graphics Interface 2005, 8 pages, May 2005.
O'Hara, et al., "Pressure-Sensitive Icons", ip.com Journal, ip.com Inc., West Henrietta, NY, US, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
Phonebuff, "How to Pair Bluetooth on the iPhone", https://www.youtube.com/watch?v=LudNwEar9A8, Feb. 8, 2012, 3 pages.
Plaisant et al., "Touchscreen Toggle Design", Proceedings of CHI '92, pp. 667-668, May 3-7, 1992, 2 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Rekimoto, et al., "SmartPad: A Finger-Sensing Keypad for Mobile Interaction", CHI 2003, Ft. Lauderdale, Florida, ACM 1-58113-637-Apr. 5-10, 2003, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Roth et al., "Bezel Swipe: Conflict-Free Scrolling and Miltiple Selection on Mobile Touch Screen Devices," Chi 2009, Boston, Massachusetts, USA, Apr. 4-9, 2009, 4 pages.
Rubino et al., "How to Enable 'Living Images' on your Nokia Lumia with Windows Phone 8.1", https://www.youtube.com/watch?v=RX7vpoFy1Dg, Jun. 6, 2014, 5 pages.
Sleepfreaks, "How to Easily Play/Loop an Event Range in Cubase", https://sleepfreaks-dtm.com/for-advance-cubase/position-3/>, Apr. 4, 2011, 14 pages.
Sony, "Intelligent Scene Recognition," https://www.sony-asia.com/article/252999/section/product/product/dsc-t77, downloaded on May 20, 2016, 5 pages.
Sood, "MultitaskingGestures", http://cydia.saurik.com/package/org.thebigboxx.multitaskinggestures/, Mar. 3, 2014, 2 pages.
Stewart, et al., "Characteristics of Pressure-Based Input for Mobile Devices", Proceedings of the SIGCHI Conference on Human Factors in Computing Systems, Apr. 2010, 10 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Tweak, "QuickCenter—Add 3D-Touch Shortcuts to Control Center", https://www.youtube.com/watch?v=8rHOFpGvZFM, Mar. 22, 2016, 2 pages.
Tweak, "iOS 10 Tweak on iOS 9.0.2 Jailbread & 9.2.1—9.3 Support: QuickCenter 3D, Touch Cydia Tweak!" https://wwwyoutube.com/watch?v=opOBr30_Fkl, Mar. 6, 2016, 3 pages.
UpDown-G, "Using Multiple Selection Mode in Android 4.0 / Getting Started", https://techbooster.org/android/13946, Mar. 7, 2012, 7 pages.
VGJFeliz, "How to Master Android Lollipop Notifications in Four Minutes!", https://www.youtube.com/watch?v=S-zBRG7GJgs, Feb. 8, 2015, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
Viticci, "Apple Watch: Our Complete Overview—MacStories", https://www.macstories.net, Sep. 10, 2014, 21 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One (M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
Wilson, et al., "Augmenting Tactile Interaction with Pressure-Based Input", School of Computing Science, Glasgow, UK, Nov. 15-17, 2011, 2 pages.
Yang, et al., "Affordance Application on Visual Interface Design of Desk-Top Virtual Experiments", 2014 International Conference on Information Science, Electronics and Electrical Engineering, IEEE, vol. 1, Apr. 26, 2014, 5 pages.
Yatani, et al., SemFeel: A User Interface with Semantic Tactile Feedback for Mobile Touch-Screen Devices, Proceedings of the 22nd annual ACM symposium on user interface software and technology (UIST '09), Oct. 2009, 10 pages.
YouTube, "Android Lollipop Lock-Screen Notification Tips", https://www.youtube.com/watch?v=LZTxHBOwzIU, Nov. 13, 2014, 3 pages.
YouTube, "Blackberry Playbook bezel interaction," https://www.youtube.com/watch?v=YGkzFqnOwXI, Jan. 10, 2011, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "HTC One Favorite Camera Features", http://www.youtube.com/watch?v=sUYHfcj14RU, Apr. 28, 2013, 3 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in a Tap", https://www.youtube.com/watch?v=gailSHRgsTo, May 15, 2015, 1 page.
Zylom, "House Secrets", http://game.zylom.com/servlet/Entry?g=38&s=19521&nocache=1438641323066, Aug. 3, 2015, 1 page.
Office Action, dated Mar. 15, 2017, received in U.S. Appl. No. 14/535,671, 13 pages.
Office Action, dated Nov. 30, 2017, received in U.S. Appl. No. 14/535,671, 21 pages.
Notice of Allowance, dated Sep. 5, 2018, received in U.S. Appl. No. 14/535,671, 5 pages.

(56) References Cited

OTHER PUBLICATIONS

Office Action, dated Jun. 29, 2017, received in U.S. Appl. No. 14/608,895, 30 pages.
Final Office Action, dated Feb. 22, 2018, received in U.S. Appl. No. 14/608,895, 20 pages.
Notice of Allowance, dated Jun. 26, 2018, received in U.S. Appl. No. 14/608,895, 9 pages.
Office Action, dated Dec. 18, 2015, received in Australian Patent Application No. 2013368440, which corresponds with U.S. Appl. No. 14/536,426, 3 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Certificate of Grant, dated Apr. 29, 2017, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Office Action, dated Oct. 9, 2018, received in Chinese Patent Application No. 201380068493.6, which corresponds with U.S. Appl. No. 14/608,895, 3 pages.
Patent, dated Dec. 25, 2018, received in Chinese Patent Application No. 201380068493.6, which corresponds with U.S. Appl. No. 14/608,895, 4 pages.
Office Action, dated Jul. 21, 2016, received in European Patent Application No. 13795391.5, which corresponds with U.S. Appl. No. 14/536,426, 9 pages.
Office Action, dated Mar. 9, 2018, received in European Patent Application No. 13795391.5, which corresponds with U.S. Appl. No. 14/536,426, 4 pages.
Intention to Grant, dated Jul. 6, 2018, received in European Patent Application No. 13795391.5, which corresponds with U.S. Appl. No. 14/536,426, 5 pages.
Certificate of Grant, dated Dec. 26, 2018, received in European Patent Application No. 13795391.5, which corresponds with U.S. Appl. No. 14/536,426, 4 pages.
Office Action, dated Sep. 13, 2016, received in Japanese Patent Application No. 2015-547948, which corresponds with U.S. Appl. No. 14/536,426, 5 pages.
Patent, dated May 12, 2017, received in Japanese Patent Application No. 2015-547948, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Feb. 24, 2017, received in Korean Patent Application No. 10-2015-7018851, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Oct. 5, 2018, received in Korean Patent Application No. 2018-7028236, which corresponds with U.S. Appl. No. 14/608,895, 6 pages.
Notice of Allowance, dated May 24, 2019, received in Korean Patent Application No. 2018-7028236, which corresponds with U.S. Appl. No. 14/608,895, 4 pages.
Patent, dated Jul. 9, 2019, received in Korean Patent Application No. 2018-7028236, which corresponds with U.S. Appl. No. 14/608,895, 4 pages.
Office Action, dated Jul. 26, 2017, received in U.S. Appl. No. 14/536,235, 14 pages.
Final Office Action, dated Feb. 26, 2018, received in U.S. Appl. No. 14/536,235, 13 pages.
Notice of Allowance, dated Aug. 15, 2018, received in U.S. Appl. No. 14/536,235, 5 pages.
Office Action, dated Apr. 5, 2017, received in U.S. Appl. No. 14/536,367, 16 pages.
Notice of Allowance, dated Nov. 30, 2017, received in U.S. Appl. No. 14/536,367, 9 pages.
Notice of Allowance, dated May 16, 2018, received in U.S. Appl. No. 14/536,367, 5 pages.
Office Action, dated Dec. 17, 2015, received in U.S. Appl. No. 14/536,426, 28 pages.
Final Office Action, dated May 6, 2016, received in U.S. Appl. No. 14/536,426, 23 pages.
Office action, dated Aug. 3, 2017, received in U.S. Appl. No. 14/536,426, 10 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Australian Patent Application No. 20133259606, which corresponds with U.S. Appl. No. 14/536,426, 1 page.
Office Action, dated Nov. 18, 2015, received in Australian Patent Application No. 2015101231, which corresponds with U.S. Appl. No. 14/536,426, 3 pages.
Office Action, dated May 15, 2017, received in Australian Patent Application No. 2016216580, which corresponds with U.S. Appl. No. 14/536,426, 3 pages.
Office Action, dated May 8, 2018, received in Australian Patent Application No. 2016216580, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Certificate of Grant, dated Sep. 13, 2018, received in Australian Patent Application No. 2016216580, which corresponds with U.S. Appl. No. 14/536,426, 1 page.
Office Action, dated Apr. 12, 2019, received in Australian Patent Application No. 2018223021, which corresponds with U.S. Appl. No. 14/536,426, 3 pages.
Office Action, dated Nov. 18, 2019, received in Australian Patent Application No. 2018223021, which corresponds with U.S. Appl. No. 14/536,426, 3 pages.
Office Action, dated Feb. 18, 2020, received in Australian Patent Application No. 2018223021, which corresponds with U.S. Appl. No. 14/536,426, 3 pages.
Notice of Allowance, dated Mar. 27, 2020, received in Australian Patent Application No. 2018223021, which corresponds with U.S. Appl. No. 14/536,426, 3 pages.
Certificate of Grant, dated Jul. 23, 2020, received in Australian Patent Application No. 2018223021, which corresponds with U.S. Appl. No. 14/536,426, 4 pages.
Office Action, dated Sep. 19, 2017, received in Chinese Patent Application No. 201380035982.1, which corresponds with U.S. Appl. No. 14/536,426, 5 pages.
Notice of Allowance, dated May 10, 2018, received in Chinese Patent Application No. 201380035982.1, which corresponds with U.S. Appl. No. 14/536,426, 2 pages.
Patent, dated Aug. 17, 2018, received in Chinese Patent Application No. 201380035982.1, which corresponds with U.S. Appl. No. 14/536,426, 4 pages.
Office Action, dated Sep. 20, 2017, received in Chinese Patent Application No. 201510566550.4, which corresponds with U.S. Appl. No. 14/536,426, 11 pages.
Notice of Allowance, dated Aug. 8, 2018, received in Chinese Patent Application No. 201510566550.4, which corresponds with U.S. Appl. No. 14/536,426, 3 pages.
Patent, dated Oct. 23, 2018, received in Chinese Patent Application No. 20151056650.4, which corresponds with U.S. Appl. No. 14/536,426, 4 pages.
Office Action, dated Jan. 4, 2021, received in Chinese Patent Application No. 201810826224.6, which corresponds with U.S. Appl. No. 14/536,426, 6 pages.

(56) References Cited

OTHER PUBLICATIONS

Office Action, dated Jun. 24, 2021, received in Chinese Patent Application No. 201810826224.6, which corresponds with U.S. Appl. No. 14/536,426, 3 pages.
Notice of Allowance, dated Oct. 11, 2021, received in Chinese Patent Application No. 201810826224.6, which corresponds with U.S. Appl. No. 14/536,426, 1 page.
Patent, dated Nov. 12, 2021, received in Chinese Patent Application No. 201810826224.6, which corresponds with U.S. Appl. No. 14/536,426, 7 pages.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Aug. 21, 2017, received in European Patent Application No. 15183980.0, which corresponds with U.S. Appl. No. 14/536,426, 3 pages.
Intention to Grant, dated Mar. 9, 2018, received in European Patent Application No. 15183980.0, which corresponds with U.S. Appl. No. 14/536,426, 5 pages.
Intention to Grant, dated Aug. 14, 2018, received in European Patent Application No. 15183980.0, which corresponds with U.S. Appl. No. 14/536,426, 5 pages.
Decision to Grant, dated Jan. 10, 2019, received in European Patent Application No. 15183980.0, which corresponds with U.S. Appl. No. 14/536,426, 4 pages.
Patent, dated Feb. 6, 2019, received in European Patent Application No. 15183980.0, which corresponds with U.S. Appl. No. 14/536,426, 4 pages.
Office Action, dated Sep. 6, 2019, received in European Patent Application No. 18180503.7, which corresponds with U.S. Appl. No. 14/536,426, 5 pages.
Certificate of Grant, dated Nov. 10, 2017, received in Hong Kong Patent Application No. 15107535.0, which corresponds with U.S. Appl. No. 14/536,426, 2 pages.
Certificate of Grant, dated Jul. 5, 2019, received in Hong Kong Patent Application No. 15108892.5, which corresponds with U.S. Appl. No. 14/536,426, 5 pages.
Patent, dated Nov. 22, 2019, received in Hong Kong Patent Application No. 16107033.6, which corresponds with U.S. Appl. No. 14/536,426, 6 pages.
Office Action, dated Mar. 4, 2016, received in Japanese Patent Application No. 2015-511644, which corresponds with U.S. Appl. No. 14/536,426, 3 pages.
Office Action, dated Feb. 6, 2017, received in Japanese Patent Application No. 2015-511644, which corresponds with U.S. Appl. No. 14/536,426, 6 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Nov. 6, 2018, received in Japanese Patent Application No. 2018-000753, which corresponds with U.S. Appl. No. 14/536,426, 8 pages.
Office Action, dated Oct. 7, 2019, received in Japanese Patent Application No. 2018-000753, which corresponds with U.S. Appl. No. 14/536,426, 5 pages.
Office Action, dated Feb. 8, 2021, received in Japanese Patent Application No. 2018-000753, which corresponds with U.S. Appl. No. 14/536,426, 2 pages.
Office Action, dated Mar. 9, 2017, received in U.S. Appl. No. 14/536,464, 21 pages.
Final Office Action, dated Aug. 25, 2017, received in U.S. Appl. No. 14/536,464, 30 pages.
Office Action, dated Feb. 12, 2018, received in U.S. Appl. No. 14/536,464, 33 pages.
Final Office Action, dated Jun. 22, 2018, received in U.S. Appl. No. 14/536,464, 32 pages.
Notice of Allowance, dated Jan. 25, 2021, received in U.S. Appl. No. 14/536,464, 5 pages.
Notice of Allowance, dated Feb. 23, 2021, received in U.S. Appl. No. 14/536,464, 5 pages.
Office Action, dated Sep. 25, 2017, received in U.S. Appl. No. 14/536,644, 29 pages.
Final Office Action, dated May 3, 2018, received in U.S. Appl. No. 14/536,644, 28 pages.
Office Action, dated Nov. 2, 2018, received in U.S. Appl. No. 14/536,644, 24 pages.
Notice of Allowance, dated Jul. 2, 2019, received in U.S. Appl. No. 14/536,644, 5 pages.
Office Action, dated Oct. 19, 2017, received in U.S. Appl. No. 14/608,926, 14 pages.
Final Office Action, dated Jun. 6, 2018, received in U.S. Appl. No. 14/608,926, 19 pages.
Notice of Allowance, dated Apr. 10, 2019, received in U.S. Appl. No. 14/608,926, 16 pages.
Notice of Allowance, dated May 21, 2019, received in U.S. Appl. No. 14/608,926, 5 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Jan. 3, 2017, received in Australian Patent Application No. 2016201451, which corresponds with U.S. Appl. No. 14/608,926, 3 pages.
Notice of Acceptance, dated Dec. 20, 2017, received in Australian Patent Application No. 2016201451, which corresponds with U.S. Appl. No. 14/608,926, 3 pages.
Certificate of Grant, dated May 3, 2018, received in Australian Patent Application No. 2016201451, which corresponds with U.S. Appl. No. 14/608,926, 1 page.
Office Action, dated May 4, 2017, received in Chinese Patent Application No. 201380068414.1, which corresponds with U.S. Appl. No. 14/608,926, 5 pages.
Notice of Allowance, dated Feb. 8, 2018, received in Chinese Patent Application No. 201380068414.1, which corresponds with U.S. Appl. No. 14/608,926, 2 pages.
Patent, dated May 4, 2018, received in Chinese Patent Application No. 201380068414.1, which corresponds with U.S. Appl. No. 14/608,926, 4 pages.
Office Action, dated Dec. 1, 2020, received in Chinese Patent Application No. 201810369259.1, which corresponds with U.S. Appl. No. 14/608,926, 14 pages.
Office Action, dated Jul. 14, 2021, received in Chinese Patent Application No. 201810369259.1, which corresponds with U.S. Appl. No. 14/608,926, 5 pages.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Nov. 11, 2016, received in European Patent Application No. 13795392.3, which corresponds with U.S. Appl. No. 14/608,926, 6 pages.
Office Action, dated Jul. 4, 2017, received in European Patent Application No. 13795392.3, which corresponds with U.S. Appl. No. 14/608,926, 4 pages.

(56) References Cited

OTHER PUBLICATIONS

Oral Summons, dated Feb. 13, 2017, received in European Patent Application No. 13795392.3, which corresponds with U.S. Appl. No. 14/608,926, 11 pages.
Office Action, dated Mar. 14, 2016, received in Japanese Patent Application No. 2015-549392, which corresponds with U.S. Appl. No. 14/608,926, 4 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Patent, dated Apr. 27, 2018, received in Japanese Patent Application No. 2017-024234, which corresponds with U.S. Appl. No. 14/608,926, 3 pages.
Office Action, dated Feb. 22, 2019, received in Japanese Patent Application No. 2018-079290, which corresponds with U.S. Appl. No. 14/608,926, 7 pages.
Office Action, dated Sep. 30, 2019, received in Japanese Patent Application No. 2018-079290, which corresponds with U.S. Appl. No. 14/608,926, 5 pages.
Notice of Allowance, dated Apr. 3, 2020, received in Japanese Patent Application No. 2018-079290, which corresponds with U.S. Appl. No. 14/608,926, 5 pages.
Patent, dated Apr. 14, 2020, received in Japanese Patent Application No. 2018-079290, which corresponds with U.S. Appl. No. 14/608,926, 5 pages.
Office Action, dated May 12, 2016, received in Korean Patent Application No. 10-2015-7018853, which corresponds with U.S. Appl. No. 14/608,926, 4 pages.
Notice of Allowance, dated Mar. 31, 2017, received in Korean Patent Application No. 2015-7018853, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Aug. 22, 2017, received in Korean Patent Application No. 2017-7018250, which corresponds with U.S. Appl. No. 14/608,926, 2 pages.
Notice of Allowance, dated Dec. 29, 2017, received in Korean Patent Application No. 2017-7018250, which corresponds with U.S. Appl. No. 14/608,926, 3 pages.
Office Action, dated Oct. 19, 2017, received in U.S. Appl. No. 14/536,646, 21 pages.
Notice of Allowance, dated Aug. 9, 2018, received in U.S. Appl. No. 14/536,646, 5 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Jun. 6, 2019, received in Australian Patent Application No. 2018256626, which corresponds with U.S. Appl. No. 14/536,646, 3 pages.
Notice of Acceptance, dated Aug. 1, 2019, received in Australian Patent Application No. 2018256626, which corresponds with U.S. Appl. No. 14/536,646, 3 pages.
Certificate of Grant, dated Dec. 5, 2019, received in Australian Patent Application No. 2018256626, which corresponds with U.S. Appl. No. 14/536,646, 3 pages.
Office Action, dated Dec. 1, 2016, received in Chinese Patent Application No. 2013800362059, which corresponds with U.S. Appl. No. 14/536,646, 3 pages.

Notice of Allowance, dated Oct. 9, 2017, received in Chinese Patent Application No. 2013800362059, which corresponds with U.S. Appl. No. 14/536,646, 3 pages.
Office Action, dated Jul. 3, 2020, received in Chinese Patent Application No. 201711425148.X, which corresponds with U.S. Appl. No. 14/536,646, 13 pages.
Office Action, dated Jun. 10, 2021, received in Chinese Patent Application No. 201711425148.X, which corresponds with U.S. Appl. No. 14/536,646, 2 pages.
Notice of Allowance, dated Oct. 9, 2021, received in Chinese Patent Application No. 201711425148.X, which corresponds with U.S. Appl. No. 14/536,646, 2 pages.
Office Action, dated Oct. 26, 2020, received in Chinese Patent Application No. 201711422092.2, which corresponds with U.S. Appl. No. 14/536,646, 20 pages.
Notice of Allowance, dated Mar. 22, 2021, received in Chinese Patent Application No. 201711422092.2, which corresponds with U.S. Appl. No. 14/536,646, 2 pages.
Certificate of Grant, dated Apr. 13, 2021, received in Chinese Patent Application No. 201711422092.2, which corresponds with U.S. Appl. No. 14/536,646, 8 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Notice of Allowance, dated Jan. 4, 2017, received in European Patent Application No. 13724102.2, which corresponds with U.S. Pat. No. 14,536,646, 5 pages.
Patent, dated May 26, 2017, received in European Patent Application No. 13724102.2, which corresponds with U.S. Pat. No. 14,536,646, 1 page.
Office Action, dated Feb. 29, 2016, received in Japanese Patent Application No. 2015-511645, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Certificate of Grant, dated Jan. 25, 2019, received in Hong Kong Patent Application No. 2015-511645, which corresponds with U.S. Appl. No. 14/536,646, 4 pages.
Office Action, dated Apr. 3, 2017, received in U.S. Appl. No. 14/536,141, 11 pages.
Notice of Allowance, dated Sep. 20, 2017, received in U.S. Appl. No. 14/536,141, 10 pages.
Office Action, dated Aug. 27, 2015, received in Australian Patent Application No. 2013259614, which corresponds with U.S. Appl. No. 14/536,141, 4 pages.
Notice of Allowance, dated Aug. 15, 2016, received in Australian Patent Application No. 2013259614, which corresponds with U.S. Appl. No. 14/536,141, 1 page.
Office Action, dated Jul. 21, 2017, received in Australian Patent Application No. 2016262773, which corresponds with U.S. Appl. No. 14/536,141, 3 pages.
Notice of Acceptance, dated Jul. 19, 2018, received in Australian Patent Application No. 2016262773, which corresponds with U.S. Appl. No. 14/536,141, 3 pages.
Office Action, dated Jun. 5, 2019, received in Australian Patent Application No. 2018256616, which corresponds with U.S. Appl. No. 14/536,141, 3 pages.
Notice of Acceptance, dated Jan. 22, 2020, received in Australian Patent Application No. 2018256616, which corresponds with U.S. Appl. No. 14/536,141, 3 pages.
Certificate of Grant, dated May 21, 2020, received in Australian Patent Application No. 2018256616, which corresponds with U.S. Appl. No. 14/536,141, 3 pages.
Office Action, dated Mar. 3, 2017, received in Chinese Patent Application No. 201380035893.7, which corresponds with U.S. Appl. No. 14/536,141, 8 pages.
Office Action, dated Feb. 2, 2018, received in Chinese Patent Application No. 201380035893.7, which corresponds with U.S. Appl. No. 14/536,141, 5 pages.

(56) References Cited

OTHER PUBLICATIONS

Notice of Allowance, dated Aug. 31, 2018, received in Chinese Patent Application No. 201380035893.7, which corresponds with U.S. Appl. No. 14/536,141, 6 pages.
Office Action, dated Mar. 10, 2021, received in Chinese Patent Application No. 201811142423.1, which corresponds with U.S. Appl. No. 14/536,141, 6 pages.
Office Action, dated Aug. 12, 2021, received in Chinese Patent Application No. 201811142423.1, which corresponds with U.S. Appl. No. 14/536,141, 6 pages.
Notice of Allowance, dated Oct. 26, 2021, received in Chinese Patent Application No. 201811142423.1, which corresponds with U.S. Appl. No. 14/536,141, 2 pages.
Patent, dated Dec. 31, 2021, received in Chinese Patent Application No. 201811142423.1, which corresponds with U.S. Appl. No. 14/536,141, 6 pages.
Patent, dated Oct. 23, 2018, received in Chinese Patent Application No. 201380035893.7, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Aug. 31, 2016, received in European Patent Application No. 13726053.5, which corresponds with U.S. Appl. No. 14/536,141, 10 pages.
Office Action, dated Apr. 9, 2018, received in European Patent Application No. 13726053.5, which corresponds with U.S. Appl. No. 14/536,141, 9 pages.
Office Action, dated Mar. 7, 2019, received in European Patent Application No. 13726053.5, which corresponds with U.S. Appl. No. 14/536,141, 5 pages.
Intention to Grant, dated Sep. 6, 2019, received in European Patent Application No. 13726053.5, which corresponds with U.S. Appl. No. 14/536,141, 7 pages.
Decision to Grant, dated Jan. 23, 2020, received in European Patent Application No. 13726053.5, which corresponds with U.S. Appl. No. 14/536,141, 1 page.
Patent, dated Feb. 19, 2020, received in European Patent Application No. 13726053.5, which corresponds with U.S. Appl. No. 14/536,141, 4 page.
Office Action, dated Feb. 29, 2016, received in Japanese Patent Application No. 2015-511646, which corresponds with U.S. Appl. No. 14/536,141, 3 pages.
Office Action, dated Oct. 25, 2016, received in Japanese Patent Application No. 2015-511646, which corresponds with U.S. Appl. No. 14/536,141, 6 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Office Action, dated Aug. 10, 2018, received in Japanese Patent Application No. 2017-141953, which corresponds with U.S. Appl. No. 14/536,141, 6 pages.
Office Action, dated Jul. 5, 2019, received in Japanese Patent Application No. 2017-141953, which corresponds with U.S. Appl. No. 14/536,141, 6 pages.
Office Action, dated Dec. 8, 2016, received in U.S. Appl. No. 14/608,942, 9 pages.
Notice of Allowance, dated May 12, 2017, received in U.S. Appl. No. 14/608,942, 10 pages.
Office Action, dated Jan. 29, 2016, received in Australian Patent Application No. 2013368443, which corresponds with U.S. Appl. No. 14/608,942, 3 pages.
Notice of Allowance, dated Mar. 11, 2016, received in Australian Patent Application No. 2013368443, which corresponds with U.S. Appl. No. 14/608,942, 2 pages.
Certificate of Grant, dated Jul. 7, 2016, received in Australian Patent Application No. 14/608,942, which corresponds with U.S. Appl. No. 14/608,942, 3 pages.
Office Action, dated Mar. 29, 2017, received in Australian Patent Application No. 2016201303, which corresponds with U.S. Appl. No. 14/608,942, 3 pages.
Notice of Acceptance, dated Mar. 7, 2018, received in Australian Patent Application No. 2016201303, which corresponds with U.S. Appl. No. 14/608,942, 3 pages.
Certificate of Grant, dated Jul. 5, 2018, received in Australian Patent Application No. 2016201303, which corresponds with U.S. Appl. No. 14/608,942, 4 pages.
Office Action, dated Jun. 16, 2017, received in Chinese Patent Application No. 201380068295.X, which corresponds with U.S. Appl. No. 14/608,942, 6 pages.
Office Action, dated Mar. 28, 2018, received in Chinese Patent Application No. 201380068295.X, which corresponds with U.S. Appl. No. 14/608,942, 5 pages.
Office Action, dated Oct. 8, 2018, received in Chinese Patent Application No. 201380068295.X, which corresponds with U.S. Appl. No. 14/608,942, 3 pages.
Notice of Allowance, dated May 7, 2019, received in Chinese Patent Application No. 201380068295.X, which corresponds with U.S. Appl. No. 14/608,942, 3 pages.
Patent, dated Jul. 5, 2019, received in Chinese Patent Application No. 201380068295.X, which corresponds with U.S. Appl. No. 14/608,942, 8 pages.
Office Action, dated Oct. 7, 2016, received in European Patent Application No. 13798464.7, which corresponds with U.S. Appl. No. 14/608,942, 7 pages.
Decision to Grant, dated Sep. 13, 2018, received in European Patent Application No. 13798464.7, which corresponds with U.S. Appl. No. 14/608,942, 2 pages.
Intention to Grant, dated Nov. 8, 2019, received in European Patent Application No. 18194127.9, which corresponds with U.S. Appl. No. 14/608,942, 7 pages.
Decision to Grant, dated Aug. 20, 2020, received in European Patent Application No. 18194127.9, which corresponds with U.S. Appl. No. 14/608,942, 4 pages.
Patent, dated Sep. 16, 2020, received in European Patent Application No. 18194127.9, which corresponds with U.S. Appl. No. 14/608,942, 4 pages.
Certificate of Grant, dated Jul. 26, 2019, received in Hong Kong, which corresponds with U.S. Appl. No. 14/608,942, 4 pages.
Office Action, dated Jul. 4, 2016, received in Japanese Patent Application No. 2015-549393, which corresponds with U.S. Appl. No. 14/608,942, 4 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Apr. 5, 2016, received in Korean Patent Application No. 2015-7018448, which corresponds with U.S. Appl. No. 14/608,942, 6 pages.
Office Action, dated Feb. 24, 2017, received in Korean Patent Application No. 2015-7018448, which corresponds with U.S. Appl. No. 14/608,942, 4 pages.
Notice of Allowance, dated Jan. 15, 2019, received in Korean Patent Application No. 2015-7018448, which corresponds with U.S. Appl. No. 14/608,942, 5 pages.
Patent, dated Mar. 8, 2019, received in Korean Patent Application No. 2015-7018448, which corresponds with U.S. Appl. No. 14/608,942, 4 pages.
Office Action, dated Jul. 17, 2017, received in U.S. Appl. No. 14/536,166, 19 pages.
Notice of Allowance, dated Feb. 28, 2018, received in U.S. Appl. No. 14/536,166, 5 pages.
Office Action, dated Aug. 1, 2016, received in U.S. Appl. No. 14/536,203, 14 pages.
Notice of Allowance, dated Feb. 1, 2017, received in U.S. Appl. No. 14/536,203, 9 pages.

(56) References Cited

OTHER PUBLICATIONS

Office Action, dated Jul. 9, 2015, received in Australian Patent Application No. 2013259630, which corresponds with U.S. Appl. No. 14/536,203, 3 pages.
Notice of Allowance, dated Jun. 15, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259630, which corresponds with U.S. Appl. No. 14/536,203, 3 pages.
Office Action, dated Jul. 4, 2017, received in Australian Patent Application No. 2016238917, which corresponds with U.S. Appl. No. 14/536,203, 5 pages.
Notice of Acceptance, dated Jul. 19, 2018, received in Australian Patent Application No. 2016238917, which corresponds with U.S. Appl. No. 14/536,203, 3 pages.
Certificate of Grant, dated Nov. 1, 2018, received in Australian Patent Application No. 2016238917, which corresponds with U.S. Appl. No. 14/536,203, 1 page.
Office Action, dated Aug. 20, 2018, received in Australian Patent Application No. 2018250481, which corresponds with U.S. Appl. No. 14/536,203, 2 pages.
Notice of Allowance, dated Apr. 29, 2020, received in Australian Patent Application No. 2018250481, which corresponds with U.S. Appl. No. 14/536,203, 3 pages.
Certificate of Grant, dated Sep. 3, 2020, received in Australian Patent Application No. 2018250481, which corresponds with U.S. Appl. No. 14/536,203, 4 pages.
Office Action, dated Oct. 25, 2017, received in Chinese Patent Application No. 201380035977.0, which corresponds with U.S. Appl. No. 14/536,203, 5 pages.
Notice of Allowance, dated Apr. 4, 2018, received in Chinese Patent Application No. 201380035977.0, which corresponds with U.S. Appl. No. 14/536,203, 3 pages.
Patent, dated Jul. 6, 2018, received in Chinese Patent Application No. 201380035977.0, which corresponds with U.S. Appl. No. 14/536,203, 4 pages.
Office Action, dated Jan. 26, 2021, received in Chinese Patent Application No. 201810632507.7, 5 pages.
Notice of Allowance, dated Aug. 11, 2021, received in Chinese Patent Application No. 201810632507.7, which corresponds with U.S. Appl. No. 14/536,203, 1 page.
Patent, dated Oct. 22, 2021, received in Chinese Patent Application No. 201810632507.7, which corresponds with U.S. Appl. No. 14/536,203, 7 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Dec. 6, 2017, received in European Patent Application No. 13724104.8, which corresponds with U.S. Appl. No. 14/536,203, 9 pages.
Decision to Grant, dated Oct. 24, 2018, received in European Patent Application No. 13724104.8, which corresponds with U.S. Appl. No. 14/536,203, 5 pages.
Intention to Grant, dated Mar. 18, 2019, received in European Patent Application No. 13724104.8, which corresponds with U.S. Appl. No. 14/536,203, 9 pages.
Decision to Grant, dated Aug. 8, 2019, received in European Patent Application No. 13724104.8, which corresponds with U.S. Appl. No. 14/536,203, 1 page.
Certificate of Grant, dated Sep. 4, 2019, received in European Patent Application No. 13724104.8, which corresponds with U.S. Appl. No. 14/536,203, 4 pages.
Patent, dated Sep. 27, 2019, received in Hong Kong Patent Application No. 15108904.1, which corresponds with U.S. Appl. No. 14/536,203, 6 pages.
Office Action, dated Feb. 15, 2016, received in Japanese Patent Application No. 2015-511650, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Office Action, dated Jun. 23, 2017, received in Japanese Patent Application No. 2016173113, which corresponds with U.S. Appl. No. 14/536,203, 5 pages.
Notice of Allowance, dated Jan. 12, 2018, received in Japanese Patent Application No. 2016173113, which corresponds with U.S. Appl. No. 14/536,203, 5 pages.
Patent, dated Feb. 16, 2018, received in Japanese Patent Application No. 2016173113, which corresponds with U.S. Appl. No. 14/536,203, 3 pages.
Office Action, dated Oct. 19, 2018, received in Japanese Patent Application No. 2018-022394, which corresponds with U.S. Appl. No. 14/536,203, 4 pages.
Office Action, dated Sep. 30, 2019, received in Japanese Patent Application No. 2018-022394, which corresponds with U.S. Appl. No. 14/536,203, 5 pages.
Office Action, dated Jan. 22, 2021, received in Japanese Patent Application No. 2018-022394, which corresponds with U.S. Appl. No. 14/536,203, 2 pages.
Notice of Allowance, dated Dec. 3, 2021, received in Japanese Patent Application No. 2018-022394, which corresponds with U.S. Appl. No. 14/536,203, 2 pages.
Office Action, dated Dec. 4, 2015, received in Korean Patent Application No. 2014-7034520, which corresponds with U.S. Appl. No. 14/536,203, 4 pages.
Notice of Allowance, dated Sep. 1, 2016, received in Korean Patent Application No. 2014-7034520, which corresponds with U.S. Appl. No. 14/536,203, 5 pages.
Office Action, dated Feb. 6, 2017, received in Korean Patent Application No. 2016-7033834, which corresponds with U.S. Appl. No. 14/536,203, 4 pages.
Notice of Allowance, dated Oct. 30, 2017, received in Korean Patent Application No. 2016-7033834, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Office Action, dated Oct. 20, 2017, received in U.S. Appl. No. 14/608,965, 14 pages.
Office Action, dated Jul. 2, 2018, received in U.S. Appl. No. 14/608,965, 16 pages.
Final Office Action, dated Jan. 10, 2019, received in U.S. Appl. No. 14/608,965, 17 pages.
Notice of Allowance dated Nov. 7, 2019, received in U.S. Appl. No. 14/608,965, 17 pages.
Notice of Allowance dated Jan. 2, 2020, received in U.S. Appl. No. 14/608,965, 5 pages.
Office action, dated Oct. 11, 2017, received in Chinese Patent Application No. 201380074060.1, which corresponds with U.S. Appl. No. 14/608,965, 5 pages.
Office action, dated Aug. 1, 2018, received in Chinese Patent Application No. 201380074060.1, which corresponds with U.S. Appl. No. 14/608,965, 5 pages.
Office action, dated Nov. 1, 2018, received in Chinese Patent Application No. 201380074060.1, which corresponds with U.S. Appl. No. 14/608,965, 3 pages.
Office action, dated Apr. 3, 2019, received in Chinese Patent Application No. 201380074060.1, which corresponds with U.S. Appl. No. 14/608,965, 3 pages.
Patent, dated May 17, 2019, received in Chinese Patent Application No. 201380074060.1, which corresponds with U.S. Appl. No. 14/608,965, 6 pages.
Office Action, dated Jul. 22, 2016, received in European Office Action No. 13798465.4, which corresponds with U.S. Appl. No. 14/608,965, 3 pages.

(56) References Cited

OTHER PUBLICATIONS

Oral Proceedings, dated Mar. 7, 2018, received in European Office Action No. 13798465.4, which corresponds with U.S. Appl. No. 14/608,965, 5 pages.
Decision to Grant, dated Sep. 6, 2018, received in European Office Action No. 13798465.4, which corresponds with U.S. Appl. No. 14/608,965, 2 pages.
Office Action, dated Oct. 20, 2016, received in U.S. Appl. No. 14/536,247, 10 pages.
Final Office Action, dated Mar. 24, 2017, received in U.S. Appl. No. 14/536,247, 14 pages.
Notice of Allowance, dated Nov. 22, 2017, received in U.S. Appl. No. 14/536,247, 6 pages.
Office Action, dated Mar. 24, 2017, received in U.S. Appl. No. 14/536,267, 12 pages.
Notice of Allowance, dated Nov. 9, 2017, received in U.S. Appl. No. 14/536,267, 8 pages.
Notice of Allowance, dated Jun. 1, 2018, received in U.S. Appl. No. 14/536,267, 5 pages.
Office Action, dated Aug. 10, 2015, received in Australian Patent Application No. 2013259637, which corresponds with U.S. Appl. No. 14/536,267, 3 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.
Office Action, dated Mar. 24, 2017, received in Australian Patent Application No. 2016204411, which corresponds with U.S. Appl. No. 14/536,267, 3 pages.
Notice of Acceptance, dated Feb. 27, 2018, received in Australian Patent Application No. 2016204411, which corresponds with U.S. Appl. No. 14/536,267, 3 pages.
Certificate of Grant, dated Jun. 28, 2018, received in Australian Patent Application No. 2016204411, which corresponds with U.S. Appl. No. 14/536,267, 4 pages.
Office Action, dated Mar. 15, 2019, received in Australian Patent Application No. 2018204236, which corresponds with U.S. Appl. No. 14/5326,267, 5 pages.
Notice of Acceptance, dated Apr. 29, 2019, received in Australian Patent Application No. 2018204236, which corresponds with U.S. Appl. No. 14/5326,267, 3 pages.
Certificate of Grant, dated Aug. 28, 2019, received in Australian Patent Application No. 2018204236, which corresponds with U.S. Patent Application No. 14/5326,267, 4 pages.
Office Action, dated Dec. 9, 2016, received in Chinese Patent Application No. 2016120601564130, which corresponds with U.S. Appl. No. 14/536,267, 4 pages.
Notice of Allowance, dated Jan. 29, 2018, received in Chinese Patent Application No. 201380035968.1, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Office Action, dated Nov. 28, 2018, received in Chinese Patent Application No. 201610537334.1, which corresponds with U.S. Appl. No. 14/536,267, 5 pages.
Office Action, dated Jul. 11, 2019, received in Chinese Patent Application No. 201610537334.1, which corresponds with U.S. Appl. No. 14/536,267, 3 pages.
Office Action, dated Sep. 30, 2019, received in Chinese Patent Application No. 201610537334.1, which corresponds with U.S. Appl. No. 14/536,267, 3 pages.
Office Action, dated Dec. 20, 2019, received in Chinese Patent Application No. 201610537334.1, which corresponds with U.S. Appl. No. 14/536,267, 3 pages.
Office Action, dated Apr. 20, 2020, received in Chinese Patent Application No. 201610537334.1, which corresponds with U.S. Appl. No. 14/536,267, 4 pages.
Patent, dated Sep. 29, 2020, received in Chinese Patent Application No. 201610537334.1, which corresponds with U.S. Appl. No. 14/536,267, 7 pages.
Office Action, dated Jun. 13, 2018, received in Chinese Patent Application No. 201810332044.2, which corresponds with U.S. Appl. No. 14/536,267, 2 pages.
Office Action, dated Jan. 20, 2021, received in Chinese Patent Application No. 201810332044.2, which corresponds with U.S. Appl. No. 14/536,267, 15 pages.
Office Action, dated Jul. 19, 2021, received in Chinese Patent Application No. 201810332044.2, which corresponds with U.S. Appl. No. 14/536,267, 1 page.
Office Action, dated Nov. 23, 2021, received in Chinese Patent Application No. 201810332044.2, which corresponds with U.S. Appl. No. 14/536,267, 2 page.
Office Action, dated Jan. 25, 2018, received in European Patent Application No. 13724106.3, which corresponds with U.S. Appl. No. 14/536,267, 5 pages.
Intention to Grant, dated Jun. 27, 2018, received in European Patent Application No. 13724106.3, which corresponds with U.S. Appl. No. 14/536,267, 5 pages.
Decision to Grant, dated Oct. 18, 2018, received in European Patent Application No. 13724106.3, which corresponds with U.S. Appl. No. 14/536,267, 3 pages.
Grant Certificate, dated Nov. 14, 2018, received in European Patent Application No. 13724106.3, which corresponds with U.S. Appl. No. 14/536,267, 3 pages. 4 pages.
Office Action, dated Sep. 13, 2017, received in European Patent Application No. 16177863.4, which corresponds with U.S. Appl. No. 14/536,267, 6 pages.
Decision to Grant, dated Nov. 29, 2018, received in European Patent Application No. 16177863.4, which corresponds with U.S. Appl. No. 14/536,267, 4 pages.
Patent, dated Dec. 26, 2018, received in European Patent Application No. 16177863.4, which corresponds with U.S. Appl. No. 14/536,267, 4 pages.
Office Action, dated Aug. 29, 2019, received in European Patent Application No. 18183789.9, which corresponds with U.S. Appl. No. 16/262,800, 9 pages.
Office Action, dated Aug. 21, 2020, received in European Patent Application No. 18183789.9, which corresponds with U.S. Appl. No. 16/262,800, 9 pages.
Patent, dated Aug. 30, 2019, received in Hong Kong Patent Application No. 15107537.8, which corresponds with U.S. Appl. No. 14/536,267, 9 pages.
Patent, dated Nov. 8, 2019, received in Hong Kong Patent Application No. 15108890.7, which corresponds with U.S. Appl. No. 14/536,267, 4 pages.
Office Action, dated Jan. 29, 2016, received in Japanese Patent Application No. 2015-511652, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Patent Application No. 2016-125839, which corresponds with U.S. Appl. No. 14/536,267, 6 pages.
Notice of Allowance, dated Nov. 17, 2017, received in Japanese Patent Application No. 2016-125839, which corresponds with U.S. Appl. No. 14/536,267, 5 pages.
Office Action, dated Feb. 4, 2019, received in Japanese Patent Application No. 2017-237035, which corresponds with U.S. Appl. No. 14/536,267, 7 pages.
Notice of Allowance, dated Sep. 9, 2019, received in Japanese Patent Application No. 2017-237035, which corresponds with U.S. Appl. No. 14/536,267, 5 pages.
Patent, dated Sep. 27, 2019, received in Japanese Patent Application No. 2017-237035, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.

(56) References Cited

OTHER PUBLICATIONS

Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 2016-7029533, which corresponds with U.S. Appl. No. 14/536,267, 2 pages.
Notice of Allowance, dated Sep. 1, 2017, received in Korean Patent Application No. 2016-7029533, which corresponds with U.S. Appl. No. 14/536,267, 4 pages.
Patent, dated Dec. 1, 2017, received in Korean Patent Application No. 2016-7029533, which corresponds with U.S. Appl. No. 14/536,267, 2 pages.
Office Action, dated Jan. 29, 2018, received in Korean Patent Application No. 2017-7034838, which corresponds with U.S. Appl. No. 14/536,267, 4 pages.
Notice of Allowance, dated Dec. 3, 2018, received in Korean Patent Application No. 2017-7034838, which corresponds with U.S. Appl. No. 14/536,267, 5 pages.
Patent, dated Mar. 4, 2019, received in Korean Patent Application No. 2017-7034838, which corresponds with U.S. Appl. No. 14/536,267, 4 pages.
Office Action, dated Apr. 7, 2017, received in U.S. Appl. No. 14/536,291, 11 pages.
Notice of Allowance, dated Dec. 1, 2017, received in U.S. Appl. No. 14/536,291, 19 pages.
Notice of Allowance, dated Mar. 20, 2018, received in U.S. Appl. No. 14/536,291, 5 pages.
Office Action, dated Aug. 18, 2015, received in Australian Patent Application No. 2013259642, which corresponds with U.S. Appl. No. 14/536,291, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Office Action, dated Jul. 21, 2017, received in Australian Patent Application No. 2016216658, which corresponds with U.S. Appl. No. 14/536,291, 3 pages.
Notice of Acceptance, dated Jul. 19, 2018, received in Australian Patent Application No. 2016216658, which corresponds with U.S. Appl. No. 14/536,291, 3 pages.
Patent, dated Nov. 30, 2018, received in Australian Patent Application No. 2016216658, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Oct. 23, 2017, received in Chinese Patent Application No. 201380035986.X, which corresponds with U.S. Appl. No. 14/536,291, 9 pages.
Notice of Allowance, dated Jun. 24, 2020, received in Chinese Patent Application No. 201710781246.0, which corresponds with U.S. Appl. No. 14/536,291, 5 pages.
Patent, dated Jul. 31, 2020, received in Chinese Patent Application No. 201710781246.0, which corresponds with U.S. Appl. No. 14/536,291, 6 pages.
Office Action, dated Jul. 17, 2020, received in Chinese Patent Application No. 2018100116175.X, which corresponds with U.S. Appl. No. 14/536,291, 15 pages.
Office Action, dated Nov. 17, 2020, received in Chinese Patent Application No. 2018100116175.X, which corresponds with U.S. Appl. No. 14/536,291, 16 pages.
Notice of Allowance, dated Mar. 29, 2021, received in Chinese Patent Application No. 2018100116175.X, which corresponds with U.S. Appl. No. 14/536,291, 1 page.
Patent, dated Apr. 27, 2021, received in Chinese Patent Application No. 2018100116175.X, which corresponds with U.S. Appl. No. 14/536,291, 6 pages.
Office Action, dated Jan. 7, 2016, received in European Patent Application No. 13724107.1, which corresponds with U.S. Appl. No. 14/536,291, 11 pages.
Office Action, dated Aug. 22, 2016, received in European Patent Application No. 13724107.1, which corresponds with U.S. Appl. No. 14/536,291, 7 pages.
Office Action, dated Mar. 23, 2017, received in European Patent Application No. 13724107.1, which corresponds with U.S. Appl. No. 14/536,291, 8 pages.
Intention to Grant, dated Jan. 8, 2019, received in European Patent Application No. 17186744.3, which corresponds with U.S. Appl. No. 14/536,291, 7 pages.
Decision to Grant, dated Oct. 31, 2019, received in European Patent Application No. 17186744.3, which corresponds with U.S. Appl. No. 14/536,291, 3 pages.
Patent, dated Nov. 27, 2019, received in European Patent Application No. 17186744.3, which corresponds with U.S. Appl. No. 14/536,291, 4 pages.
Office Action, dated Mar. 8, 2016, received in Japanese Patent Application No. 2015-511655, which corresponds with U.S. Appl. No. 14/536,291, 4 pages.
Final Office Action, dated Dec. 22, 2016, received in Japanese Patent Application No. 2015-511655, which corresponds with U.S. Appl. No. 14/536,291, 3 pages.
Office Action, dated Jun. 29, 2018, received in Japanese Patent Application No. 2017-083027, which corresponds with U.S. Appl. No. 14/536,291, 5 pages.
Patent, dated Feb. 22, 2019, received in Japanese Patent Application No. 2017-083027, which corresponds with U.S. Appl. No. 14/536,291, 3 pages.
Notice of Allowance, dated Jan. 15, 2019, received in Japanese Patent Application No. 2017-083027, which corresponds with U.S. Appl. No. 14/536,291, 5 pages.
Office Action, dated Oct. 19, 2017, received in U.S. Appl. No. 14/608,985, 13 pages.
Notice of Allowance, dated Apr. 20, 2018, received in U.S. Appl. No. 14/608,985, 5 pages.
Office Action, dated Jan. 15, 2016, received in Australian Patent Application No. 2013368445, which corresponds with U.S. Appl. No. 14/608,985, 3 pages.
Notice of Allowance, dated Jan. 18, 2017, received in Australian Patent Application No. 2013368445, which corresponds with U.S. Appl. No. 14/608,985, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Notice of Allowance, dated Sep. 19, 2017, received in Chinese Patent Application No. 201380068399.0, which corresponds with U.S. Appl. No. 14/608,985, 3 pages.
Patent, dated Dec. 8, 2017, received in Chinese Patent Application No. 201380068399.0, which corresponds with U.S. Appl. No. 14/608,985, 4 pages.
Office Action, dated Jul. 25, 2016, received in European Patent Application No. 13811032.5, which corresponds with U.S. Appl. No. 14/608,985, 8 pages.
Office Action, dated Feb. 27, 2017, received in European Patent Application No. 13811032.5, which corresponds with U.S. Appl. No. 14/608,985, 6 pages.
Summons, dated Oct. 6, 2017, received in European Patent Application No. 13811032.5, which corresponds with U.S. Appl. No. 14/608,985, 6 pages.
Intention to Grant, dated Jan. 16, 2019, received in European Patent Application No. 13811032.5, which corresponds with U.S. Appl. No. 14/608,985, 9 pages.
Decision to Grant, dated Aug. 1, 2019, received in European Patent Application No. 13811032.5, which corresponds with U.S. Appl. No. 14/608,985, 2 pages.

(56) References Cited

OTHER PUBLICATIONS

Certificate of Grant, dated Aug. 28, 2019, received in European Patent Application No. 13811032.5, which corresponds with U.S. Appl. No. 14/608,985, 4 pages.
Certificate of Grant, dated Jun. 29, 2018, received in Hong Kong Patent Application No. 15112851.6, which corresponds with U.S. Appl. No. 14/608,985, 2 pages.
Office Action, dated Apr. 25, 2016, received in Japanese Patent Application No. 2015-550384, which corresponds with U.S. Appl. No. 14/608,985, 4 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 2015-7019984, which corresponds with U.S. Appl. No. 14/608,985, 8 pages.
Notice of Allowance, dated Sep. 19, 2017, received in Korean Patent Application No. 2015-7019984, which corresponds with U.S. Appl. No. 14/608,985, 4 pages.
Patent, dated Dec. 19, 2017, received in Korean Patent Application No. 2015-7019984, which corresponds with U.S. Appl. No. 14/608,985, 3 pages.
Office Action, dated Mar. 24, 2017, received in U.S. Appl. No. 14/609,006, 13 pages.
Final Office Action, dated Sep. 21, 2017, received in U.S. Appl. No. 14/609,006, 17 pages.
Office Action, dated Mar. 20, 2018, received in U.S. Appl. No. 14/609,006, 13 pages.
Office Action, dated Oct. 11, 2018, received in U.S. Appl. No. 14/609,006, 12 pages.
Final Office Action, dated May 23, 2019, received in U.S. Appl. No. 14/609,006, 14 pages.
Office Action, dated Jan. 7, 2020, received in U.S. Appl. No. 14/609,006, 17 pages.
Final Office Action, dated Jun. 15, 2020, received in U.S. Appl. No. 14/609,006, 19 pages.
Office Action, dated Apr. 19, 2017, received in U.S. Appl. No. 14/536,296, 12 pages.
Final Office Action, dated Nov. 2, 2017, received in U.S. Appl. No. 14/536,296, 13 pages.
Notice of Allowance, dated Mar. 14, 2018, received in U.S. Appl. No. 14/536,296, 8 pages.
Office Action, dated Nov. 1, 2017, received in U.S. Appl. No. 14/536,648, 22 pages.
Final Office Action, dated Aug. 7, 2018, received in U.S. Appl. No. 14/536,648, 14 pages.
Office Action, dated Jan. 2, 2019, received in U.S. Appl. No. 14/536,648 12 pages.
Notice of Allowance, dated Jul. 2, 2019, received in U.S. Appl. No. 14/536,648, 5 pages.
Office Action, dated Jul. 21, 2017, received in Australian Patent Application No. 2016247194, which corresponds with U.S. Appl. No. 14/536,648, 3 pages.
Notice of Acceptance, dated Jul. 19, 2018, received in Australian Patent Application No. 2016247194, which corresponds with U.S. Appl. No. 14/536,648, 3 pages.
Office Action, dated Jul. 24, 2020, received in Chinese Patent Application No. 201711422121.5, which corresponds with U.S. Appl. No. 14/536,648, 10 pages.
Notice of Allowance, dated Feb. 2, 2021, received in Chinese Patent Application No. 201711422121.5, which corresponds with U.S. Appl. No. 14/536,648, 1 page.
Patent, dated Mar. 9, 2021, received in Chinese Patent Application No. 201711422121.5, which corresponds with U.S. Appl. No. 14/536,648, 7 pages.
Intention to Grant, dated Apr. 1, 2019, received in European Patent Application No. 17153418.3, which corresponds with U.S. Appl. No. 14/536,648, 7 pages.
Decision to Grant, dated Aug. 16, 2019, received in European Patent Application No. 17153418.3, which corresponds with U.S. Appl. No. 14/536,648, 3 pages.
Grant Certificate, dated Sep. 11, 2019, received in European Patent Application No. 17153418.3, which corresponds with U.S. Appl. No. 14/536,648, 3 pages.
Office Action, dated Apr. 27, 2018, received in Japanese Patent Application No. 2017-008764, which corresponds with U.S. Appl. No. 14/536,648, 5 pages.
Notice of Allowance, dated Feb. 4, 2019, received in Japanese Patent Application No. 2017-008764, which corresponds with U.S. Appl. No. 14/536,648, 5 pages.
Patent, dated Mar. 1, 2019, received in Japanese Patent Application No. 2017-008764, which corresponds with U.S. Appl. No. 14/536,648, 3 pages.
Office Action, dated Jan. 19, 2017, received in U.S. Appl. No. 14/609,042, 12 pages.
Notice of Allowance, dated Jul. 10, 2017, received in U.S. Appl. No. 14/609,042, 8 pages.
Office Action, dated Aug. 24, 2018, received in Japanese Patent Application No. 2017-113598, which corresponds with U.S. Appl. No. 14/609,042, 6 pages.
Notice of Allowance, dated Apr. 9, 2019, received in Japanese Patent Application No. 2017-113598, which corresponds with U.S. Appl. No. 14/609,042, 5 pages.
Patent, dated Apr. 19, 2019, received in Japanese Patent Application No. 2017-113598, which corresponds with U.S. Appl. No. 14/609,042, 2 pages.
Notice of Allowance, dated Dec. 17, 2018, received in Korean Patent Application No. 2017-7008614, which corresponds with U.S. Appl. No. 14/609,042, 5 pages.
Patent, dated Mar. 8, 2019, received in Korean Patent Application No. 2017-7008614, which corresponds with U.S. Appl. No. 14/609,042, 4 pages.
Office Action, dated Mar. 31, 2016, received in U.S. Appl. No. 14/864,737, 17 pages.
Notice of Allowance, dated Feb. 27, 2017, received in U.S. Appl. No. 14/864,737, 9 pages.
Notice of Allowance, dated Jun. 19, 2017, received in U.S. Appl. No. 14/864,737, 8 pages.
Office Action, dated Apr. 16, 2018, received in Australian Patent Application No. 2016233792, which corresponds with U.S. Appl. No. 14/864,737, 2 pages.
Notice of Acceptance, dated Mar. 12, 2019, received in Australian Patent Application No. 2016233792, which corresponds with U.S. Appl. No. 14/864,737, 5 pages.
Certificate of Grant, dated Jul. 4, 2019, received in Australian Patent Application No. 2016233792, which corresponds with U.S. Appl. No. 14/864,737, 1 page.
Office Action, dated Sep. 11, 2018, received in Chinese Patent Application No. 201610159295.6, which corresponds with U.S. Appl. No. 14/864,737, 6 pages.
Notice of Allowance, dated Apr. 17, 2019, received in Chinese Patent Application No. 201610159295.6, which corresponds with U.S. Appl. No. 14/864,737, 3 pages.
Patent, dated May 31, 2019, received in Chinese Patent Application No. 201610159295.6, which corresponds with U.S. Appl. No. 14/864,737, 7 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.

(56) References Cited

OTHER PUBLICATIONS

Intention to Grant, dated Aug. 2, 2016, received in Danish Patent Application No. 201500577, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Grant Certificate, dated Apr. 25, 2018, received in European Patent Application No. 16710871.1, which corresponds with U.S. Appl. No. 14/864,737, 2 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Feb. 14, 2018, received in Korean Patent Application No. 2017-7030129, which corresponds with U.S. Appl. No. 14/864,737, 17 pages.
Patent, dated Dec. 26, 2018, received in Korean Patent Application No. 2017-7030129, which corresponds with U.S. Appl. No. 14/864,737, 4 pages.
Patent, dated Jul. 12, 2017, received in Dutch Patent Application No. 2016452, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Office Action, dated May 10, 2016, received in Australian Patent Application No. 2016100254, which corresponds with U.S. Appl. No. 14/866,981, 6 pages.
Patent, dated Nov. 2, 2016, received in Australian Patent Application No. 2016100254, which corresponds with U.S. Appl. No. 14/866,981, 1 page.
Office Action, dated Nov. 5, 2018, received in Chinese Patent Application No. 201610131415.1, which corresponds with U.S. Appl. No. 14/866,981, 6 pages.
Office Action, dated Jul. 16, 2019, received in Chinese Patent Application No. 201610131415.1, which corresponds with U.S. Appl. No. 14/866,981, 4 pages.
Office Action, dated Mar. 16, 2020, received in Chinese Patent Application No. 201610131415.1, which corresponds with U.S. Appl. No. 14/866,981, 3 pages.
Notice of Allowance, dated Dec. 4, 2020, received in Chinese Patent Application No. 201610131415.1, which corresponds with U.S. Appl. No. 14/866,981, 3 pages.
Patent, dated Jan. 22, 2021, received in Chinese Patent Application No. 201610131415.1, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated Jul. 7, 2017, received in Danish Patent Application No. 201500575, 4 pages.
Patent, Nov. 16, 2017, received in Dutch Patent Application No. 2016375, which corresponds with U.S. Appl. No. 14/866,981, 2 pages.
Office Action, dated Dec. 15, 2017, received in U.S. Appl. No. 14/866,159, 35 pages.
Notice of Allowance, dated May 18, 2018, received in U.S. Appl. No. 14/866,159, 8 pages.
Office Action, dated May 19, 2016, received in Australian Patent Application No. 2016100251, which corresponds with U.S. Appl. No. 14/866,159, 5 pages.
Office Action, dated Jun. 5, 2018, received in Chinese Patent Application No. 201610137839.9, which corresponds with U.S. Appl. No. 14/866,159, 11 pages.
Notice of Allowance, dated Dec. 6, 2018, received in Chinese Patent Application No. 201610137839.9, which corresponds with U.S. Appl. No. 14/866,159, 3 pages.
Patent, dated Feb. 19, 2019, received in Chinese Patent Application No. 201610137839.9, which corresponds with U.S. Appl. No. 14/866,159, 6 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Pat. No. 14,866,159, 3 pages.
Office Action, dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 14/866,159, which corresponds with U.S. Appl. No. 14/866,159, 5 pages.
Office Action, dated Jul. 6, 2017, received in Danish Patent Application No. 201500574, which corresponds with U.S. Appl. No. 14/866,159, 3 pages.
Office Action, dated Jan. 10, 2018, received in Danish Patent Application No. 201500574, which corresponds with U.S. Appl. No. 14/866,159, 2 pages.
Notice of Allowance, dated Mar. 21, 2018, received in Danish Patent Application No. 201500574, which corresponds with U.S. Appl. No. 14/866,159, 2 pages.
Patent, dated May 22, 2018, received in Danish Patent Application No. 201500574, which corresponds with U.S. Appl. No. 14/866,159, 2 pages.
Intention to Grant, dated Oct. 28, 2019, received in European Patent Application No. 16707356.8, which corresponds with U.S. Appl. No. 14/866,159, 7 pages.
Decision to Grant, dated Mar. 5, 2020, received in European Patent Application No. 16707356.8, which corresponds with U.S. Appl. No. 14/866,159, 2 pages.
Patent, dated Apr. 1, 2020, received in European Patent Application No. 16707356.8, which corresponds with U.S. Appl. No. 14/866,159, 3 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Notice of Allowance, dated May 24, 2018, received in U.S. Appl. No. 14/868,078, 6 pages.
Innovation Patent, dated Aug. 4, 2016, received in Australian Patent Application No. 2016101201, which corresponds with U.S. Appl. No. 14/868,078, 1 page.
Office Action, dated Oct. 12, 2016, received in Australian Patent Application No. 2016101201, which corresponds with U.S. Appl. No. 14/868,078, 3 pages.
Notice of Allowance, dated Sep. 1, 2017, received in Australian Patent Application No. 2016229421, which corresponds with U.S. Appl. No. 14/868,078, 3 pages.

(56) References Cited

OTHER PUBLICATIONS

Certificate of Grant, dated Jan. 3, 2018, received in Australian Patent Application No. 2016229421, which corresponds with U.S. Appl. No. 14/868,078, 1 page.
Office Action, dated Feb. 7, 2019, received in Australian Patent Application No. 2017258967, which corresponds with U.S. Appl. No. 14/868,078, 3 page.
Notice of Acceptance, dated Jun. 21, 2019, received in Australian Patent Application No. 2017258967, which corresponds with U.S. Appl. No. 14/868,078, 3 pages.
Certificate of Grant, dated Oct. 17, 2019, received in Australian Patent Application No. 2017258967, which corresponds with U.S. Appl. No. 14/868,078, 4 page.
Office Action, dated Aug. 20, 2018, received in Chinese Patent Application No. 01610130348.1, which corresponds with U.S. Appl. No. 14/868,078, 6 pages.
Office Action, dated Feb. 26, 2019, received in Chinese Patent Application No. 01610130348.1, which corresponds with U.S. Appl. No. 14/868,078, 4 pages.
Notice of Allowance, dated May 6, 2019, received in Chinese Patent Application No. 01610130348.1, which corresponds with U.S. Appl. No. 14/868,078, 3 pages.
Patent, dated Jul. 5, 2019, received in Chinese Patent Application No. 201610130348.1, which corresponds with U.S. Appl. No. 14/868,078, 6 pages.
Notice of Allowance, dated Oct. 1, 2016, received in Chinese Patent Application No. 201620175847.8, which corresponds with U.S. Appl. No. 14/868,078, 1 page.
Office Action, dated Nov. 21, 2019, received in Chinese Patent Application No. 201680011338.4, which corresponds with U.S. Appl. No. 14/868,078, 8 pages.
Office Action, dated May 19, 2020, received in Chinese Patent Application No. 201680011338.4, which corresponds with U.S. Appl. No. 14/868,078, 4 pages.
Office Action, dated Jun. 30, 2020, received in Chinese Patent Application No. 201680011338.4, which correspondence with U.S. Appl. No. 14/868,078, 4 pages.
Patent, dated Dec. 11, 2020, received in Chinese Patent Application No. 201680011338.4, which correspondence with U.S. Appl. No. 14/868,078, 3 pages.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Danish Patent Application No. 201500588, which corresponds with U.S. Appl. No. 14/868,078, 9 pages.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Patent, dated Sep. 11, 2017, received in Danish Patent Application No. 201500588, which corresponds with U.S. Appl. No. 14/868,078, 5 pages.
Office Action, dated Apr. 25, 2018, received in European Patent Application No. 16708916.8, which corresponds with U.S. Appl. No. 14/868,078, 6 pages.
Intention to Grant, dated May 10, 2019, received in European Patent Application No. 16708916.8, which corresponds with U.S. Appl. No. 14/868,078, 5 pages.
Decision to Grant, dated Sep. 12, 2019, received in European Patent Application No. 16708916.8, which corresponds with U.S. Appl. No. 14/868,078, 2 pages.
Patent, dated Oct. 9, 2019, received in European Patent Application No. 16708916.8, which corresponds with U.S. Appl. No. 14/868,078, 3 pages.
Office Action, dated Oct. 25, 2018, received in European Patent Application No. 17184437.6, which corresponds with U.S. Appl. No. 14/868,078, 6 pages.
Intention to Grant, dated May 22, 2019, received in European Patent Application No. 17184437.6, which corresponds with U.S. Appl. No. 14/868,078, 7 pages.
Decision to Grant, dated Sep. 19, 2019, received in European Patent Application No. 17184437.6, which corresponds with U.S. Appl. No. 14/868,078, 2 pages.
Patent, dated Oct. 16, 2019, received in European Patent Application No. 17184437.6, which corresponds with U.S. Appl. No. 14/868,078, 3 pages.
Patent, dated Jul. 12, 2017, received in Dutch Patent Application No. 2016376, which corresponds with U.S. Appl. No. 14/868,078, 2 pages.
Office Action, dated May 9, 2016, received in U.S. Appl. No. 14/863,432, 26 pages.
Notice of Allowance, dated Nov. 14, 2016, received in U.S. Appl. No. 14/863,432, 7 pages.
Notice of Allowance, dated Apr. 27, 2017, received in U.S. Appl. No. 14/863,432, 7 pages.
Notice of Allowance, dated Sep. 18, 2017, received in U.S. Appl. No. 14/863,432, 8 pages.
Office Action, dated Aug. 19, 2016, received in Australian Patent Application No. 2016100647, which corresponds with U.S. Appl. No. 14/863,432, 5 pages.
Office Action, dated Dec. 4, 2018, received in Chinese Patent Application No. 201610342313.4, which corresponds with U.S. Appl. No. 14/863,432, 5 pages.
Office Action, dated Jun. 17, 2019, received in Chinese Patent Application No. 201610342313.4, which corresponds with U.S. Appl. No. 14/863,432, 4 pages.
Office Action, dated Nov. 5, 2019, received in Chinese Patent Application No. 201610342313.4, which corresponds with U.S. Appl. No. 14/863,432, 4 pages.
Notice of Allowance, dated Mar. 20, 2020, received in Chinese Patent Application No. 201610342313.4, which corresponds with U.S. Appl. No. 14/863,432, 6 pages.
Patent, dated May 12, 2020, received in Chinese Patent Application No. 201610342313.4, which corresponds with U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Patent, dated Feb. 8, 2017, received in Chinese Patent Application No. 201620470063.8, which corresponds with U.S. Appl. No. 14/863,432, 5 pages.
Office Action, dated Apr. 4, 2016, received in Danish Patent Application No. 201500582, which corresponds with U.S. Appl. No. 14/863,432, 10 pages.
Office Action, dated Oct. 7, 2016, received in Danish Patent Application No. 201500582, which corresponds with U.S. Appl. No. 14/863,432, 6 pages.
Office Action, dated Jun. 12, 2017, received in Danish Patent Application No. 201500582, which corresponds with U.S. Appl. No. 14/863,432, 5 pages.
Office Action, dated Jan. 10, 2020, received in Japanese Patent Application No. 2018-243773, which corresponds with U.S. Appl. No. 14/863,432, 6 pages.
Office Action, dated Jul. 17, 2020, received in Japanese Patent Application No. 2018-243773, which corresponds with U.S. Appl. No. 14/863,432, 5 pages.
Notice of Allowance, dated Dec. 4, 2020, received in Japanese Patent Application No. 2018-243773, which corresponds with U.S. Appl. No. 14/863,432, 5 pages.
Patent, dated Jan. 5, 2021, received in Japanese Patent Application No. 2018-243773, which corresponds with U.S. Appl. No. 14/863,432, 4 pages.
Notice of Allowance, dated Jul. 13, 2020, received in Korean Patent Application No. 2020-7015964, which corresponds with U.S. Appl. No. 14/863,432, 6 pages.

(56) References Cited

OTHER PUBLICATIONS

Patent, dated Oct. 12, 2020, received in Korean Patent Application No. 2020-7015964, which corresponds with U.S. Appl. No. 14/863,432, 8 pages.
Grant, dated Jul. 21, 2017, received in Dutch Patent Application No. 2016801, which corresponds with U.S. Appl. No. 14/871,227, 8 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Notice of Allowance, dated Oct. 4, 2017, received in U.S. Appl. No. 14/866,511, 37 pages.
Office Action, dated Aug. 19, 2016, received in U.S. Appl. No. 14/291,880—to be referenced in 7294 per Robby), 19 pages.
Notice of Allowance, dated Jan. 10, 2017, received in U.S. Appl. No. 14/291,880—to be referenced in 7294 per Robby), 8 pages.
Patent, dated Aug. 8, 2016, received in Australian Patent Application No. 2016100653, corresponds with U.S. Appl. No. 14/866,511, 1 page.
Office Action, dated Dec. 5, 2018, received in Chinese Patent Application No. 201610342264.4, which corresponds with U.S. Appl. No. 14/866,511, 4 pages.
Office Action, dated Jul. 11, 2019, received in Chinese Patent Application No. 201610342264.4, which corresponds with U.S. Appl. No. 14/866,511, 4 pages.
Office Action, dated Sep. 17, 2019, received in Chinese Patent Application No. 201610342264.4, which corresponds with U.S. Appl. No. 14/866,511, 3 pages.
Notice of Allowance, dated Nov. 28, 2019, received in Chinese Patent Application No. 201610342264.4, which corresponds with U.S. Appl. No. 14/866,511, 3 pages.
Patent, dated Feb. 7, 2020, received in Chinese Patent Application No. 201610342264.4, which corresponds with U.S. Appl. No. 14/866,511, 7 pages.
Notice of Allowance, dated Jan. 12, 2017, received in Chinese Patent Application No. 201620470281.1, which corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Patent, dated Jan. 23, 2017, received in Danish Patent Application No. 201500576, which corresponds with U.S. Appl. No. 14/866,511, 3 pages.
Office Action, dated Nov. 24, 2017, received in European Patent Application No. 16727900.9, which corresponds with U.S. Appl. No. 14/866,511, 5 pages.
Office Action, dated May 24, 2018, received in European Patent Application No. 16727900.9, which corresponds with U.S. Appl. No. 14/866,511, 7 pages.
Office Action, dated Jan. 2, 2019, received in European Patent Application No. 16727900.9, which corresponds with U.S. Appl. No. 14/866,511, 5 pages.
Intention to Grant, dated Jul. 5, 2019, received in European Patent Application No. 16727900.9, which corresponds with U.S. Appl. No. 14/866,511, 5 pages.
Decision to Grant, dated Dec. 5, 2019, received in European Patent Application No. 16727900.9, which corresponds with U.S. Appl. No. 14/866,511, 2 pages.
Patent, dated Jan. 1, 2020, received in European Patent Application No. 16727900.9, which corresponds with U.S. Appl. No. 14/866,511, 3 pages.

Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Patent, dated Aug. 18, 2017, received in Japanese Patent Application No. 2016558214, which corresponds with U.S. Appl. No. 14/866,511, 3 pages.
Office Action, dated Apr. 24, 2020, received in Korean Patent Application No. 2020-7003065, which corresponds with U.S. Appl. No. 14/866,511, 3 pages.
Notice of Allowance, dated Jul. 29, 2020, received in Korean Patent Application No. 2020-7003065, which corresponds with U.S. Appl. No. 14/866,511, 5 pages.
Patent, dated Oct. 29, 2020, received in Korean Patent Application No. 2020-7003065, which corresponds with U.S. Appl. No. 14/866,511, 5 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Notice of Allowance, dated Apr. 27, 2017, received in U.S. Appl. No. 14/866,489, 27 pages.
Notice of Allowance, dated Jul. 6, 2017, received in U.S. Appl. No. 14/866,489, 12 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Notice of Acceptance, dated Aug. 23, 2018, received in Australian Patent Application No. 2018204611, which corresponds with U.S. Appl. No. 14/869,899, 3 pages.
Office Action, dated Nov. 6, 2020, received in Chinese Patent Application No. 201610871595.7, which corresponds with U.S. Appl. No. 14/869,899, 15 pages.
Notice of Allowance, dated Mar. 30, 2021, received in Chinese Patent Application No. 201610871595.7, which corresponds with U.S. Appl. No. 14/869,899, 1 page.
Patent, dated Jun. 4, 2021, received in Chinese Patent Application No. 201610871595.7, which corresponds with U.S. Appl. No. 14/869,899, 7 pages.
Office Action, dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Jul. 3, 2017, received in Danish Patent Application No. 201500592, which corresponds with U.S. Appl. No. 14/869,899, 5 pages.
Office Action, dated Jan. 29, 2018, received in Danish Patent Application No. 201500592, which corresponds with U.S. Appl. No. 14/869,899, 2 pages.
Notice of Allowance, dated Apr. 24, 2018, received in Danish Patent Application No. 201500592, which corresponds with U.S. Appl. No. 14/869,899, 2 pages.
Patent, dated May 28, 2018, received in Danish Patent Application No. 201500592, which corresponds with U.S. Appl. No. 14/869,899, 2 pages.
Office Action, dated Nov. 22, 2016, received in Danish Patent Application No. 201670594, which corresponds with U.S. Appl. No. 14/869,899, 9 pages.

(56) References Cited

OTHER PUBLICATIONS

Office Action, dated Dec. 14, 2017, received in Danish Patent Application No. 201670594, which corresponds with U.S. Appl. No. 14/869,899, 3 pages.
Office Action, dated May 1, 2018, received in Danish Patent Application No. 201670594, which corresponds with U.S. Appl. No. 14/869,899, 2 pages.
Office Action, dated Oct. 9, 2018, received in Danish Patent Application No. 201670594, which corresponds with U.S. Appl. No. 14/869,899, 2 pages.
Patent, dated Feb. 26, 2019, received in Danish Patent Application No. 201670594, which corresponds with U.S. Appl. No. 14/869,899, 3 pages.
Office Action, dated May 8, 2019, received in European Patent Application No. 18168939.9, which corresponds with U.S. Appl. No. 14/869,899, 10 pages.
Intention to Grant, dated Oct. 25, 2019, received in European Patent Application No. 18168939.9, which corresponds with U.S. Appl. No. 14/869,899, 8 pages.
Decision to Grant, dated Mar. 26, 2020, received in European Patent Application No. 14/869,899, which corresponds with U.S. Appl. No. 14/869,899, 3 pages.
Patent, dated Apr. 22, 2020, received in European Patent Application No. 14/869,899, which corresponds with U.S. Appl. No. 14/869,899, 3 pages.
Office Action, dated May 23, 2019, received in European Patent Application No. 18175195.9, which corresponds with U.S. Appl. No. 14/869,899, 10 pages.
Oral Summons, dated Dec. 6, 2019, received in European Patent Application No. 18175195.9, which corresponds with U.S. Appl. No. 14/869,899, 9 pages.
Office Action, dated Sep. 21, 2018, received in Japanese Patent Application No. 2018-100827, which corresponds with U.S. Appl. No. 14/869,899, 4 pages.
Notice of Allowance, dated Mar. 1, 2019, received in Japanese Patent Application No. 2018-100827, which corresponds with U.S. Appl. No. 14/869,899, 5 pages.
Patent, dated Apr. 5, 2019, received in Japanese Patent Application No. 2018-100827, which corresponds with U.S. Appl. No. 14/869,899, 5 pages.
Office Action, dated Oct. 5, 2018, received in Korean Patent Application No. 2018-7017213, which corresponds with U.S. Appl. No. 14/869,899, 3 pages.
Office Action, dated Mar. 22, 2019, received in Korean Patent Application No. 2018-7017213, which corresponds with U.S. Appl. No. 14/869,899, 6 pages.
Patent, dated May 10, 2019, received in Korean Patent Application No. 2018-7017213, which corresponds with U.S. Appl. No. 14/869,899, 8 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Apr. 13, 2017, received in U.S. Appl. No. 14/866,992, 34 pages.
Final Office Action, dated Oct. 3, 2017, received in U.S. Appl. No. 14/866,992, 37 pages.
Office Action, dated Jan. 29, 2018, received in U.S. Appl. No. 14/866,992, 44 pages.
Final Office Action, dated Aug. 28, 2018, received in U.S. Appl. No. 14/866,992, 52 pages.
Examiner's Answer, dated May 9, 2019, received in U.S. Appl. No. 14/866,992, 26 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Mar. 26, 2018, received in Australian Patent Application No. 2016304890, which corresponds with U.S. Appl. No. 14/866,992, 3 pages.
Notice of Acceptance, dated Mar. 12, 2019, received in Australian Patent Application No. 2016304890, which corresponds with U.S. Appl. No. 14/866,992, 5 pages.
Certificate of Grant, dated Jul. 4, 2019, received in Australian Patent Application No. 2016304890, which corresponds with U.S. Appl. No. 14/866,992, 1 page.
Office Action, dated Jan. 19, 2018, received in Australian Patent Application No. 201761478, which corresponds with U.S. Appl. No. 14/866,992, 6 pages.
Certificate of Grant, dated May 9, 2019, received in Australian Patent Application No. 201761478, which corresponds with U.S. Appl. No. 14/866,992, 3 pages.
Office Action, dated Sep. 12, 2019, received in Chinese Patent Application No. 201610658351.8, which corresponds with U.S. Appl. No. 14/866,992, 5 pages.
Office Action, dated Jan. 13, 2020, received in Chinese Patent Application No. 201610658351.8, which corresponds with U.S. Appl. No. 14/866,992, 3 pages.
Office Action, dated Jun. 30, 2020, received in Chinese Patent Application No. 201610658351.8, which corresponds with U.S. Appl. No. 14/866,992, 11 pages.
Office Action, dated Nov. 25, 2020, received in Chinese Patent Application No. 201610658351.8, which corresponds with U.S. Appl. No. 14/866,992, 9 pages.
Office Action, dated Jul. 24, 2020, received in Chinese Patent Application No. 201680041559.6, which corresponds with U.S. Appl. No. 14/866,992, 13 pages.
Notice of Allowance, dated Apr. 26, 2021, received in Chinese Patent Application No. 201680041559.6, which corresponds with U.S. Appl. No. 14/866,992, 1 page.
Patent, dated May 28, 2021, received in Chinese Patent Application No. 201680041559.6, which corresponds with U.S. Appl. No. 14/866,992, 7 pages.
Office Action, dated Mar. 18, 2016, received in Danish Patent Application 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Feb. 6, 2017, received in Danish Patent Application No. 201500593, which corresponds with U.S. Appl. No. 14/866,992, 4 pages.
Office Action, dated Sep. 5, 2017, received in Danish Patent Application No. 201500593, which corresponds with U.S. Appl. No. 14/866,992, 6 pages.
Office Action, dated Oct. 12, 2018, received in European Patent Application No. 16758008.3, which corresponds with U.S. Appl. No. 14/866,992, 11 pages.
Summons, dated May 8, 2019, received in European Patent Application No. 16758008.3, which corresponds with U.S. Appl. No. 14/866,992, 14 pages.
Office Action, dated Jan. 11, 2019, received in Japanese Patent Application No. 2018-506425, which corresponds with U.S. Appl. No. 14/866,992, 6 pages.
Notice of Allowance, dated Jun. 18, 2019, received in Japanese Patent Application No. 2018-506425, which corresponds with U.S. Appl. No. 14/866,992, 5 pages.
Patent, dated Jul. 26, 2019, received in Japanese Patent Application No. 2018-506425, which corresponds with U.S. Appl. No. 14/866,992, 3 pages.
Notice of Allowance, dated Sep. 10, 2019, received in Korean Patent Application No. 2018-7003890, which corresponds with U.S. Appl. No. 14/866,992, 5 pages.
Patent, dated Oct. 11, 2019, received in Korean Patent Application No. 2018-7003890, which corresponds with U.S. Appl. No. 14/866,992, 5 pages.

(56) References Cited

OTHER PUBLICATIONS

Office Action, dated Feb. 12, 2018, received in U.S. Appl. No. 15/009,661, 36 pages.
Final Office Action, dated Sep. 19, 2018, received in U.S. Appl. No. 15/009,661, 28 pages.
Office Action, dated Jun. 28, 2019, received in U.S. Appl. No. 15/009,661, 33 pages.
Final Office Action, dated Dec. 30, 2019, received in U.S. Appl. No. 15/009,661, 33 pages.
Office Action, dated Sep. 16, 2020, received in U.S. Appl. No. 15/009,661, 37 pages.
Final Office Action, dated Feb. 26, 2021, received in U.S. Appl. No. 15/009,661, 46 pages.
Office Action, dated Jul. 1, 2021 received in U.S. Appl. No. 15/009,661, 52 pages.
Office Action, dated Jan. 18, 2018, received in U.S. Appl. No. 15/009,676, 21 Pages.
Notice of Allowance, dated Aug. 3, 2018, received in U.S. Appl. No. 15/009,676, 6 pages.
Notice of Allowance, dated Nov. 15, 2018, received in U.S. Appl. No. 15/009,676, 6 pages.
Office Action, dated Jul. 15, 2020, received in Chinese Patent Application No. 201680047125.7, which corresponds with U.S. Appl. No. 15/009,676, 11 pages.
Office Action, dated Nov. 30, 2020, received in Chinese Patent Application No. 201680047125.7, which corresponds with U.S. Appl. No. 15/009,676, 11 pages.
Notice of Allowance, dated Feb. 24, 2021, received in Chinese Patent Application No. 201680047125.7, which corresponds with U.S. Appl. No. 15/009,676, 1 page.
Patent, dated Apr. 27, 2021, received in Chinese Patent Application No. 201680047125.7, which corresponds with U.S. Appl. No. 15/009,676, 8 pages.
Intention to Grant, dated Apr. 7, 2020, received in European Patent Application No. 16756866.6, which corresponds with U.S. Appl. No. 15/009,676, 8 pages.
Decision to Grant, dated Aug. 27, 2020, received in European Patent Application No. 16756866.6, which corresponds with U.S. Appl. No. 15/009,676, 4 pages.
Patent, dated Sep. 23, 2020, received in European Patent Application No. 16756866.6, which corresponds with U.S. Appl. No. 15/009,676, 4 pages.
Office Action, dated Mar. 13, 2018, received in U.S. Appl. No. 15/009,688, 10 pages.
Notice of Allowance, dated Nov. 6, 2018, received in U.S. Appl. No. 15/009,688, 10 pages.
Office Action, dated Jun. 29, 2020, received in Chinese Patent Application No. 201680047164.7, which corresponds with U.S. Appl. No. 15/009,688, 7 pages.
Notice of Allowance, dated Oct. 9, 2020, received in Chinese Patent Application No. 201680047164.7, which corresponds with U.S. Appl. No. 15/009,688, 5 pages.
Patent, dated Nov. 10, 2020, received in Chinese Patent Application No. 201680047164.7, which corresponds with U.S. Appl. No. 15/009,688, 6 pages.
Intention to Grant, dated Mar. 16, 2020, received in European Patent Application No. 16753796.8, which corresponds with U.S. Appl. No. 15/009,688, 6 pages.
Decision to Grant, dated Sep. 24, 2020, received in European Patent Application No. 16753796.8, which corresponds with U.S. Appl. No. 15/009,688, 4 pages.
Certificate of Grant, dated Oct. 21, 2020, received in European Patent Application No. 16753796.8, which corresponds with U.S. Appl. No. 15/009,688, 4 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated May 2, 2017, received in U.S. Appl. No. 14/856,517, 34 pages.
Final Office Action, dated Oct. 4, 2017, received in U.S. Appl. No. 14/856,517, 33 pages.
Notice of Allowance, dated Jun. 29, 2018, received in U.S. Appl. No. 14/856,517, 11 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated May 18, 2017, received in U.S. Appl. No. 14/856,519, 35 pages.
Final Office Action, dated Nov. 15, 2017, received in U.S. Appl. No. 14/856,519, 31 pages.
Notice of Allowance, dated Jan. 31, 2018, received in U.S. Appl. No. 14/856,519, 9 pages.
Notice of Allowance, dated May 2, 2018, received in U.S. Appl. No. 14/856,519, 10 pages.
Office Action, dated Jun. 9, 2017, received in U.S. Appl. No. 14/856,520, 36 pages.
Final Office Action, dated Nov. 16, 2017, received in U.S. Appl. No. 14/856,520, 41 pages.
Office Action, dated Nov. 20, 2018, received in U.S. Appl. No. 14/856,520, 36 pages.
Final Office Action, dated Apr. 17, 2019, received in U.S. Appl. No. 14/856,520, 38 pages.
Notice of Allowance, dated Jan. 6, 2020, received in U.S. Appl. No. 14/856,520, 5 pages.
Notice of Allowance, dated Mar. 4, 2020, received in U.S. Appl. No. 14/856,520, 6 pages.
Notice of Allowance, dated Oct. 1, 2020, received in U.S. Appl. No. 14/856,520, 5 pages.
Office Action, dated Jun. 30, 2017, received in U.S. Appl. No. 14/856,522, 22 pages.
Notice of Allowance, dated Feb. 9, 2018, received in U.S. Appl. No. 14/856,522, 9 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Notice of Allowance, dated Jun. 16, 2017, received in in U.S. Appl. No. 14/857,645, 5 pages.
Office Action, dated Nov. 30, 2017, received in U.S. Appl. No. 14/857,636, 19 pages.
Notice of Allowance, dated Aug. 16, 2018, received in U.S. Appl. No. 14/857,636, 5 pages.
Office Action, dated Jan. 17, 2018, received in Australian U.S. Appl. No. 14/857,636, which corresponds with U.S. Appl. No. 14/857,636, 3 pages.
Notice of Allowance, dated Jan. 15, 2019, received in Australian Patent Application No. 2017202816, which corresponds with U.S. Appl. No. 14/857,636, 3 pages.
Certificate of Grant, dated May 16, 2019, received in Australian Patent Application No. 2017202816, which corresponds with U.S. Appl. No. 14/857,636, 4 pages.
Office Action, dated Jul. 1, 2020, received in Chinese Patent Application No. 201711262953.5, which corresponds with U.S. Appl. No. 14/857,636, 13 pages.
Patent, dated Nov. 27, 2020, received in Chinese Patent Application No. 201711262953.5, which corresponds with U.S. Appl. No. 14/857,636, 6 pages.
Office Action, dated Sep. 22, 2017, received in Japanese Patent Application No. 2017-029201, which corresponds with U.S. Appl. No. 14/857,636, 8 pages.

(56) References Cited

OTHER PUBLICATIONS

Office Action, dated Jun. 25, 2018, received in Japanese Patent Application No. 2017-029201, which corresponds with U.S. Appl. No. 14/857,636, 4 pages.
Office Action, dated Jan. 20, 2020, received in Japanese Patent Application No. 2017-029201, which corresponds with U.S. Appl. No. 14/857,636, 21 pages.
Notice of Allowance, dated Oct. 16, 2020, received in Japanese Patent Application No. 2017-029201, which corresponds with U.S. Appl. No. 14/857,636, 4 pages.
Patent, dated Nov. 12, 2020, received in Japanese Patent Application No. 2017-029201, which corresponds with U.S. Appl. No. 14/857,636, 3 pages.
Office Action, dated Nov. 28, 2018, received in Korean U.S. Appl. No. 14/857,636, which corresponds with U.S. Appl. No. 14/857,636, 6 pages.
Notice of Allowance, dated May 10, 2019, received in Korean U.S. Appl. No. 14/857,636, which corresponds with U.S. Appl. No. 14/857,636, 4 pages.
Patent, dated Jul. 11, 2019, received in Korean Patent Application No. 20177036645, which corresponds with U.S. Appl. No. 14/857,636, 8 pages.
Office Action, dated Dec. 1, 2017, received in U.S. Appl. No. 14/857,663, 15 pages.
Notice of Allowance, dated Aug. 16, 2018, received in U.S. Appl. No. 14/857,663, 5 pages.
Office Action, dated Jul. 14, 2020, received in Chinese Patent Application No. 201711261143.8, which corresponds with U.S. Appl. No. 14/857,663, 12 pages.
Notice of Allowance, dated Dec. 2, 2020, received in Chinese Patent Application No. 201711261143.8, which corresponds with U.S. Appl. No. 14/857,663, 3 pages.
Patent, dated Jan. 22, 2021, received in Chinese Patent Application No. 201711261143.8, which corresponds with U.S. Appl. No. 14/857,663, 6 pages.
Office Action, dated Nov. 11, 2019, received in Japanese Patent Application No. 2018-201076, which corresponds with U.S. Appl. No. 14/857,663, 7 pages.
Notice of Allowance, dated Sep. 18, 2020, received in Japanese Patent Application No. 2018-201076, which corresponds with U.S. Appl. No. 14/857,663, 5 pages.
Patent, dated Oct. 19, 2020, received in Japanese Patent Application No. 2018-201076, which corresponds with U.S. Appl. No. 14/857,663, 4 pages.
Office Action, dated Mar. 31, 2017, received in U.S. Appl. No. 14/857,700, 14 pages.
Final Office Action, dated Oct. 11, 2017, received in U.S. Appl. No. 14/857,700, 13 pages.
Notice of Allowance, dated Feb. 12, 2018, received in U.S. Appl. No. 14/857,700, 13 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Notice of Allowance, dated Oct. 9, 2018, received in U.S. Appl. No. 14/864,529, 11 pages.
Office Action, dated Dec. 21, 2020, received in Korean Patent Application No. 2020-7029178, which corresponds with U.S. Appl. No. 14/870,882, 2 pages.
Notice of allowance, dated Jun. 28, 2021, received in Korean Patent Application No. 2020-7029178, which corresponds with U.S. Appl. No. 14/870,882, 2 pages.
Patent, dated Sep. 28, 2021, received in Korean Patent Application No. 2020-7029178, which corresponds with U.S. Appl. No. 14/870,882, 3 pages.
Grant of Patent, dated Apr. 16, 2018, received in Dutch Patent Application No. 2019215, 2 pages.
Office Action, dated Jan. 25, 2016, received in U.S. Pat. No. 14,864,580, 29 pages.
Notice of Allowance, dated May 23, 2016, received in U.S. Appl. No. 14/864,580, 9 pages.
Notice of Allowance, dated Aug. 4, 2016, received in U.S. Appl. No. 14/864,580, 9 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Office Action, dated Jul. 1, 2019, received in Australian Patent Application No. 2019200872, which corresponds with U.S. Appl. No. 14/864,580, 6 pages.
Notice of Acceptance, dated Sep. 19, 2019, received in Australian Patent Application No. 2019200872, which corresponds with U.S. Appl. No. 14/864,580, 3 pages.
Certificate of Grant, dated Jan. 23, 2020, received in Australian Patent Application No. 2019200872, which corresponds with U.S. Appl. No. 14/864,580, 3 pages.
Office Action, dated Nov. 7, 2018, received in Chinese Patent Application No. 201610342151.4, which corresponds with U.S. Appl. No. 14/864,580, 3 pages.
Notice of Allowance, dated Jun. 14, 2019, received in Chinese Patent Application No. 201610342151.4, which corresponds with U.S. Appl. No. 14/864,580, 3 pages.
Patent, dated Jul. 30, 2019, received in Chinese Patent Application No. 201610342151.4, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Apr. 8, 2016, received in Danish Patent Application No. 201500584, which corresponds with U.S. Appl. No. 14/864,580, 9 pages.
Office Action, dated Oct. 7, 2016, received in Danish Patent Application No. 201500584, which corresponds with U.S. Appl. No. 14/864,580, 3 pages.
Office Action, dated May 5, 2017, received in Danish Patent Application No. 201500584, which corresponds with U.S. Appl. No. 14/864,580, 3 pages.
Office Action, dated Dec. 15, 2017, received in Danish Patent Application No. 201500584, which corresponds with U.S. Appl. No. 14/864,580, 4 pages.
Office Action, dated Jun. 17, 2021, received in European Patent Application No. 19194418.0, which corresponds with U.S. Appl. No. 14/864,580, 7 pages.
Notice of Allowance, dated Aug. 14, 2019, received in Korean Patent Application No. 2019-7018317, which corresponds with U.S. Appl. No. 14/864,580, 6 pages.
Patent, dated Nov. 12, 2019, received in Korean Patent Application No. 2019-7018317, which corresponds with U.S. Appl. No. 14/864,580, 6 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Office Action, dated Aug. 31, 2018, received in Australian Patent Application No. 14/864,601, which corresponds with U.S. Appl. No. 14/864,601, 3 pages.
Certificate of Grant, dated Feb. 21, 2019, received in Australian Patent Application No. 2016276030, which corresponds with U.S. Appl. No. 14/864,601, 4 pages.
Office Action, dated Feb. 4, 2019, received in European Patent Application No. 16730554.9, which corresponds with U.S. Appl. No. 14/864,601, 10 pages.
Intention to Grant, dated Jul. 18, 2019, received in European Patent Application No. 16730554.9, which corresponds with U.S. Appl. No. 14/864,601, 5 pages.
Decision to Grant, dated Sep. 12, 2019, received in European Patent Application No. 16730544.9, which corresponds with U.S. Appl. No. 14/864,601, 2 pages.

(56) References Cited

OTHER PUBLICATIONS

Patent, dated Oct. 9, 2019, received in European Patent Application No. 16730554.9, which corresponds with U.S. Appl. No. 14/864,601, 3 pages.
Notice of Allowance, dated Dec. 10, 2018, received in Japanese Patent Application No. 2017-561375, which corresponds with U.S. Appl. No. 14/864,601, 5 pages.
Patent, dated Jan. 11, 2019, received in Japanese Patent Application No. 2017-561375, which corresponds with U.S. Appl. No. 14/864,601, 3 pages.
Office Action, dated Jan. 25, 2019, received in Korean Patent Application No. 2017-7033756, which corresponds with U.S. Appl. No. 14/864,601, 8 pages.
Notice of Allowance, dated May 29, 2019, received in Korean Patent Application No. 2017-7033756, which corresponds with U.S. Appl. No. 14/864,601, 6 pages.
Patent, dated Jun. 25, 2019, received in Korean Patent Application No. 2017-7033756, which corresponds with U.S. Appl. No. 14/864,601, 6 pages.
Office Action, dated Apr. 19, 2016, received in U.S. Appl. No. 14/864,627, 9 pages.
Notice of Allowance, dated Jan. 31, 2017, received in U.S. Appl. No. 14/864,627, 7 pages.
Office Action, dated Apr. 8, 2016, received in Danish Patent Application No. 201500585, which corresponds with U.S. Appl. No. 14/864,627, 9 pages.
Office Action, dated Oct. 7, 2016, received in Danish Patent Application No. 201500585, which corresponds with U.S. Appl. No. 14/864,627, 3 pages.
Office Action, dated May 5, 2017, received in Danish Patent Application No. 201500585, which corresponds with U.S. Appl. No. 14/864,627, 4 pages.
Office Action, dated Dec. 15, 2017, received in Danish Patent Application No. 201500585, which corresponds with U.S. Appl. No. 14/864,627, 5 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Certificate of Examination, dated Dec. 8, 2016, received in Australian Patent Application No. 2016100292, which corresponds with U.S. Appl. No. 14/866,361, 1 page.
Office Action, dated Oct. 19, 2018, received in Chinese Patent Application No. 201610189298.4, which corresponds with U.S. Appl. No. 14/866,361, 6 pages.
Notice of Allowance, dated May 23, 2019, received in Chinese Patent Application No. 201610189298.4, which corresponds with U.S. Appl. No. 14/866,361, 3 pages.
Patent, dated Jul. 23, 2019, received in Chinese Patent Application No. 201610189298.4, which corresponds with U.S. Appl. No. 14/866,361, 7 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Apr. 7, 2016, received in Danish Patent Application No. 201500579, which corresponds with U.S. Appl. No. 14/866,361, 10 pages.
Office Action, dated Oct. 28, 2016, received in Danish Patent Application No. 201500579, which corresponds with U.S. Appl. No. 14/866,361, 3 pages.
Office Action, dated Jun. 15, 2017, received in Danish Patent Application No. 201500579, which corresponds with U.S. Appl. No. 14/866,361, 2 pages.
Office Action, dated Jan. 4, 2018, received in Danish Patent Application No. 201500579, which corresponds with U.S. Appl. No. 14/866,361, 2 pages.
Notice of Allowance, dated Mar. 16, 2018, received in Danish Patent Application No. 201500579, which corresponds with U.S. Appl. No. 14/866,361, 2 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Office Action, dated Jan. 30, 2019, received in European Patent Application No. 17188507.2, which corresponds with U.S. Appl. No. 14/866,361, 13 pages.
Office Action, dated Oct. 8, 2019, received in European Patent Application No. 17188507.2, which corresponds with U.S. Appl. No. 14/866,361, 6 pages.
Intention to Grant, dated Apr. 14, 2020, received in European Patent Application No. 17188507.2, which corresponds with U.S. Appl. No. 14/866,361, 7 pages.
Intention to Grant, dated Feb. 3, 2021, received in European Patent Application No. 17188507.2, which corresponds with U.S. Appl. No. 14/866,361, 7 pages.
Patent, dated May 26, 2021, received in European Patent Application No. 17188507.2, which corresponds with U.S. Appl. No. 14/866,361, 3 pages.
Office Action, dated Oct. 12, 2018, received in Japanese Patent Application No. 2017-141962, which corresponds with U.S. Appl. No. 14/866,361, 6 pages.
Office Action, dated Jun. 10, 2019, received in Japanese Patent Application No. 2017-141962, which corresponds with U.S. Appl. No. 14/866,361, 6 pages.
Notice of Allowance, dated Oct. 7, 2019, received in Japanese Patent Application No. 2017-141962, which corresponds with U.S. Appl. No. 14/866,361, 5 pages.
Patent, dated Nov. 8, 2019, received in Japanese Patent Application No. 2017-141962, which corresponds with U.S. Appl. No. 14/866,361, 4 pages.
Office Action, dated Sep. 14, 2018, received in Korean Patent Application No. 2018-7013039, which corresponds with U.S. Appl. No. 14/866,361, 2 pages.
Notice of Allowance, dated Jan. 30, 2019, received in Korean Patent Application No. 2018-7013039, which corresponds with U.S. Appl. No. 14/866,361, 5 pages.
Patent, dated Apr. 3, 2019, received in Korean Patent Application No. 2018-7013039, which corresponds with U.S. Appl. No. 14/866,361, 4 pages.
Office Action, dated Jan. 22, 2018, received in U.S. Appl. No. 14/866,987, 22 pages.
Final Office Action, dated Oct. 11, 2018, received in U.S. Appl. No. 14/866,987, 20 pages.
Notice of Allowance, dated Apr. 4, 2019, received in U.S. Appl. No. 14/866,987, 5 pages.
Patent, dated Aug. 8, 2016, received in Australian Patent Application No. 2016100649, which corresponds with U.S. Appl. No. 14/866,987, 1 page.
Office Action, dated Dec. 4, 2018, received in Chinese Patent Application No. 201610342336.5, which corresponds with U.S. Appl. No. 14/866,987, 5 pages.
Rejection Decision, dated Apr. 28, 2019, received in Chinese Patent Application No. 201610342336.5, which corresponds with U.S. Appl. No. 14/866,987, 4 pages.
Office Action, dated Aug. 15, 2019, received in Chinese Patent Application No. 201610342336.5, which corresponds with U.S. Appl. No. 14/866,987, 3 pages.
Notice of Allowance, dated Dec. 3, 2019, received in Chinese Patent Application No. 201610342336.5, which corresponds with U.S. Appl. No. 14/866,987, 3 pages.

(56) References Cited

OTHER PUBLICATIONS

Patent, dated Jan. 31, 2020, received in Chinese Patent Application No. 201610342336.5, which corresponds with U.S. Appl. No. 14/866,987, 7 pages.
Office Action, dated Oct. 19, 2016, received in Chinese Patent Application No. 2016201470246.X, which corresponds with U.S. Appl. No. 14/866,987, 4 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Office Action, dated Mar. 22, 2016, received in Danish Patent Application No. 201500587, which corresponds with U.S. Appl. No. 14/866,987, 8 pages.
Intention to Grant, dated Jun. 10, 2016, received in Danish Patent Application No. 201500587, which corresponds with U.S. Appl. No. 14/866,987, 2 pages.
Notice of Allowance, dated Nov. 1, 2016, received in Danish Patent Application No. 201500587, which corresponds with U.S. Appl. No. 14/866,987, 2 pages.
Office Action, dated Sep. 9, 2016, received in Danish Patent Application No. 201670463, which corresponds with U.S. Appl. No. 14/866,987, 7 pages.
Notice of Allowance, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Office Action, dated May 7, 2018, received in European Patent Application No. 16189421.7, which corresponds with U.S. Appl. No. 14/866,987, 5 pages.
Office Action, dated Dec. 11, 2018, received in European Patent Application No. 16189421.7, which corresponds with U.S. Appl. No. 14/866,987, 6 pages.
Intention to Grant, dated Jun. 14, 2019, received in European Patent Application No. 16189421.7, which corresponds with U.S. Appl. No. 14/866,987, 7 pages.
Intention to Grant, dated Oct. 25, 2019, received in European Patent Application No. 16189421.7, which corresponds with U.S. Appl. No. 14/866,987, 7 pages.
Decision to Grant, dated Nov. 14, 2019, received in European Patent Application No. 16189421.7, which corresponds with U.S. Appl. No. 14/866,987, 2 pages.
Patent, dated Dec. 11, 2019, received in European Patent Application No. 16189421.7, which corresponds with U.S. Appl. No. 14/866,987, 3 pages.
Office Action, dated Feb. 3, 2020, received in European Patent Application No. 17163309.2, which corresponds with U.S. Appl. No. 14/866,987, 6 pages.
Office Action, dated Dec. 22, 2021, received in European Patent Application No. 17163309.2, which corresponds with U.S. Appl. No. 14/866,987, 4 pages.
Patent, dated Feb. 5, 2021, received in Hong Kong Patent Application No. 1235878, which corresponds with U.S. Appl. No. 14/866,987, 6 pages.
Patent, dated Jan. 8, 2021, received in Hong Kong Patent Application No. 18100151.5, which corresponds with U.S. Appl. No. 14/866,987, 6 pages.
Office Action, dated Aug. 26, 2020, received in Indian Application No. 201617032291, which corresponds with U.S. Appl. No. 14/866,987, 9 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Jul. 31, 2017, received in Japanese Patent Application No. 2017126445, which corresponds with U.S. Appl. No. 14/866,987, 6 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Office Action, dated Nov. 29, 2017, received in U.S. Appl. No. 14/866,989, 31 pages.
Final Office Action, dated Jul. 3, 2018, received in U.S. Appl. No. 14/866,989, 17 pages.
Notice of Allowance, dated Jan. 17, 2019, received in U.S. Appl. No. 14/866,989, 8 pages.
Certificate of Exam, dated Jul. 21, 2016, received in Australian Patent Application No. 2016100652, which corresponds with U.S. Appl. No. 14/866,989, 1 page.
Office Action, dated Feb. 26, 2018, received in Australian Patent Application No. 2017201079, which corresponds with U.S. Appl. No. 14/866,989, 6 pages.
Notice of Acceptance, dated Feb. 14, 2019, received in Australian Patent Application No. 2017201079, which corresponds with U.S. Appl. No. 14/866,989, 3 pages.
Certificate of Grant, dated Jun. 13, 2019, received in Australian Patent Application No. 2017201079, which corresponds with U.S. Appl. No. 14/866,989, 1 page.
Office Action, dated Sep. 19, 2018, received in Chinese Patent Application No. 201610342314.9, which corresponds with U.S. Appl. No. 14/866,989, 6 pages.
Office Action, dated Feb. 25, 2019, received in Chinese Patent Application No. 201610342314.9, which corresponds with U.S. Appl. No. 14/866,989, 3 pages.
Rejection Decision, dated Apr. 24, 2019, received in Chinese Patent Application No. 201610342314.9, which corresponds with U.S. Appl. No. 14/866,989, 3 pages.
Office Action, dated Jun. 16, 2017, received in Japanese Patent Application No. 2016-233450, which corresponds with U.S. Appl. No. 14/866,989, 6 pages.
Patent, dated Mar. 9, 2018, received in Japanese Patent Application No. 2016-233450, which corresponds with U.S. Appl. No. 14/866,989, 4 pages.
Office Action, dated Apr. 1, 2016, received in Danish Patent Application No. 201500589, which corresponds with U.S. Appl. No. 14/866,989, 8 pages.
Intention to Grant, dated Jun. 10, 2016, received in Danish Patent Application No. 201500589, which corresponds with U.S. Appl. No. 14/866,989, 2 pages.
Notice of Allowance, dated Nov. 1, 2016, received in Danish Patent Application No. 201500589, which corresponds with U.S. Appl. No. 14/866,989, 2 pages.
Office Action, dated Feb. 3, 2020, received in European Patent Application No. 16189425.8, which corresponds with U.S. Appl. No. 14/866,989, 6 pages.
Intention to Grant, dated Dec. 3, 2020, received in European Patent Application No. 16189425.8, which corresponds with U.S. Appl. No. 14/866,989, 7 pages.
Decision to Grant, dated Feb. 25, 2021, received in European Patent Application No. 16189425.8, which corresponds with U.S. Appl. No. 14/866,989, 1 page.
Notice of Allowance, dated Feb. 5, 2018, received in Japanese Patent Application No. 2016-233450, which corresponds with U.S. Appl. No. 14/866,989, 5 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.

(56) References Cited

OTHER PUBLICATIONS

Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action, dated Jun. 23, 2020, received in Brazilian Patent Application No. 11201701119-9, which corresponds with U.S. Appl. No. 14/871,236, 9 pages.
Office Action, dated Sep. 30, 2019, received in Chinese Patent Application No. 201610871466.8, which corresponds with U.S. Appl. No. 14/871,236, 4 pages.
Notice of Allowance, dated Mar. 24, 2020, received in Chinese Patent Application No. 201610871466.8, which corresponds with U.S. Appl. No. 14/871,236, 3 pages.
Patent, dated May 19, 2020, received in Chinese Patent Application No. 201610871466.8, which corresponds with U.S. Appl. No. 14/871,236, 8 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Sep. 30, 2016, received in Danish Patent Application No. 201500595, which corresponds with U.S. Appl. No. 14/871,236, 10 pages.
Office Action, dated Jun. 15, 2017, received in Danish Patent Application No. 201500595, which corresponds with U.S. Appl. No. 14/871,236, 4 pages.
Office Action, dated Jan. 29, 2018, received in Danish Patent Application No. 201500595, which corresponds with U.S. Appl. No. 14/871,236, 2 pages.
Notice of Allowance, dated Apr. 26, 2018, received in Danish Patent Application No. 201500595, which corresponds with U.S. Appl. No. 14/871,236, 2 pages.
Patent, dated Jun. 18, 2018, received in Danish Patent Application No. 201500595, which corresponds with U.S. Appl. No. 14/871,236, 3 pages.
Intention to Grant, dated Dec. 4, 2019, received in European Patent Application No. 18168941.5, which corresponds with U.S. Appl. No. 14/871,236, 8 pages.
Intention to Grant, dated Oct. 5, 2020, received in European Patent Application No. 18168941.5, which corresponds with U.S. Appl. No. 14/871,236, 8 pages.
Decision to Grant, dated Mar. 25, 2021, received in European Patent Application No. 18168941.5, which corresponds with U.S. Appl. No. 14/871,236, 2 pages.
Patent, dated Apr. 21, 2021, received in European Patent Application No. 18168941.5, which corresponds with U.S. Appl. No. 14/871,236, 3 pages.
Office Action, dated Mar. 17, 2020, received in Mx/a/2017/011610, which corresponds with U.S. Appl. No. 14/871,236, 4 pages.
Notice of Allowance, dated Sep. 7, 2020, received in Mx/a/2017/011610, which corresponds with U.S. Appl. No. 14/871,236, 12 pages.
Patent, dated Dec. 2, 2020, received in Mx/a/2017/011610, which corresponds with U.S. Appl. No. 14/871,236, 4 pages.
Office Action, dated Jul. 19, 2018, received in Russian Patent Application No. 2017131408, which corresponds with U.S. Appl. No. 14/871,236, 8 pages.
Patent, dated Feb. 15, 2019, received in Russian Patent Application No. 2017131408, which corresponds with U.S. Appl. No. 14/871,236, 2 pages.

Office Action, dated Sep. 1, 2017, received in U.S. Appl. No. 14/870,754, 22 pages.
Final Office Action, dated Mar. 9, 2018, received in U.S. Appl. No. 14/870,754, 19 pages.
Notice of Allowance, dated Jul. 2, 2018, received in U.S. Appl. No. 14/870,754, 9 pages.
Notice of Allowance, dated Dec. 3, 2018, received in U.S. Appl. No. 14/870,754, 8 pages.
Office Action, dated Nov. 14, 2017, received in U.S. Appl. No. 14/870,882, 25 pages.
Final Office Action, dated Apr. 20, 2018, received in U.S. Appl. No. 14/870,882, 7 pages.
Notice of Allowance, dated Jul. 12, 2018, received in U.S. Appl. No. 14/870,882, 5 pages.
Notice of Allowance, dated Dec. 5, 2018, received in U.S. Appl. No. 14/870,882, 8 pages.
Innovation Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Nov. 28, 2019, received in Chinese Patent Application No. 201610870912.3, which corresponds with U.S. Appl. No. 14/870,882, 10 pages.
Office Action, dated Aug. 3, 2020, received in Chinese Patent Application No. 201610870912.3, which corresponds with U.S. Appl. No. 14/870,882, 4 pages.
Office Action, dated Dec. 21, 2020, received in Chinese Patent Application No. 201610870912.3, which corresponds with U.S. Appl. No. 14/870,882, 5 pages.
Notice of Allowance, dated Mar. 22, 2021, received in Chinese Patent Application No. 201610870912.3, which corresponds with U.S. Appl. No. 14/870,882, 1 pages.
Patent, dated May 25, 2021, received in Chinese Patent Application No. 201610870912.3, which corresponds with U.S. Appl. No. 14/870,882, 8 pages.
Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Notice of Allowance, dated Oct. 31, 2017, received in Danish Patent Application No. 201500596, which corresponds with U.S. Appl. No. 14/870,882, 2 pages.
Patent, dated Jan. 29, 2018, received in Danish Patent Application No. 201500596, which corresponds with U.S. Appl. No. 14/870,882, 4 pages.
Office Action, dated Feb. 11, 2019, received in European Patent Application No. 17171972.7, which corresponds with U.S. Appl. No. 14/870,882, 7 pages.
Office Action, dated Sep. 1, 2017, received in U.S. Appl. No. 14/870,988, 14 pages.
Final Office Action, dated Feb. 16, 2018, received in U.S. Appl. No. 14/870,988, 18 pages.
Notice of Allowance, dated Aug. 27, 2018, received in U.S. Appl. No. 14/870,988, 11 pages.
Office Action, dated Nov. 22, 2017, received in U.S. Appl. No. 14/871,227, 24 pages.
Notice of Allowance, dated Jun. 11, 2018, received in U.S. Appl. No. 14/871,227, 11 pages.
Office Action, dated Oct. 17, 2016, received in Australian Patent Application No. 2016203040, which corresponds with U.S. Appl. No. 14/871,227, 7 pages.
Office Action, dated Oct. 16, 2017, received in Australian Patent Application No. 2016203040, which corresponds with U.S. Appl. No. 14/871,227, 5 pages.
Notice of Acceptance, dated Oct. 30, 2018, received in Australian Patent Application No. 2016203040, which corresponds with U.S. Appl. No. 14/871,227, 4 pages.

(56) References Cited

OTHER PUBLICATIONS

Certificate of Grant, dated Feb. 28, 2019, received in Australian Patent Application No. 2016203040, which corresponds with U.S. Appl. No. 14/871,227, 1 page.
Office Action, dated Oct. 18, 2016, received in Australian Patent Application No. 2016101431, which corresponds with U.S. Appl. No. 14/871,227, 3 pages.
Office Action, dated Apr. 13, 2017, received in Australian Patent Application No. 2016101431, which corresponds with U.S. Appl. No. 14/871,227, 4 pages.
Office Action, dated Oct. 11, 2018, received in Australian Patent Application No. 2017245442, which corresponds with U.S. Appl. No. 14/871,227, 4 pages.
Office Action, dated Nov. 16, 2018, received in Chinese Patent Application No. 201680000466.9, which corresponds with U.S. Appl. No. 14/871,227, 5 pages.
Notice of Allowance, dated Jun. 5, 2019, received in Chinese Patent Application No. 201680000466.9, which corresponds with U.S. Appl. No. 14/871,227, 5 pages.
Patent, dated Aug. 9, 2019, received in Chinese Patent Application No. 201680000466.9, which corresponds with U.S. Appl. No. 14/871,227, 8 pages.
Intention to Grant, dated Apr. 7, 2016, received in Danish Patent Application No. 201500597, which corresponds with U.S. Appl. No. 14/871,227, 7 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Intent to Grant, dated Sep. 17, 2018, received in European Patent No. 16711743.1, which corresponds with U.S. Appl. No. 14/871,227, 5 pages.
Patent, dated Nov. 28, 2018, received in European Patent No. 16711743.1, which corresponds with U.S. Appl. No. 14/871,227, 1 page.
Office Action, dated Jul. 20, 2020, received in Indian Patent Application No. 201617032293, which corresponds with U.S. Appl. No. 14/871,227, 9 pages.
Office Action, dated Mar. 24, 2017, received in Japanese Patent Application No. 2016-533201, which corresponds with U.S. Appl. No. 14/871,227, 6 pages.
Office Action, dated Aug. 4, 2017, received in Japanese Patent Application No. 2016-533201, which corresponds with U.S. Appl. No. 14/871,227, 6 pages.
Notice of Allowance, dated Jan. 4, 2018, received in Japanese Patent Application No. 2016-533201, which corresponds with U.S. Appl. No. 14/871,227, 4 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Notice of Allowance, dated Oct. 1, 2018, received in Korean Patent Application No. 2016-7019816, which corresponds with U.S. Appl. No. 14/871,227, 6 pages.
Patent, dated Dec. 28, 2018, received in Korean Patent Application No. 2016-7019816, which corresponds with U.S. Appl. No. 14/871,227, 8 pages.
Office Action, dated Oct. 26, 2017, received in U.S. Appl. No. 14/871,336, 22 pages.
Final Office Action, dated Mar. 15, 2018, received in U.S. Appl. No. 14/871,336, 23 pages.
Office Action, dated Nov. 5, 2018, received in U.S. Appl. No. 14/871,336, 24 pages.
Notice of Allowance, dated Feb. 5, 2019, received in U.S. Appl. No. 14/871,336, 10 pages.
Office Action, dated Oct. 14, 2016, received in Australian Patent Application No. 2016101437, which corresponds with U.S. Appl. No. 14/871,336, 2 pages.
Office Action, dated Apr. 11, 2017, received in Australian Patent Application No. 2016101437, which corresponds with U.S. Appl. No. 14/871,336, 4 pages.
Office Action, dated Nov. 4, 2019, received in Chinese Patent Application No. 201610871323.7, which corresponds with U.S. Appl. No. 14/871,336, 12 pages.
Office Action, dated Aug. 4, 2020, received in Chinese Patent Application No. 201610871323.7, which corresponds with U.S. Appl. No. 14/871,336, 18 pages.
Office Action, dated Feb. 9, 2021, received in Chinese Patent Application No. 201610871323.7, which corresponds with U.S. Appl. No. 14/871,336, 1 page.
Office Action, dated Jun. 1, 2021, received in Chinese Patent Application No. 201610871323.7, which corresponds with U.S. Appl. No. 14/871,336, 1 page.
Office Action, dated Apr. 18, 2016, received in Danish Patent Application No. 201500601, which corresponds with U.S. Appl. No. 14/871,336, 8 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Patent, dated Oct. 30, 2017, Danish Patent Application No. 201500601, which corresponds with U.S. Appl. No. 14/871,336, 5 pages.
Office Action, dated Feb. 12, 2019, received in European Patent Application No. 17172266.3, which corresponds with U.S. Appl. No. 14/871,336, 6 pages.
Office Action, dated Apr. 2, 2018, received in Japanese Patent Application No. 2018-020324, which corresponds with U.S. Appl. No. 14/871,336, 4 pages.
Notice of Allowance, dated Oct. 12, 2018, received in Japanese Patent Application No. 2018-020324, which corresponds with U.S. Appl. No. 14/871,336, 5 pages.
Patent, dated Nov. 16, 2018, received in Japanese Patent Application No. 2018-020324, which corresponds with U.S. Appl. No. 14/871,336, 4 pages.
Office Action, dated Oct. 16, 2017, received in U.S. Appl. No. 14/871,462, 26 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Oct. 9, 2021, received in Chinese Patent Application No. 201610869950.7, which corresponds with U.S. Appl. No. 14/871,462, 5 pages.
Office Action, dated Apr. 20, 2017, received in Chinese Patent Application No. 201621044346.2, which corresponds with U.S. Appl. No. 14/871,462, 3 pages.
Intention to Grant, dated Apr. 18, 2016, received in Danish Patent Application No. 201500600, which corresponds with U.S. Appl. No. 14/871,462, 7 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Office Action, dated Nov. 13, 2017, received in Japanese Patent Application No. 2016-183289, which corresponds with U.S. Appl. No. 14/871,462, 5 pages.

(56) References Cited

OTHER PUBLICATIONS

Office Action, dated Apr. 29, 2016, received in U.S. Appl. No. 14/867,823, 28 pages.
Final Office Action, dated Sep. 28, 2016, received in U.S. Appl. No. 14/867,823, 31 pages.
Office Action, dated May 11, 2017, received in U.S. Appl. No. 14/867,823, 42 pages.
Final Office Action, dated Nov. 29, 2017, received in U.S. Appl. No. 14/867,823, 47 pages.
Notice of Allowance, dated Apr. 18, 2018, received in U.S. Appl. No. 14/867,823, 10 pages.
Notice of Allowance, dated Aug. 7, 2018, received in U.S. Appl. No. 14/867,823, 8 pages.
Office Action, dated Mar. 18, 2016, received in Danish Patent Application No. 201500594, which corresponds with U.S. Appl. No. 14/867,823, 10 pages.
Office Action, dated Sep. 7, 2016, received in Danish Patent Application No. 201500594, which corresponds with U.S. Appl. No. 14/867,823, 4 pages.
Office Action, dated May 15, 2017, received in Danish Patent Application No. 201500594, which corresponds with U.S. Appl. No. 14/867,823, 4 pages.
Office Action, dated Jan. 23, 2018, received in Danish Patent Application No. 201500594, which corresponds with U.S. Appl. No. 14/867,823, 8 pages.
Office Action, dated May 10, 2016, received in U.S. Appl. No. 14/867,892, 28 pages.
Final Office Action, dated Nov. 2, 2016, received in U.S. Appl. No. 14/867,892, 48 pages.
Office Action, dated Jul. 6, 2017, received in U.S. Appl. No. 14/867,892, 55 pages.
Final Office Action, dated Dec. 14, 2017, received in U.S. Appl. No. 14/867,892, 53 pages.
Office Action, dated Apr. 24, 2018, received in U.S. Appl. No. 14/867,892, 63 pages.
Final Office Action, dated Oct. 17, 2018, received in U.S. Appl. No. 14/867,892, 48 pages.
Examiner's Answer, dated Jul. 18, 2019, received in U.S. Appl. No. 14/867,892, 17 pages.
Notice of Allowance, dated May 26, 2021, received in U.S. Appl. No. 14/867,892, 7 pages.
Notice of Allowance, dated Jul. 13, 2021, received in U.S. Appl. No. 14/867,892, 8 pages.
Office Action, dated Mar. 21, 2016, received in Danish Patent Application No. 201500598, which corresponds with U.S. Appl. No. 14/867,892, 9 pages.
Office Action, dated Sep. 14, 2016, received in Danish Patent Application No. 201500598, which corresponds with U.S. Appl. No. 14/867,892, 4 pages.
Office Action, dated May 4, 2017, received in Danish Patent Application No. 201500598, which corresponds with U.S. Appl. No. 14/867,892, 4 pages.
Office Action, dated Oct. 31, 2017, received in Danish Patent Application No. 201500598, which corresponds with U.S. Appl. No. 14/867,892, 2 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,361, 26 pages.
Final Office Action, dated Oct. 4, 2018, received in U.S. Appl. No. 14/869,361, 28 pages.
Office Action, dated Feb. 27. 2019, received in U.S. Appl. No. 14/869,361, 28 pages.
Office Action, dated Mar. 1, 2017, received in U.S. Appl. No. 14/869,855, 14 pages.
Final Office Action, dated Oct. 10, 2017, received in U.S. Appl. No. 14/869,855, 16 pages.
Office Action, dated Jan. 23, 2018, received in U.S. Appl. No. 14/869,855, 24 pages.
Notice of Allowance, dated May 31, 2018, received in U.S. Appl. No. 14/869,855, 10 pages.
Office Action, dated Feb. 9, 2017, received in U.S. Appl. No. 14/869,873, 17 pages.
Final Office Action, dated Aug. 18, 2017, received in U.S. Appl. No. 14/869,873, 20 pages.
Office Action, dated Jan. 18, 2018, received in U.S. Appl. No. 14/869,873, 25 pages.
Final Office Action, dated May 23, 2018, received in U.S. Appl. No. 14/869,873, 18 pages.
Notice of Allowance, dated Jul. 30, 2018, received in U.S. Appl. No. 14/869,873, 8 pages.
Office Action, dated Jan. 11, 2018, received in U.S. Appl. No. 14/869,997, 17 pages.
Office Action, dated Sep. 7, 2018, received in U.S. Appl. No. 14/869,997, 23 pages.
Notice of Allowance, dated Apr. 4, 2019, received in U.S. Appl. No. 14/869,997, 9 pages.
Notice of Allowance, dated Jan. 17, 2018, received in U.S. Appl. No. 14/867,990, 12 pages.
Notice of Allowance, dated Mar. 30, 3018, received in U.S. Appl. No. 14/867,990, 5 pages.
Office Action, dated May 23, 2016, received in Australian Patent Application No. 2016100253, which corresponds with U.S. Appl. No. 14/867,990, 5 pages.
Notice of Allowance, dated May 21, 2019, received in Chinese Patent Application No. 201610131507.X, which corresponds with U.S. Appl. No. 14/867,990, 3 pages.
Patent, dated Jul. 19, 2019, received in Chinese Patent Application No. 201610131507.X, which corresponds with U.S. Appl. No. 14/867,990, 6 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Mar. 18, 2016, received in Danish Patent Application No. 201500581, which corresponds with U.S. Appl. No. 14/867,990, 9 pages.
Office Action, dated Sep. 26, 2016, received in Danish Patent Application No. 201500581, which corresponds with U.S. Appl. No. 14/867,990, 5 pages.
Office Action, dated May 3, 2017, received in Danish Patent Application No. 201500581, which corresponds with U.S. Appl. No. 14/867,990, 5 pages.
Office Action, dated Feb. 19, 2018, received in Danish Patent Application No. 201500581, which corresponds with U.S. Appl. No. 14/867,990, 4 pages.
Office Action, dated Feb. 21, 2020, received in European Patent Application No. 16711725.8, which corresponds with U.S. Appl. No. 14/867,990, 13 pages.
Office Action, dated May 14, 2021, received in European Patent Application No. 16711725.8, which corresponds with U.S. Appl. No. 14/867,990, 7 pages.
Office Action, dated Apr. 19, 2018, received in U.S. Appl. No. 14/869,703, 19 pages.
Final Office Action, dated Oct. 26, 2018, received in U.S. Appl. No. 14/869,703, 19 pages.
Notice of Allowance, dated Mar. 12, 2019, received in U.S. Appl. No. 14/869,703, 6 pages.
Office Action, dated Dec. 12, 2017, received in U.S. Appl. No. 15/009,668, 32 pages.
Final Office Action, dated Jul. 3, 2018, received in U.S. Appl. No. 15/009,668, 19 pages.
Office Action, dated Jan. 10, 2019, received in U.S. Appl. No. 15/009,668, 17 pages.
Notice of Allowance, dated May 1, 2019, received in U.S. Appl. No. 15/009,668, 12 pages.

(56) References Cited

OTHER PUBLICATIONS

Office Action, dated Aug. 20, 2020, received in Chinese Patent Application No. 201680046985.9, which corresponds with U.S. Appl. No. 15/009,668, 15 pages.
Notice of Allowance, dated Apr. 20, 2021, received in Chinese Patent Application No. 201680046985.9, which corresponds with U.S. Appl. No. 15/009,668, 1 page.
Office Action, dated Jan. 31, 2020, received in European Patent Application No. 16753795.0, which corresponds with U.S. Appl. No. 15/009,668, 9 pages.
Office Action, dated Mar. 19, 2021, received in European Patent Application No. 16753795.0, which corresponds with U.S. Appl. No. 15/009,668, 5 pages.
Office Action, dated Nov. 25, 2016, received in U.S. Appl. No. 15/081,771, 17 pages.
Final Office Action, dated Jun. 2, 2017, received in U.S. Appl. No. 15/081,771, 17 pages.
Notice of Allowance, dated Dec. 4, 2017, received in U.S. Appl. No. 15/081,771, 10 pages.
Office Action, dated Feb. 1, 2018, received in Australian U.S. Appl. No. 15/081,771, which corresponds with U.S. Appl. No. 15/081,771, 4 pages.
Notice of Acceptance, dated Jan. 24, 2019, received in Australian Patent Application No. 2017202058, which corresponds with U.S. Appl. No. 15/081,771, 3 pages.
Certificate of Grant, dated May 23, 2019, received in Australian Patent Application No. 2017202058, which corresponds with U.S. Appl. No. 15/081,771, 1 page.
Office Action, dated Mar. 2, 2022, received in Chinese Patent Application No. 201811561188.1, which corresponds with U.S. Appl. No. 15/081,771, 1 page.
Office Action, dated Jan. 24, 2020, received in European Patent Application No. 18205283.7, which corresponds with U.S. Appl. No. 15/081,771, 4 pages.
Intention to Grant, dated Apr. 30, 2020, received in European Patent Application No. 18205283.7, which corresponds with U.S. Appl. No. 15/081,771, 7 pages.
Decision to Grant, dated Aug. 27, 2020, received in European Patent Application No. 18205283.7, which corresponds with U.S. Appl. No. 15/081,771, 4 pages.
Patent, dated Sep. 23, 2020, received in European Patent Application No. 18205283.7, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Notice of Allowance, dated Oct. 12, 2018, received in Japanese Patent Application No. 2017-086460, which corresponds with U.S. Appl. No. 15/081,771, 5 pages.
Office Action, dated Aug. 29, 2017, received in Korean Patent Application No. 2017-7014536, which corresponds with U.S. Appl. No. 15/081,771, 5 pages.
Notice of Allowance, dated Jun. 28, 2018, received in Korean Patent Application No. 2017-7014536, which corresponds with U.S. Appl. No. 15/081,771, 4 pages.
Patent, dated Sep. 28, 2018, received in Korean Patent Application No. 2017-7014536, which corresponds with U.S. Appl. No. 15/081,771, 3 pages.
Final Office Action, dated May 1, 2017, received in U.S. Appl. No. 15/136,782, 18 pages.
Notice of Allowance, dated Oct. 20, 2017, received in U.S. Appl. No. 15/136,782, 9 pages.
Office Action, dated May 4, 2018, received in Australian Patent Application No. 2018202855, which corresponds with U.S. Appl. No. 15/136,782, 3 pages.
Notice of Acceptance, dated Sep. 10, 2018, received in Australian Patent Application No. 2018202855, which corresponds with U.S. Appl. No. 15/136,782, 3 pages.
Certificate of Grant, dated Jan. 17. 2019, received in Australian Patent Application No. 2018202855, which corresponds with U.S. Appl. No. 15/136,782, 4 pages.
Office Action, dated Sep. 27, 2019, received in Chinese Patent Application No. 201810119007.3, which corresponds with U.S. Appl. No. 15/136,782, 6 pages.
Notice of Allowance, dated Feb. 26, 2020, received in Chinese Patent Application No. 201810119007.3, which corresponds with U.S. Appl. No. 15/136,782, 3 pages.
Patent, dated Apr. 7, 2020, received in Chinese Patent Application No. 201810119007.3, which corresponds with U.S. Appl. No. 15/136,782, 7 pages.
Office Action, dated May 23, 2017, received in Danish Patent Application No. 201770190, which corresponds with U.S. Appl. No. 15/136,782, 7 pages.
Office Action, dated Jan. 8, 2018, received in Danish Patent Application No. 2011770190, which corresponds with U.S. Appl. No. 15/136,782, 2 pages.
Notice of Allowance, dated Mar. 19, 2018, received in Danish Patent Application No. 201770190, which corresponds with U.S. Appl. No. 15/136,782, 2 pages.
Patent, dated May 22, 2018, received in Danish Patent Application No. 201770190, which corresponds with U.S. Appl. No. 15/136,782, 2 pages.
Office Action, dated Apr. 17, 2019, received in European Patent Application No. 18171453.6, which corresponds with U.S. Appl. No. 15/136,782, 4 pages.
Office Action, dated Oct. 2, 2019, received in European Patent Application No. 18171453.6, which corresponds with U.S. Appl. No. 15/136,782, 5 pages.
Office Action, dated May 12, 2020, received in European Patent Application No. 18171453.6, which corresponds with U.S. Appl. No. 15/136,782, 5 pages.
Patent, dated Feb. 5, 2021, received in Hong Kong Patent Application No. 1257553, which corresponds with U.S. Appl. No. 15/136,782, 14 pages.
Office Action, dated Jun. 1, 2018, received in Japanese Patent Application No. 2018-062161, which corresponds with U.S. Appl. No. 15/136,782, 5 pages.
Office Action, dated Nov. 12, 2018, received in Japanese Patent Application No. 2018-062161, which corresponds with U.S. Appl. No. 15/136,782, 5 pages.
Notice of Allowance, dated Feb. 18, 2019, received in Japanese Patent Application No. 2018-062161, which corresponds with U.S. Appl. No. 15/136,782, 5 pages.
Patent, dated Mar. 22, 2019, received in Japanese Patent Application No. 2018-062161, which corresponds with U.S. Appl. No. 15/136,782, 5 pages.
Office Action, dated Oct. 31, 2018, received in Korean Patent Application No. 2018-7020659, which corresponds with U.S. Appl. No. 15/136,782, 5 pages.
Notice of Allowance, dated Feb. 25, 2019, received in Korean Patent Application No. 2018-7020659, which corresponds with U.S. Appl. No. 15/136,782, 5 pages.
Patent, dated Apr. 3, 2019, received in Korean Patent Application No. 2018-7020659, which corresponds with U.S. Appl. No. 15/136,782, 5 pages.
Office Action, dated Jan. 20, 2017, received in U.S. Appl. No. 15/231,745, 21 pages.
Notice of Allowance, dated Jul. 6, 2017, received in U.S. Appl. No. 15/231,745, 18 pages.
Office Action, dated Oct. 17, 2016, received in Danish Patent Application No. 201670587, which corresponds with U.S. Appl. No. 15/231,745, 9 pages.
Office Action, dated Jun. 29, 2017, received in Danish Patent Application No. 201670587, which corresponds with U.S. Appl. No. 15/231,745, 4 pages.
Office Action, dated Feb. 22, 2018, received in Danish Patent Application No. 201670587, which corresponds with U.S. Appl. No. 15/231,745, 4 pages.
Office Action, dated Dec. 18, 2018, received in Danish Patent Application No. 201670587, which corresponds with U.S. Appl. No. 15/231,745, 4 pages.

(56) References Cited

OTHER PUBLICATIONS

Office Action, dated Dec. 14, 2016, received in Danish Patent Application No. 201670590, which corresponds with U.S. Appl. No. 15/231,745, 9 pages.
Office Action, dated Jul. 6, 2017, received in Danish Patent Application No. 201670590, which corresponds with U.S. Appl. No. 15/231,745, 3 pages.
Office Action, dated Jan. 10, 2018, received in Danish Patent Application No. 201670590, which corresponds with U.S. Appl. No. 15/231,745, 2 pages.
Patent, dated May 28, 2018, received in Danish Patent Application No. 201670590, which corresponds with U.S. Appl. No. 15/231,745, 2 pages.
Office Action, dated Nov. 10, 2016, received in Danish Patent Application No. 201670591, which corresponds with U.S. Appl. No. 15/231,745, 12 pages.
Office Action, dated Apr. 11, 2018, received in Danish Patent Application No. 201670591, which corresponds with U.S. Appl. No. 15/231,745, 3 pages.
Office Action, dated Nov. 23, 2018, received in Danish Patent Application No. 201670591, which corresponds with U.S. Appl. No. 15/231,745, 7 pages.
Office Action, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action, dated Jan. 30, 2018, received in Danish Patent Application No. 201670592, which corresponds with U.S. Appl. No. 15/231,745, 2 pages.
Notice of Allowance, dated Mar. 27, 2018, received in Danish Patent Application No. 201670592, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Office Action, dated Oct. 12, 2016, received in Danish Patent Application No. 201670593, which corresponds with U.S. Appl. No. 15/231,745, 7 pages.
Patent, dated Oct. 30, 2017, received in Danish Patent Application No. 201670593, which corresponds with U.S. Appl. No. 15/231,745, 3 pages.
Notice of Allowance, dated Nov. 1, 2019, received in Japanese Patent Application No. 2018-158502, which corresponds with U.S. Appl. No. 15/231,745, 5 pages.
Patent, dated Nov. 29, 2019, received in Japanese Patent Application No. 2018-158502, which corresponds with U.S. Appl. No. 15/231,745, 3 pages.
Notice of Allowance, dated Oct. 4, 2018, received in U.S. Appl. No. 15/272,327, 46 pages.
Notice of Acceptance, dated Mar. 2, 2018, received in Australian Patent Application No. 2018200705, which corresponds with U.S. Appl. No. 15/272,327, 3 pages.
Certificate of Grant, dated Jun. 28, 2018, received in Australian Patent Application No. 2018200705, which corresponds with U.S. Appl. No. 15/272,327, 4 pages.
Office Action, dated Mar. 22, 2019, received in Australian Patent Application No. 2018204234, which corresponds with U.S. Appl. No. 15/272,327, 7 pages.
Notice of Acceptance, dated Dec. 10, 2019, received in Australian Patent Application No. 2018204234, which corresponds with U.S. Appl. No. 15/272,327, 3 pages.
Certificate of Grant, dated Apr. 2, 2020, received in Australian Patent Application No. 2018204234, which corresponds with U.S. Appl. No. 15/272,327, 1 page.
Office Action, dated Aug. 31, 2020, received in Chinese Patent Application No. 201810151593.X, which corresponds with U.S. Appl. No. 15/272,327, 10 pages.
Notice of Allowance, dated Jan. 27, 2021, received in Chinese Patent Application No. 201810151593.X, which corresponds with U.S. Appl. No. 15/272,327, 3 pages.
Patent, dated Mar. 19, 2021, received in Chinese Patent Application No. 201810151593.X, which corresponds with U.S. Appl. No. 15/272,327, 6 pages.
Office Action, dated Sep. 14, 2018, received in European Patent Application No. 15155939.4, which corresponds with U.S. Appl. No. 15/272,327, 5 pages.
Intention to Grant, dated Mar. 19, 2019, received in European Patent Application No. 15155939.4, which corresponds with U.S. Appl. No. 15/272,327, 6 pages.
Decision to Grant, dated Apr. 26, 2019, received in European Patent Application No. 15155939.4, which corresponds with U.S. Appl. No. 15/272,327, 2 pages.
Patent, dated May 22, 2019, received in European Patent Application No. 15155939.4, which corresponds with U.S. Appl. No. 15/272,327, 1 page.
Notice of Allowance, dated Jul. 30, 2018, received in Japanese Patent Application No. 2018-506989, which corresponds with U.S. Appl. No. 15/272,327, 4 pages.
Patent, dated Aug. 31, 2018, received in Japanese Patent Application No. 2018-506989, which corresponds with U.S. Appl. No. 15/272,327, 3 pages.
Office Action, dated Oct. 26, 2018, received in U.S. Appl. No. 15/272,341, 22 pages.
Final Office Action, dated Mar. 25, 2019, received in U.S. Appl. No. 15/272,341, 25 pages.
Notice of Allowance, dated Feb. 20, 2020, received in U.S. Appl. No. 15/272,341, 12 pages.
Office Action, dated Jul. 27, 2017, received in Australian Patent Application No. 217100535, which corresponds with U.S. Appl. No. 15/272,341, 4 pages.
Notice of Allowance, dated Sep. 20, 2018, received in U.S. Appl. No. 15/272,343, 44 pages.
Office Action, dated Jun. 5, 2019, received in Chinese Patent Application No. 201810071627.4, which corresponds with U.S. Appl. No. 15/272,343, 6 pages.
Notice of Allowance, dated Dec. 11, 2019, received in Chinese Patent Application No. 201710071627.4, which corresponds with U.S. Appl. No. 15/272,343, 4 pages.
Patent, dated Mar. 3, 2020, received in Chinese Patent Application No. 201710071627.4, which corresponds with U.S. Appl. No. 15/272,343, 7 pages.
Office Action, dated Jan. 8, 2019, received in European Patent Application No. 17206374.5, which corresponds with U.S. Appl. No. 15/272,343, 5 pages.
Intention to Grant, dated May 13, 2019, received in European Patent Application No. 17206374.5, which corresponds with U.S. Appl. No. 15/272,343, 7 pages.
Decision to Grant, dated Sep. 12, 2019, received in European Patent Application No. 17206374.5, which corresponds with U.S. Appl. No. 15/272,343, 3 pages.
Patent, Oct. 9, 2019, received in European Patent Application No. 17206374.5, which corresponds with U.S. Appl. No. 15/272,343, 3 pages.
Office Action, dated Oct. 15, 2018, received in U.S. Appl. No. 15/272,345. 31 pages.
Final Office Action, dated Apr. 2, 2019, received in U.S. Appl. No. 15/272,345, 28 pages.
Notice of Allowance, dated Apr. 22, 2020, received in U.S. Appl. No. 15/272,345, 12 pages.
Notice of Acceptance, dated Mar. 2, 2018, received in Australian Patent Application No. 2016304832, which corresponds with U.S. Appl. No. 15/272,345, 3 pages.
Certificate of Grant, dated Jun. 28, 2018, received in Australian Patent Application No. 2016304832, which corresponds with U.S. Appl. No. 15/272,345, 4 pages.
Office Action, dated Oct. 22, 2019, received in Chinese Patent Application No. 201680022696.5, which corresponds with U.S. Appl. No. 15/272,345, 7 pages.

(56) References Cited

OTHER PUBLICATIONS

Notice of Allowance, dated Jul. 6, 2020, received in Chinese Patent Application No. 201680022696.5, which corresponds with U.S. Appl. No. 15/272,345, 5 pages.
Patent, dated Sep. 18, 2020, received in Chinese Patent Application No. 201680022696.5, which corresponds with U.S. Appl. No. 15/272,345, 6 pages.
Office Action, dated Apr. 20, 2018, received in European Patent Application No. 16756862.5, which corresponds with U.S. Appl. No. 15/272,345, 15 pages.
Office Action, dated Nov. 13, 2018, received in European Patent Application No. 16756862.5, which corresponds with U.S. Appl. No. 15/272,345, 5 pages.
Decision to Grant, dated Jan. 31, 2019, received in European Patent Application No. 16756862.5, which corresponds with U.S. Appl. No. 15/272,345, 5 pages.
Patent, dated Feb. 27, 2019, received in European Patent Application No. 16756862.5, which corresponds with U.S. Appl. No. 15/272,345, 3 pages.
Patent, dated Feb. 7, 2020, received in Hong Kong Patent Application No. 18101477.0, which corresponds with U.S. Appl. No. 15/272,345, 6 pages.
Office Action, dated Dec. 4, 2020, received in Japanese Patent Application No. 2019-212493, which corresponds with U.S. Appl. No. 15/272,345, 5 pages.
Notice of Allowance, dated Aug. 27, 2021, received in Japanese Patent Application No. 2019-212493, which corresponds with U.S. Appl. No. 15/272,345, 2 pages.
Patent, dated Sep. 29, 2021, received in Japanese Patent Application No. 2019-212493, which corresponds with U.S. Appl. No. 15/272,345, 4 pages.
Office Action, dated Mar. 7, 2018, received in U.S. Appl. No. 15/482,618, 7 pages.
Notice of Allowance, dated Aug. 15, 2018, received in U.S. Appl. No. 15/482,618, 7 pages.
Office Action, dated Apr. 23, 2018, received in U.S. Appl. No. 15/499,691, 29 pages.
Notice of Allowance, dated Oct. 12, 2018, received in U.S. Appl. No. 15/499,693, 8 pages.
Office Action, dated May 11, 2020, received in Australian Patent Application No. 2019203776, which corresponds with U.S. Appl. No. 15/499,693, 4 pages.
Notice of Acceptance, dated Jul. 22, 2020, received in Australian Patent Application No. 2019203776, which corresponds with U.S. Appl. No. 15/499,693, 3 pages.
Certificate of Grant, dated Nov. 26, 2020, received in Australian Patent Application No. 2019203776, which corresponds with U.S. Appl. No. 15/499,693, 3 pages.
Office action, dated Nov. 20, 2020, received in Japanese Patent Application No. 2019-200174, which corresponds with U.S. Appl. No. 15/499,693, 6 pages.
Notice of Allowance, dated Jul. 16, 2021, received in Japanese Patent Application No. 2019-200174, which corresponds with U.S. Appl. No. 15/499,693, 2 pages.
Patent, dated Aug. 18, 2021, received in Japanese Patent Application No. 2019-200174, which corresponds with U.S. Appl. No. 15/499,693, 3 pages.
Office Action, dated Aug. 2, 2019, received in Korean Patent Application No. 2019-7009439, which corresponds with U.S. Appl. No. 15/499,693, 3 pages.
Notice of Allowance, dated Dec. 27, 2019, received in Korean Patent Application No. 2019-7009439, which corresponds with U.S. Appl. No. 15/499,693, 5 pages.
Patent, dated Mar. 27, 2020, received in Korean Patent Application No. 2019-7009439, which corresponds with U.S. Appl. No. 15/499,693, 4 pages.
Office Action, dated Aug. 30, 2017, received in U.S. Appl. No. 15/655,749, 22 pages.
Final Office Action, dated May 10, 2018, received in U.S. Appl. No. 15/655,749, 19 pages.
Office Action, dated Jan. 24, 2019, received in U.S. Appl. No. 15/655,749, 25 pages.
Final Office Action, dated Jul. 1, 2019, received in U.S. Appl. No. 15/655,749, 24 pages.
Notice of Allowance, dated Feb. 20, 2020, received in U.S. Appl. No. 15/655,749, 10 pages.
Office Action, dated Feb. 3, 2020, received in Chinese Patent Application No. 201710331254.5, which corresponds with U.S. Appl. No. 15/655,749, 8 pages.
Office Action, dated Mar. 22, 2021, received in Chinese Patent Application No. 201710331254.5, which corresponds with U.S. Appl. No. 15/655,749, 4 pages.
Notice of Allowance, dated May 27, 2021, received in Chinese Patent Application No. 201710331254.5, which corresponds with U.S. Appl. No. 15/655,749, 1 page.
Patent, dated Jun. 25, 2021, received in Chinese Patent Application No. 201710331254.5, which corresponds with U.S. Appl. No. 15/655,749, 7 pages.
Notice of Allowance, dated Apr. 18, 2019, received in Korean Patent Application No. 2017-7034248, which corresponds with U.S. Appl. No. 15/655,749, 5 pages.
Patent, dated Jul. 3, 2019, received in Korean Patent Application No. 2017-7034248, which corresponds with U.S. Appl. No. 15/655,749, 5 pages.
Office Action, dated Aug. 1, 2019, received in U.S. Appl. No. 15/785,372, 22 pages.
Final Office Action, dated Feb. 5, 2020, received in U.S. Appl. No. 15/785,372, 26 pages.
Office Action, dated Jul. 23, 2020, received in U.S. Appl. No. 15/785,372, 23 pages.
Final Office Action, dated Nov. 18, 2020, received in U.S. Appl. No. 15/785,372, 27 pages.
Notice of Allowance, dated Jul. 14, 2021, received in U.S. Appl. No. 15/785,372, 11 pages.
Notice of Allowance, dated Oct. 22, 2021, received in U.S. Appl. No. 15/785,372, 11 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.
Office Action, dated Apr. 11, 2019, received in U.S. Appl. No. 15/889,115, 9 pages.
Final Office Action, dated Oct. 28, 2019, received in U.S. Appl. No. 15/889,115, 12 pages.
Notice of Allowance, dated May 19, 2020, received in U.S. Appl. No. 15/889,115, 9 pages.
Office Action, dated Jul. 25, 2019, received in U.S. Appl. No. 15/979,347, 14 pages.
Final Office Action, dated Feb. 27, 2020, received in U.S. Appl. No. 15/979,347, 19 pages.
Office Action, dated Jul. 14, 2020, received in U.S. Appl. No. 15/979,347, 10 pages.
Final Office Action, dated Jan. 25, 2021, received in U.S. Appl. No. 15/979,347, 12 pages.
Office Action, dated Sep. 25, 2020, received in U.S. Appl. No. 15/994,843, 5 pages.
Notice of Allowance, dated Jan. 22, 2021, received in U.S. Appl. No. 15/994,843, 8 pages.
Office Action, dated Nov. 25, 2019, received in U.S. Appl. No. 16/049,725, 9 pages.
Notice of Allowance, dated May 14, 2020, received in U.S. Appl. No. 16/049,725, 9 pages.
Office Action, dated May 31, 2019, received in Australian Patent Application No. 2018253539, which corresponds with U.S. Appl. No. 16/049,725, 3 pages.
Notice of Acceptance, dated Apr. 2, 2020, received in Australian Patent Application No. 2018253539, which corresponds with U.S. Appl. No. 16/049,725, 3 pages.
Certificate of Grant, dated Aug. 13, 2020, received in Australian Patent Application No. 2018253539, which corresponds with U.S. Appl. No. 16/049,725, 3 pages.
Notice of Allowance, dated Oct. 10, 2019, received in U.S. Appl. No. 16/102,409, 9 pages.

(56) References Cited

OTHER PUBLICATIONS

Office Action, dated Nov. 29, 2019, received in U.S. Appl. No. 16/136,163, 9 pages.
Final Office Action, dated Jun. 9, 2020, received in U.S. Appl. No. 16/136,163, 10 pages.
Office Action, dated Sep. 17, 2020, received in U.S. Appl. No. 16/136,163, 13 pages.
Final Office Action, dated May 20, 2021, received in U.S. Appl. No. 16/136,163, 13 pages.
Office Action, dated Nov. 23, 2021, received in U.S. Appl. No. 16/136,163, 27 pages.
Office Action, dated Mar. 9, 2020, received in U.S. Appl. No. 16/145,954, 15 pages.
Office Action, dated Dec. 10, 2020, received in U.S. Appl. No. 16/145,954, 5 pages.
Office Action, dated Mar. 6, 2020, received in U.S. Appl. No. 16/154,591, 16 pages.
Final Office Action, dated Oct. 1, 2020, received in U.S. Appl. No. 16/154,591, 19 pages.
Office Action, dated Mar. 4, 2021, received in U.S. Appl. No. 16/154,591, 20 pages.
Office Action, dated May 4, 2020, received in Australian Patent Application No. 2019203175, which corresponds with U.S. Appl. No. 16/154,591, 4 pages.
Office Action, dated Oct. 13, 2020, received in Australian Patent Application No. 2019203175, which corresponds with U.S. Appl. No. 16/154,591, 5 pages.
Office Action, dated Dec. 2, 2019, received in Japanese Patent Application No. 2018-202048, which corresponds with U.S. Appl. No. 16/154,591, 6 pages.
Notice of Allowance, dated Jun. 1, 2020, received in Japanese Patent Application No. 2018-202048, which corresponds with U.S. Appl. No. 16/154,591, 3 pages.
Patent, dated Jun. 25, 2020, received in Japanese Patent Application No. 2018-202048, which corresponds with U.S. Appl. No. 16/154,591, 4 pages.
Office Action, dated Aug. 20, 2019, received in Korean Patent Application No. 2019-7019946, which corresponds with U.S. Appl. No. 16/154,591, 6 pages.
Office Action, dated Feb. 27, 2020, received in Korean Patent Application No. 2019-7019946, which corresponds with U.S. Appl. No. 16/154,591, 5 pages.
Office Action, dated Mar. 29, 2021, received in Korean Patent Application No. 2019-7019946, which corresponds with U.S. Appl. No. 16/154,591, 6 pages.
Notice of Allowance, dated Aug. 26, 2021, received in Korean Patent Application No. 2019-7019946, which corresponds with U.S. Appl. No. 16/154,591, 2 pages.
Patent, dated Sep. 7, 2021, received in Korean Patent Application No. 2019-7019946, which corresponds with U.S. Appl. No. 16/154,591, 4 pages.
Office Action, dated Nov. 25, 2019, received in U.S. Appl. No. 16/174,170, 31 pages.
Final Office Action, dated Mar. 19, 2020, received in U.S. Appl. No. 16/174,170, 25 pages.
Notice of Allowance, dated Jun. 18, 2020, received in U.S. Appl. No. 16/174,170, 19 pages.
Notice of Allowance, dated Aug. 26, 2020, received in U.S. Appl. No. 16/240,669, 18 pages.
Office Action, dated Oct. 30, 2020, received in U.S. Appl. No. 16/230,707, 20 pages.
Notice of Allowance, dated Feb. 18, 2021, received in U.S. Appl. No. 16/230,707, 9 pages.
Office Action, dated Aug. 10, 2020, received in U.S. Appl. No. 16/240,672, 13 pages.
Final Office Action, dated Nov. 27, 2020, received in U.S. Appl. No. 16/240,672, 12 pages.
Office Action, dated May 17, 2021, received in U.S. Appl. No. 16/240,672, 14 pages.
Notice of Allowance, dated Sep. 2, 2021, received in U.S. Appl. No. 16/240,672, 13 pages.
Office Action, dated Sep. 24, 2020, received in Australian Patent Application No. 2019268116, which corresponds with U.S. Appl. No. 16/240,672, 4 pages.
Office Action, dated Jan. 28, 2021, received in Australian Patent Application No. 2019268116, which corresponds with U.S. Appl. No. 16/240,672, 4 pages.
Notice of Allowance, dated Sep. 20, 2021, received in Australian Patent Application No. 2019268116, which corresponds with U.S. Appl. No. 16/240,672, 3 pages.
Office Action, dated Apr. 21, 2021, received in European Patent Application No. 19195414.8, which corresponds with U.S. Appl. No. 16/240,672, 7 pages.
Notice of Allowance, dated May 22, 2020, received in Japanese Patent Application No. 2019-027634, which corresponds with U.S. Appl. No. 16/240,672, 5 pages.
Patent, dated Jun. 23, 2020, received in Japanese Patent Application No. 2019-027634, which corresponds with U.S. Appl. No. 16/240,672, 4 pages.
Office Action, dated May 22, 2019, received in U.S. Appl. No. 16/230,743, 7 pages.
Notice of Allowance, dated Sep. 11, 2019, received in U.S. Appl. No. 16/230,743, 5 pages.
Office Action, dated Mar. 6, 2020, received in U.S. Appl. No. 16/243,834, 19 pages.
Notice of Allowance, dated Sep. 24, 2020, received in U.S. Appl. No. 16/243,834, 10 pages.
Office Action, dated Dec. 18, 2019, received in Australian Patent Application No. 2018282409, which corresponds with U.S. Appl. No. 16/243,834, 3 pages.
Office Action, dated Sep. 18, 2020, received in Australian Patent Application No. 2018282409, which corresponds with U.S. Appl. No. 16/243,834, 3 pages.
Notice of Acceptance, dated Oct. 21, 2020, received in Australian Patent Application No. 2018282409, which corresponds with U.S. Appl. No. 16/243,834, 3 pages.
Certificate of Grant, dated Feb. 18, 2021, received in Australian Patent Application No. 2018282409, which corresponds with U.S. Appl. No. 16/243,834, 3 pages.
Office Action, dated Aug. 7, 2020, received in Japanese Patent Application No. 2019-058800, which corresponds with U.S. Appl. No. 16/243,834, 8 pages.
Office Action, dated Feb. 12, 2021, received in Japanese Patent Application No. 2019-058800, which corresponds with U.S. Appl. No. 16/243,834, 2 pages.
Office Action, dated Jul. 5, 2019, received in Korean Patent Application No. 2018-7037896, which corresponds with U.S. Appl. No. 16/243,834, 2 pages.
Notice of Allowance, dated Dec. 23, 2019, received in Korean Patent Application No. 2018-7037896, which corresponds with U.S. Appl. No. 16/243,834, 6 pages.
Patent, dated Mar. 13, 2020, received in Korean Patent Application No. 2018-7037896, which corresponds with U.S. Appl. No. 16/243,834, 7 pages.
Office Action, dated Nov. 30, 2021, received in Russian Patent Application No. 2018146112, which corresponds with U.S. Appl. No. 16/243,834, 15 pages.
Notice of Allowance, dated Apr. 14, 2022, received in Russian Patent Application No. 2018146112, which corresponds with U.S. Appl. No. 16/243,834, 2 pages.
Notice of Allowance, dated Nov. 20, 2020, received in U.S. Appl. No. 16/262,784, 8 pages.
Office action, dated Feb. 25, 2021, received in Australian Patent Application No. 2020201648, which corresponds with U.S. Appl. No. 16/262,784, 3 pages.
Notice of Allowance, dated Dec. 14, 2021, received in Australian Patent Application No. 2020201648, which corresponds with U.S. Appl. No. 16/262,784, 3 pages.
Office Action, dated Feb. 5, 2021, received in U.S. Appl. No. 16/262,800, 53 pages.
Final Office Action, dated Jun. 4, 2021, received in U.S. Appl. No. 16/262,800, 65 pages.

(56) References Cited

OTHER PUBLICATIONS

Office Action, dated Sep. 15, 2020, received in European Patent Application No. 19194439.6, which corresponds with U.S. Appl. No. 16/262,800, 6 pages.
Office Action, dated Mar. 25, 2021, received in European Patent Application No. 19194439.6, which corresponds with U.S. Appl. No. 16/262,800, 5 pages.
Notice of Allowance, dated Apr. 19, 2019, received in U.S. Appl. No. 16/252,478, 11 pages.
Office Action, dated Jun. 11, 2020, received in Australian Patent Application No. 2019257437, which corresponds with U.S. Appl. No. 16/252,478, 3 pages.
Notice of Allowance, dated Sep. 15, 2020, received in Australian Patent Application No. 2019257437, which corresponds with U.S. Appl. No. 16/252,478, 3 pages.
Notice of Allowance, dated Dec. 13, 2019, received in Korean Patent Application No. 2019-7033444, which corresponds with U.S. Appl. No. 16/252,478, 6 pages.
Patent, dated Mar. 12, 2020, received in Korean Patent Application No. 2019-7033444, which corresponds with U.S. Appl. No. 16/252,478, 6 pages.
Office action, dated Aug. 27, 2020, received in U.S. Appl. No. 16/241,883, 11 pages.
Notice of Allowance, dated Sep. 28, 2020, received in U.S. Appl. No. 16/241,883, 10 pages.
Office Action, dated Aug. 10, 2021, received in European Patent Application No. 19181042.3, which corresponds with U.S. Appl. No. 16/241,883, 7 pages.
Office Action, dated Oct. 1, 2021, received in Japanese Patent Applicat No. 2020-174097, which corresponds with U.S. Appl. No. 16/241,883, 2 pages.
Office Action, dated Jul. 15, 2019, received in U.S. Appl. No. 16/258,394, 8 pages.
Notice of Allowance, dated Nov. 6, 2019, received in U.S. Appl. No. 16/258,394, 8 pages.
Office Action, dated Oct. 21, 2021, received in Australian Patent Application No. 2020267298, which corresponds with U.S. Appl. No. 16/258,394, 2 pages.
Office Action, dated May 14, 2020, received in U.S. Appl. No. 16/354,035, 16 pages.
Notice of Allowance, dated Aug. 25, 2020, received in U.S. Appl. No. 16/354,035, 14 pages.
Office Action, dated Jun. 9, 2021, received in U.S. Appl. No. 16/896,141, 21 pages.
Final Office Action, dated Dec. 13, 2021, received in U.S. Appl. No. 16/896,141, 29 pages.
Office Action, dated Oct. 11, 2019, received in Australian Patent Application No. 2019202417, which corresponds with U.S. Appl. No. 16/896,141, 4 pages.
Notice of Allowance, dated Jul. 6, 2020, received in Australian Patent Application No. 2019202417, which corresponds with U.S. Appl. No. 16/896,141, 3 pages.
Certificate of Grant, dated Nov. 5, 2020, received in Australian Patent Application No. 2019202417, which corresponds with U.S. Appl. No. 16/896,141, 4 pages.
Office Action, dated Aug. 21, 2020, received in Japanese Patent Application No. 2019-047319, which corresponds with U.S. Appl. No. 16/896,141, 6 pages.
Office Action, dated Apr. 9, 2021, received in Japanese Patent Application No. 2019-047319, which corresponds with U.S. Appl. No. 16/896,141, 2 pages.
Office Action, dated Aug. 30, 2019, received in Korean Patent Application No. 2019-7019100, 2 pages.
Notice of Allowance, dated Nov. 1, 2019, received in Korean Patent Application No. 2019-7019100, 5 pages.
Patent, dated Jan. 31, 2020, received in Korean Patent Application No. 2019-7019100, 5 pages.
Office Action, dated May 14, 2020, received in U.S. Appl. No. 16/509,438, 16 pages.
Notice of Allowance, dated Jan. 6, 2021, received in U.S. Appl. No. 16/509,438, 5 pages.
Notice of Allowance, dated Apr. 29, 2021, received in U.S. Appl. No. 16/509,438, 9 pages.
Office Action, dated Sep. 6, 2021, received in Chinese Patent Application No. 201910718931.8, 6 pages.
Notice of Allowance, dated May 20, 2020, received in U.S. Appl. No. 16/534,214, 16 pages.
Office Action, dated Oct. 7, 2020, received in U.S. Appl. No. 16/563,505, 20 pages.
Final Office Action, dated May 12, 2021, received in U.S. Appl. No. 16/563,505, 19 pages.
Office Action, dated Oct. 5, 2021, received in U.S. Appl. No. 16/563,505, 19 pages.
Office Action, dated Oct. 19, 2020, received in U.S. Appl. No. 16/685,773, 15 pages.
Final Office Action, dated Feb. 2, 2021, received in U.S. Appl. No. 16/685,773, 20 pages.
Office Action, dated Dec. 14, 2021, received in U.S. Appl. No. 16/685,773, 20 pages.
Office Action, dated Oct. 30, 2020, received in U.S. Appl. No. 16/824,490, 15 pages.
Notice of Allowance, dated Feb. 24, 2021, received in U.S. Appl. No. 16/824,490, 8 pages.
Office Action, dated Sep. 21, 2020, received in U.S. Appl. No. 16/803,904, 5 pages.
Notice of Allowance, dated Jan. 6, 2021, received in U.S. Appl. No. 16/803,904, 9 pages.
Notice of Allowance, dated Oct. 25, 2021, received in U.S. Appl. No. 17/003,869, 21 pages.
Office Action, dated Aug. 30, 2021, received in Australian Patent Application No. 2020244406, which corresponds with U.S. Appl. No. 17/003,869, 4 pages.
Notice of Allowance, dated May 4, 2020, received in Korean Patent Application No. 2019-7033444, which corresponds with U.S. Appl. No. 17/003,869, 5 pages.
Patent, dated Jun. 3, 2020, received in Korean Patent Application No. 2019-7033444, which corresponds with U.S. Appl. No. 17/003,869, 7 pages.
Notice of Allowance, dated Dec. 21, 2021, received in U.S. Appl. No. 16/921,083, 25 pages.
Office Action, dated Sep. 8, 2021, received in Japanese Patent Application No. 2020-106360, 2 pages.
Office Action, dated May 26, 2021, received in U.S. Appl. No. 16/988,509, 25 pages.
Final Office Action, dated Sep. 16, 2021, received in U.S. Appl. No. 16/988,509, 38 pages.
Office Action, dated Feb. 23, 2021, received in Korean Patent Application No. 2020-7031330, which corresponds with U.S. Appl. No. 15/272,398, 3 pages.
Office Action, dated Aug. 27, 2021, received in Korean Patent Application No. 2020-7031330, which corresponds with U.S. Appl. No. 15/272,398, 6 pages.
Office Action, dated Dec. 23, 2021, received in Korean Patent Application No. 2020-7031330, which corresponds with U.S. Appl. No. 15/272,398, 8 pages.
Office Action, dated Oct. 26, 2021, received in U.S. Appl. No. 17/103,899 21 pages.
Office Action, dated Nov. 11, 2021, received in Australian Patent Application No. 2021200655, which corresponds with U.S. Appl. No. 17/103,899, 4 pages.
Office Action, dated Oct. 29, 2021, received in Korean Patent Application No. 2021-7031223, 2 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.

(56) References Cited

OTHER PUBLICATIONS

International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
Extended European Search Report, dated Jul. 30, 2018, received in European Patent Application No. 14/536,426, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Extended European Search Report, dated Dec. 5, 2018, received in European Patent Application No. 18194127.9, which corresponds with U.S. Appl. No. 14/608,942, 8 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Pat. No. 14,536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Extended European Search Report, dated Oct. 7, 2016, received in European Patent Application No. 16177863.4, which corresponds with U.S. Appl. No. 14/536,267, 12 pages.
Extended European Search Report, dated Oct. 30, 2018, received in European Patent Application No. 18183789.9, which corresponds with U.S. Appl. No. 14/536,267, 11 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
Extended European Search Report, dated Nov. 24, 2017, received in European Patent Application No. 17186744.3, which corresponds with U.S. Appl. No. 14/536,291, 10 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
Extended European Search Report, dated Mar. 15, 2017, received in European Patent Application No. 17153418.3, which corresponds with U.S. Appl. No. 14/536,648, 7 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.

(56) References Cited

OTHER PUBLICATIONS

International Search Report and Written Opinion, dated Oct. 14, 2016, received in International Patent Application No. PCT/US2016/020697, which corresponds with U.S. Appl. No. 14/866,981, 21 pages.
Search Report, dated Jun. 19, 2017, received in Dutch Patent Application No. 2016377, which corresponds with U.S. Appl. No. 14/866,159, 13 pages.
International Search Report and Written Opinion, dated Apr. 25, 2016, received in International Patent Application No. PCT/US2016/018758, which corresponds with U.S. Appl. No. 14/866,159, 15 pages.
Extended European Search Report, dated Oct. 17, 2017, received in European Patent Application No. 17184437.6, Which corresponds with U.S. Appl. No. 14/868,078, 8 pages.
Search Report, dated Apr. 13, 2017, received in Dutch Patent Application No. 2016376, which corresponds with U.S. Appl. No. 14/868,078, 15 pages.
International Search Report and Written Opinion, dated Jul. 21, 2016, received in International Patent Application No. PCT/US2016/019913, which corresponds with U.S. Appl. No. 14/868,078, 16 pages.
Search Report, dated Apr. 18, 2017, received in Dutch Patent Application No. 2016801, which corresponds with U.S. Appl. No. 14/863,432, 34 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
Extended European Search Report, dated Aug. 17, 2018, received in European Patent Application No. 18175195.9, which corresponds with U.S. Appl. No. 14/869,899, 13 pages.
International Search Report and Written Opinion, dated Aug. 29, 2016, received in International Patent Application No. PCT/US2016/021400, which corresponds with U.S. Appl. No. 14/869,899, 48 pages.
International Preliminary Report on Patentability, dated Sep. 12, 2017, received in International Patent Application No. PCT/US2016/021400, which corresponds with U.S. Appl. No. 14/869,899, 39 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
International Preliminary Report on Patentability, dated Feb. 13, 2018, received in International Patent Application No. PCT/US2016/046407, which corresponds with U.S. Appl. No. 15/009,688, 20 pages.
Search Report, dated Feb. 15, 2018, received in Dutch Patent Application No. 2019215, which corresponds with U.S. Appl. No. 14/864,529, 13 pages.
Extended European Search Report, dated Nov. 14, 2019, received in European Patent Application No. 19194418.0, which corresponds with U.S. Appl. No. 14/864,580, 8 pages.
Search Report, dated Feb. 15, 2018, received in Dutch Patent Application No. 2019214, which corresponds with U.S. Appl. No. 14/864,601, 12 pages.

Extended European Search Report, dated Oct. 10, 2017, received in European Patent Application No. 17188507.2, which corresponds with U.S. Appl. No. 14/866,361, 9 pages.
Extended European Search Report, dated Jun. 22, 2017, received in European Patent Application No. 16189421.7, which corresponds with U.S. Appl. No. 14/866,987, 7 pages.
Extended European Search Report, dated Sep. 11, 2017, received in European Patent Application No. 17163309.2, which corresponds with U.S. Appl. No. 14/866,987, 8 pages.
Extended European Search Report, dated Jun. 8, 2017, received in European Patent Application No. 16189425.8, which corresponds with U.S. Appl. No. 14/866,989, 8 pages.
Extended European Search Report, dated Aug. 2, 2018, received in European Patent Application No. 18168941.5, which corresponds with U.S. Appl. No. 14/871,236, 11 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Extended European Search Report, dated Dec. 21, 2016, received in European Patent Application No. 16189790.5, which corresponds with U.S. Appl. No. 14/871,462, 8 pages.
Extended European Search Report, dated Mar. 8, 2019, received in European Patent Application No. 18205283.7, which corresponds with U.S. Appl. No. 15/081,771, 15 pages.
Extended European Search Report, dated Aug. 24, 2018, received in European Patent Application No. 18171453.6, which corresponds with U.S. Appl. No. 15/136,782, 9 pages.
International Search Report and Written Opinion, dated Jan. 3, 2017, received in International Patent Application No. PCT/US2016/046214, which corresponds with U.S. Appl. No. 15/231,745, 25 pages.
Extended European Search Report, dated May 30, 2018, received in European Patent Application No. 18155939.4, which corresponds with U.S. Appl. No. 15/272,327, 8 pages.
Extended European Search Report, dated Mar. 2, 2018, received in European Patent Application No. 17206374.5, which corresponds with U.S. Appl. No. 15/272,343, 11 pages.
Extended European Search Report, dated Oct. 6, 2020, received in European Patent Application No. 20188553.0, which corresponds with U.S. Appl. No. 15/499,693, 11 pages.
Extended European Search Report, dated Oct. 28, 2019, received in European Patent Application No. 19195414.8, which corresponds with U.S. Appl. No. 16/240,672, 6 pages.
Extended European Search Report, dated Nov. 13, 2019, received in European Patent Application No. 19194439.6, which corresponds with U.S. Appl. No. 16/262,800, 12 pages.
Extended European Search Report, dated Oct. 9, 2019, received in European Patent Application No. 19181042.3, which corresponds with U.S. Appl. No. 15/272,343, 10 pages.
Anonymous, RX-V3800AV Receiver Owner's Manual, Yamaha Music Manuals, www.Manualslib.com, Dec. 31, 2007, 169 pages.
Office Action, dated Jan. 10, 2022, received in Chinese Patent Application No. 201810369259.1, which corresponds with U.S. Appl. No. 14/608,926, 4 pages.
Patent, dated Dec. 13, 2021, received in Japanese Patent Application No. 2018-022394, which corresponds with U.S. Appl. No. 14/536,203, 3 pages.
Notice of Allowance, dated Mar. 21, 2022, received in Chinese Patent Application No. 201810332044.2, which corresponds with U.S. Appl. No. 14/536,267, 1 page.
Intent to Grant, dated Mar. 16, 2022, received in European Patent Application No. 18183789.9, which corresponds with U.S. Appl. No. 16/262,800, 7 pages.
Notice of Allowance, dated Feb. 4, 2022, received in Japanese Patent Application No. 2020-185336, which corresponds with U.S. Appl. No. 14/864,580, 2 pages.
Patent, dated Mar. 3, 2022, received in Japanese Patent Application No. 2020-185336, which corresponds with U.S. Appl. No. 14/864,580, 3 pages.

(56) References Cited

OTHER PUBLICATIONS

Notice of Allowance, dated Feb. 9, 2022, received in Chinese Patent Application No. 201610869950.7, which corresponds with U.S. Appl. No. 14/871,462, 1 page.
Patent, dated Mar. 8, 2022, received in Chinese Patent Application No. 201610869950.7, which corresponds with U.S. Appl. No. 14/871,462, 7 pages.
Patent, dated Jan. 27, 2022, received in Australian Patent Application No. 2019268116, which corresponds with U.S. Appl. No. 16/240,672, 3 pages.
Office Action, dated Apr. 11, 2022, received in Japanese Patent Application No. 2019-058800, which corresponds with U.S. Appl. No. 16/243,834, 4 pages.
Notice of Allowance, dated Jan. 24, 2022, received in U.S. Appl. No. 16/262,800, 26 pages.
Notice of Allowance, dated Jan. 14, 2022, received in Australian Patent Application No. 2020267298, which corresponds with U.S. Appl. No. 16/258,394, 3 pages.
Final Office Action, dated Mar. 4, 2022, received in Japanese Patent Application No. 2019-047319, which corresponds with U.S. Appl. No. 16/896,141, 2 pages.
Office Action, dated Mar. 17, 2022, received in Chinese Patent Application No. 201910718931.8, 1 page.
Notice of Allowance, dated Jan. 14, 2022, received in Australian Patent Application No. 2020244406, which corresponds with U.S. Appl. No. 17/003,869, 3 pages.
Office Action, dated Mar. 16, 2022, received in U.S. Appl. No. 17/138,676, 22 pages.
Patent, dated Jan. 27, 2022, received in Korean Patent Application No. 2021-7031223, 5 pages.
Notice of Allowance, dated Feb. 21, 2022, received in Korean Patent Application No. 2022-7003345, 2 gages.
International Search Report and Written Opinion, dated Jan. 11, 2022, received in International Application No. PCT/US2021/042402, which corresponds with U.S. Appl. No. 17/031,637, 50 pages.
Bognot, "Microsoft Windows 7 Aero Shake, Snap, and Peek", https://www.outube.com/watch?v=vgD7wGrsQg4, Apr. 3, 2012, 4 pages.
Microsoft, "Windows 7 Aero Shake, Snap, and Peek", hr.msu.edu.techtipshrsds/window 7 snappeekandshake.pdf, Apr. 4, 2012, 6 pages.
Intent to Grant, dated May 11, 2022, received in European Patent Application No. 13795392.3, which corresponds with U.S. Appl. No. 14/608,926, 7 pages.
Decision to Grant, dated Jun. 17, 2022, received in European Patent Application No. 13795392.3, which corresponds with U.S. Appl. No. 14/608,926, 7 pages.
Patent, dated Jul. 13, 2022, received in European Patent Application No. 13795392.3, which corresponds with U.S. Appl. No. 14/608,926, 4 pages.
Patent, dated May 27, 2022, received in Chinese Patent Application No. 201810332044.2, which corresponds with U.S. Appl. No. 14/536,267, 6 pages.
Decision to Grant, dated Jul. 21, 2022, received in European Patent Application No. 18183789.9, which corresponds with U.S. Appl. No. 16/262,800, 3 pages.
Patent, dated Aug. 17, 2022, received in European Patent Application No. 18183789.9, which corresponds with U.S. Appl. No. 16/262,800, 4 pages.
Decision on Appeal, dated Jun. 9, 2022, received in U.S. Appl. No. 14/609,006, 11 pages.
Office Action, dated Jul. 29, 2022, received in Indian Patent Application No. 202118007136, which corresponds with U.S. Appl. No. 14/866,511, 9 pages.
Office Action, dated Aug. 23, 2022, received in European Patent Application No. 19194418.0, which corresponds with U.S. Appl. No. 14/864,580, 6 pages.
Intent to Grant, dated Jan. 9, 2023, received in European Patent Application No. 16711725.8, which corresponds with U.S. Appl. No. 14/867,990, 7 pages.
Intention to Grant, dated Sep. 26, 2022, received in European Patent Application No. 16753795.0, which corresponds with U.S. Appl. No. 15/009,668, 7 pages.
Decision to Grant, dated Nov. 24, 2022, received in European Patent Application No. 16753795.0, which corresponds with U.S. Appl. No. 15/009,668, 4 pages.
Patent, dated Dec. 21, 2023, received in European Patent Application No. 16753795.0, which corresponds with U.S. Appl. No. 15/009,668, 4 pages.
Notice of Allowance, dated Oct. 14, 2022, received in Japanese Patent Application No. 2021-157204, which corresponds with U.S. Appl. No. 15/272,327, 2 pages.
Office Action, dated Jun. 7, 2022, received in European Patent Application No. 20188553.0, which corresponds with U.S. Appl. No. 15/499,693, 7 pages.
Notice of Allowance, dated Jan. 20, 2023, reveived in Japanese Patent Application No. 2019-058800, which corresponds with U.S. Appl. No. 16/243,834, 2 pages.
Office Action, dated Jul. 25, 2022, received in Japanese Patent Application No. 2021-099049, which corresponds with U.S. Appl. No. 16/243,834, 2 pages.
Office Action, dated Jul. 18, 2022, received in Mexican Patent Application No. MX/a/2020/011482, which corresponds with U.S. Appl. No. 16/243,834, 4 pages.
Office Action, dated Jan. 5, 2023, received in Mexican Patent Application No. MX/a/2020/011482, which corresponds with U.S. Appl. No. 16/243,834, 5 pages.
Certificate of Grant, dated Apr. 21, 2022, received in Australian Patent Application No. 2020201648, which corresponds with U.S. Appl. No. 16/262,784, 3 pages.
Patent, dated Jun. 14, 2022, received in Japanese Patent Application No. 2020-174097, which corresponds with U.S. Appl. No. 16/241,883, 3 pages.
Patent, dated May 19, 2022, received in Australian Patent Application No. 2020267298, which corresponds with U.S. Appl. No. 16/258,394, 4 pages.
Office Action, dated Oct. 3, 2022, received in Japanese Patent Application No. 2021-132350, which corresponds with U.S. Appl. No. 16/258,394, 2 pages.
Final Office Action, dated Sep. 16, 2022, received in Japanese Patent Application No. 2019-047319, which corresponds with U.S. Appl. No. 16/896,141, 2 pages.
Notice of Allowance, dated Sep. 20, 2022, received in Chinese Patent Application No. 201910610331.X, 1 page.
Patent, dated Nov. 25, 2022, received in Chinese Patent Application No. 201910610331.X, 7 pages.
Office Action, dated Jul. 18, 2022, received in Chinese Patent Application No. 201910718931.8, 2 pages.
Notice of Allowance, dated Jan. 5, 2023, received in Chinese Patent Application No. 201910718931.8, 4 pages.
Final Office Action, dated Jul. 18, 2022, received in U.S. Appl. No. 16/685,773, 20 pages.
Office Action, dated Dec. 16, 2022, received in Australian Patent Application No. 2022200212, 3 pages.
Office Action, dated May 17, 2022, received in Korean Patent Application No. 2020-7008888, 2 pages.
Notice of Allowance, dated Nov. 23, 2022, received in Korean Patent Application No. 2020-7008888, 2 pages.
Patent, dated May 19, 2022, received in Australian Patent Application No. 2020244406, which corresponds with U.S. Appl. No. 17/003,869, 3 pages.
Office Action, dated Jan. 5, 2023, received in Japanese Patent Application No. 2022-031194, which corresponds with U.S. Appl. No. 17/003,869, 6 pages.
Notice of Allowance, dated Feb. 7, 2022, received in U.S. Appl. No. 16/988,509, 16 pages.
Office Action, dated Apr. 27, 2022, received in Australian Patent Application No. 2020257134, 3 pages.
Notice of Allowance, dated Aug. 23, 2022, received in Australian Patent Application No. 2020257134, 2 pages.

(56) References Cited

OTHER PUBLICATIONS

Patent, dated Dec. 22, 2022, received in Australian Patent Application No. 2020257134, 3 pages.
Office Action, dated Apr. 28, 2022, received in Korean Patent Application No. 2022-7005994, 5 pages.
Notice of Allowance, dated Oct. 18, 2022, received in Korean Patent Application No. 2022-7005994, 5 pages.
Final Office Action, dated May 2, 2022, received in U.S. Appl. No. 17/103,899 21 pages.
Office Action, date Aug. 19, 2022, received in U.S. Appl. No. 17/103,899 24 pages.
Final Office Action, dated Jan. 24, 2023, received in U.S. Appl. No. 17/103,899 27 pages.
Office Action, dated Nov. 11, 2021, received in Australian U.S. Appl. No. 17/103,899, which corresponds with U.S. Appl. No. 17/103,899, 4 pages.
Notice of Acceptance, dated Nov. 10, 2022, received in Australian Patent Application No. 2021200655, which corresponds with U.S. Appl. No. 17/103,899, 4 pages.
Office Action, dated Nov. 8, 2022, received in U.S. Appl. No. 17/333,810, 9 pages.
Office Action, dated Jun. 10, 2022, received in U.S. Appl. No. 17/362,852, 12 pages.
Notice of Allowance, dated Aug. 24, 2022, received in U.S. Appl. No. 17/362,852, 9 pages.
Office Action, dated Nov. 9, 2022, received in U.S. Appl. No. 17/409,573, 20 pages.
Notice of Allowance, dated Sep. 22, 2022, received in U.S. Appl. No. 17/524,692, 22 pages.
Office Action, dated Jan. 11, 2023, received in Australian Patent Application No. 2022202892, which corresponds with U.S. Appl. No. 15/113,779, 3 pages.
Office Action, dated Nov. 28, 2022, received in U.S. Appl. No. 17/560,013, 13 pages.
Patent, dated May 10, 2022, received in Korean Patent Application No. 2022-7003345, 8 pages.
Office Action, dated May 23, 2022, received in Korean Patent Application No. 2022-7015718, 2 pages.
Patent, dated Aug. 10, 2022, received in Korean Patent Application No. 2022-7015718, 6 pages.
Office Action, dated Mar. 2, 2023, received in Chinese Patent Application No. 202010281684.2, which corresponds with U.S. Appl. No. 14/864,601, 4 pages.
Office Action, dated Mar. 7, 2023, received in Brazilian Patent Application No. 11201701119-9, which corresponds with U.S. Appl. No. 14/871,236, 4 pages.
Notice of Allowance, dated May 19, 2023, received in Japanese Patent Application No. 2021-099049, which corresponds with U.S. Appl. No. 16/243,834, 2 pages.
Office Action, dated Mar. 2, 2023, received in Indian Patent Application No. 202118003907, which corresponds with U.S. Appl. No. 16/243,834, 11 pages.
Office Action, dated Mar. 12, 2023, received in Chinese Patent Application No. 202010281127.0, which corresponds with U.S. Appl. No. 16/252,478, 4 pages.
Final Office Action, dated Feb. 24, 2023, received in U.S. Appl. No. 16/896,141, 23 pages.
Patent, dated Mar. 17, 2023, received in Chinese Patent Application No. 201910718931.8, 7 pages.
Office Action, dated Feb. 22, 2023, received in Chinese Patent Application No. 202010290361.X, which corresponds with U.S. Appl. No. 17/003,869, 4 pages.
Patent, dated Mar. 16, 2023, received in Australian Patent Application No. 2021200655, which corresponds with U.S. Appl. No. 17/103,899, 3 pages.
Final Office Action, dated Apr. 24, 2023, received in U.S. Appl. No. 17/333,810, 12 pages.
Office Action, dated Mar. 16, 2023, received in U.S. Appl. No. 17/351,035, 23 pages.
Notice of Allowance, dated Mar. 6, 2023, received in U.S. Appl. No. 17/524,692, 14 pages.
Office Action, dated Sep. 20, 2022, received in Australian Patent Application No. 2021254568, which corresponds with U.S. Appl. No. 17/560,013, 4 pages.
Notice of Allowance, dated Mar. 24, 2023, received in U.S. Appl. No. 17/666,495, 28 pages.
Notice of Allowance, dated Apr. 27, 2023, received in U.S. Appl. No. 18/089,397, 16 pages.
Office Action, dated Mar. 30, 2023, received in U.S. Appl. No. 17/875,307, 15 pages.
Office Action, dated Aug. 10, 2023, received in Chinese Patent Application No. 201610658351.8, which corresponds with U.S. Appl. No. 14/866,992, 4 pages.
Patent, dated Aug. 4, 2023, received in Indian Patent Application No. 21617032293, which corresponds with U.S. Appl. No. 14/871,227, 4 pages.
Intent to Grant, dated Jun. 1, 2023, received in European Patent Application No. 14/867,990, which corresponds with U.S. Appl. No. 14/867,990, 8 pages.
Decision to Grant, dated Sep. 7, 2023, received in European Patent Application No. 14/867,990, which corresponds with U.S. Appl. No. 14/867,990, 4 pages.
Intent to Grant, dated Aug. 16, 2023, received in European Patent Application No. 15/499,693, which corresponds with U.S. Appl. No. 15/499,693, 10 pages.
Patent, dated Jan. 27, 2023, received in Japanese Patent Application No. 2019-058800, which corresponds with U.S. Appl. No. 16/243,834, 4 pages.
Patent, dated Jun. 19, 2023, received in Japanese Patent Application No. 2021-099049, which corresponds with U.S. Appl. No. 16/243,834, 4 pages.
Patent, dated Jul. 3, 2023, received in Mexican Patent Application No. MX/a/2020/011482, which corresponds with U.S. Appl. No. 16/243,834, 2 pages.
Final Office Action, dated Jul. 14, 2023, received in Japanese Patent Application No. 2021-132350, which corresponds with U.S. Appl. No. 16/258,394, 2 pages.
Final Office Action, dated Jul. 14, 2023, received in Japanese Patent Application No. 2019-047319, which corresponds with U.S. Appl. No. 16/896,141, 2 pages.
Notice of Allowance, dated Aug. 9, 2023, received in U.S. Appl. No. 17/103,899 7 pages.
Final Office Action, dated May 31, 2023, received in U.S. Appl. No. 17/409,573, 22 pages.
Notice of Allowance, dated Jun. 13, 2023, received in Australian Patent Application No. 2022202892, which corresponds with U.S. Appl. No. 15/113,779, 3 pages.
Office Action, dated Aug. 3, 2023, received in U.S. Appl. No. 17/560,013, 15 pages.
Office Action, dated Jun. 28, 2023, received in Australian Patent Application No. 2021254568, which corresponds with U.S. Appl. No. 17/560,013, 3 pages.
Patent, dated Sep. 15, 2023, received in Chinese Patent Application No. 202010281684.2, which corresponds with U.S. Appl. No. 14/864,601, 7 pages.
Patent, dated Sep. 12, 2023, received in Chinese Patent Application No. 202010281127.0, which corresponds with U.S. Appl. No. 16/252,478, 8 pages.
Patent, dated Sep. 12, 2023, received in Chinese Patent Application No. 202010290361.X, which corresponds with U.S. Appl. No. 17/003,869, 7 pages.
Office Action, dated Sep. 18, 2023, received in U.S. Appl. No. 17/333,810, 12 pages.
Final Office Action, dated Sep. 21, 2023, received in U.S. Appl. No. 17/875,307, 16 pages.
Notice of Allowance, dated Sep. 21, 2023, received in Korean Patent Application No. 2023-702268, 2 pages.
Notice of Allowance, dated Dec. 13, 2023, received in U.S. Appl. No. 17/409,573, 11 pages.
Office Action, dated Oct. 26, 2023, received in U.S. Appl. No. 17/172,032, 17 pages.

(56) References Cited

OTHER PUBLICATIONS

Final Office Action, dated Oct. 30, 2023, received in U.S. Appl. No. 17/351,035, 23 pages.
Notice of Allowance, dated Nov. 22, 2023, received in U.S. Appl. No. 17/560,013, 13 pages.
Office Action, dated Nov. 6, 2023, received in Chinese Patent Application No. 201610658351.8, which corresponds with U.S. Appl. No. 14/866,992, 2 pages.
Office Action, dated Oct. 30, 2023, received in European Patent Application No. 19194418.0, which corresponds with U.S. Appl. No. 14/864,580, 9 pages.
Patent, dated Nov. 6, 2023, received in Indian Patent Application No. 201617032291, which corresponds with U.S. Appl. No. 14/866,987, 4 pages.
Patent, dated Oct. 4, 2023, received in European Patent Application No. 16711725.8, which corresponds with U.S. Appl. No. 14/867,990, 2 pages.
Notice of Allowance, dated Oct. 20, 2023, received in Australian Patent Application No. 2022200212, 3 pages.
Patent, dated Oct. 12, 2023, received in Australian Patent Application No. 2022202892, which corresponds with U.S. Appl. No. 15/113,779, 3 pages.
Grant Certificate, dated Oct. 26, 2023, received in Australian Patent Application No. 2021254568, which corresponds with U.S. Appl. No. 17/560,013, 3 pages.
Notice of Allowance, dated Jan. 8, 2024, received in Chinese Patent Application No. 201610658351.8, which corresponds with U.S. Appl. No. 14/866,992, 2 pages.
Office Action, dated Jan. 5, 2024, received in Chinese Patent Application No. 202010969867.3, which corresponds with U.S. Appl. No. 16/262,784, 2 pages.
Notice of Allowance, dated Jan. 12, 2024, received in Japanese Patent Application No. 2021-132350, which corresponds with U.S. Appl. No. 16/258,394, 2 pages.
Notice of Allowance, dated Dec. 6, 2023, received in U.S. Appl. No. 17/103,899 9 pages.
Office Action, dated Dec. 13, 2023, received in Australian Patent Application No. 2023226703, which corresponds with U.S. Appl. No. 18/089,397, 2 pages.
Patent, dated Dec. 21, 2023, received in Korean Patent Application No. 2023-702268, 5 pages.
Notice of Allowance, dated Mar. 1, 2024, received in U.S. Appl. No. 17/333,810, 8 pages.
Notice of Allowance, dated Mar. 14, 2024, received in U.S. Appl. No. 17/351,035, 8 pages.
Notice of Allowance, dated Apr. 2, 2024, received in U.S. Appl. No. 17/875,307, 18 pages.
Patent, dated Feb. 27, 2024, received in Chinese Patent Application No. 201610658351.8, which corresponds with U.S. Appl. No. 14/866,992, 8 pages.
Office Action, dated Apr. 6, 2024, received in Indian U.S. Appl. No. 15/136,782 (7399IN), which corresponds with U.S. Appl. No. 15/136,782, 12 pages.
Intent to Grant, dated Feb. 16, 2024, received in European Application No. 20188553.0, which corresponds with U.S. Appl. No. 15/499,693, 8 pages.
Patent, dated Feb. 14, 2024, received in Japanese Patent Application No. 2021-132350, which corresponds with U.S. Appl. No. 16/258,394, 3 pages.
Office Action, dated Mar. 22, 2024, received in Chinese Patent Application No. 202110696612,9, which corresponds with U.S. Appl. No. 16/896,141, 5 pages.
Patent, dated Feb. 8, 2024, received in Japanese Patent Application No. 2019-047319, which corresponds with U.S. Appl. No. 16/896,141, 3 pages.
Patent, dated Jan. 25, 2024, received in Japanese Patent Application No. 2022-031194, which corresponds with U.S. Appl. No. 17/003,869, 3 pages.
Office Action, dated Feb. 19, 2024, received in Australian Patent Application No. 2022-283731, 5 pages.

\* cited by examiner

DEVICE, METHOD, AND GRAPHICAL USER INTERFACE FOR PROVIDING FEEDBACK FOR CHANGING ACTIVATION STATES OF A USER INTERFACE OBJECT

RELATED APPLICATIONS

This application is a continuation of U.S. application Ser. No. 16/921,083, filed Jul. 6, 2020, which is a continuation of U.S. application Ser. No. 15/889,115, filed Feb. 5, 2018, now U.S. Pat. No. 10,782,871, which is a continuation of U.S. application Ser. No. 14/536,141, filed Nov. 7, 2014, now U.S. Pat. No. 9,886,184, which is continuation of PCT Patent Application Serial No. PCT/US2013/040072, filed on May 8, 2013, entitled "Device, Method, and Graphical User Interface for Providing Feedback for Changing Activation States of a User Interface Object," which claims the benefit of and priority to U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application No. 61/747,278, filed Dec. 29, 2012, entitled "Device, Method, and Graphical User Interface for Manipulating User Interface Objects with Visual and/or Haptic Feedback;" and U.S. Provisional Patent Application No. 61/688,227, filed May 9, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, California), an image management application (e.g., Aperture or iPhoto from Apple Inc. of Cupertino, California), a digital content (e.g., videos and music) management application (e.g., iTunes from Apple Inc. of Cupertino, California), a drawing application, a presentation application (e.g., Keynote from Apple Inc. of Cupertino, California), a word processing application (e.g., Pages from Apple Inc. of Cupertino, California), a website creation application (e.g., iWeb from Apple Inc. of Cupertino, California), a disk authoring application (e.g., iDVD from Apple Inc. of Cupertino, California), or a spreadsheet application (e.g., Numbers from Apple Inc. of Cupertino, California).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for selecting a tactile output corresponding to a change in intensity of a contact when relocating user interface objects. Such methods and interfaces may complement or replace conventional methods for relocating user interface objects. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a touch-sensitive surface and a display, where the device includes one or more sensors to detect intensity of contacts with the touch-sensitive surface. The method includes: displaying a user interface object on the display; detecting, on the touch-sensitive surface, a contact having an intensity above an object-selection threshold; detecting movement of the contact across the touch-sensitive surface, the movement corresponding to a preliminary portion of a gesture for performing an operation corresponding to the user interface object; detecting a reduction in intensity of the contact below an object-release threshold; and in response to detecting the reduction in intensity below the object-release threshold: in accordance with a determination that the movement meets predefined operation-performance criteria: performing the operation and generating a first tactile output on the touch-sensitive surface; and in accordance with a determination that the movement does not meet the predefined operation-performance criteria: forgoing performance of the operation and generating a second tactile output on the touch-sensitive surface, where the second tactile output is different from the first tactile output.

In accordance with some embodiments, an electronic device comprises a display unit configured to display a user interface object; a touch-sensitive surface unit configured to receive contacts; one or more sensor units configured to detect intensity of contacts with the touch-sensitive surface unit; and a processing unit coupled to the display unit, the touch-sensitive surface unit, and the sensor units. The processing unit is configured to: detect, on the touch-sensitive surface unit, a contact having an intensity above an object-selection threshold; detect movement of the contact across the touch-sensitive surface unit, the movement corresponding to a preliminary portion of a gesture for performing an operation corresponding to the user interface object; detect a reduction in intensity of the contact below an object-release threshold; and in response to detecting the reduction in intensity below the object-release threshold: in accordance with a determination that the movement meets predefined operation-performance criteria: perform the operation; and generate a first tactile output on the touch-sensitive surface unit; and in accordance with a determination that the movement does not meet the predefined operation-performance criteria: forgo performance of the operation; and generate a second tactile output on the touch-sensitive surface unit, wherein the second tactile output is different from the first tactile output.

Thus, electronic devices with displays, touch-sensitive surfaces, and one or more sensors to detect intensity of contacts with the touch-sensitive surfaces are provided with faster, more efficient methods and interfaces for selecting a tactile output corresponding to a change in intensity of a contact when relocating user interface objects, thereby increasing the effectiveness, efficiency, and user satisfaction with such devices. Such methods and interfaces optionally complement or replace conventional methods for dragging and dropping user interface objects.

There is a need for electronic devices with faster, more efficient methods and interfaces for providing feedback corresponding to modifier inputs. Such methods and interfaces may complement or replace conventional methods for providing feedback corresponding to modifier inputs. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: detecting a contact on the touch-sensitive surface; detecting an increase in intensity of the contact above a first activation threshold; after detecting the increase in intensity of the contact above the first activation threshold, detecting a reduction in intensity of the contact below a second activation threshold; and in response to detecting the reduction in intensity of the contact below the second activation threshold: in accordance with a determination that a modifier input was detected while detecting the increase in intensity of the contact above the first activation threshold: performing a first operation and generating a first tactile output on the touch-sensitive surface; and in accordance with a determination that the modifier input was not detected while detecting the increase in intensity of the contact above the first activation threshold: performing a second operation different from the first operation and generating a second tactile output on the touch-sensitive surface, where the second tactile output is different from the first tactile output.

In accordance with some embodiments, an electronic device includes a display unit; a touch-sensitive surface unit configured to receive contacts; one or more sensor units configured to detect intensity of contacts with the touch-sensitive surface unit; and a processing unit coupled to the display unit, the touch-sensitive surface unit and the sensor units. The processing unit is configured to: detect a contact on the touch-sensitive surface unit; detect an increase in intensity of the contact above a first activation threshold; after detecting the increase in intensity of the contact above the first activation threshold, detect a reduction in intensity of the contact below a second activation threshold; and in response to detecting the reduction in intensity of the contact below the second activation threshold: in accordance with a determination that a modifier input was detected while detecting the increase in intensity of the contact above the first activation threshold: perform a first operation and generate a first tactile output on the touch-sensitive surface unit; and in accordance with a determination that the modifier input was not detected while detecting the increase in intensity of the contact above the first activation threshold: perform a second operation different from the first operation and generate a second tactile output on the touch-sensitive surface unit, where the second tactile output is different from the first tactile output.

Thus, electronic devices with displays, touch-sensitive surfaces and one or more sensors to detect intensity of contacts with the touch-sensitive surfaces are provided with faster, more efficient methods and interfaces for providing feedback corresponding to modifier inputs, thereby increasing the effectiveness, efficiency, and user satisfaction with such devices. Such methods and interfaces may complement or replace conventional methods for providing feedback corresponding to modifier inputs.

There is a need for electronic devices with more efficient methods and interfaces for providing feedback for changing activation states of a user interface object. Such methods and interfaces may complement or replace conventional methods for providing feedback for changing activation states of a user interface object. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a user interface object on the display, where the user interface object has a plurality of activation states; detecting a contact on the touch-sensitive surface; detecting an increase of intensity of the contact on the touch-sensitive surface from a first intensity to a second intensity; in response to detecting the increase in intensity: changing activation states of the user interface object M times, where M is a positive integer, and generating a tactile output on the touch-sensitive surface corresponding to each change in activation state of the user interface object; detecting a decrease of intensity of the contact from the second intensity to the first intensity; and in response to detecting the decrease in intensity: changing activation states of the user interface object N times, where N is a positive integer, and generating a tactile output on the touch-sensitive surface corresponding to each change in activation state of the user interface object, where N is different from M.

In accordance with some embodiments, an electronic device includes a display unit configured to display a user interface object, where the user interface object has a plurality of activation states, a touch-sensitive surface unit configured to receive contacts, one or more sensor units configured to detect intensity of contacts with the touch-sensitive surface unit, and a processing unit coupled to the display unit, the touch-sensitive surface unit, and the sensor units. The processing unit is configured to: detect a contact on the touch-sensitive surface unit; detect an increase of intensity of the contact on the touch-sensitive surface unit from a first intensity to a second intensity; in response to detecting the increase in intensity: change activation states of the user interface object M times, where M is a positive integer, and generate a tactile output on the touch-sensitive surface unit corresponding to each change in activation state of the user interface object; detect a decrease of intensity of the contact from the second intensity to the first intensity; and in response to detecting the decrease in intensity: change activation states of the user interface object N times, where N is a positive integer, and generate a tactile output on the touch-sensitive surface unit corresponding to each change in activation state of the user interface object, where N is different from M.

Thus, electronic devices with displays, touch-sensitive surfaces and one or more sensors to detect intensity of contacts with the touch-sensitive surface are provided with more efficient methods and interfaces for providing feedback for changing activation states of a user interface object, thereby increasing the effectiveness, efficiency, and user satisfaction with such devices. Such methods and interfaces may complement or replace conventional methods for providing feedback for changing activation states of a user interface object.

There is a need for electronic devices with faster, more efficient methods and interfaces for providing feedback for changing activation states of a user interface object. Such methods and interfaces may complement or replace conventional methods for providing feedback for changing activation states of a user interface object. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a user interface object on the display, where the user interface object has a first activation state and a second activation state; detecting a contact on the touch-sensitive surface; detecting an increase of intensity of the contact on the touch-sensitive surface from a first intensity to a second intensity; in response to detecting the increase in intensity: changing activation states of the user interface object from the first activation state to the second activation state; and generating M distinct tactile outputs on the touch-sensitive surface, where M is a positive integer; detecting a decrease of intensity of the contact from the second intensity to the first intensity; and in response to detecting the decrease in intensity: changing activation states of the user interface object from the second activation state to the first activation state; and generating N distinct tactile outputs on the touch-sensitive surface, where N is a positive integer and N is different from M.

In accordance with some embodiments, an electronic device includes a display unit configured to display a user interface object, where the user interface object has a first activation state and a second activation state; a touch-sensitive surface unit configured to receive contacts; one or more sensor units configured to detect intensity of contacts with the touch-sensitive surface unit; and a processing unit coupled to the display unit, the touch-sensitive surface unit and the sensor units. The processing unit is configured to: detect a contact on the touch-sensitive surface unit; detect an increase of intensity of the contact on the touch-sensitive surface unit from a first intensity to a second intensity; in response to detecting the increase in intensity: change activation states of the user interface object from the first activation state to the second activation state; and generate M distinct tactile outputs on the touch-sensitive surface unit, where M is a positive integer; detect a decrease of intensity of the contact from the second intensity to the first intensity; and in response to detecting the decrease in intensity: change activation states of the user interface object from the second activation state to the first activation state; and generate N distinct tactile outputs on the touch-sensitive surface unit, where N is a positive integer and N is different from M.

Thus, electronic devices with displays, touch-sensitive surfaces and one or more sensors to detect intensity of contacts with the touch-sensitive surface are provided with faster, more efficient methods and interfaces for providing feedback for changing activation states of a user interface object, thereby increasing the effectiveness, efficiency, and user satisfaction with such devices. Such methods and interfaces may complement or replace conventional methods for providing feedback for changing activation states of a user interface object.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
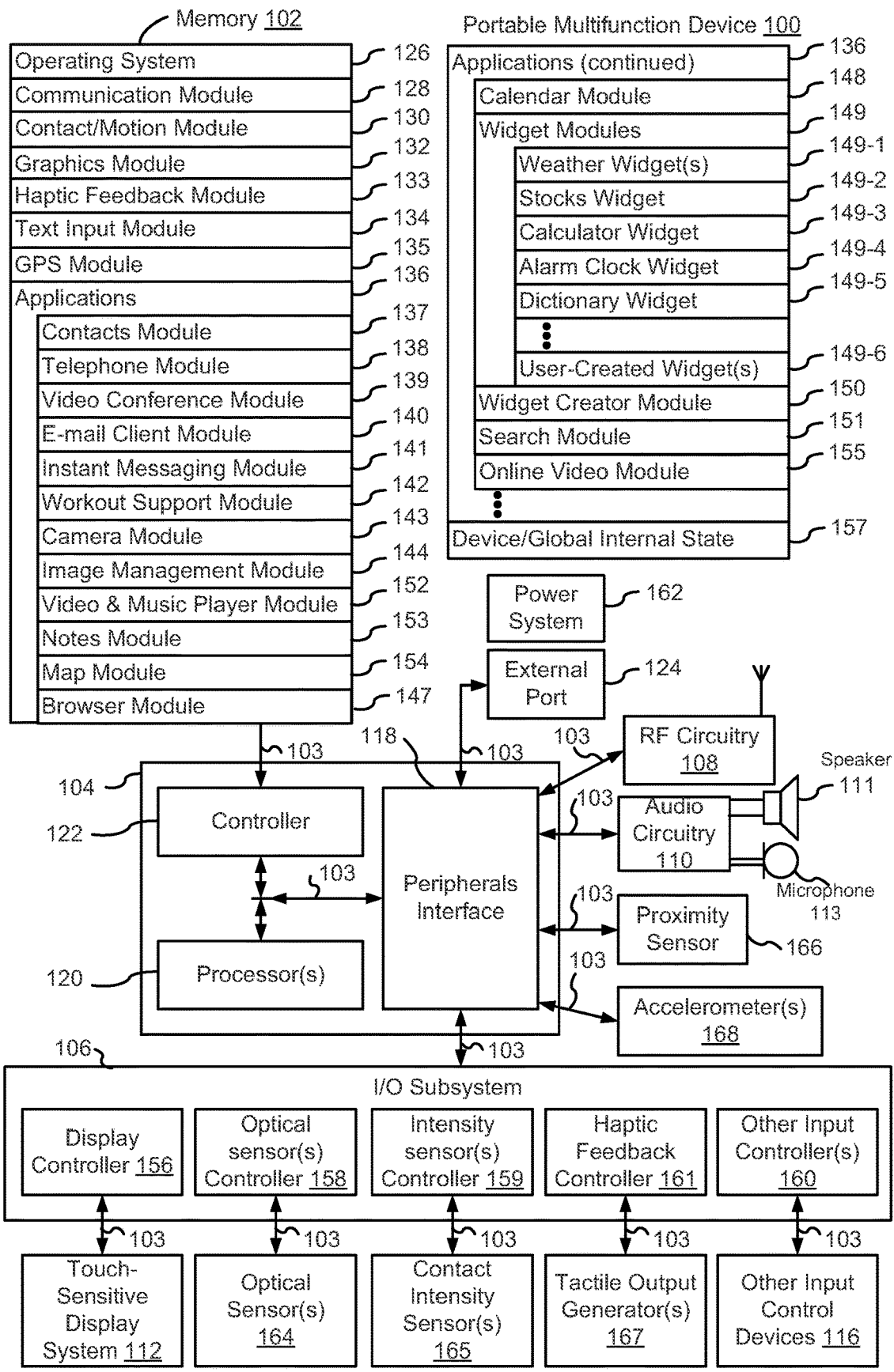
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations.

As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

Figure 5A:
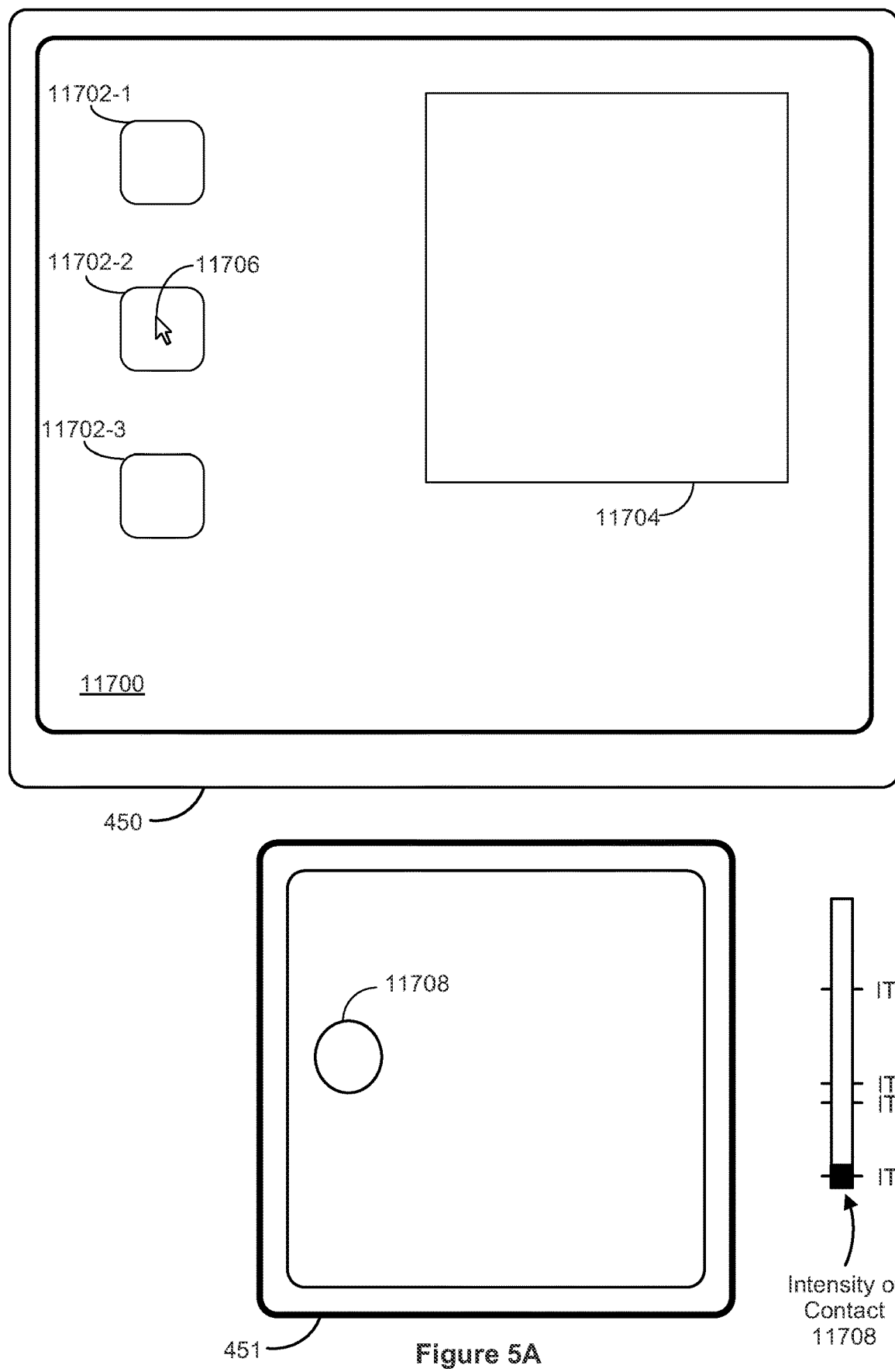
FIGS. 5A-5W illustrate exemplary user interfaces for selecting a tactile output corresponding to a change in intensity of a contact in accordance with some embodiments.
Figure 5B:
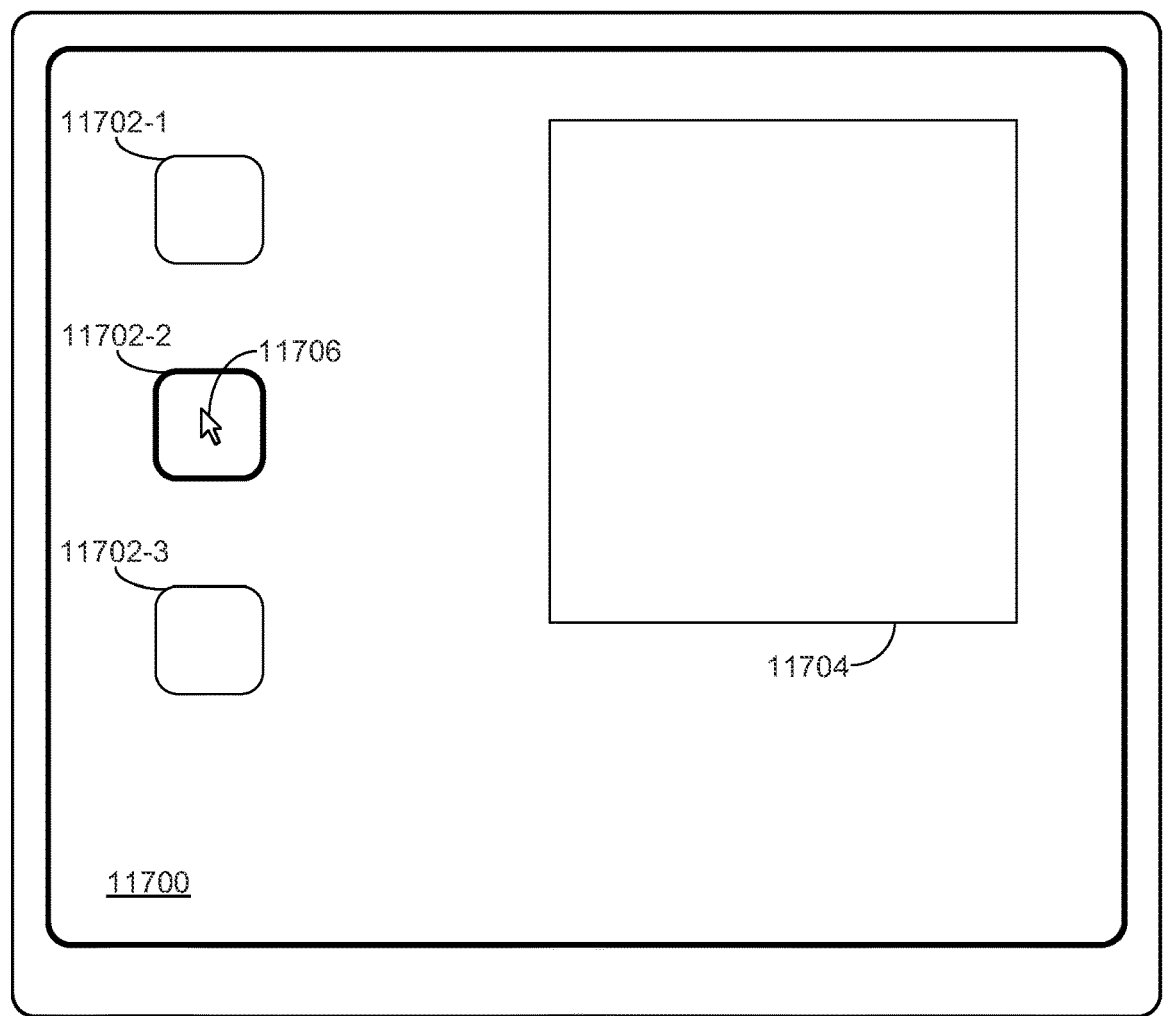
Figure 5B:
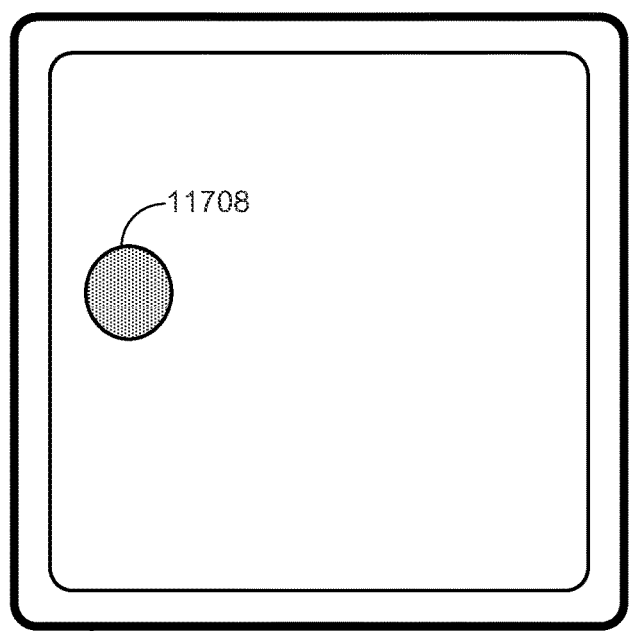
Figure 5B:
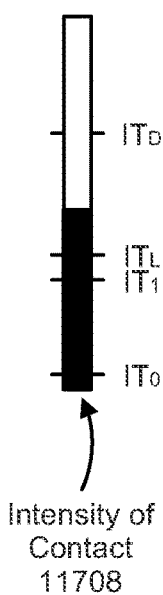
Figure 5C:
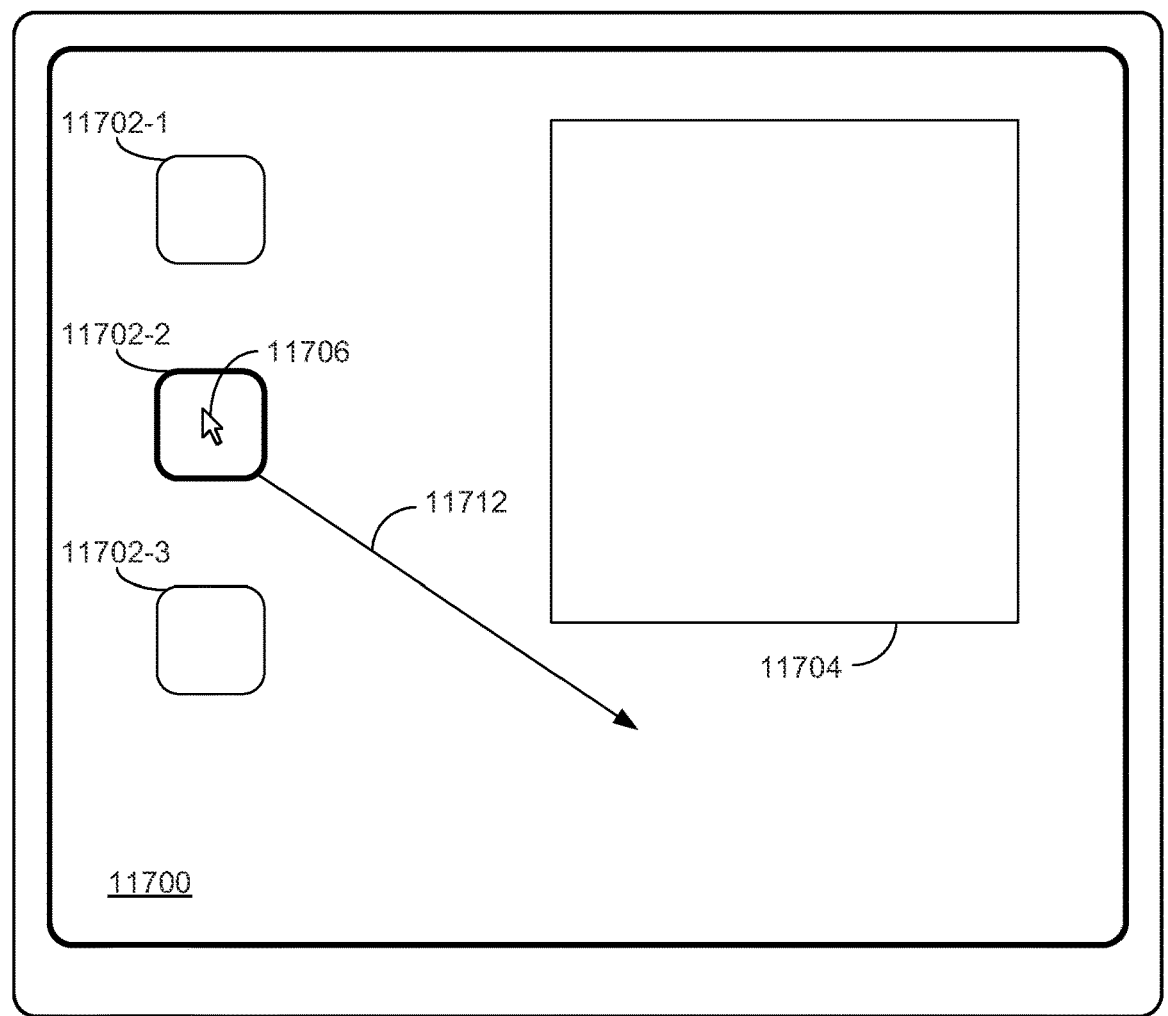
Figure 5C:
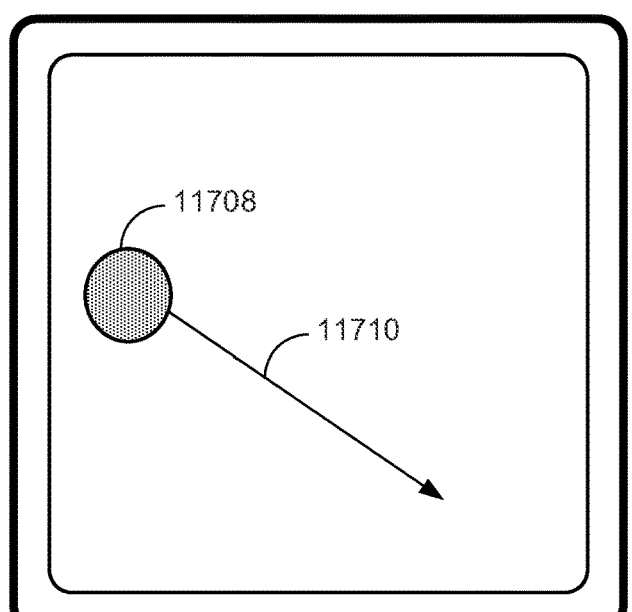
Figure 5C:
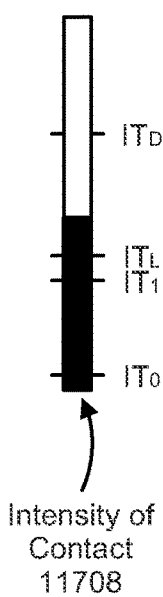
Figure 5D:
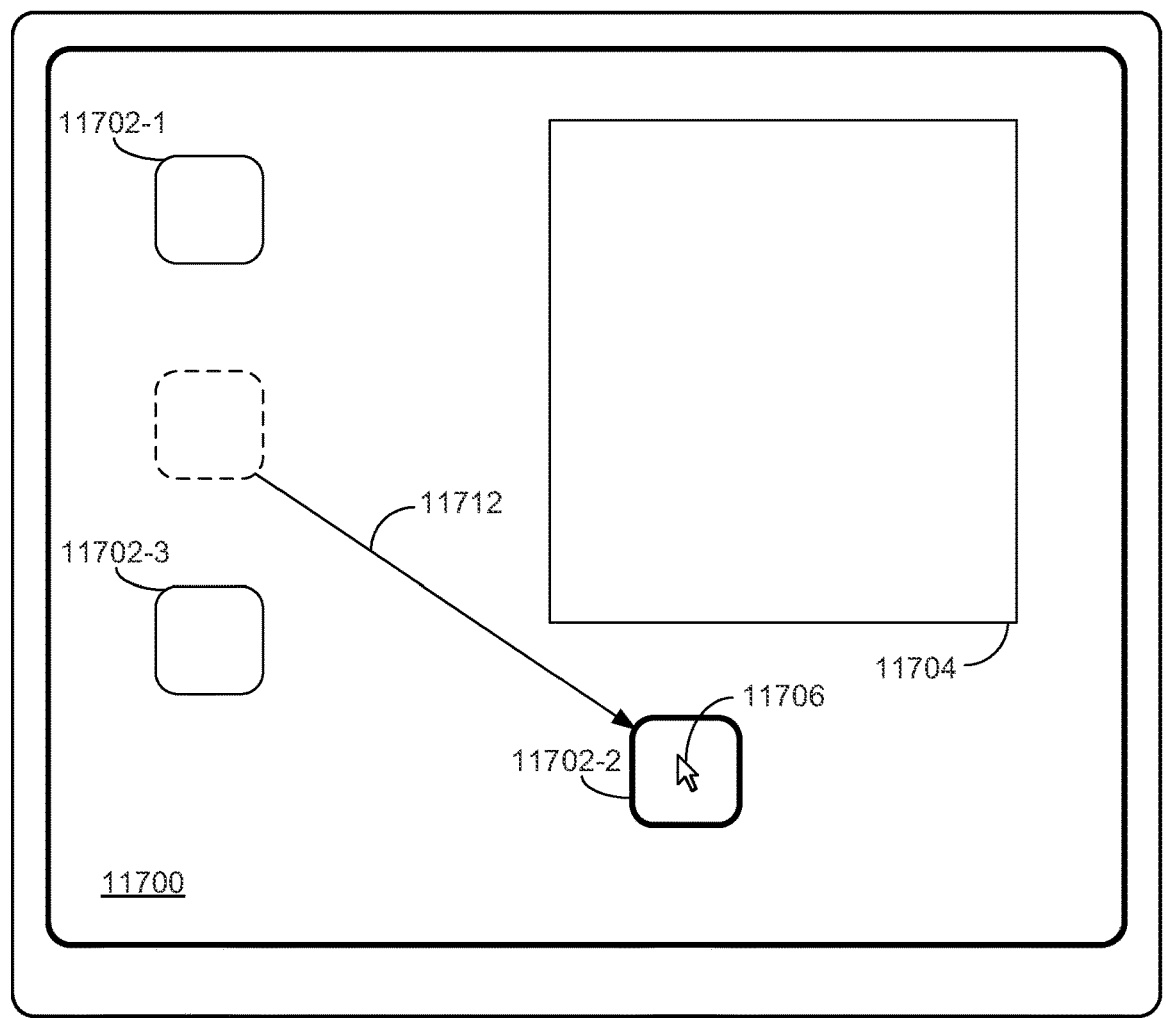
Figure 5D:
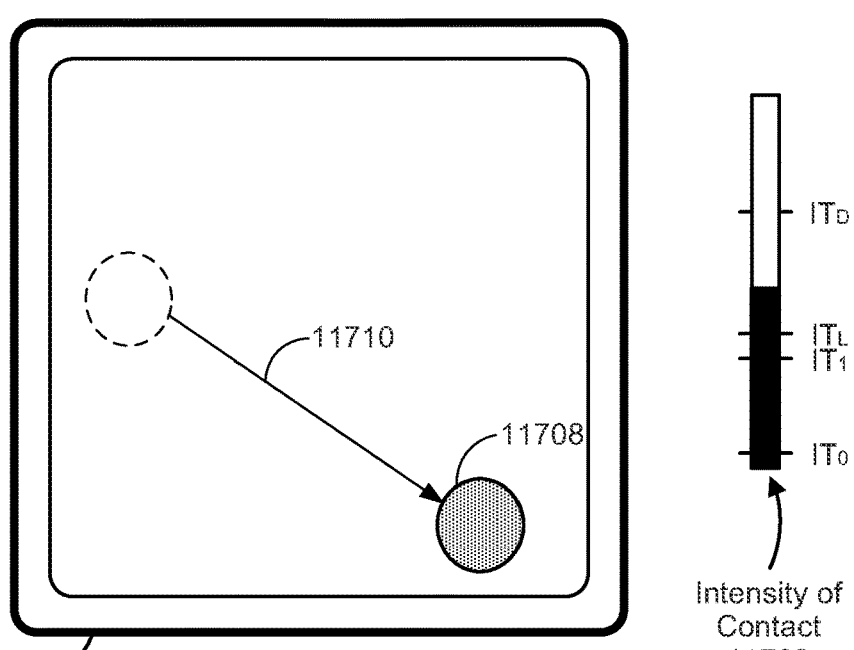
Figure 5E:
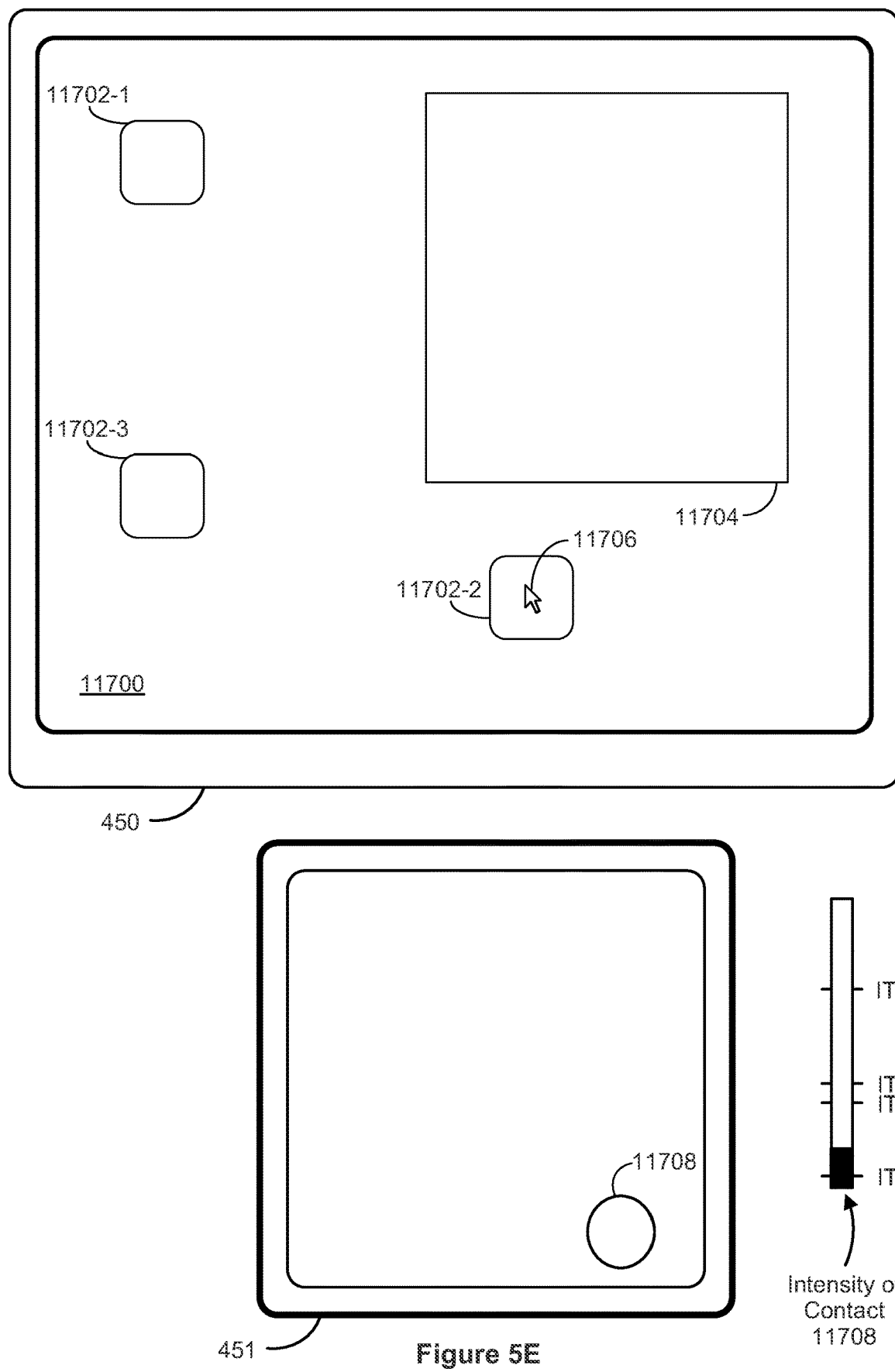
Figure 5F:
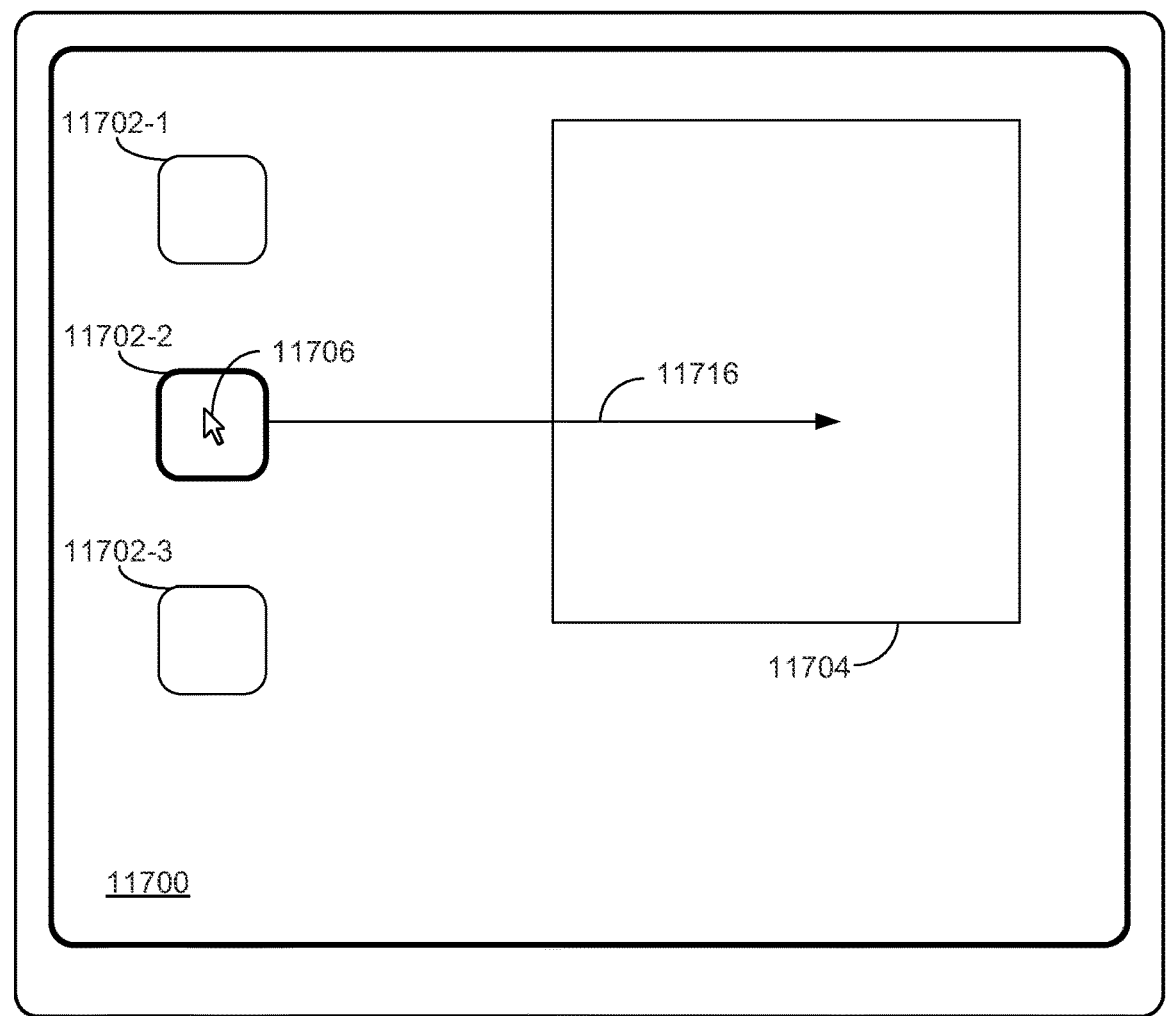
Figure 5F:
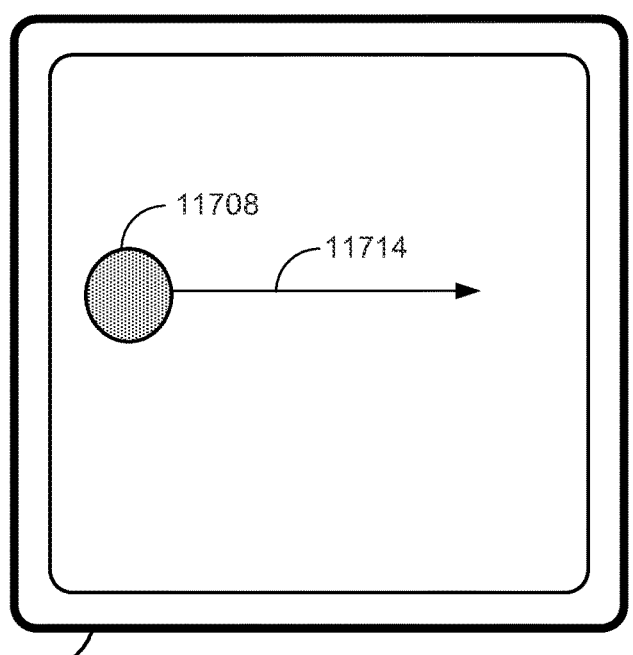
Figure 5F:
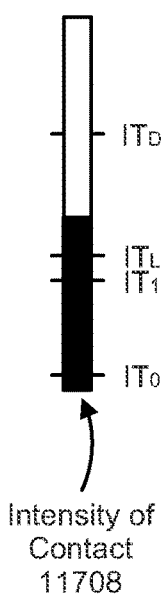
Figure 5G:
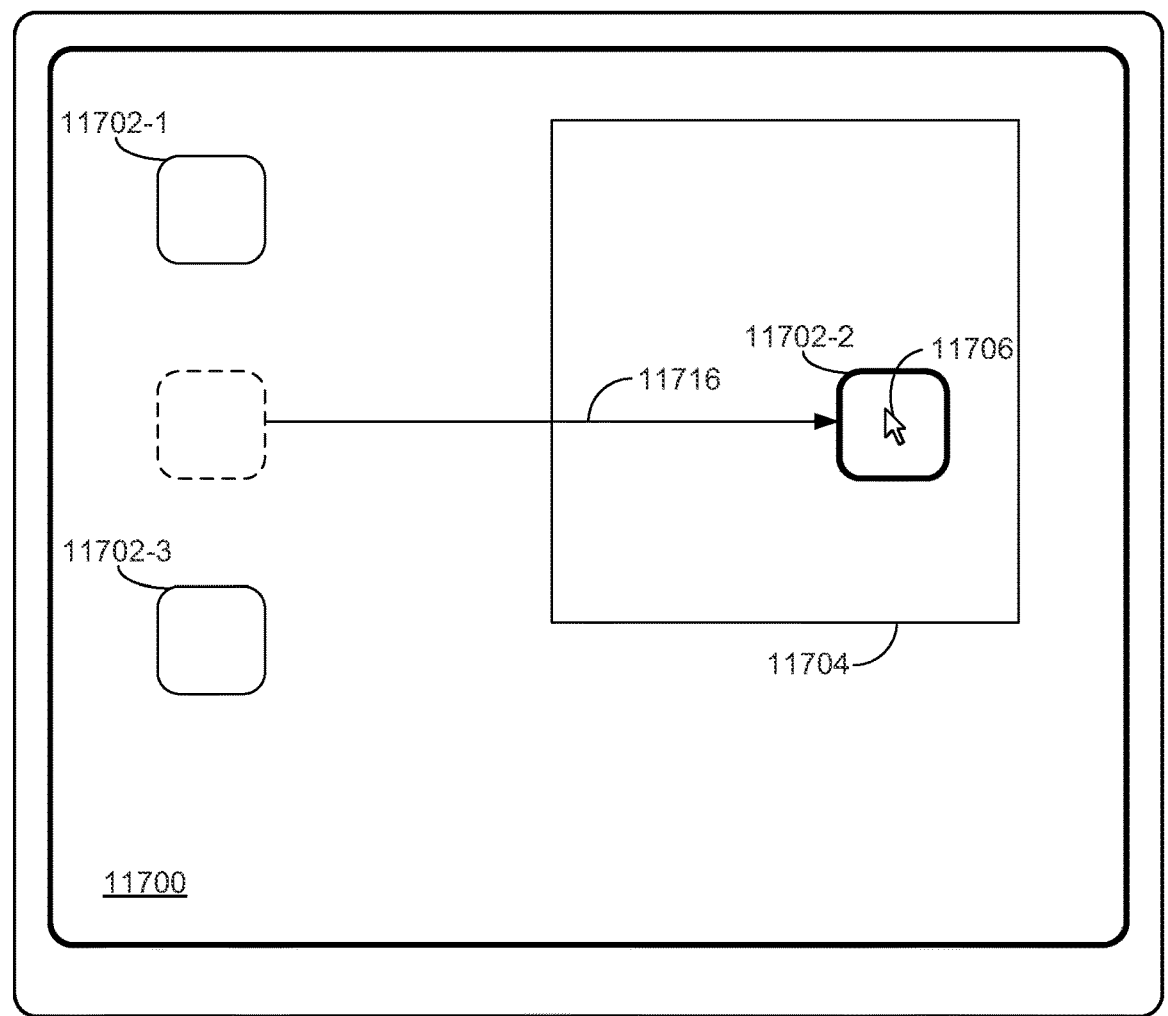
Figure 5G:
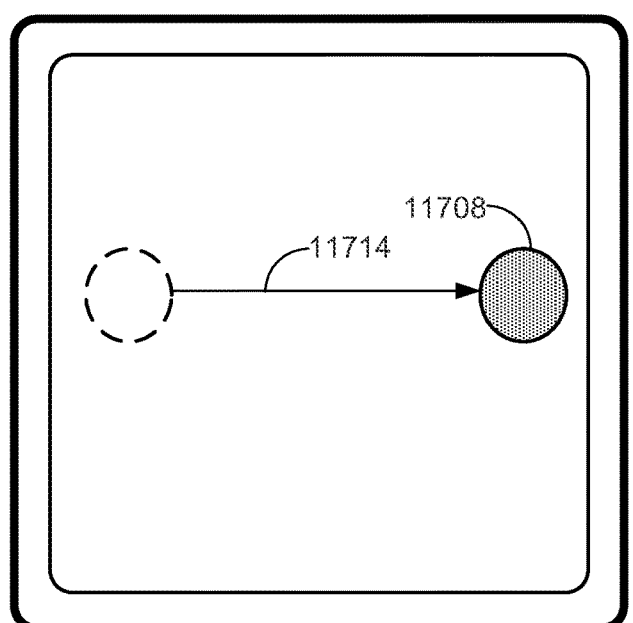
Figure 5H:
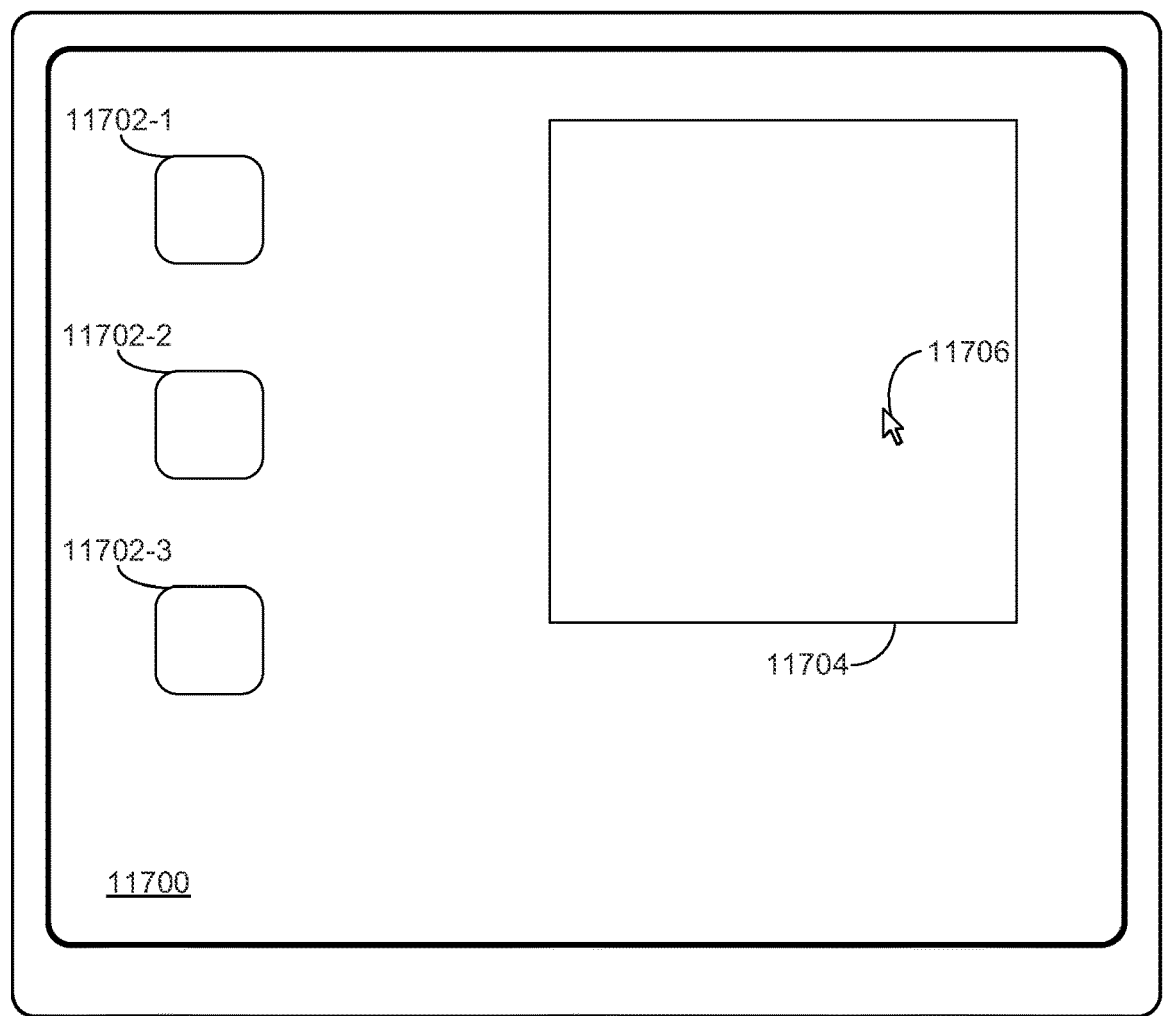
Figure 5H:
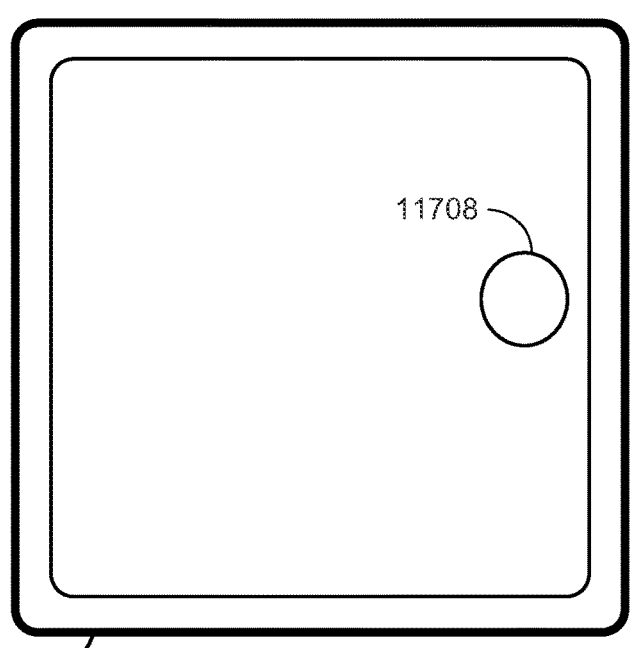
Figure 5H:
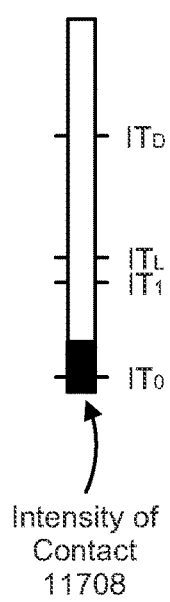
Figure 5I:
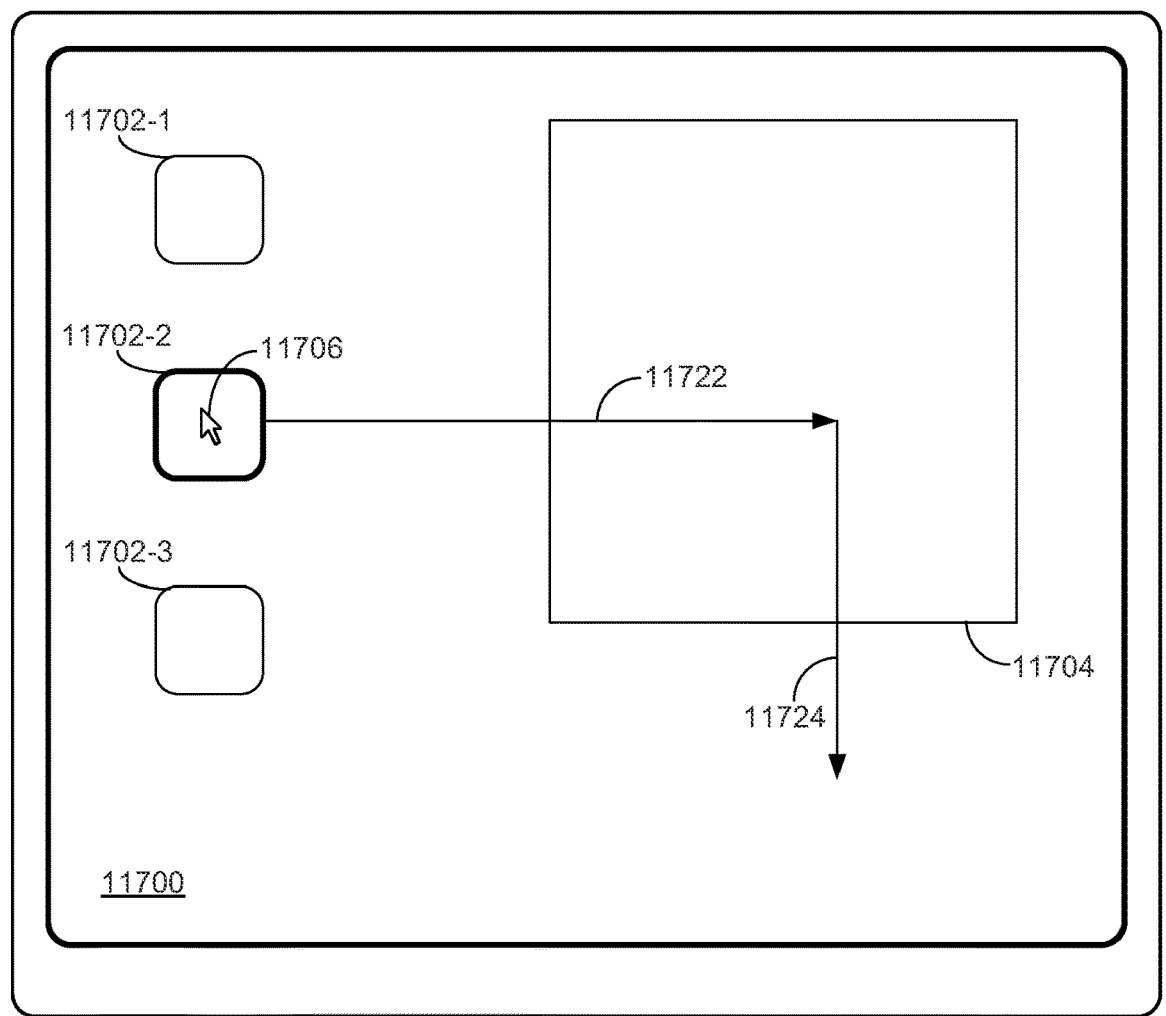
Figure 5I:
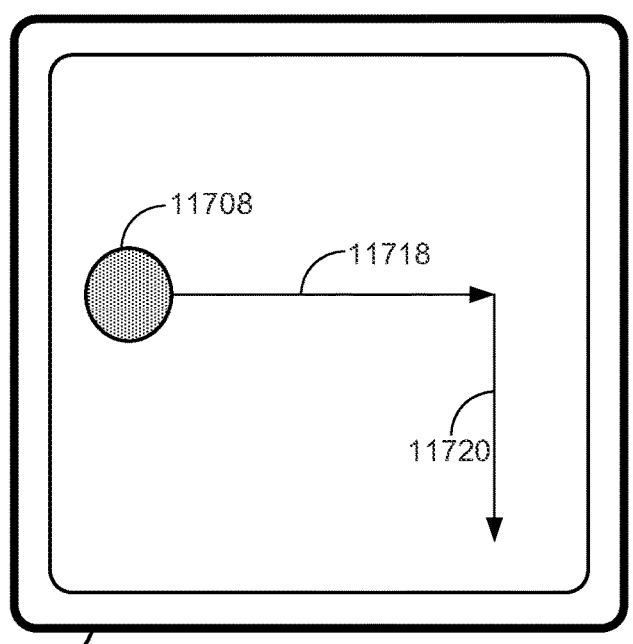
Figure 5I:
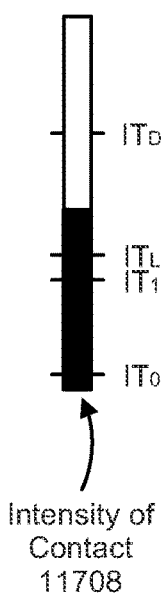
Figure 5J:
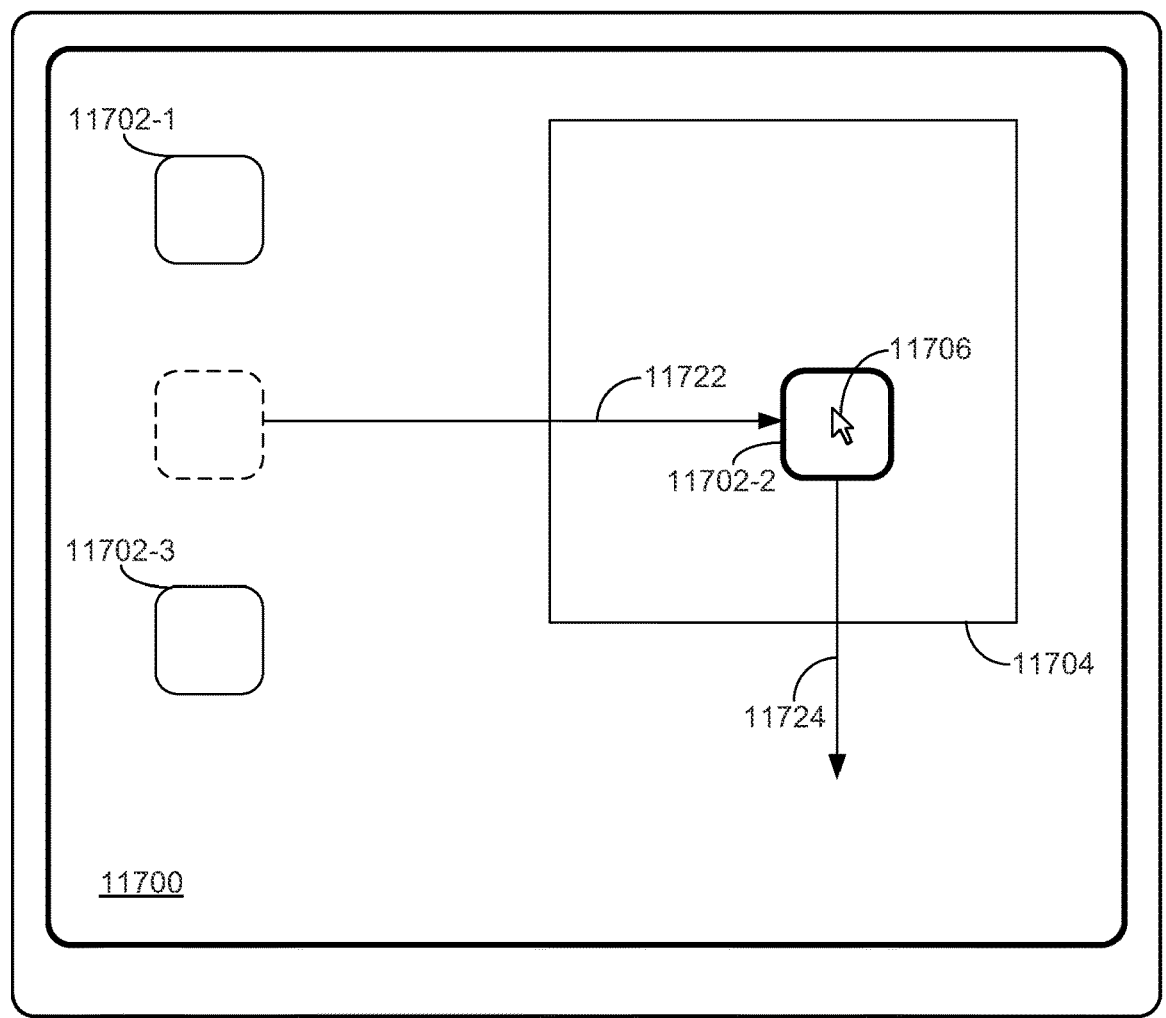
Figure 5J:
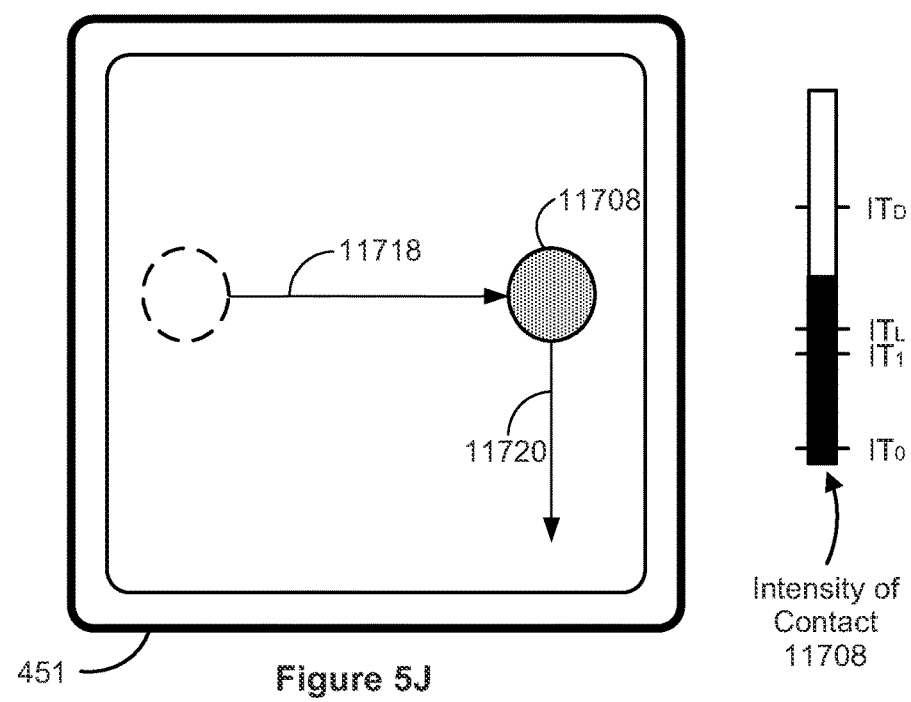
Figure 5K:
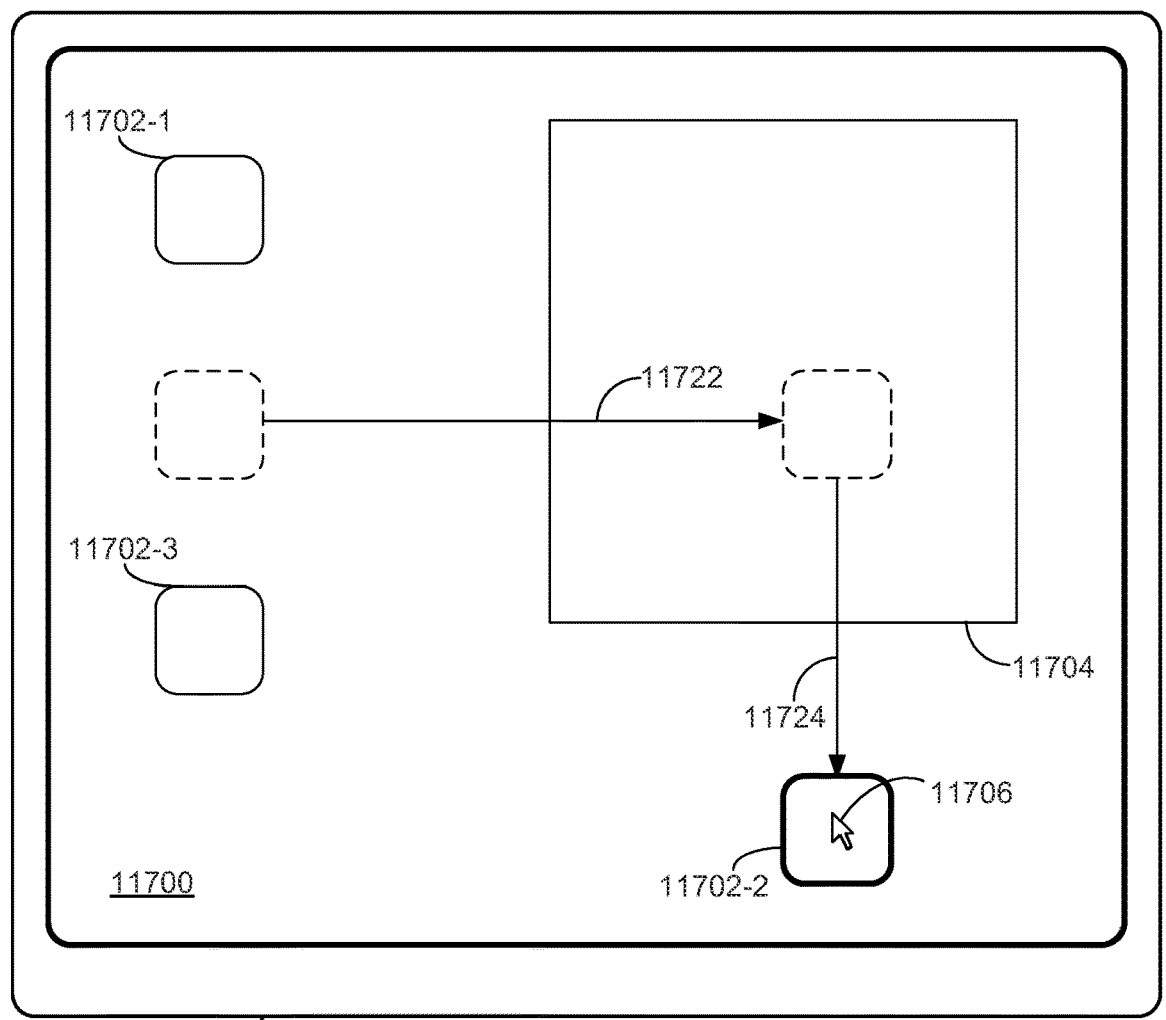
Figure 5K:
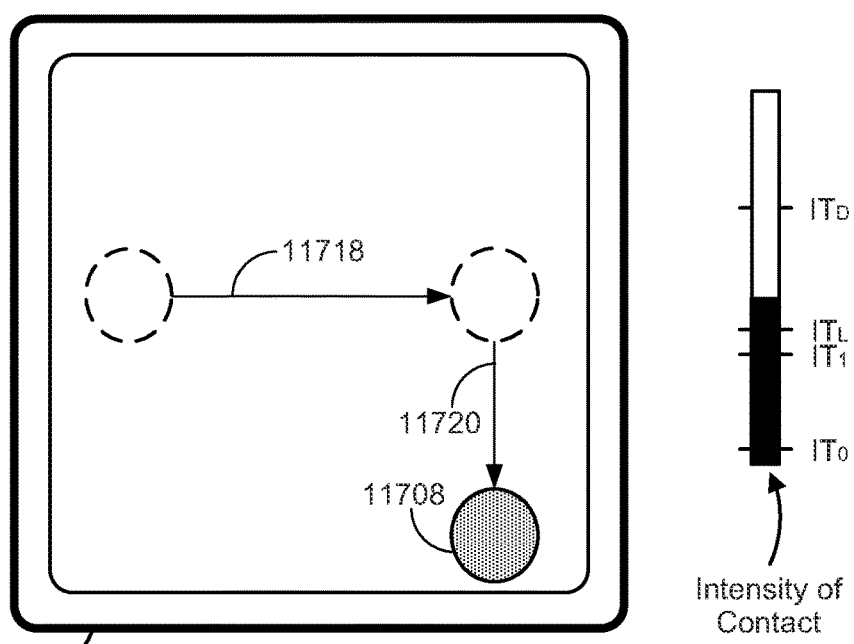

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have graphical user interfaces including one or more user interface objects. When users attempt to perform operations associated with these user interface objects, these operations are sometimes successful and sometimes unsuccessful. For example, in some circumstances, moving a user interface object to a disallowed portion of the user interface will be unsuccessful, whereas moving the same user interface object to an allowed portion of the user interface will be successful. One approach to indicating whether an operation was successful or unsuccessful is providing visual feedback indicative of the successful performance of an operation. However, visual feedback can easily be missed by a user, thereby leaving the user confused as to whether or not the operation has been performed. The embodiments described below improve on these methods by providing additional cues to the user, including tactile outputs, to indicate whether or not an operation was successful, thereby providing a more convenient and efficient user interface. In particular, FIGS. 5A-5W illustrate exemplary user interfaces for relocating a user interface object in accordance with some embodiments. FIGS. 6A-6B are flow diagrams illustrating a method of selecting a tactile output corresponding to a change in intensity of a contact in accordance with some embodiments. The user interfaces in FIGS. 5A-5W are used to illustrate the processes described below, including the processes in FIGS. 6A-6B.

Figure 8A:
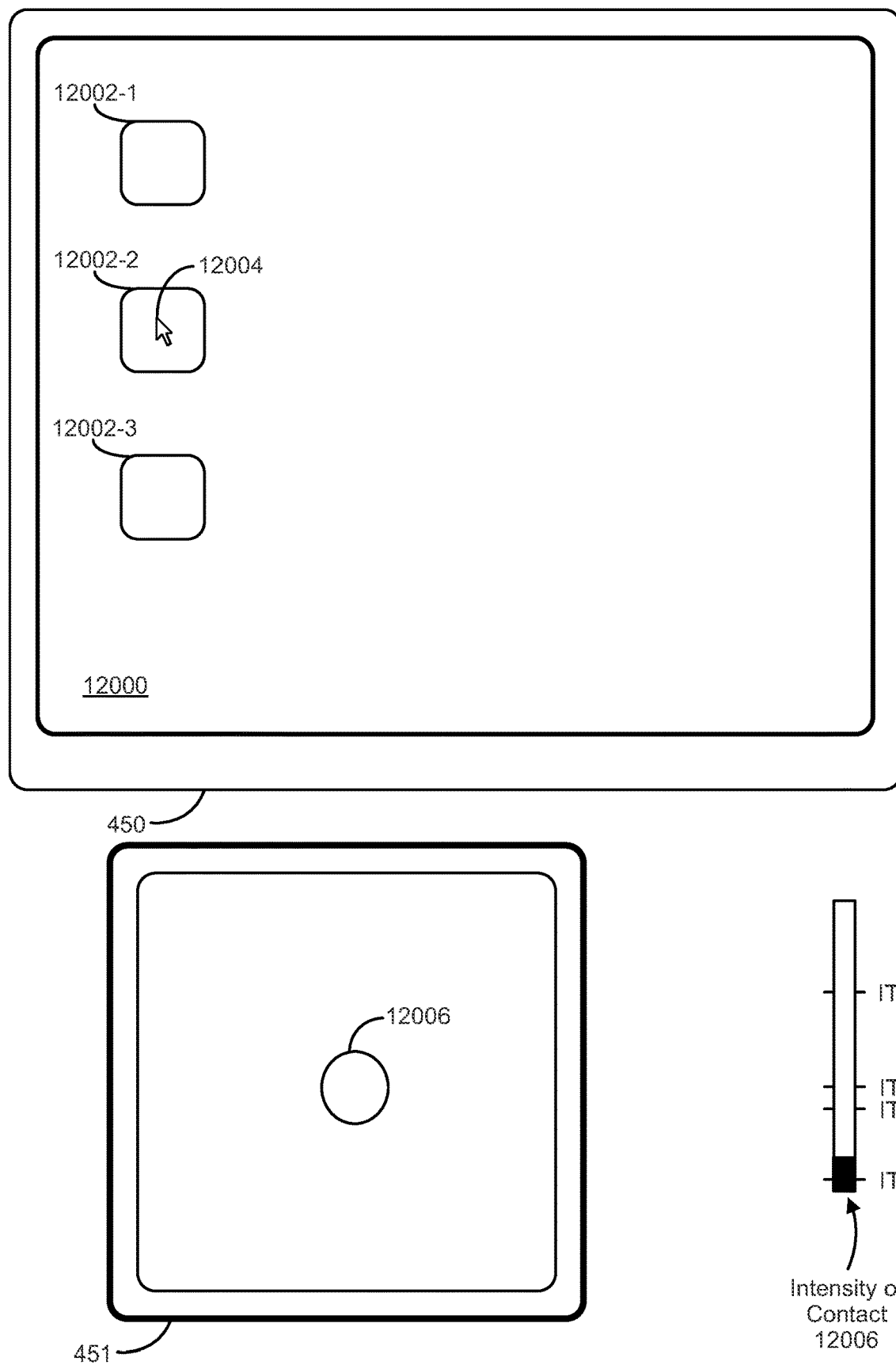
FIGS. 8A-8V illustrate exemplary user interfaces for providing feedback corresponding to modifier inputs in accordance with some embodiments.

Many electronic devices include a mouse or similar input device that provides left-click functionality and right-click functionality for activating different operations. As devices economize on the number of buttons and input devices, the left-click functionality and right-click functionality is, optionally, invoked using one input device, such as a trackpad. In some methods, when either functionality is invoked using the one input device, the user is not given sufficient feedback indicating whether the activated operation was an operation not associated with a modifier input (e.g., a left-click operation) or an operation associated with a modifier input (e.g., a right-click operation). The embodiments below improve on the these methods by providing different tactile output when device detects an input while a modifier input is detected than when the device detects a similar input while a modifier input is not detected, thereby providing a more convenient and efficient user interface. In particular, FIGS. 8A-8V illustrate exemplary user interfaces for providing feedback corresponding to modifier inputs. FIGS. 9A-9B are flow diagrams illustrating a method of providing feedback corresponding to modifier inputs. The user interfaces in FIGS. 8A-8V are used to illustrate the processes in FIGS. 9A-9B.

Figure 11A:
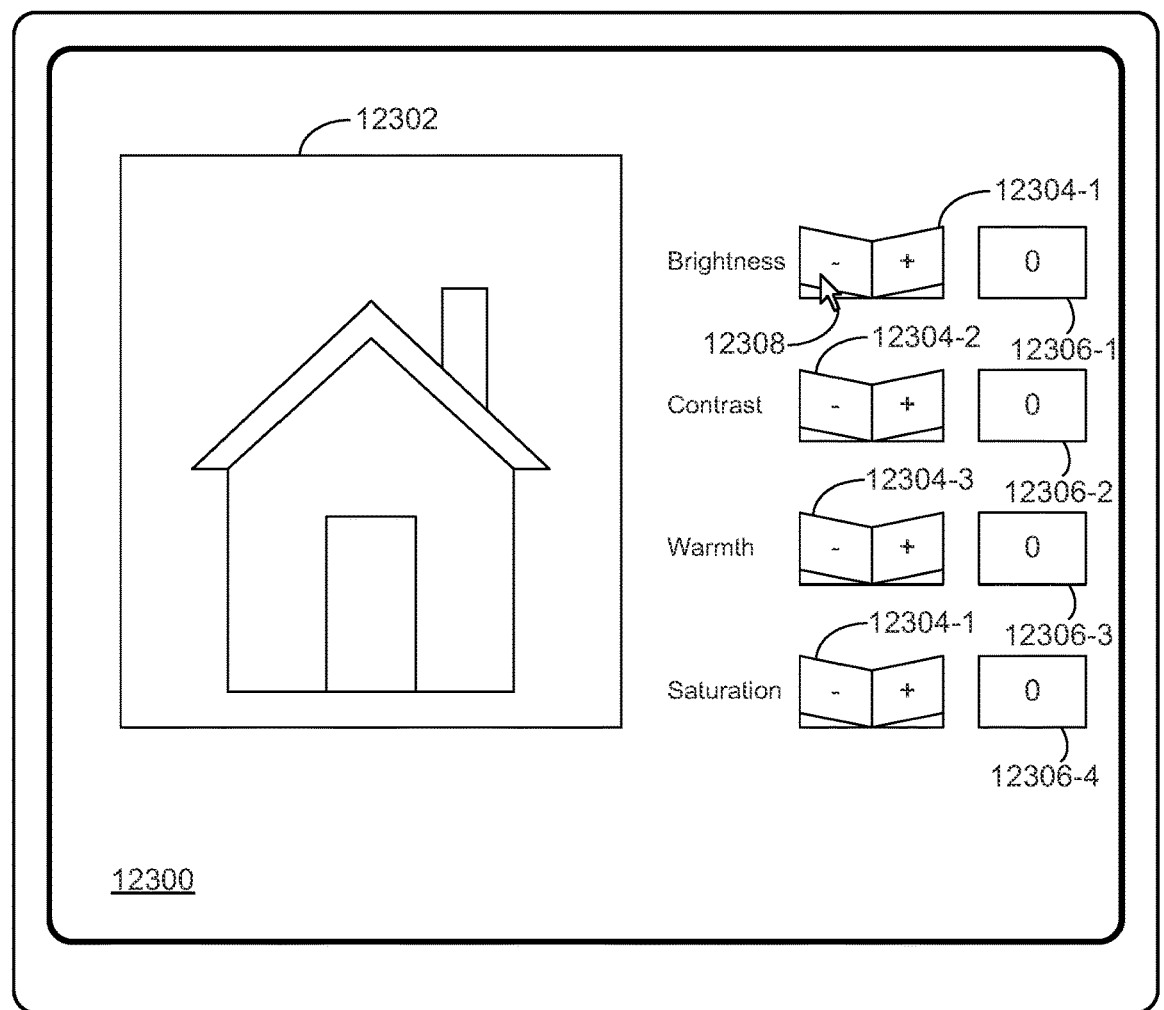
FIGS. 11A-11N illustrate exemplary user interfaces for providing feedback for changing activation states of a user interface object in accordance with some embodiments.
Figure 11A:
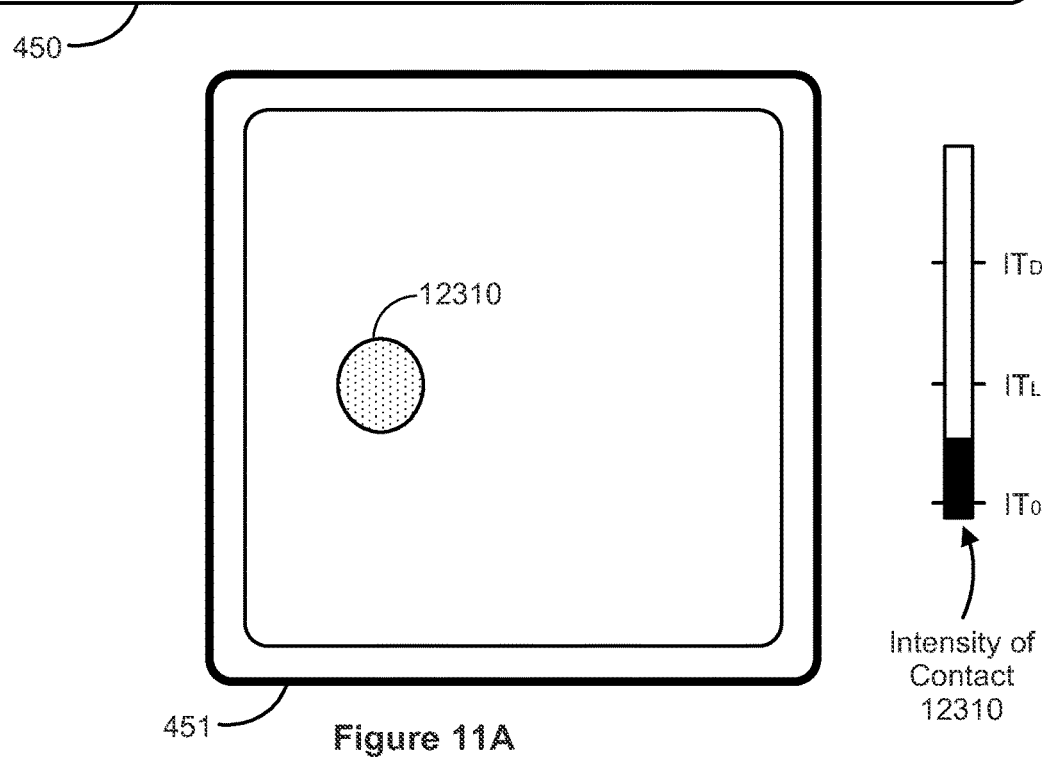
Figure 11B:
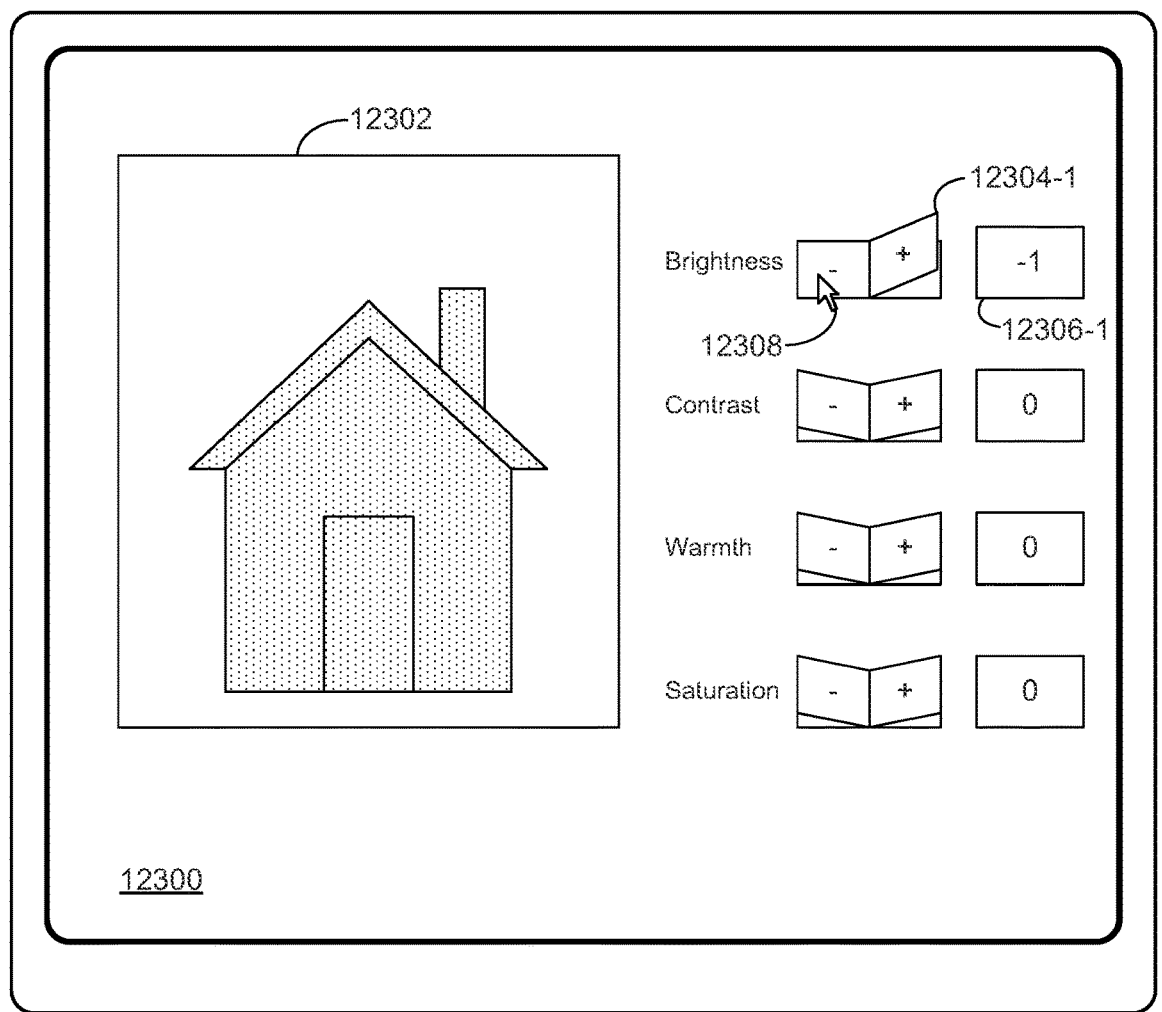
Figure 11B:
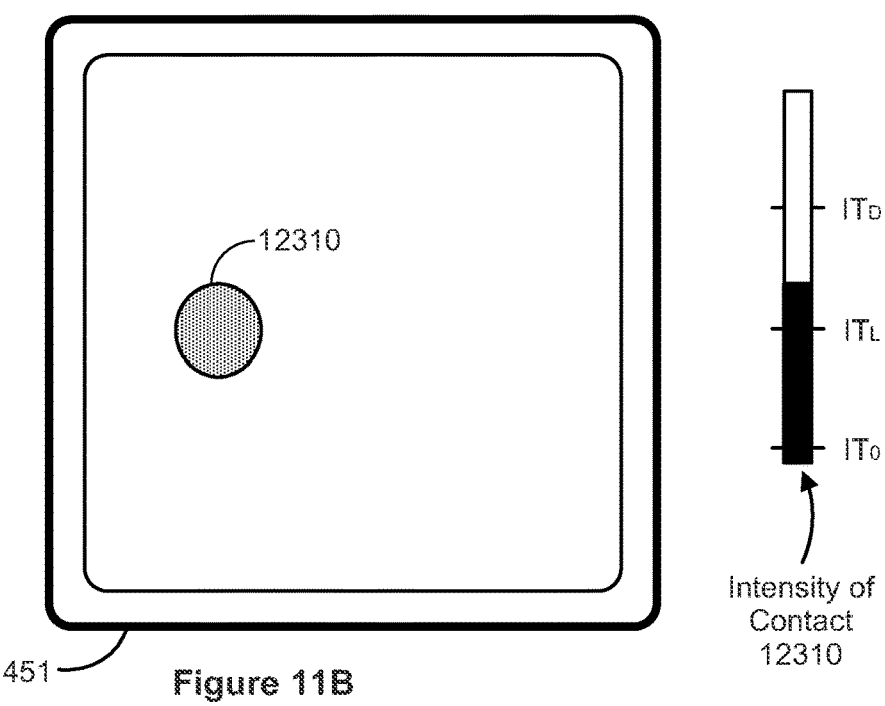
Figure 11C:
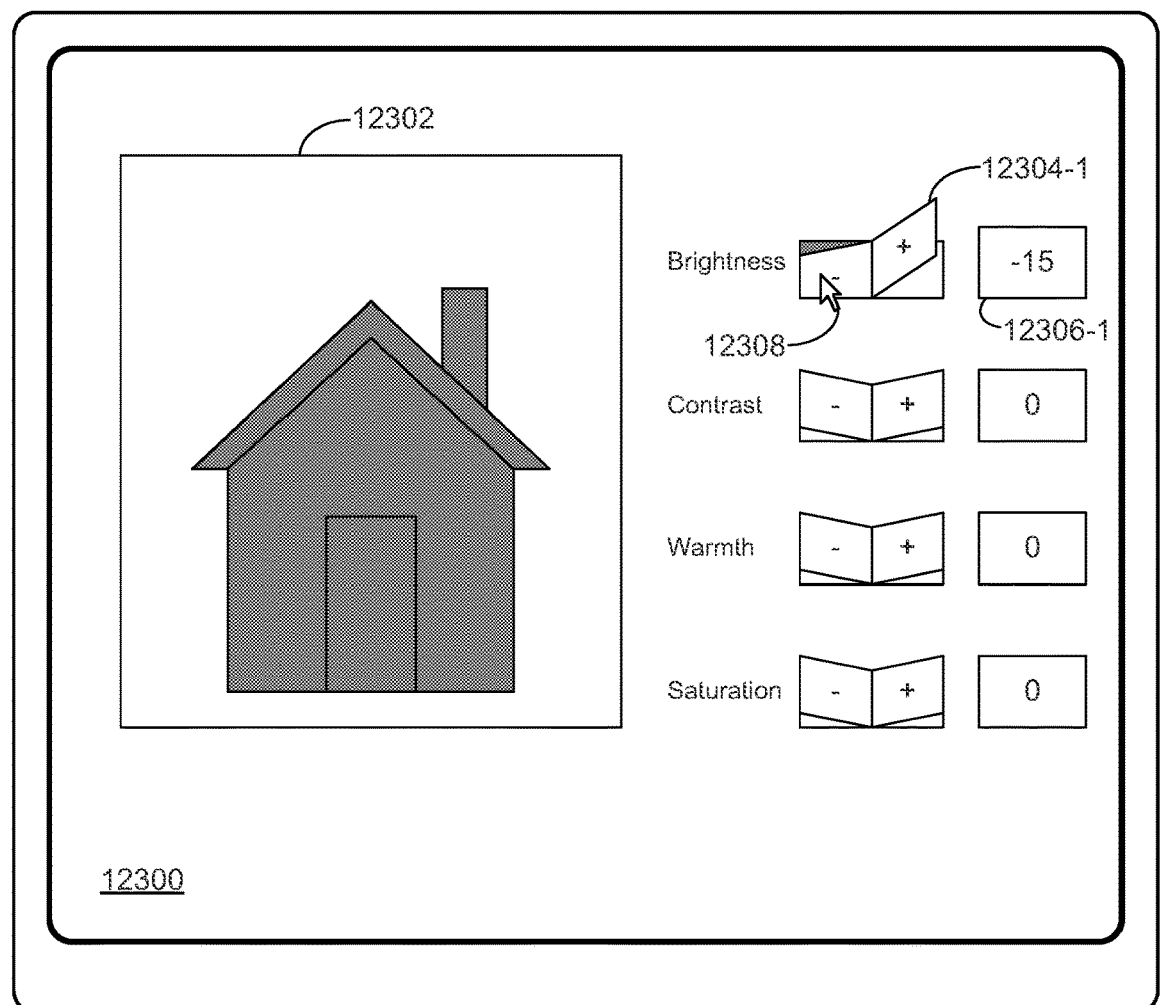
Figure 11C:
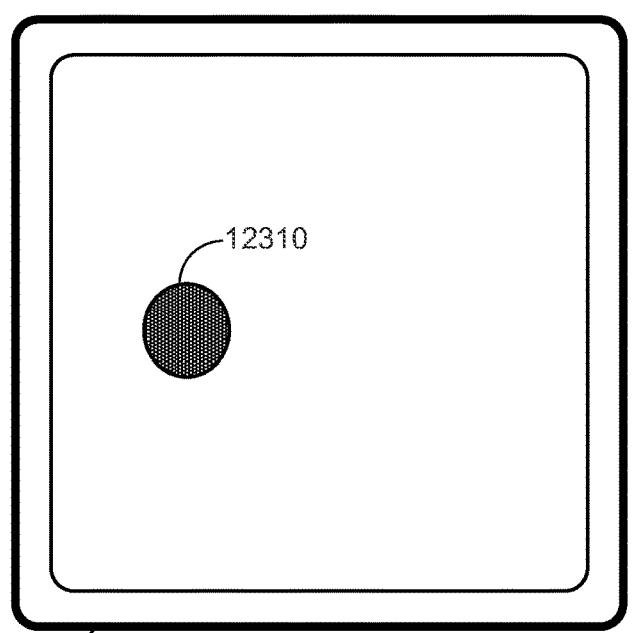
Figure 11D:
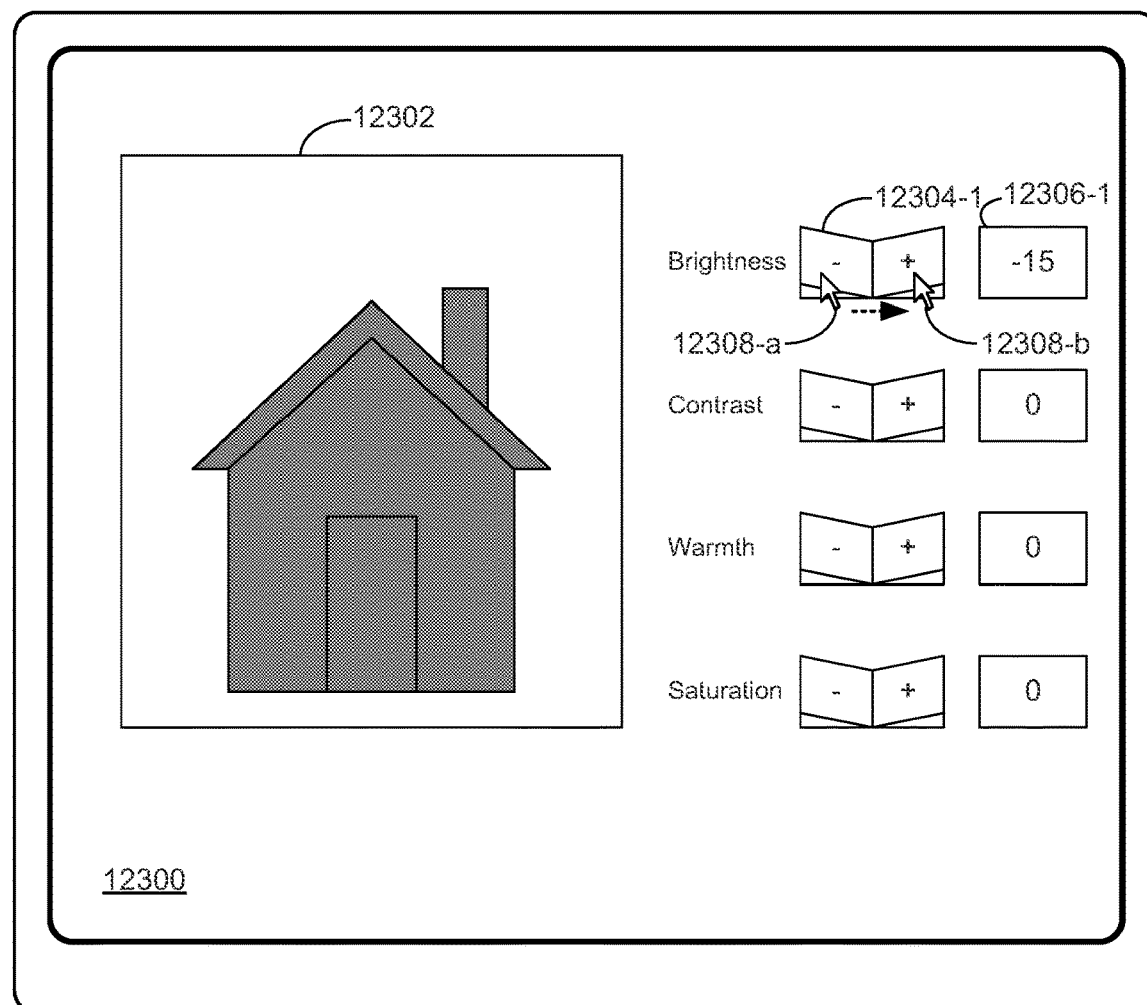
Figure 11D:
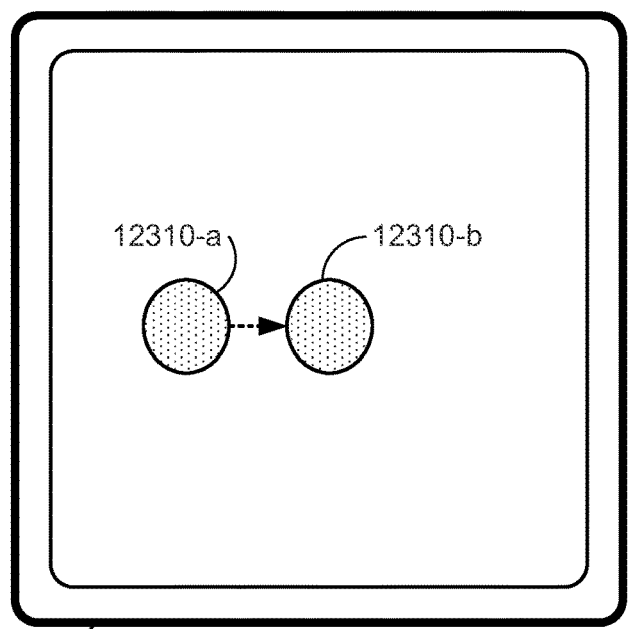
Figure 11E:
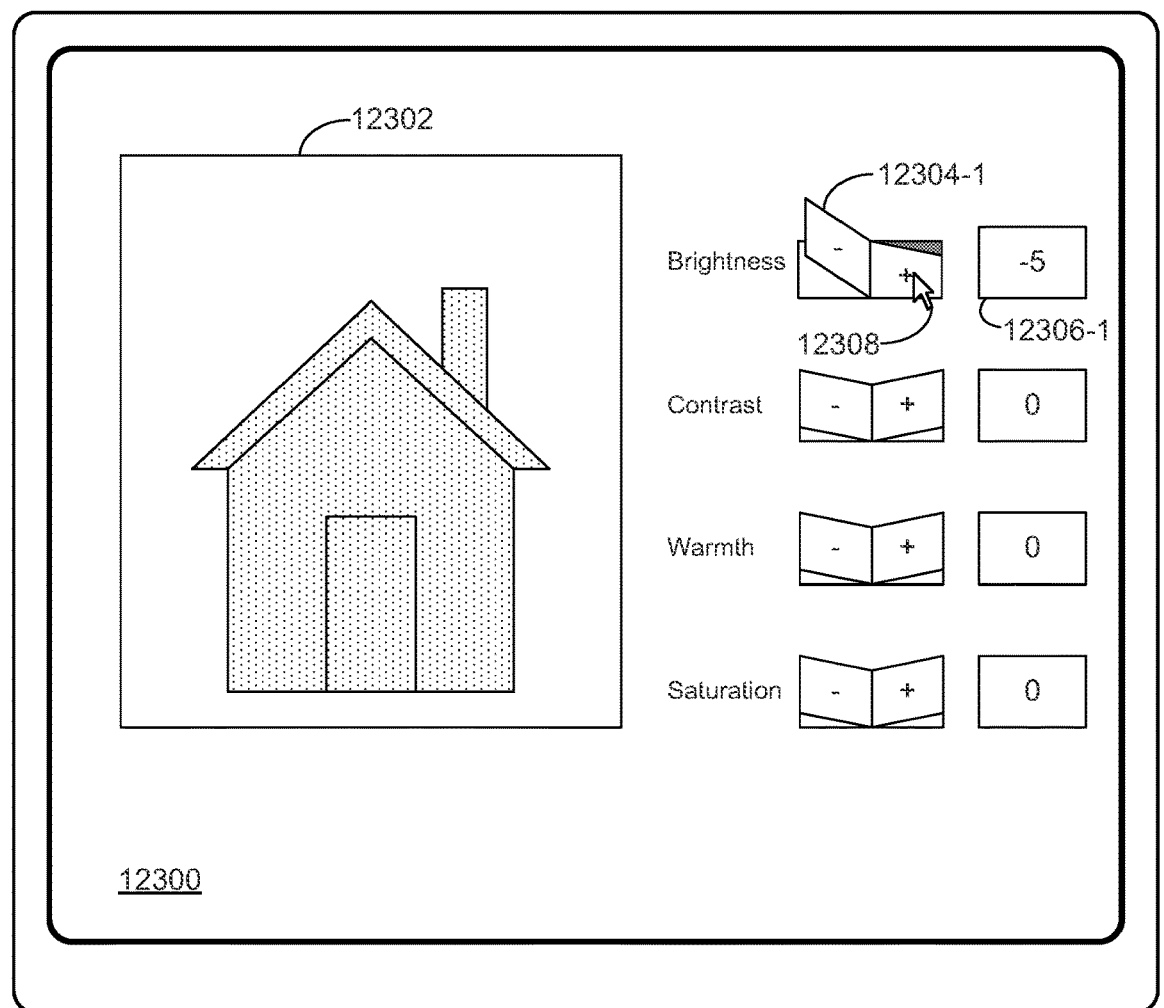
Figure 11E:
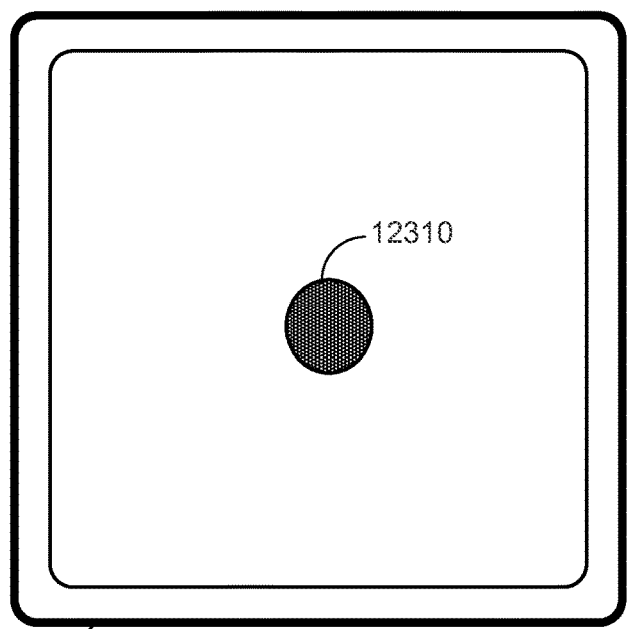

Many electronic devices have graphical user interfaces that include user interface objects, such as virtual buttons and switches. In some circumstances, a user activates a user interface object to perform an operation or adjust a parameter or property. One approach to indicating an activation state of a user interface object is to mimic the behavior of a corresponding physical object. However, physical objects, such as real buttons and switches, will, in some circumstances provide excessive tactile feedback in some circumstances, and too little feedback in others. The embodiments described below provide tactile feedback that corresponds to changes in activation states of a virtual button, switch or other user interface object rather than tactile feedback that corresponds 1:1 to tactile sensations that would be felt by a user when using a physical control to perform similar operations, thereby providing a more convenient and intuitive user interface. In particular, FIGS. 11A-11N illustrate exemplary user interfaces for providing feedback for changing activation states of a user interface object. FIGS. 12A-12B are flow diagrams illustrating a method of providing feedback for changing activation states of a user interface object. The user interfaces in FIGS. 11A-11N are used to illustrate the processes in FIGS. 12A-12B.

Figure 14A:
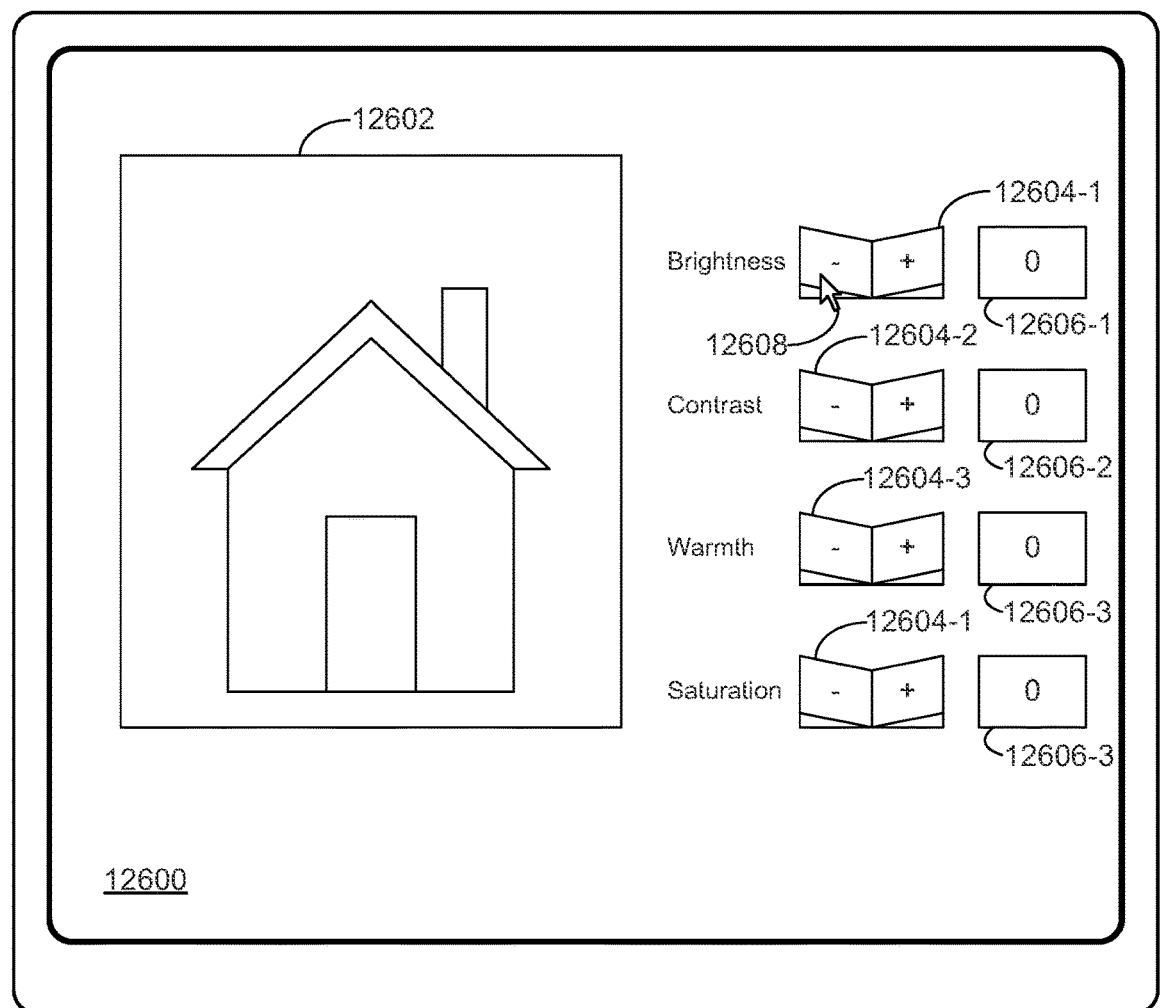
FIGS. 14A-14N illustrate exemplary user interfaces for providing feedback for changing activation states of a user interface object in accordance with some embodiments.
Figure 14A:
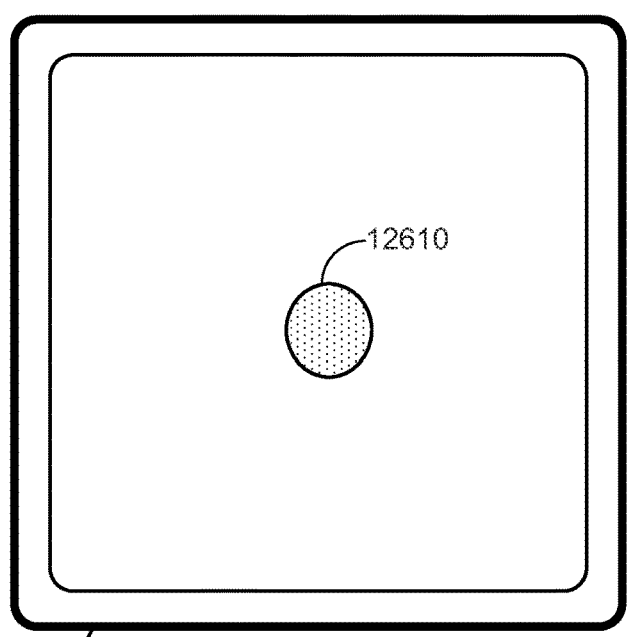
Figure 14B:
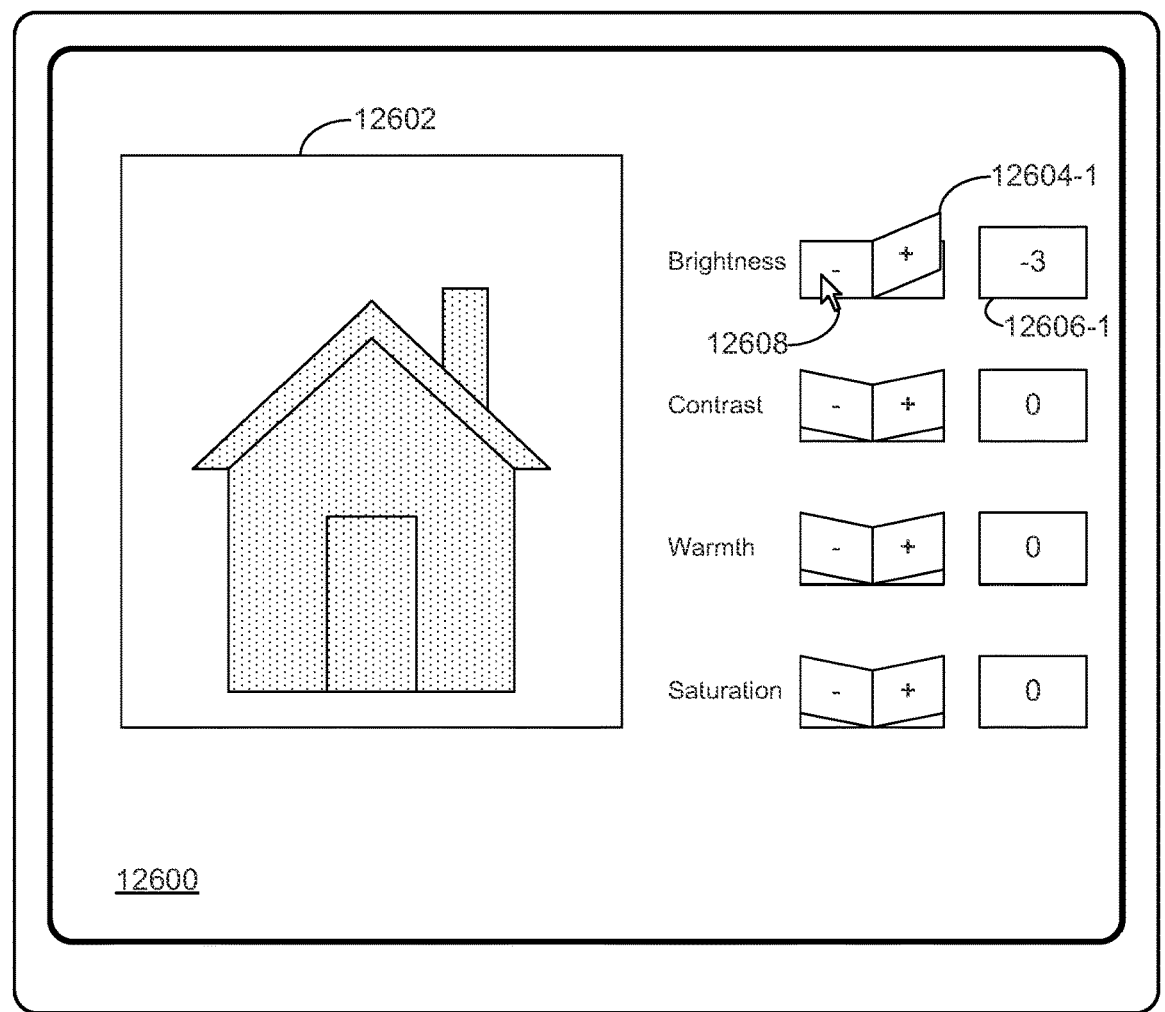
Figure 14B:
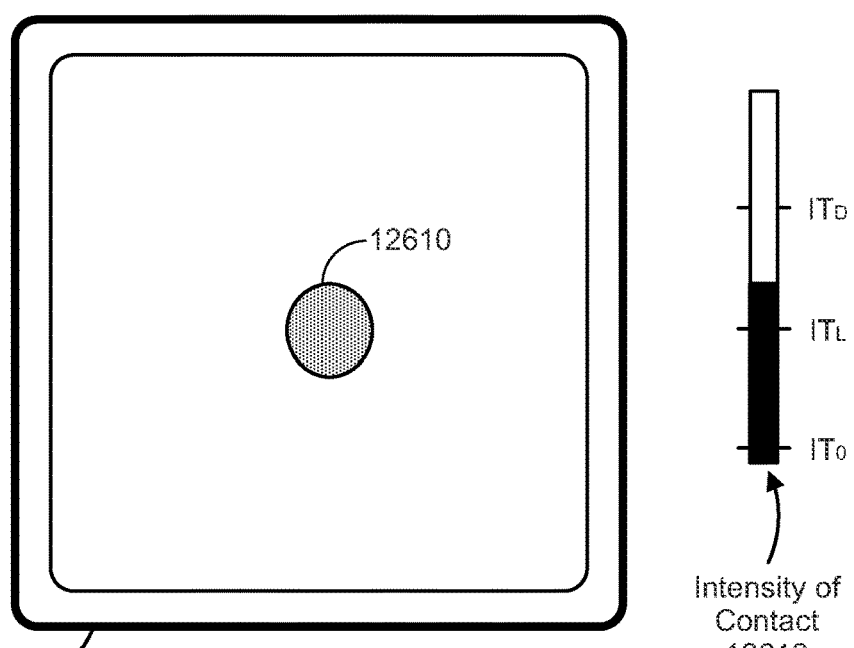
Figure 14C:
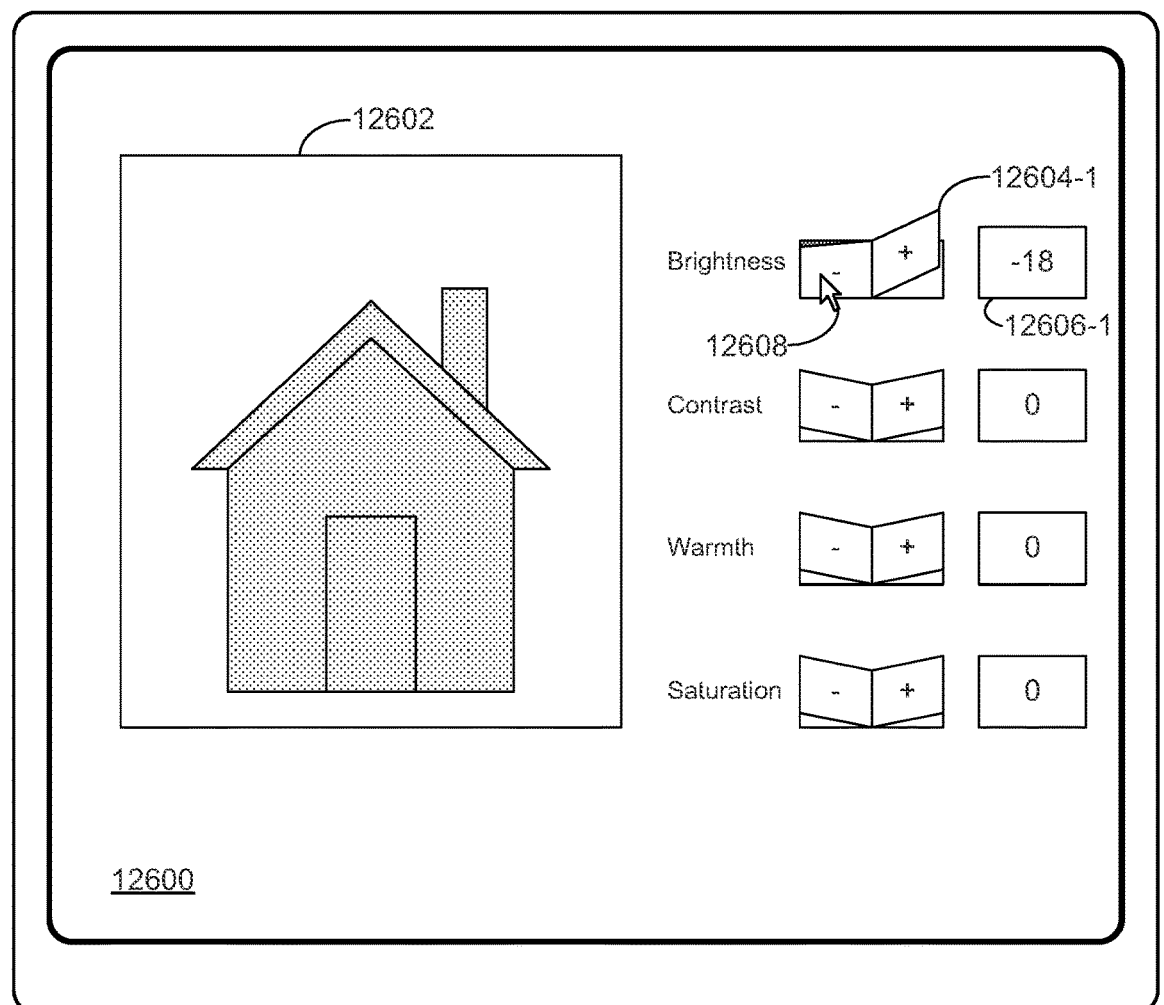
Figure 14C:
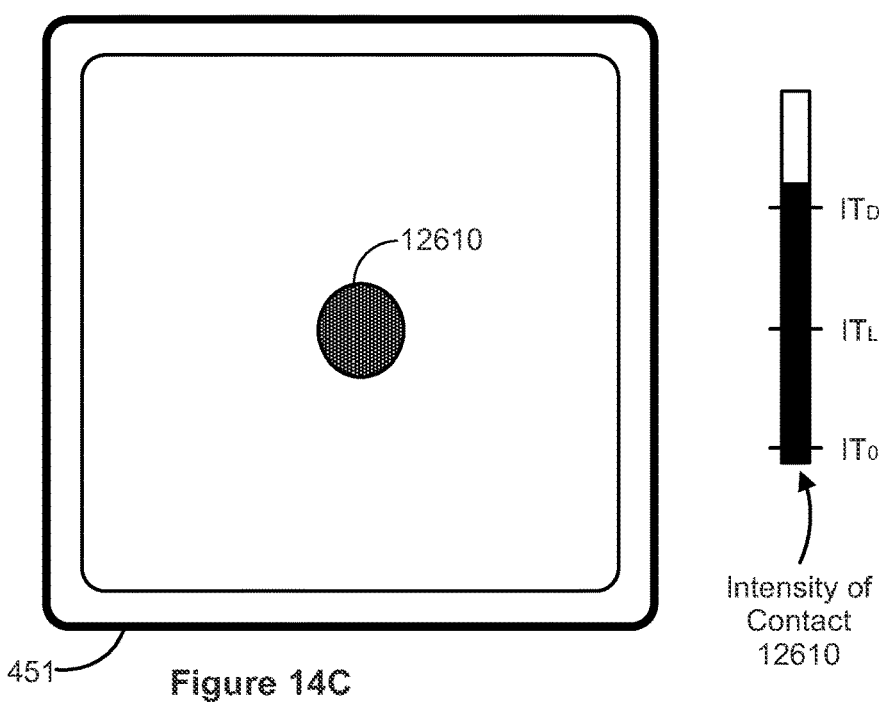
Figure 14D:
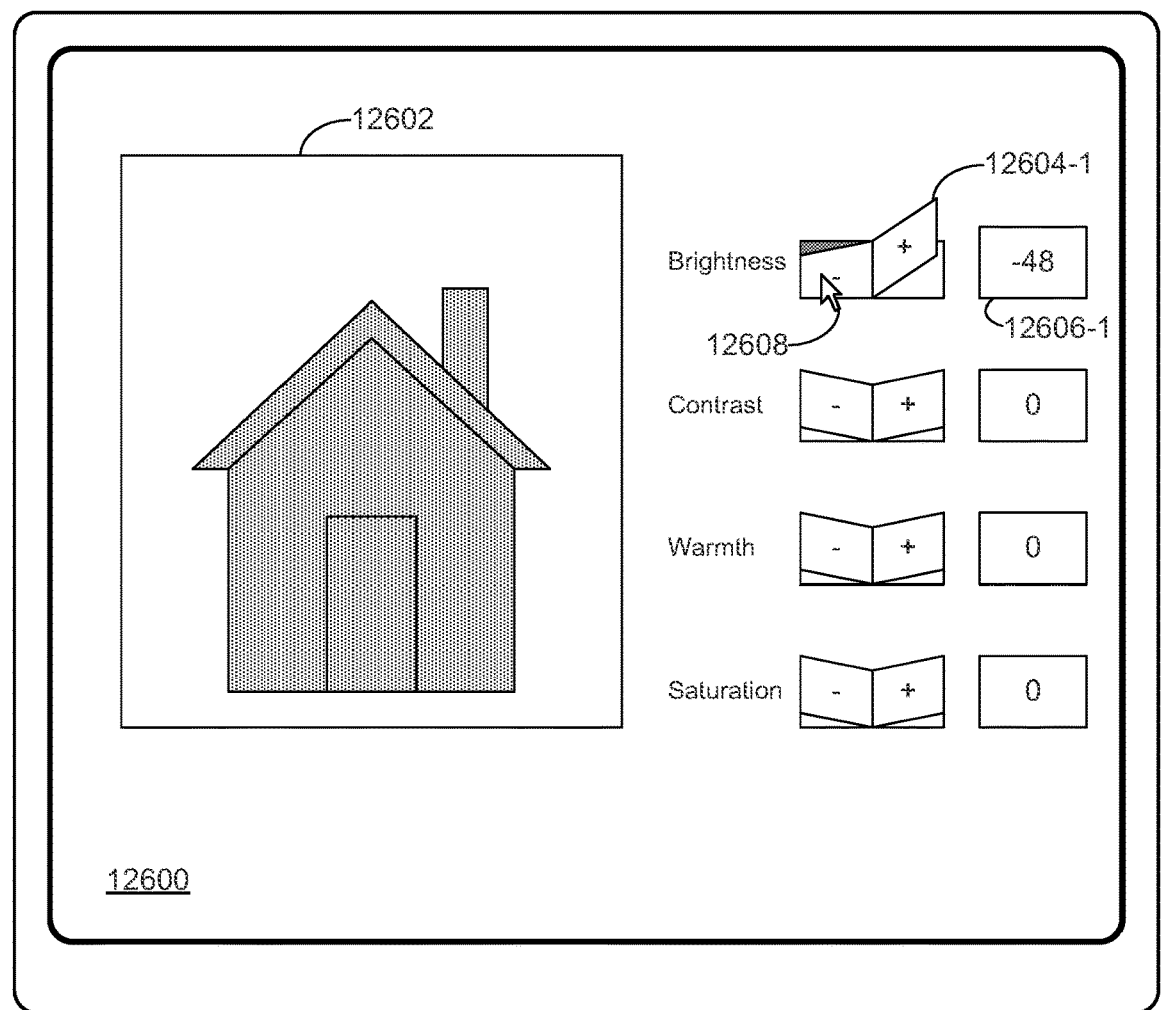
Figure 14D:
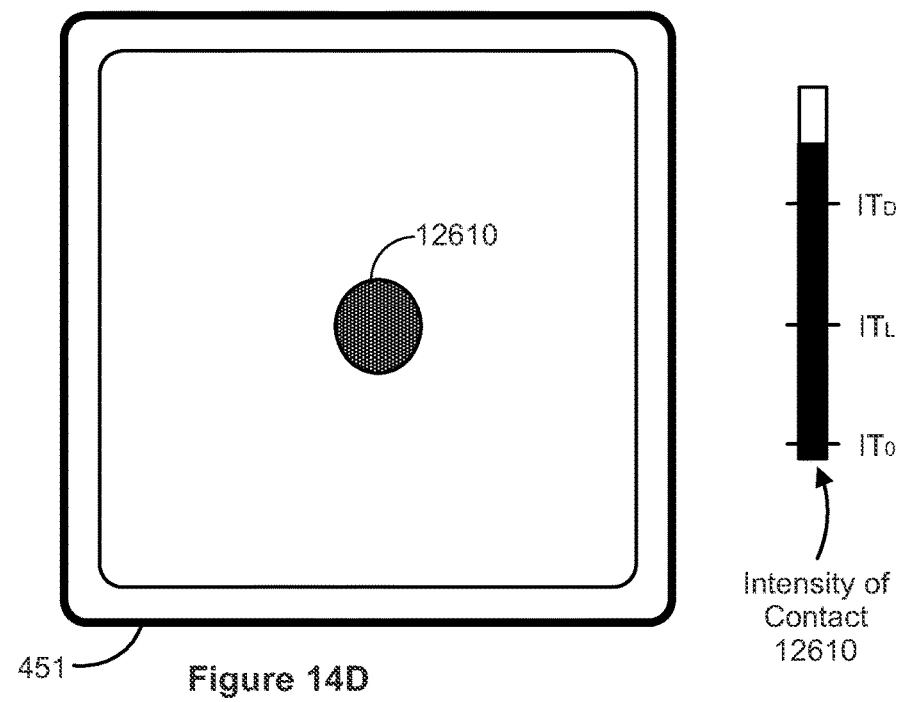
Figure 14E:
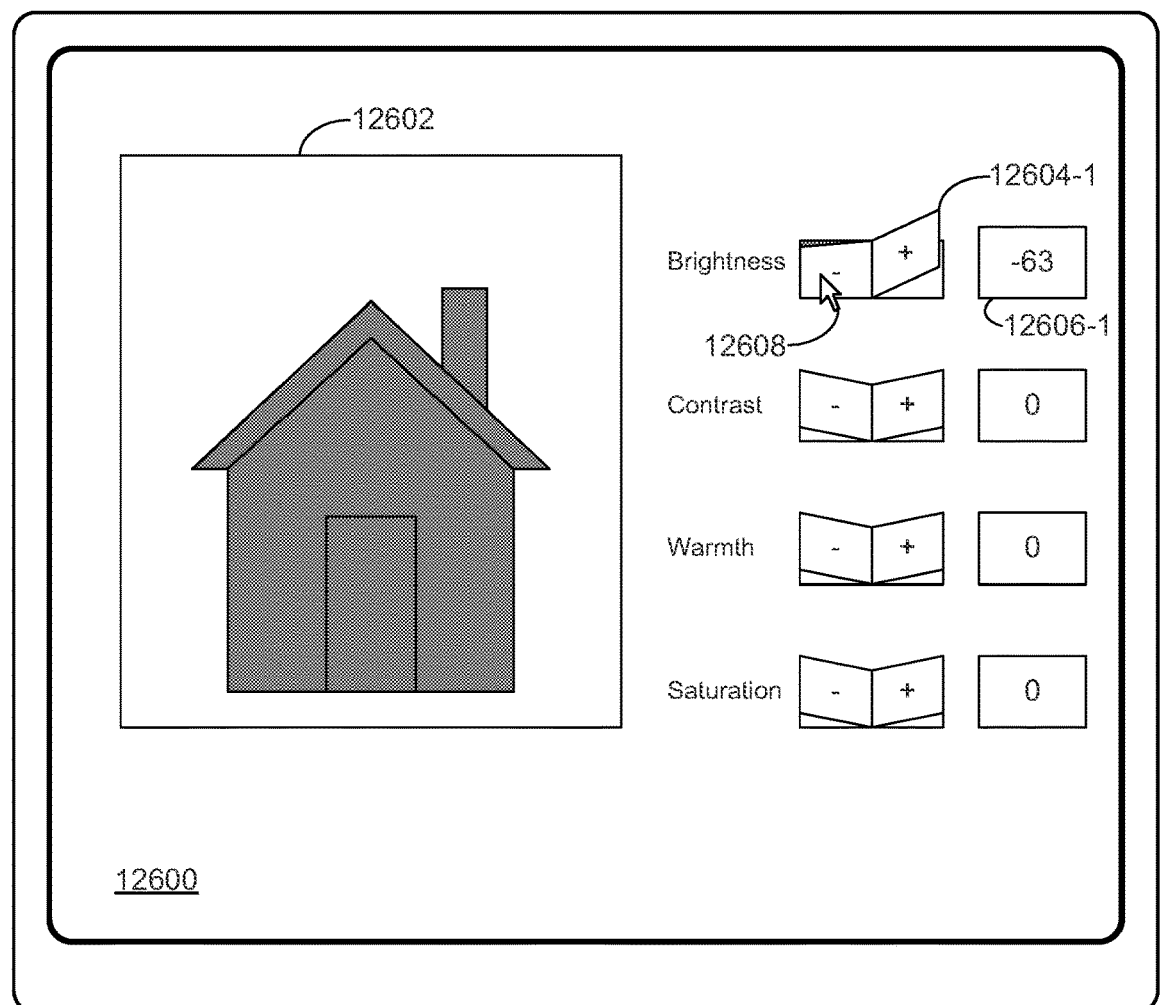
Figure 14E:
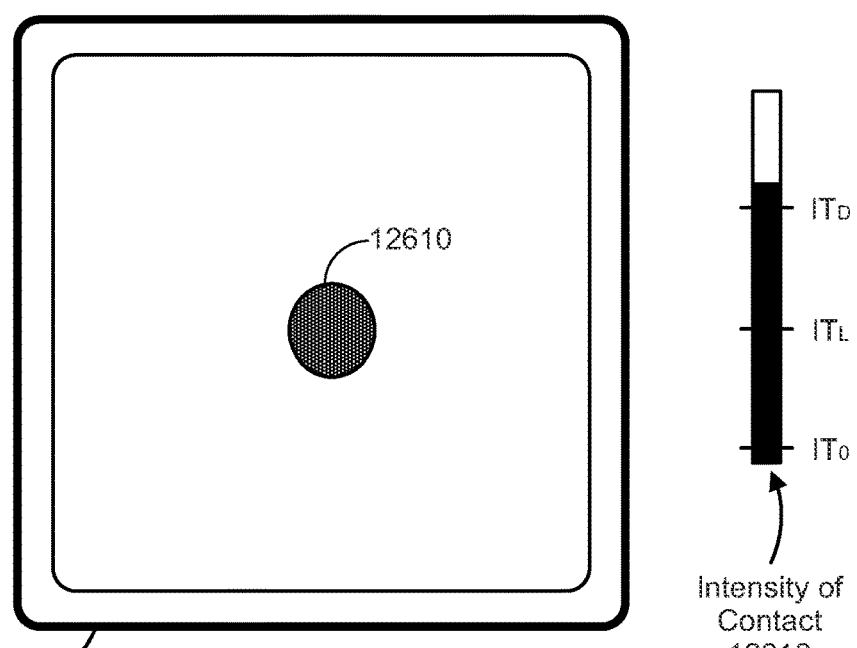
Figure 14F:
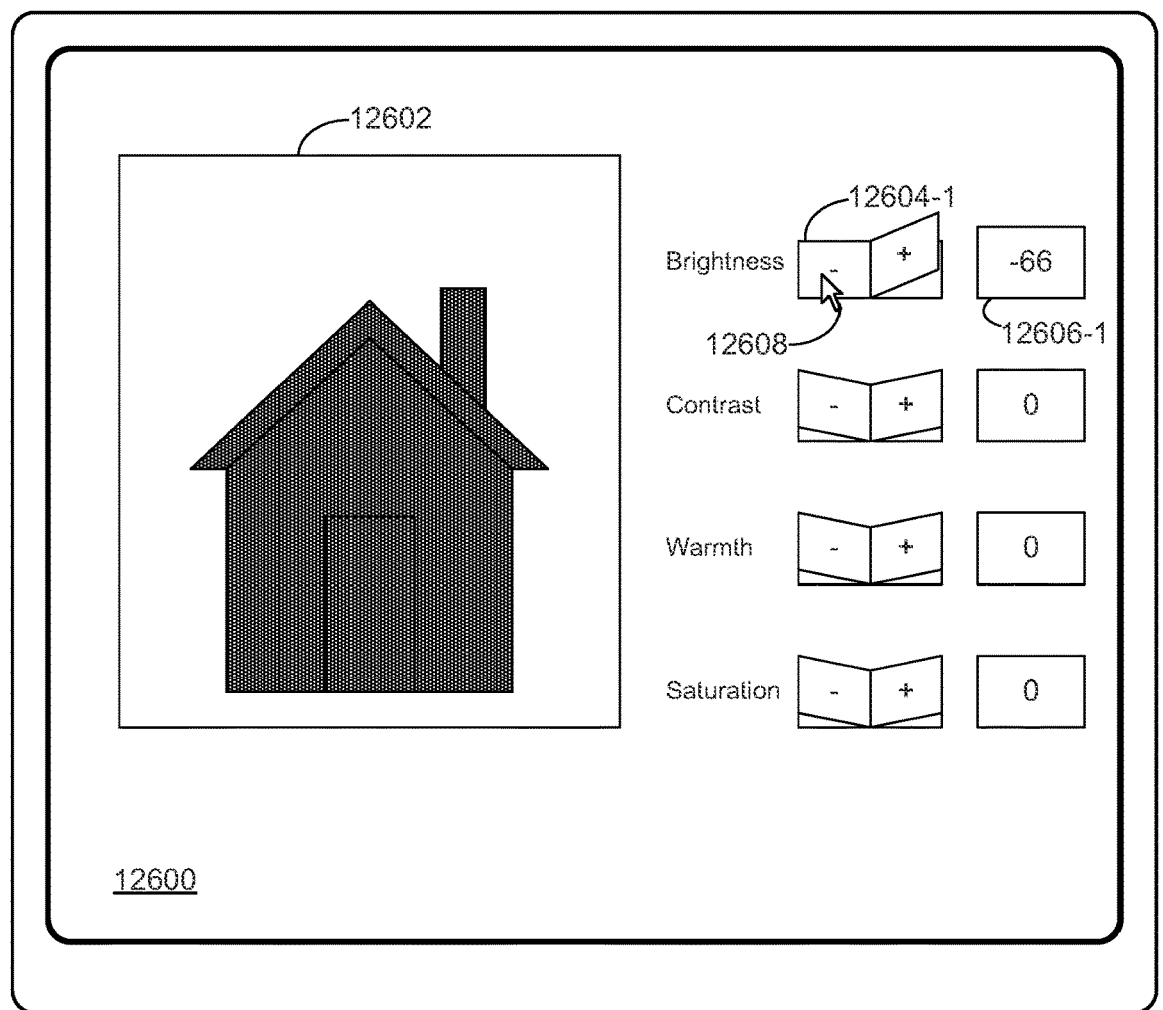
Figure 14F:
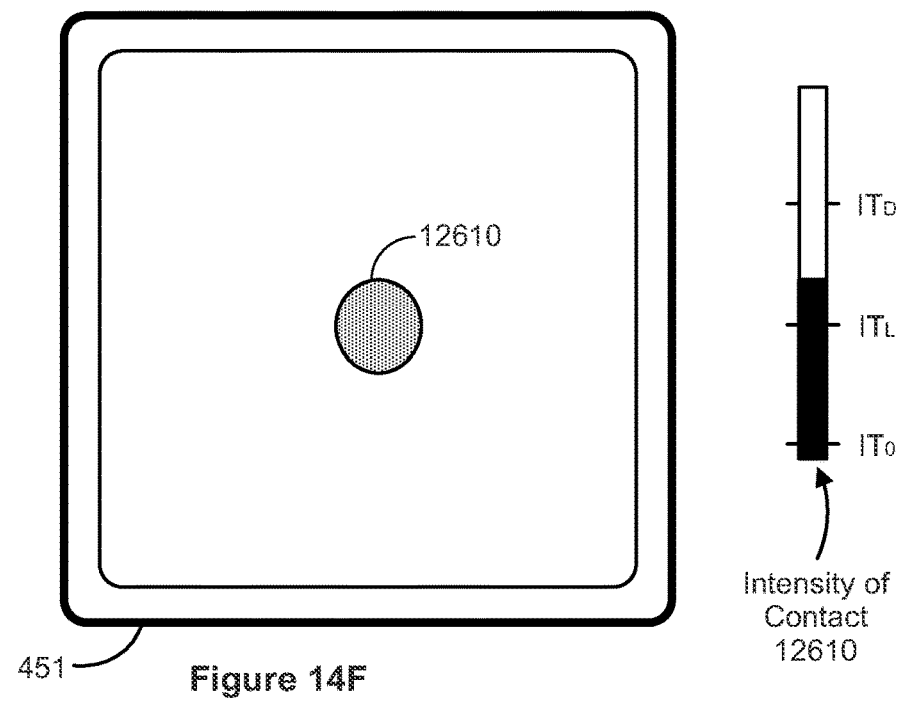
Figure 14G:
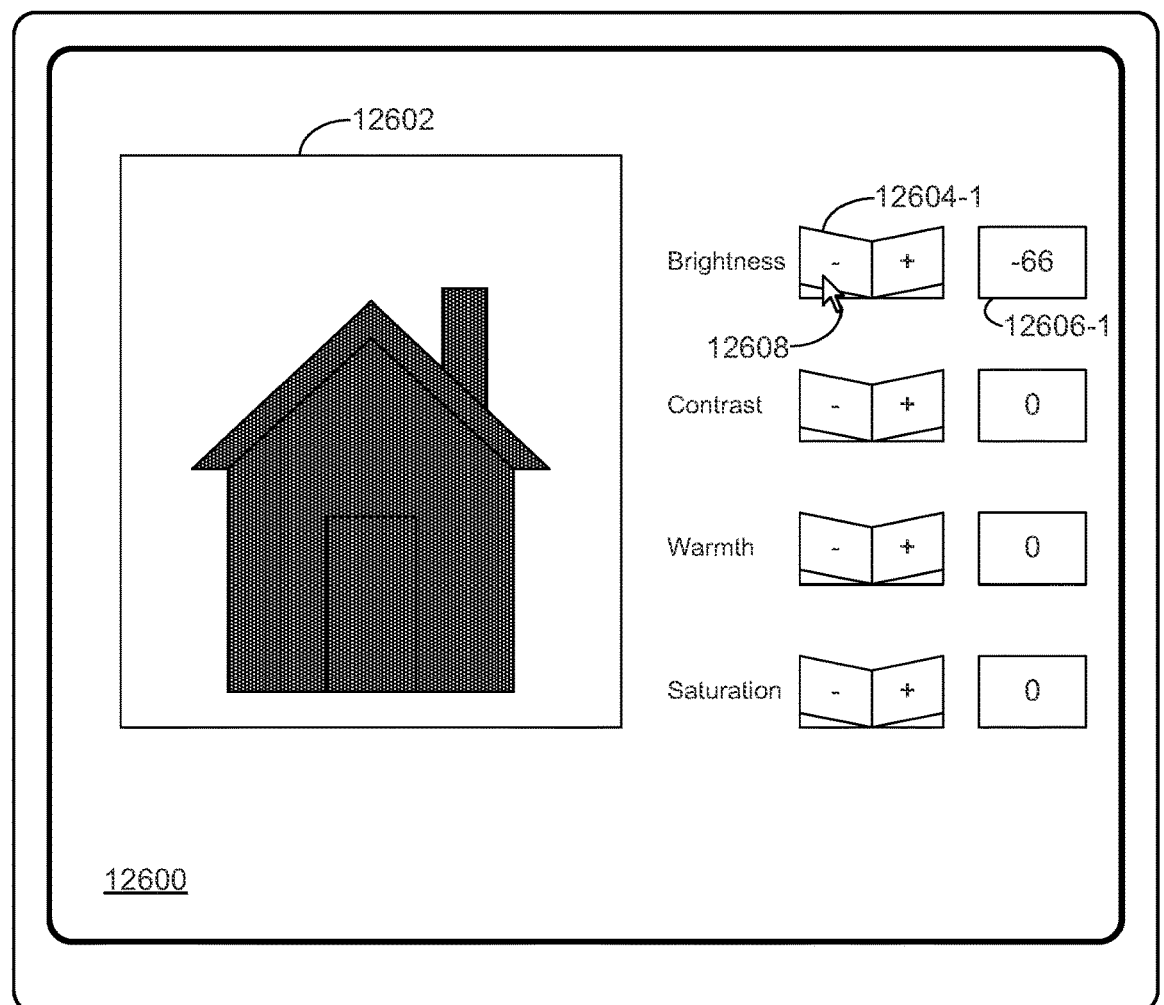
Figure 14G:
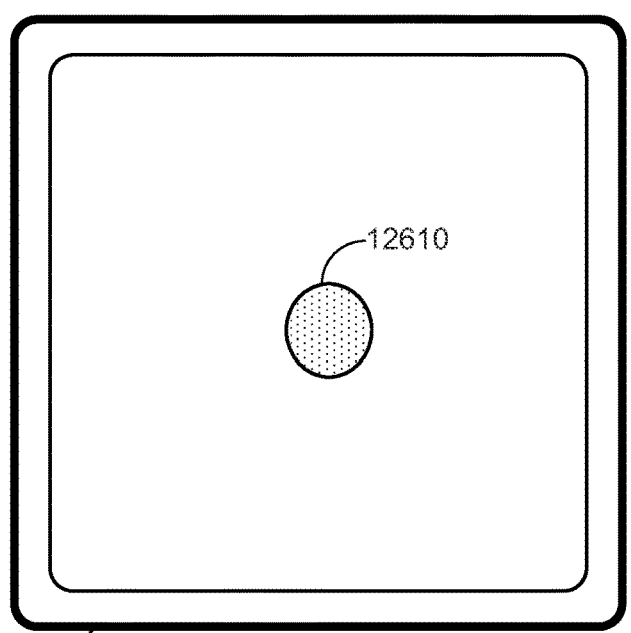

Many electronic devices have graphical user interfaces that include user interface objects, such as buttons and switches. In some circumstances, a user activates a user interface object to perform an operation or adjust a parameter or property. One approach to indicating an activation state of a user interface object is to mimic the behavior of a corresponding physical object. However, physical objects, such as real buttons and switches, will, in some circumstances provide excessive tactile feedback in some circumstances, and too little feedback in others. In some devices, a tactile sensation is, in some circumstances, perceived by the user for corresponding physical inputs, such as clicks of a physical actuator mechanism (e.g., a mouse button) that activate a switch. The embodiments described below provide tactile feedback that is not tied to actuations of a physical actuator mechanism. For example, tactile sensations related to activation state changes are, optionally, provided. When tactile sensations not tied to physical actuations are provided for, the user can better discern the activation state of the virtual button without being distracted by too much or too little tactile feedback, thereby providing a more convenient and intuitive user interface. Below, FIGS. 14A-14N illustrate exemplary user interfaces for providing feedback for changing activation states of a user interface object. FIGS. 15A-15C are flow diagrams illustrating a method of providing feedback for changing activation states of a user interface object. The user interfaces in FIGS. 14A-14N are used to illustrate the processes in FIGS. 15A-15C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user.

Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
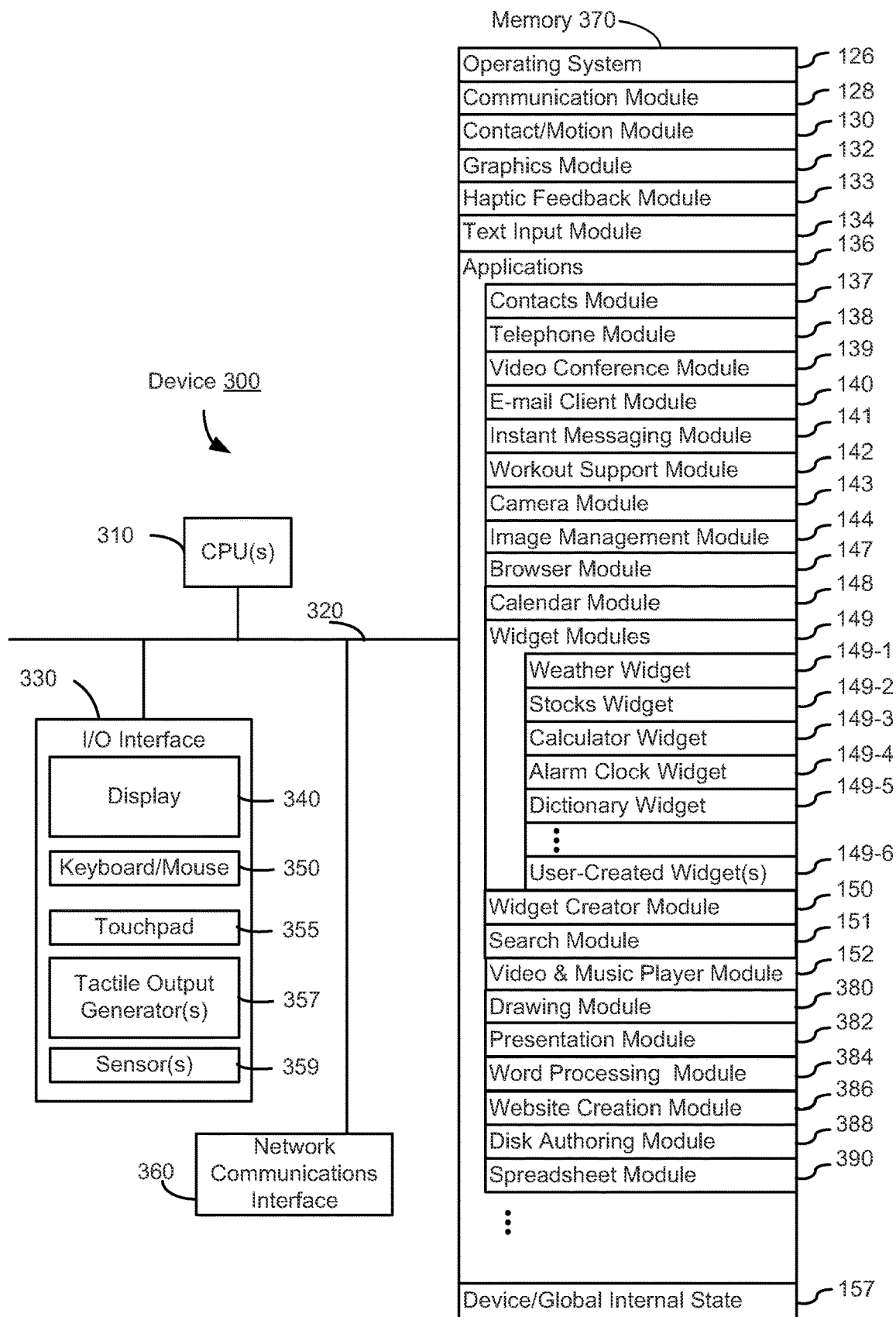
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
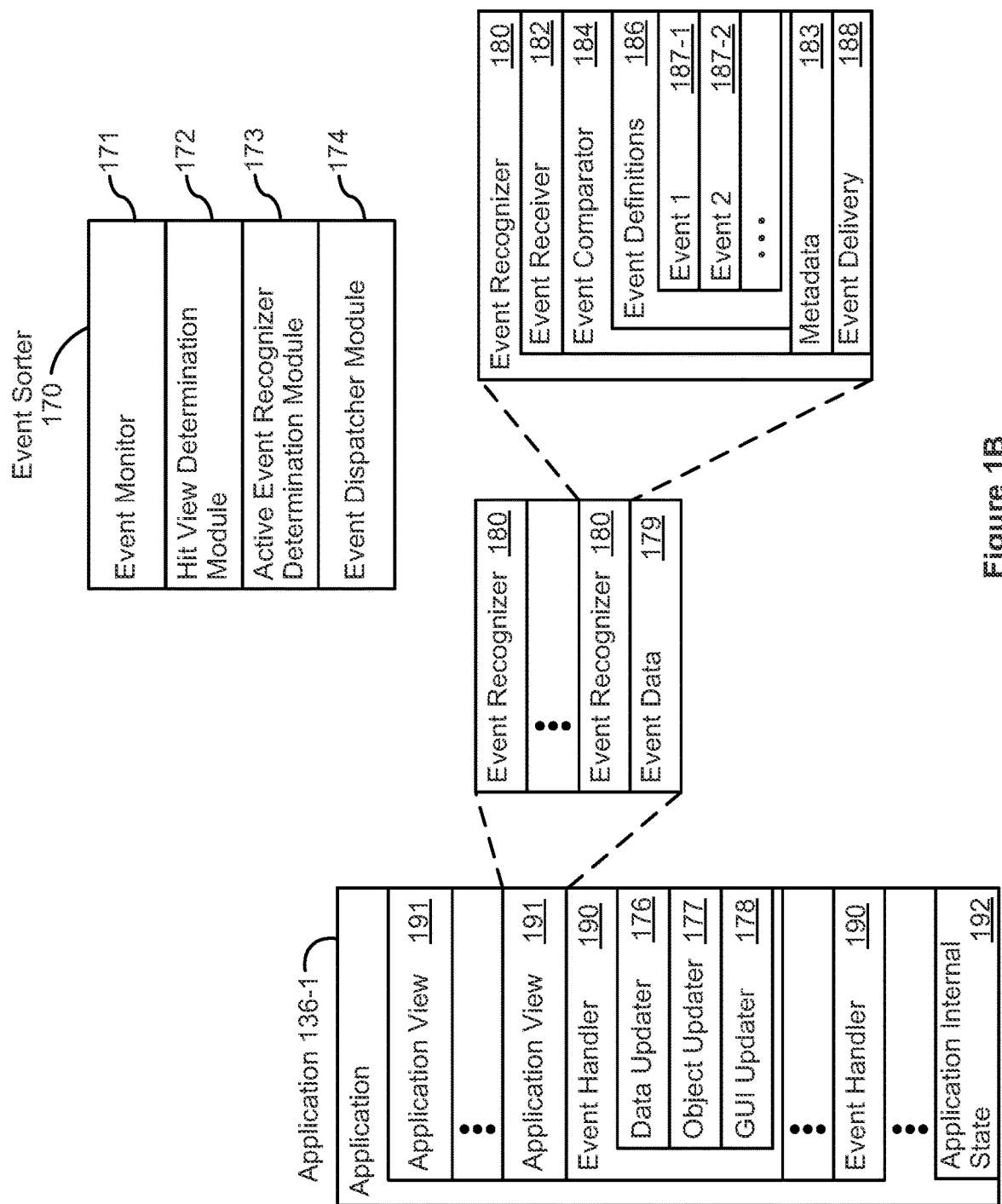
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture).

Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
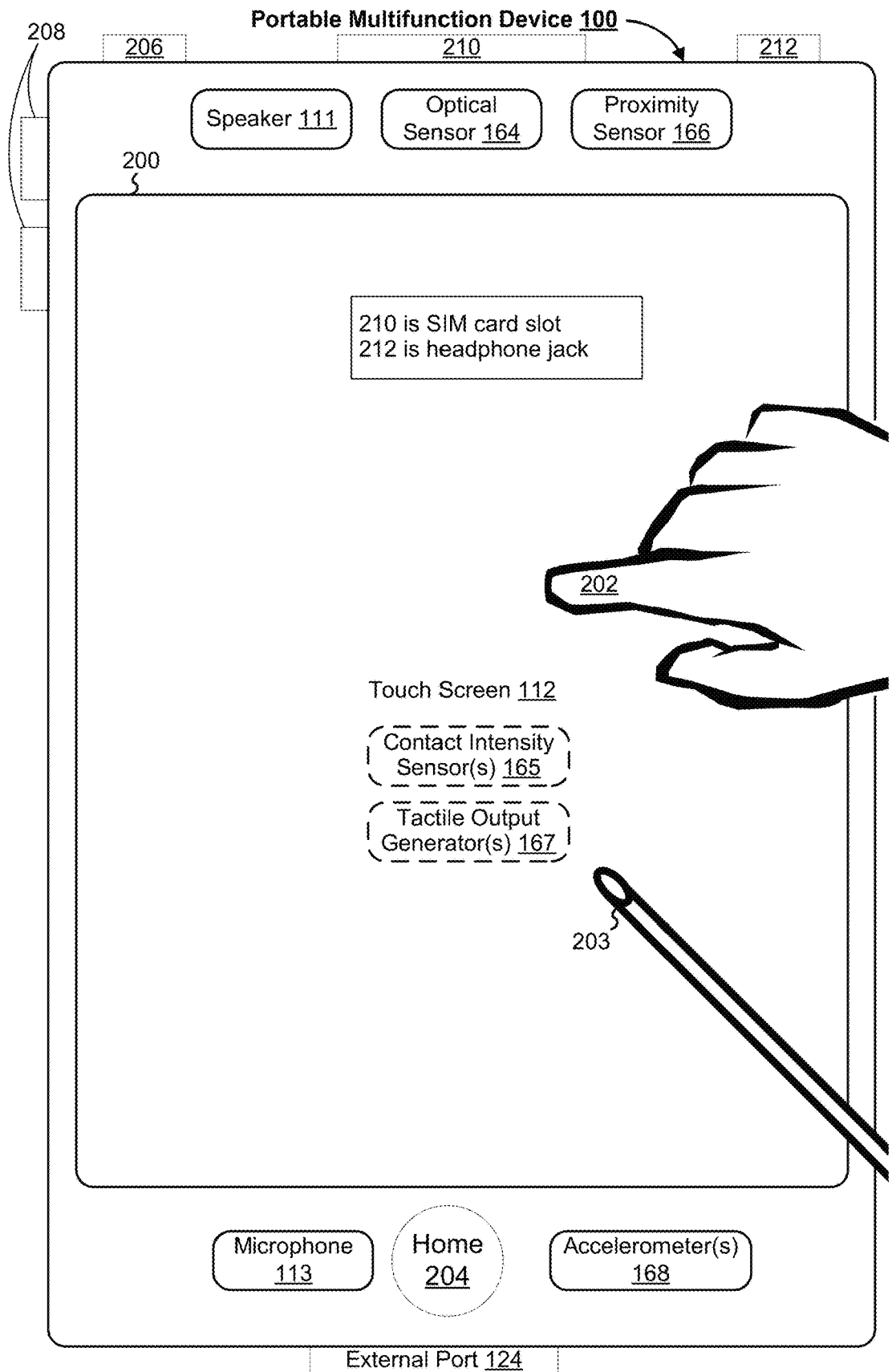
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
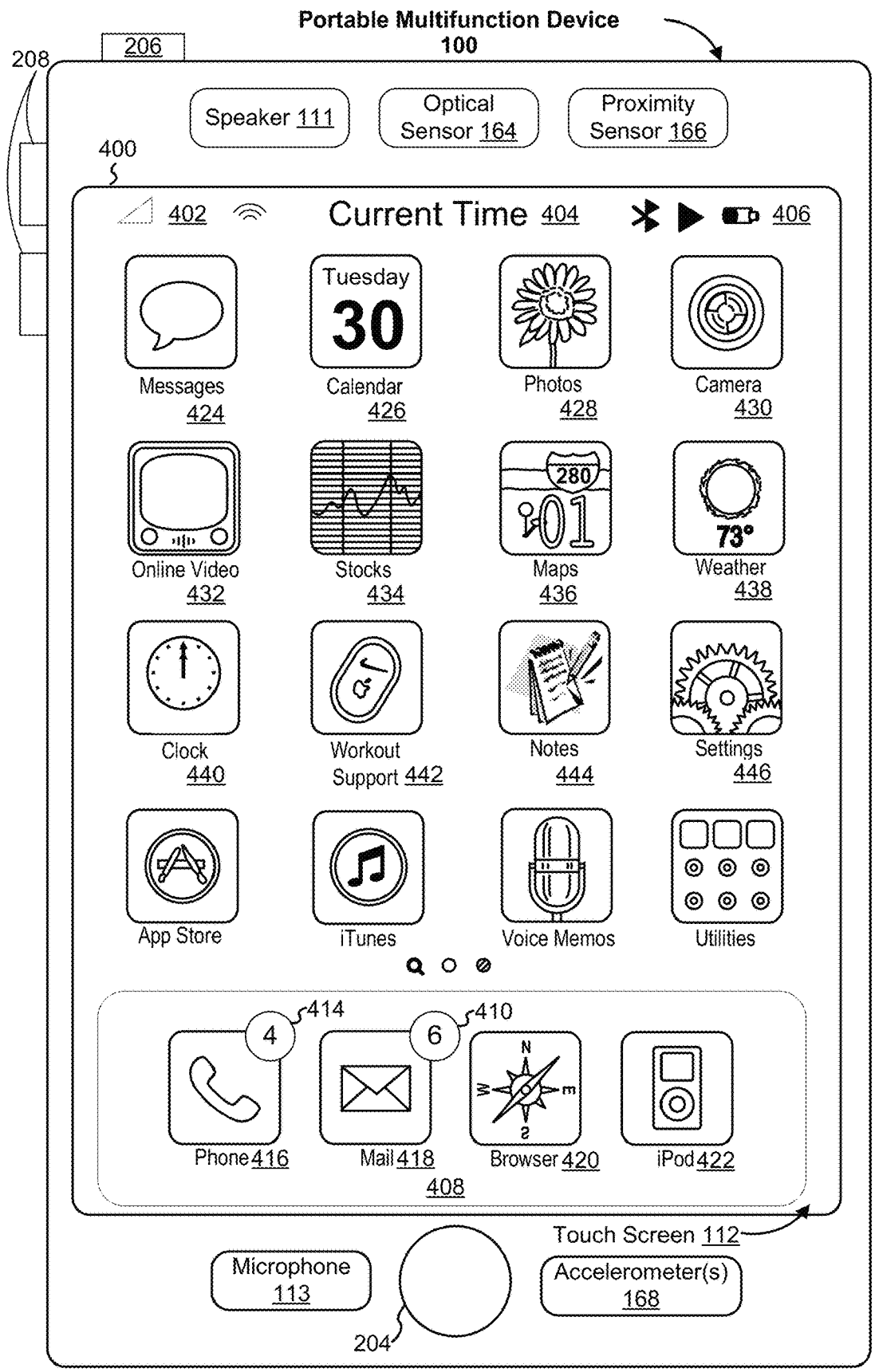
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
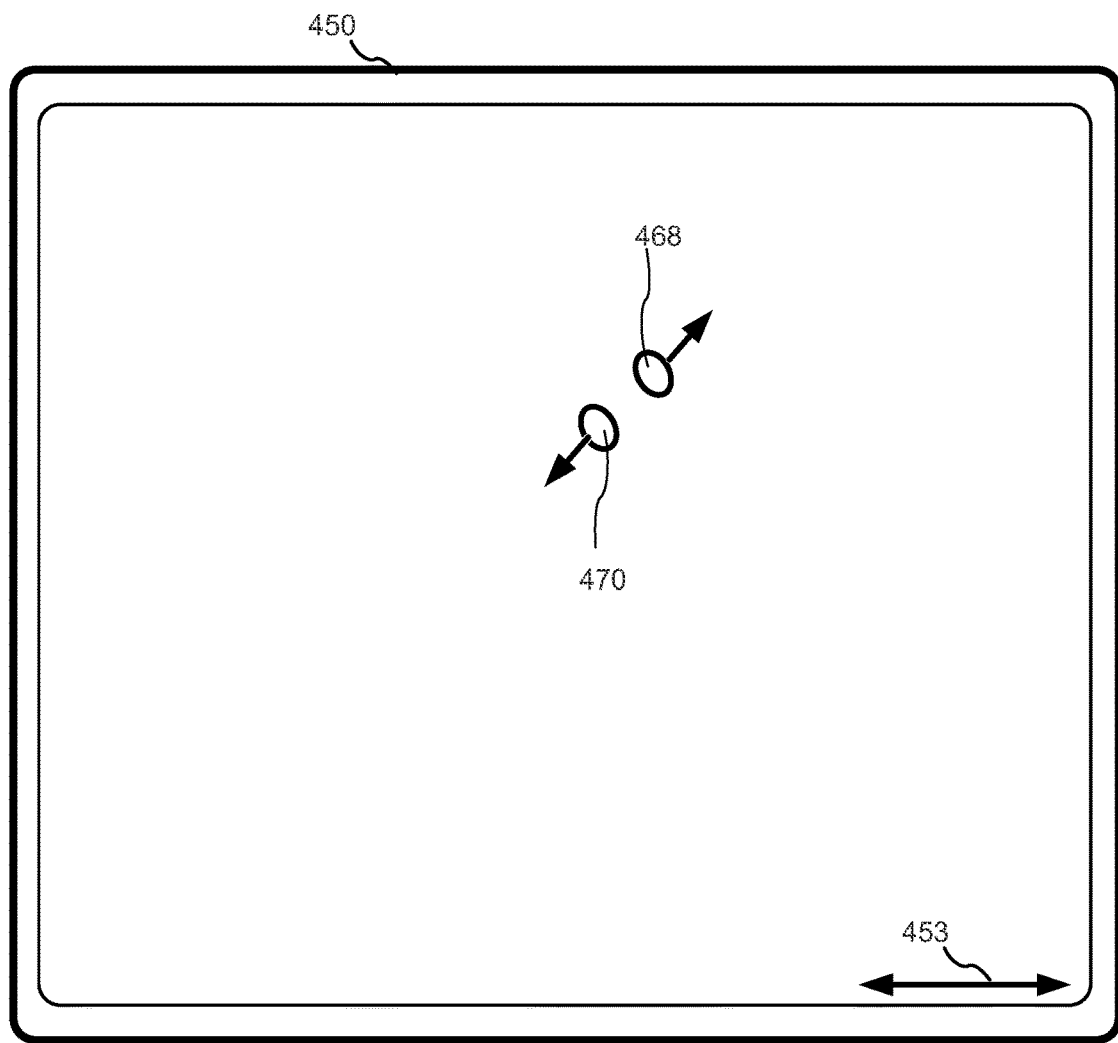
FIG. 4B illustrates an exemplary user interface for a multifunction device with a touch-sensitive surface that is separate from the display in accordance with some embodiments.
Figure 4B:
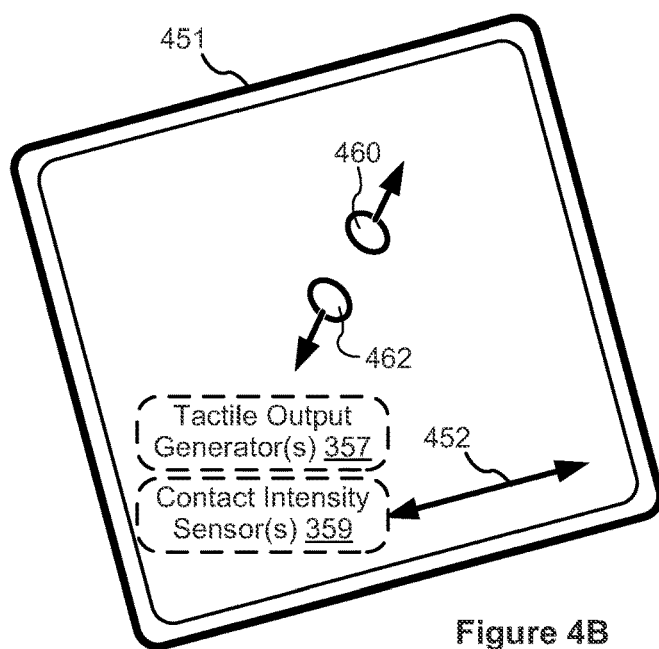

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Selecting a Tactile Output Corresponding to a Change in Intensity of a Contact

Many electronic devices have graphical user interfaces including one or more user interface objects. When users attempt to perform operations associated with these user interface objects, these operations are sometimes successful and sometimes unsuccessful. For example, attempting to move a user interface object to a region of a user interface that does not accept user interface objects will be unsuccessful. In many user interfaces, there are one or more visual or audible cues as to whether or not the operation associated with the user interface object was successful. However, in some situations the user will miss a visual or audible cue as to whether or not an operation was successful (e.g., because the user was not looking at the display and/or has the volume of the device turned down or turned off, or because the user was distracted when the cue was provided). A missed cue can result in the user attempting to repeat an operation that was successfully performed or proceeding to perform other operations without realizing that the attempted operation was not performed. Thus, it would be advantageous to provide additional cues to the user to indicate whether or not an operation was successful. In a touch-sensitive surface with an integrated mechanical button, the sensation of reducing the intensity of a contact on touch-sensitive surface is determined based on the mechanism of the mechanical button and thus is the same (for the same user input) without regard to whether or not an operation associated with the contact was performed. In contrast, when the touch-sensitive surface is associated with sensors for determining the intensity of the contact with the touch-sensitive surface and a separate actuator generates a software controlled tactile output on the touch-sensitive surface, the tactile output generated after the user has attempted to perform an operation can be varied depending on whether or not the operation was successfully performed (e.g., because the tactile outputs are decoupled from the intensity inputs). Providing such tactile feedback as to whether or not an attempted operation has been performed improves the machine-user interface by providing the user with timely, accurate feedback regarding performance of the operation.

FIGS. 5A-5W illustrate exemplary user interfaces for selecting a tactile output corresponding to a change in intensity of a contact in accordance with some embodiments. The user interfaces in these are used to illustrate the processes described below, including the processes in FIGS. 6A-6B. FIGS. 5A-5W include intensity diagrams that show the current intensity of the contact on the touch-sensitive surface relative to a plurality of intensity thresholds including an object-selection intensity threshold (e.g., "$IT_L$") and an object-release threshold (e.g., "$IT_1$"). In some embodiments, the object-selection intensity threshold is different from (e.g., higher than) the object-release intensity threshold. In some embodiments, the object-selection intensity threshold is $IT_D$ and the object-release intensity threshold is $IT_D$ or an intensity threshold slightly below $IT_D$.

FIG. 5A illustrates user interface 11700 (e.g., a desktop user interface or a drawing input area within a drawing or graphics application) displayed on display 450 (e.g., display 340) of a device (e.g., device 300). One or more user interface objects 11702 are displayed in user interface

11700. In FIG. 5A, user interface objects 11702-1 through 11702-3 are displayed in user interface 11700. A user interface object 11702 is, optionally one of, an application shortcut or launch icon, a shape or object within a drawing or graphics program, or other icon, widget, or object. One or more windows 11704 are, optionally, displayed in user interface 11700 as well. A window 11704 is, optionally, an application window corresponding to a respective application.

Cursor 11706 is also displayed in user interface 11700 on display 450. In some embodiments, cursor 11706 is a mouse pointer. Cursor 11706 is an example of a focus selector. A user optionally positions cursor 11706 at any location in user interface 11700 by making a contact (for example, a finger contact or a stylus contact) on touch-sensitive surface 451 (e.g., touchpad 355) of the device and moving the contact on touch-sensitive surface 451 as desired. In response to the detection of the contact and movement of the contact on touch-sensitive surface 451, cursor 11706 is positioned at a position in user interface 11700 that corresponds to the current position of the contact on touch-sensitive surface 451 and moves in accordance with movement of the contact on touch-sensitive surface 451. In FIG. 5A, contact 11708 is detected at a position on touch-sensitive surface 451, and cursor 11706 is positioned at a corresponding position in user interface 11700, over user interface object 11702-2, as shown.

The device includes one or more sensors that detect the intensity of contacts with touch-sensitive surface 451. In FIG. 5A, the intensity of contact 11708 is detected to be below an object-selection threshold (e.g., "$IT_L$" in FIGS. 5A-5W). The intensity of contact 11708 below the object-selection threshold is represented by the empty background in contact 11708 as shown in FIG. 5A.

The intensity of contact 11708 is increased by, for example, the user applying more pressure on touch-sensitive surface 451 with contact 11708. The change in intensity of contact 11708 is detected by the contact intensity sensors in the device. In response to the detection of an increase in the intensity of contact 11708 above the object-selection threshold (with the intensity that is above the object-selection threshold represented by the densely dotted background in contact 11708 as shown in FIG. 5B), a user interface object over which cursor 11706 is positioned is selected. In FIG. 5B, cursor 11706 is positioned over user interface object 11702-2, and thus user interface object 11702-2 is selected. User interface object 11706-2 is, optionally, visually highlighted (for example, with a different color; with thicker borders, as shown in FIG. 5B) to indicate the selection. In some embodiments, a tactile output indicative of the selection of user interface object 11702-2 is generated on the touch-sensitive surface. The tactile output indicative of the selection is, optionally, generated in accordance with a movement profile associated with selection of a user interface object. In some embodiments, the selection tactile output corresponds to a tactile sensation that simulates a down-click of a mechanical button (for example, a click sensation of pressing a mouse button or a trackpad with an integrated button).

While the intensity of contact 11708 remains above an object-release threshold (e.g., "$IT_1$" in FIGS. 5A-5W) and user interface object 11702-2 remains selected, the user moves contact 11708 on touch-sensitive surface 451. In response to detection of the movement of contact 11708, user interface object 11702-2, as well as cursor 11706, is moved across user interface 11700 in accordance with the movement of contact 11708; user interface object 11702-2 is dragged across user interface 11700 in accordance with the movement of contact 11708. For example, as shown in FIGS. 5C-5D, in response to the movement of contact 11708 in direction 11710 on touch-sensitive surface 451, user interface object 11702-2 moves in direction 11712 to another position in user interface 11700. The new position of user interface object 11702-2, as shown in FIG. 5D, is over "empty space" in user interface 11700, away from window 11704 and other user interface objects 11702.

The object-release threshold is an intensity threshold that determines whether a selected user interface object is released from selection. In some embodiments, the object-release threshold is below the object-selection threshold. In some other embodiments, the object-release threshold is the same as the object-selection threshold.

While user interface object 11702-2 is located at the new position in user interface 11700, as shown in FIG. 5D, the user reduces the intensity of contact 11708, such as by reducing the pressure on touch-sensitive surface 451 with contact 11708 (including, for example, completely releasing contact 11708 from touch-sensitive surface 451). As shown in FIG. 5E, the intensity of contact 11708 is reduced below the object-release threshold, with the intensity below the object-release threshold represented by the sparsely dotted background in contact 11708 and the intensity meter shown in FIG. 5E. In response to the reduction in intensity of contact 11708 below the object-release threshold, an attempt to relocate (or "drop") user interface object 11702-2 at the new position is made. The "empty space" in user interface 11700 is a valid drop location, as that empty space is not already occupied by a user interface object 11702 or a window 11704, and thus the relocation of user interface object 11702-2 to the new position is successful. As a result, user interface object 11702-2 is dropped at the new position in user interface 11700 and de-selected (i.e., released from selection). A tactile output is generated on touch-sensitive surface 451, along with the dropping of user interface object 502-2, in response to detection of the reduction in intensity of contact 11708 below the object-release threshold.

Returning to FIG. 5B, selected user interface object 11702-2 moves in response to detection of movement of contact 11708, as described above. FIGS. 5F-5G show user interface object 11702-2 moving in direction 11716 in user interface 11700 to a new position that is over window 11704, in response to detection of movement of contact 11708 in direction 11714 on touch-sensitive surface 451; user interface object 11702-2 is dragged across user interface 11700 in accordance with the movement of contact 11708.

While user interface object 11702-2 is located at the new position over window 11704, as shown in FIG. 5G, the user reduces the intensity of contact 11708, such as by reducing the pressure on touch-sensitive surface 451 with contact 11708 (including, for example, lifting contact 11708 off of touch-sensitive surface 451). As shown in FIG. 5H, the intensity of contact 11708 has been reduced below the object-release threshold. In response to the reduction in intensity of contact 11708 below the object-release threshold, an attempt to relocate user interface object 11702-2 at the new position is made (e.g., the position of user interface object 11702-2 in FIG. 5G). The position over window 11704 within user interface 11700 is an invalid drop location, as the position is already occupied by window 11704, and thus the relocation of user interface object 11702-2 at the new position is unsuccessful. As a result, user interface object 11702-2 is returned to its original location and de-selected. A tactile output that is different from the tactile output generated for the successful drop of user interface object 11702-2, described above with reference to FIG. 5E, is generated on touch-sensitive surface 451, along with the return of user interface object 11702-2 to its original position, in response to detection of the reduction in intensity of contact 11708 below the object-release threshold.

Thus, after selection of user interface object 11702-2, movement of contact 11708 and a decrease in the intensity of contact 11708 below the object-release threshold is performed by the user. In response to the detection of the decrease in intensity below the object-release threshold, an attempt to drop user interface object 11702-2 at a new position is made. Depending on whether the new position is a valid drop target/location or an invalid drop target/location, the drop is successful (i.e., the drop is performed) or unsuccessful (i.e., performance of the drop is not performed).

As described above, different tactile outputs are, optionally, generated for a successful drop of a user interface object (for example, as described above with reference to FIG. 5E) and for an unsuccessful drop of a user interface object (for example, as described above with reference to FIG. 5H). In some embodiments, the tactile output for the successful drop and the tactile output for the unsuccessful drop both correspond to tactile sensations that simulate of an up-click of a mechanical button (for example, releasing a clicked-and-held mouse button). In some embodiments, the tactile outputs for a successful drop and an unsuccessful drop have different amplitudes but are otherwise both generated in accordance with the same movement profile. For example, the tactile output for the successful drop has a higher amplitude than, but otherwise have the same movement profile (e.g., square waveform) as, the tactile output for the unsuccessful drop.

In some other embodiments, the tactile output for a successful drop and the tactile output for an unsuccessful drop have different movement profiles. For example, the tactile output for the successful drop is, optionally, generated in accordance with a sinusoidal movement profile, and the tactile output for the unsuccessful drop is, optionally, generated in accordance with a sawtooth waveform movement profile.

Returning to FIG. 5B, selected user interface object 11702-2 moves in response to detection of movement of contact 11708, as described above. FIGS. 5I-5K show user interface object 11702-2 moving, continuously, in direction 11722 and then direction 11724 in user interface 11700, in response to detection of continuous movement of contact 11708 in direction 11718 and then direction 11720, respectively, on touch-sensitive surface 451. User interface object 11702-2 moves to a position over window 11704 and then to "empty space" in user interface 11700; user interface object 11702-2 is dragged across user interface 11700 in accordance with the movement of contact 11708, over empty space and window 11704 at different times. Thus, during the movement, user interface object 11702-2 moves over an invalid drop location for a period of time and over a valid drop location for another period of time.

As user interface object 11702-2 is moving, while user interface object 11702-2 is over window 11704, as shown in FIG. 5J, a tactile output associated with an invalid drop location is, optionally, generated on touch-sensitive surface 451. The tactile output alerts the user that the current position of the user interface object 11702-2 is an invalid drop location.

As user interface object 11702-2 continues to move, while user interface object 11702-2 is over empty space in user interface 11700, as shown in FIG. 5K, a tactile output associated with a valid drop location is, optionally, generated on touch-sensitive surface 451. The tactile output alerts the user that the current position of the user interface object 11702-2 is a valid drop location. The tactile output associated with a valid drop location is different from the tactile output associated with an invalid drop location. For example, the valid drop location tactile output has a higher amplitude and/or different movement profile from the invalid drop location tactile output. In some embodiments, the tactile output associated with a valid drop target/location is generated according to the same movement profile and amplitude as a tactile output associated with a successful drop. Similarly, the tactile output associated with an invalid drop target/location is generated according to the same movement profile and amplitude as a tactile output associated with an unsuccessful drop. For example, the touch-sensitive surface optionally provides a high frequency periodic tactile output (e.g., a slight buzzing) while user interface object 11702-2 is over an invalid drop target and either does not provide any tactile output or provides a low frequency periodic tactile output (e.g., a periodic ping) while user interface object 11702-2 is over a valid drop target.

Figure 5L:
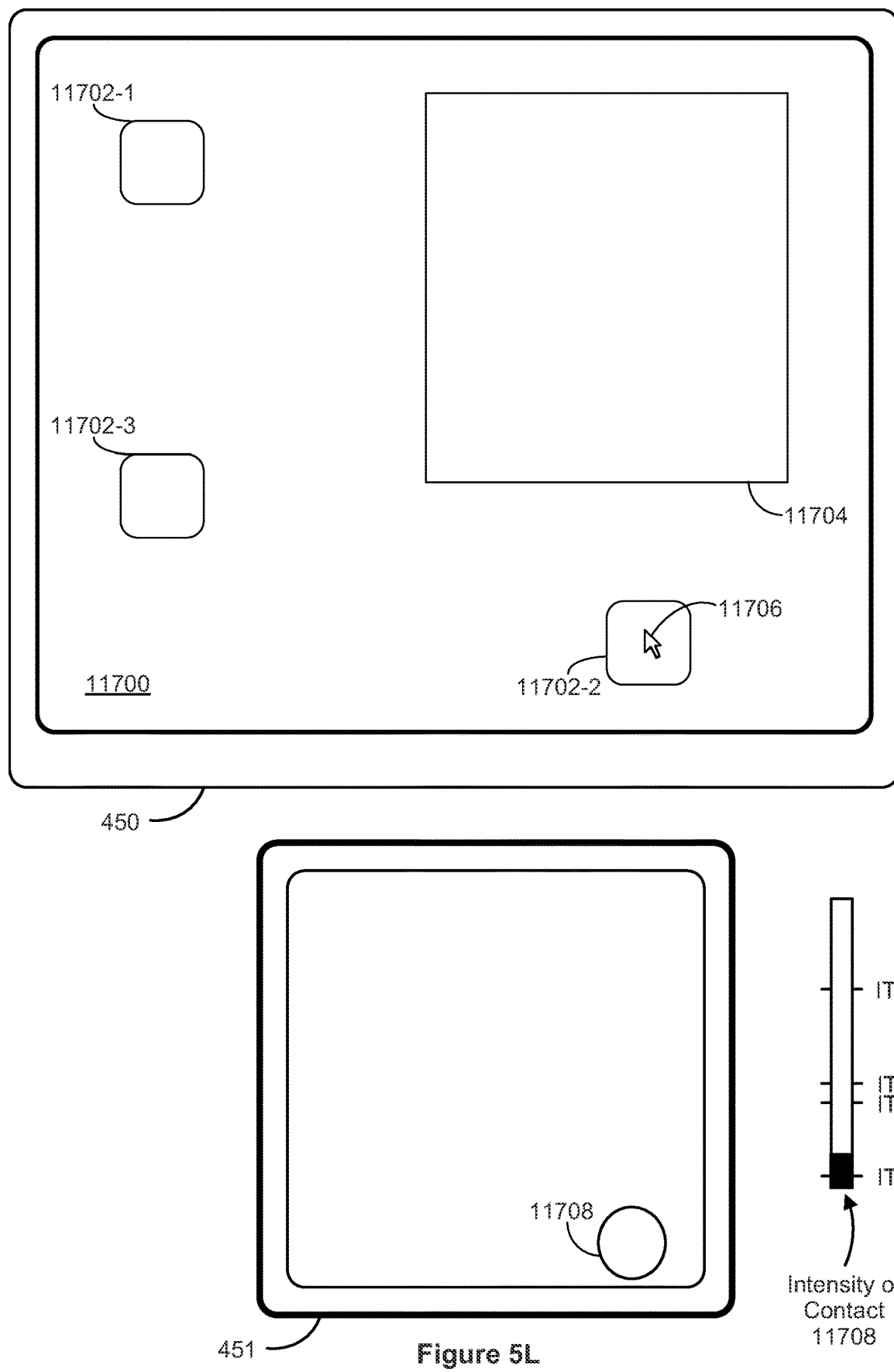

When the intensity of contact 11708 is reduced below the object-release threshold while user interface object 11702-2 is over empty space in user interface 11700, as shown in FIG. 5L, user interface object 11702-2 is dropped successfully at its new position.

It should be appreciated that the criteria for a valid drop target/location and an invalid drop target/location described above (whether a location is already occupied by a user interface object 11702 or window 11704) are merely exemplary, and other criteria are, optionally, employed in other embodiments, implementations, or for different categories of user interface objects or for different operations within an embodiment or implementation. For example, dropping an application shortcut or launch icon at a position over another application shortcut/launch icon or over an application window is invalid, while dropping a shape within a drawing program at a position over another shape is valid. As another example, dropping an application shortcut/launch icon at a position over another application shortcut/launch icon is valid if the operation includes swapping the locations of the application shortcuts/launch icons affected.

Figure 5M:
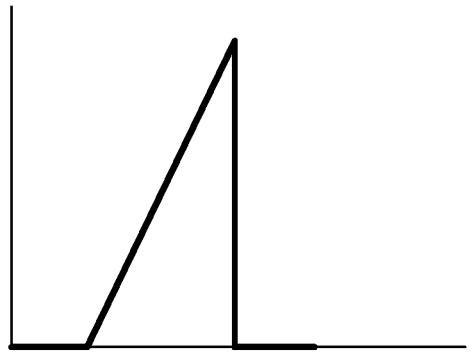
Figure 5N:
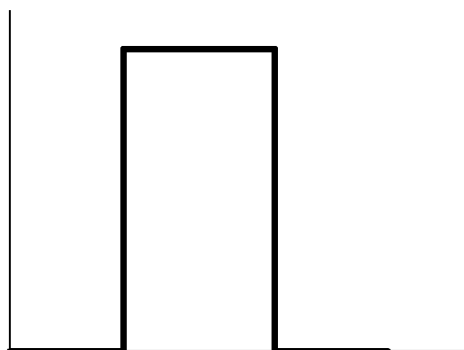
Figure 5O:
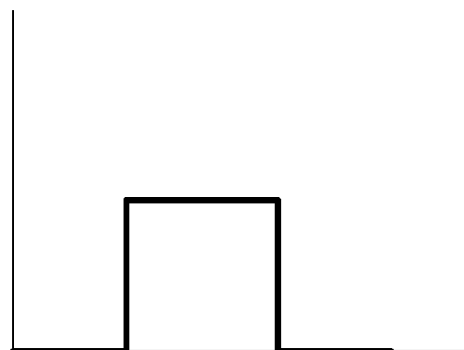

As described above, tactile outputs are, optionally, generated for a selection of a user interface object, a valid drop, an invalid drop, a valid drop location, and an invalid drop location. FIGS. 5M-5O illustrate example waveforms of movement profiles for generating these tactile outputs. FIG. 5M illustrates a sawtooth waveform. FIG. 5N illustrates a square waveform, and FIG. 5O illustrates a square waveform that has a lower amplitude than the square waveform of FIG. 5N. The sawtooth movement profile in FIG. 5M is, optionally, associated with selection of a user interface object; the tactile output generated for selection of a user interface object is, optionally, generated in accordance with the sawtooth movement profile. The high-amplitude square movement profile in FIG. 5N is, optionally, associated with a successful drop (or a valid drop target/location); the tactile output generated for a successful drop or valid drop target/location is, optionally, generated in accordance with a high-amplitude square movement profile. The low-amplitude square movement profile in FIG. 5O is, optionally, associated with an unsuccessful drop (or an invalid drop target/location); the tactile output generated for an unsuccessful drop or invalid drop target/location is, optionally, generated in accordance with a low-amplitude square movement profile.

Figure 5P:
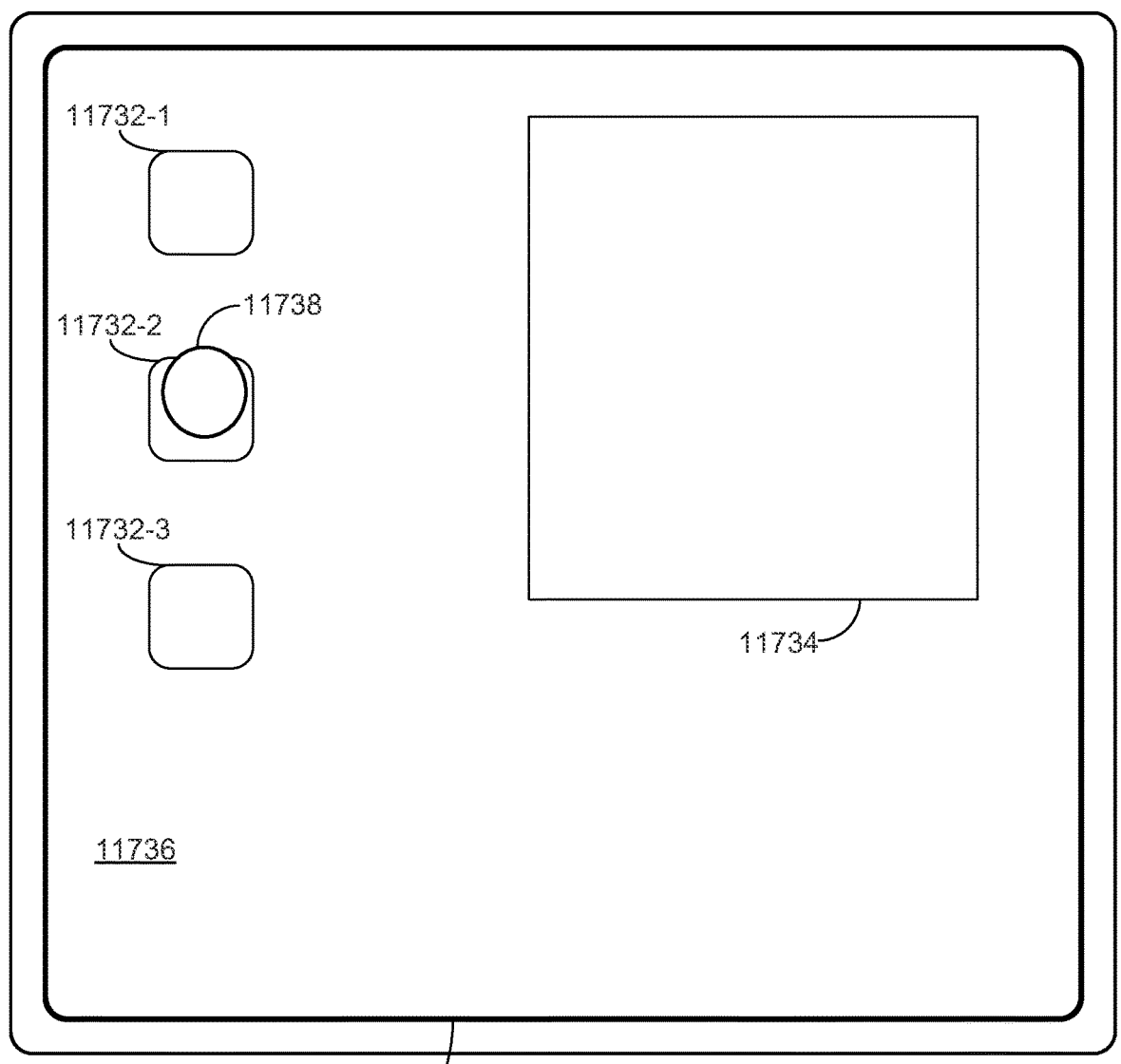
Figure 5P:
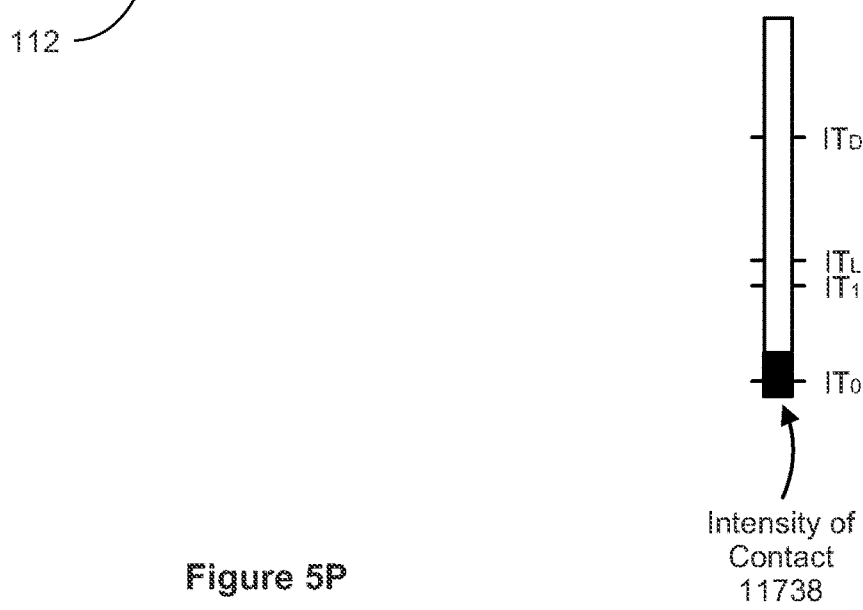
Figure 5Q:
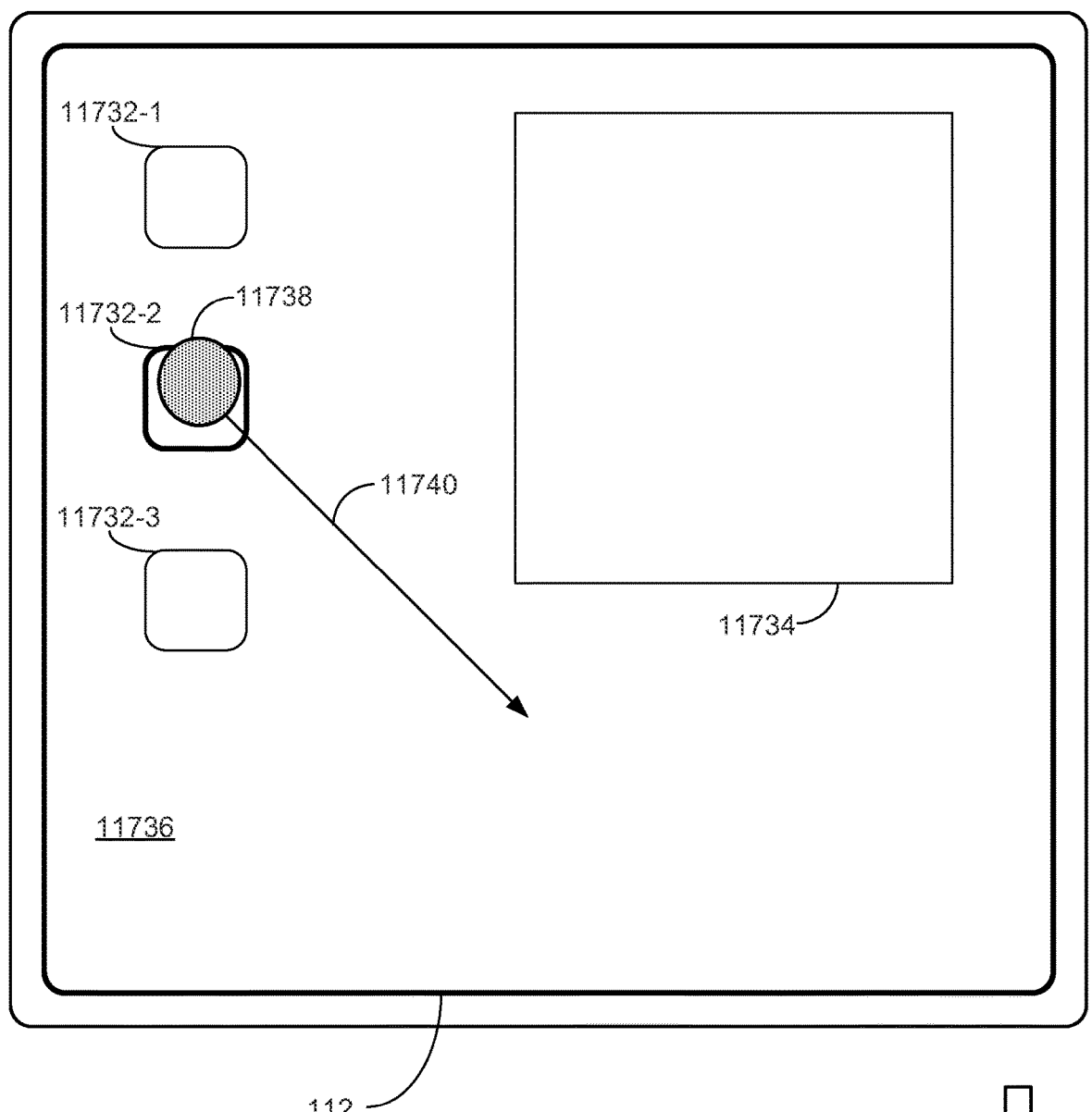
Figure 5Q:
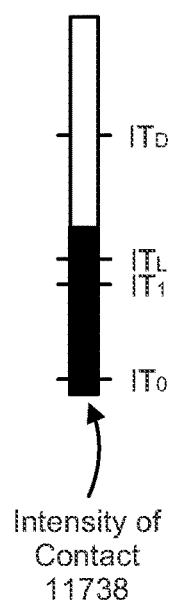
Figure 5R:
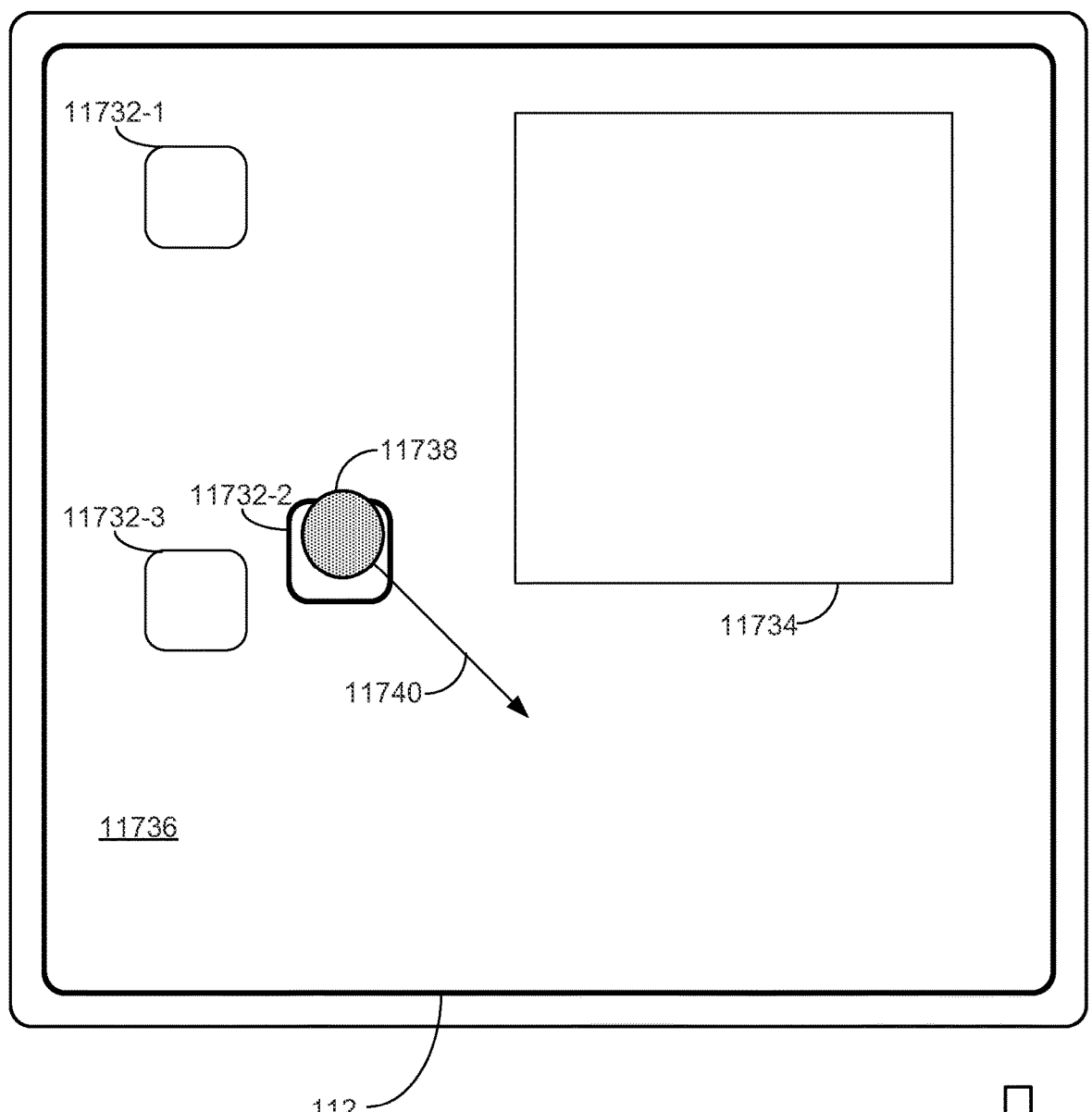
Figure 5R:
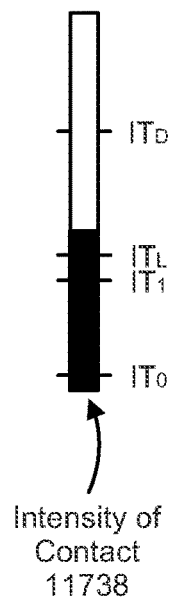
Figure 5S:
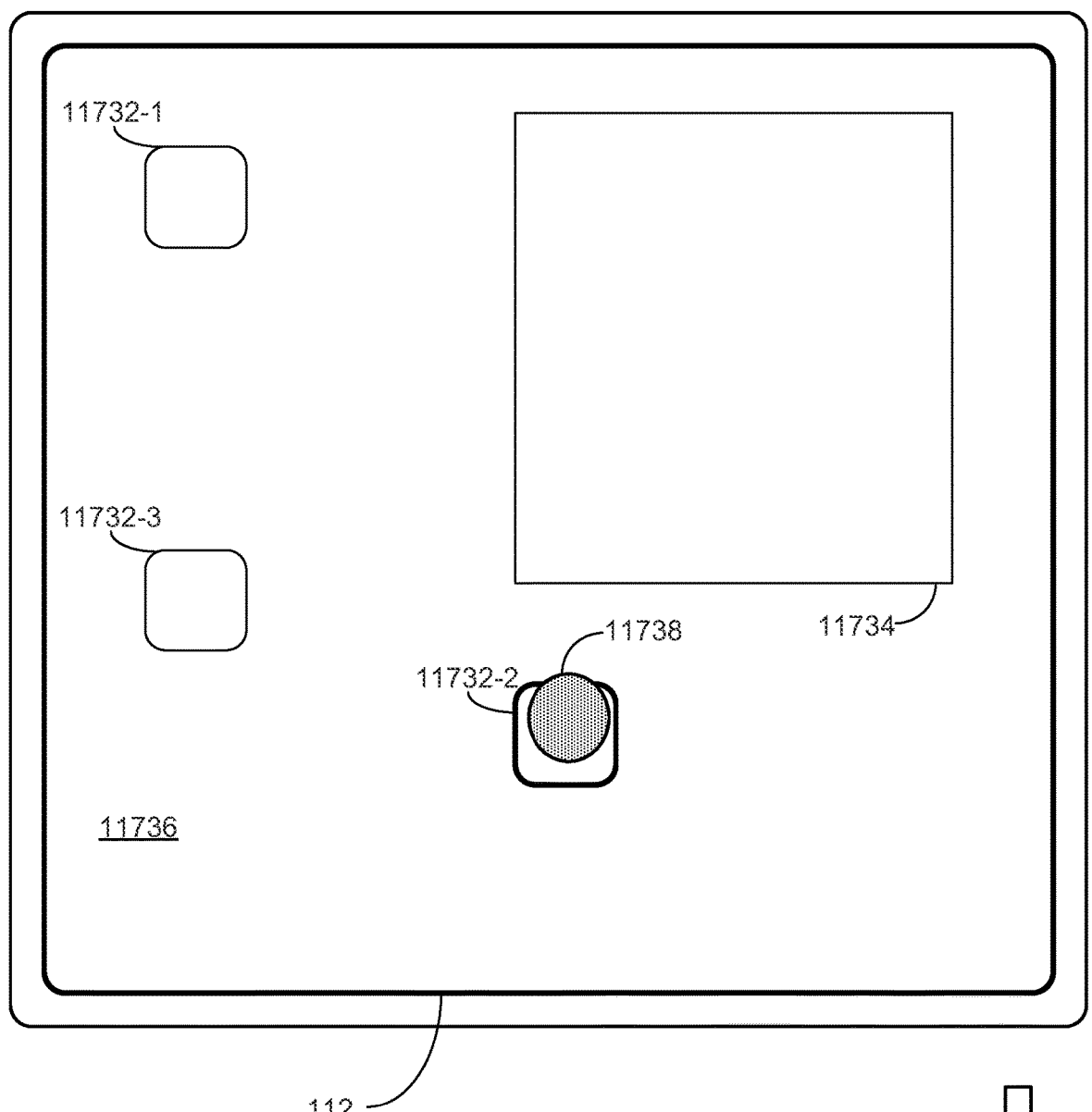
Figure 5S:
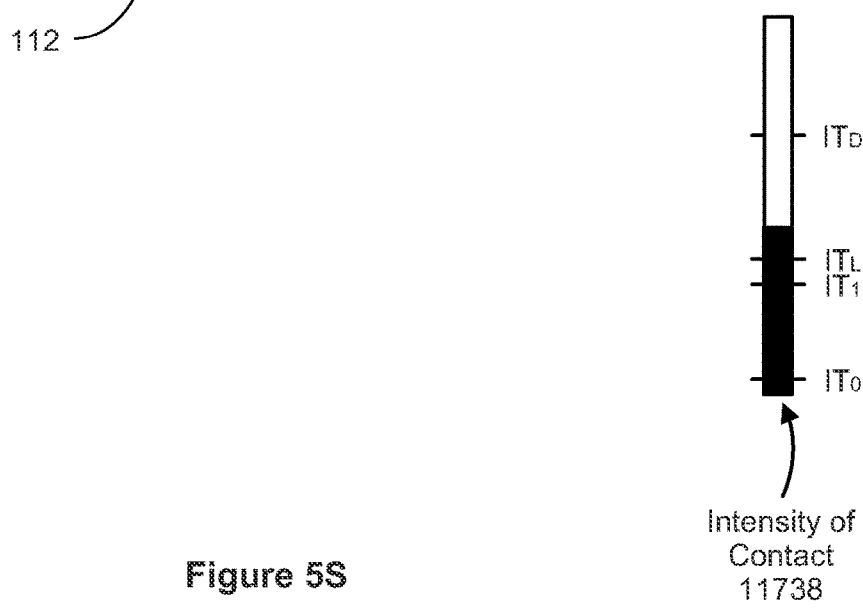
Figure 5T:
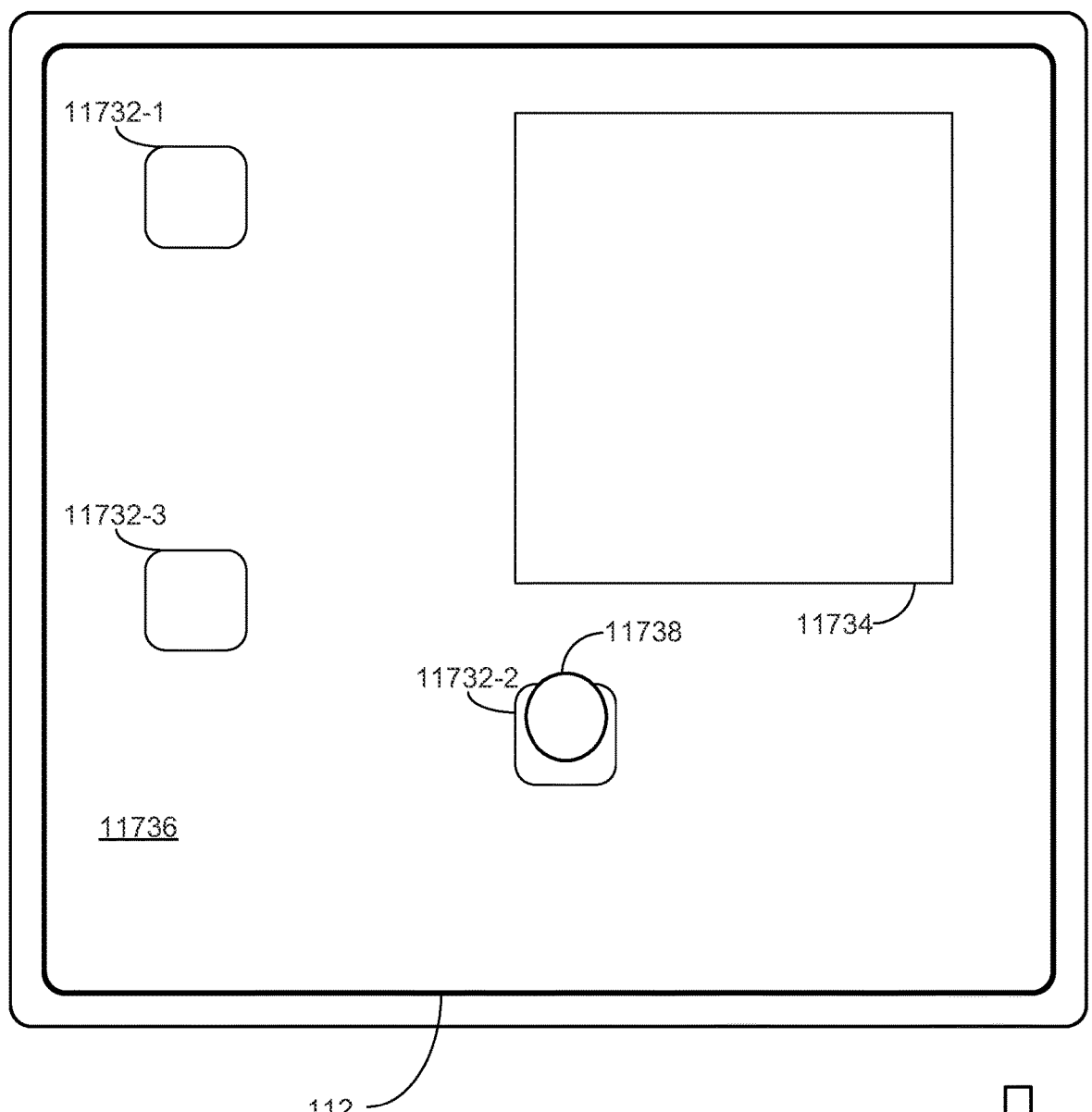
Figure 5T:
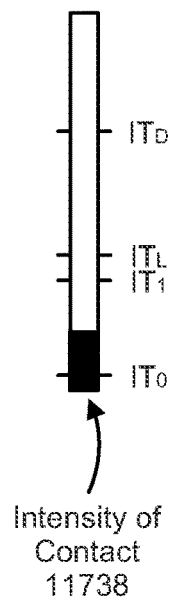
Figure 5U:
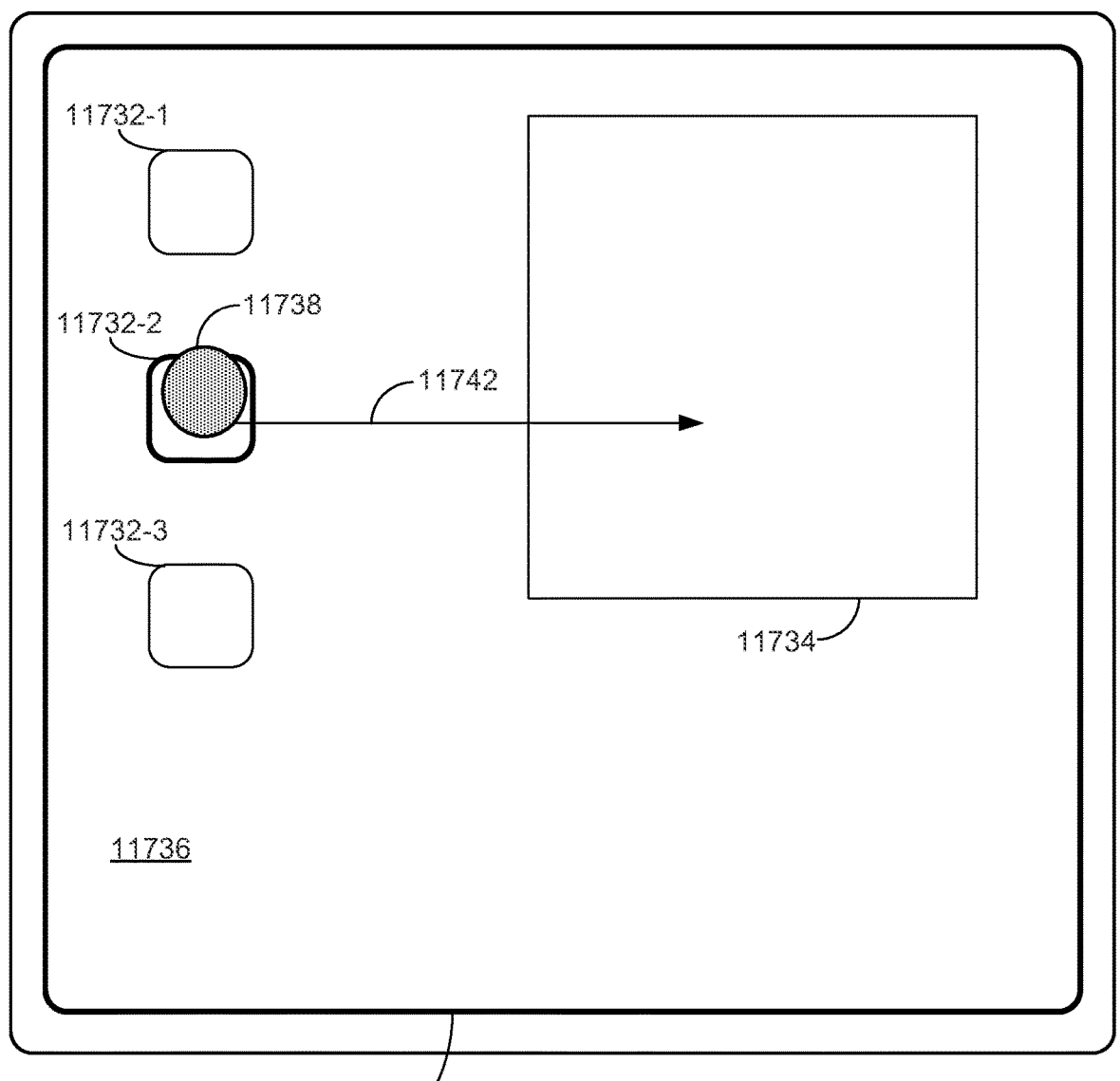
Figure 5U:
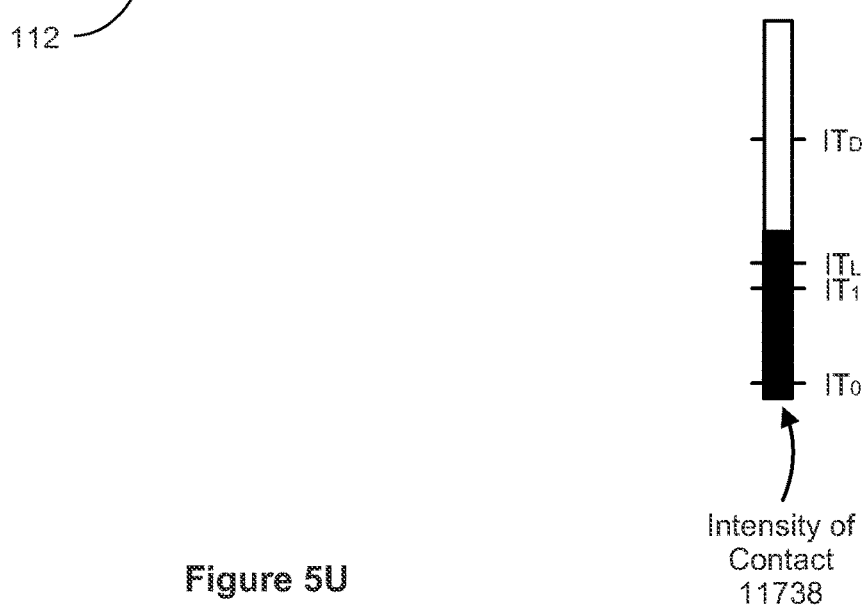
Figure 5V:
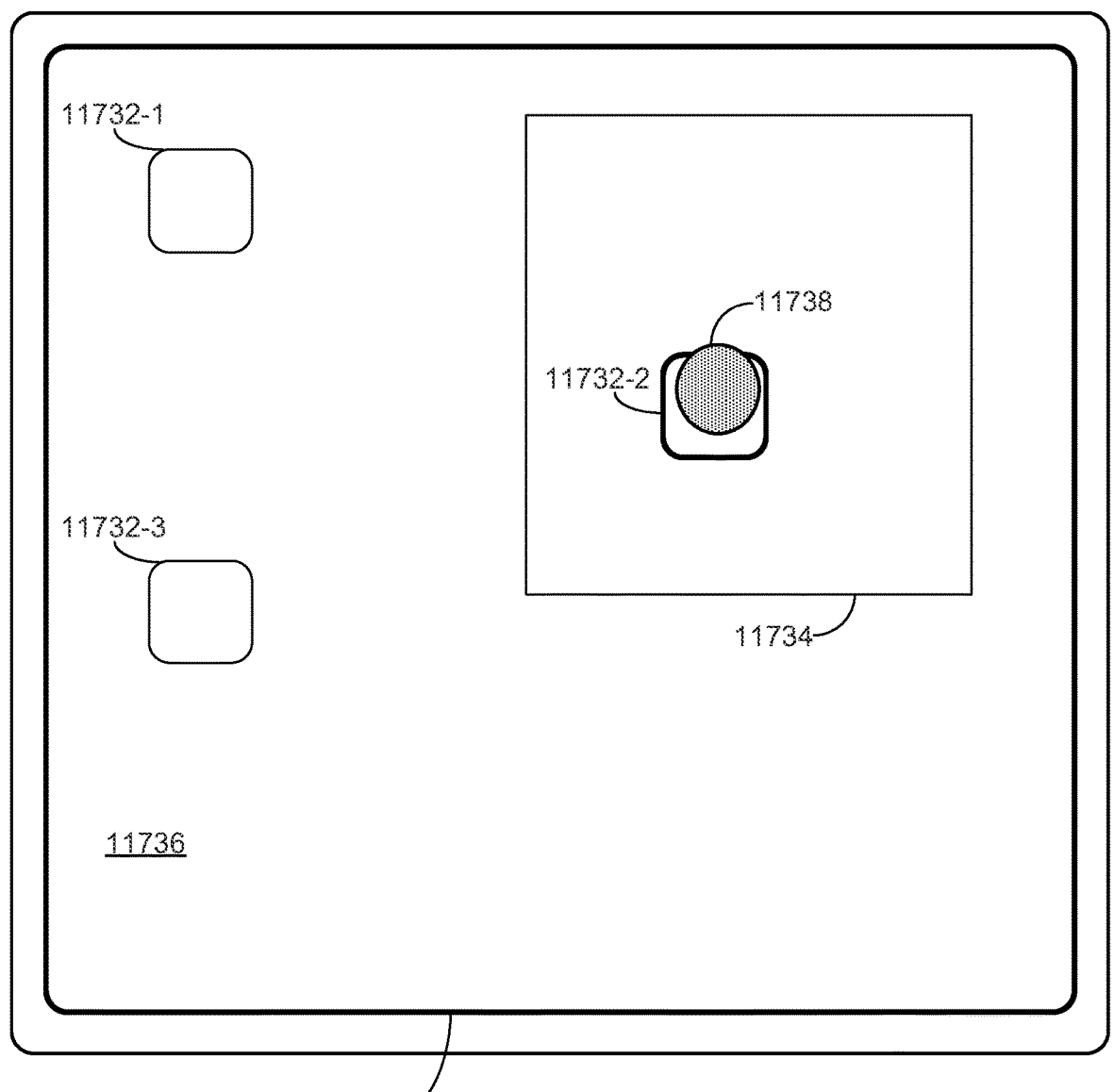
Figure 5V:
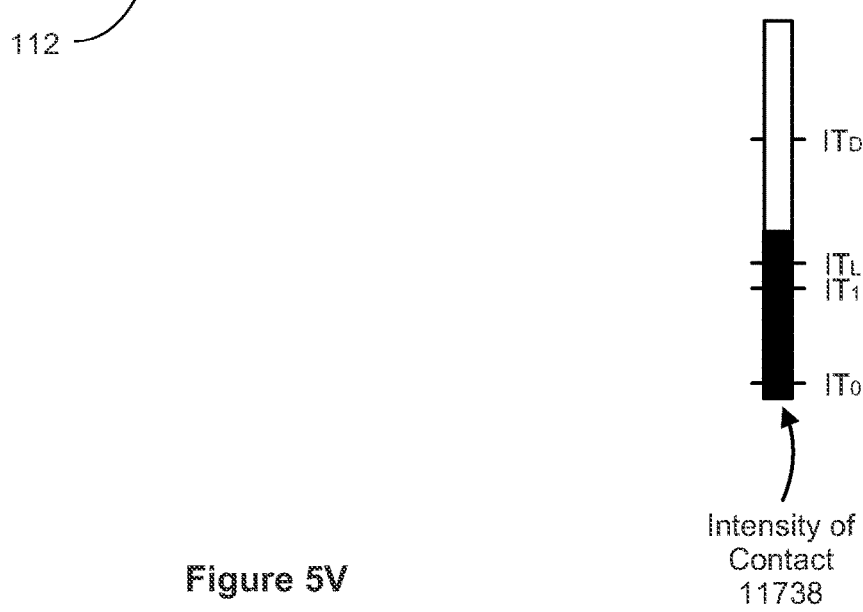
Figure 5W:
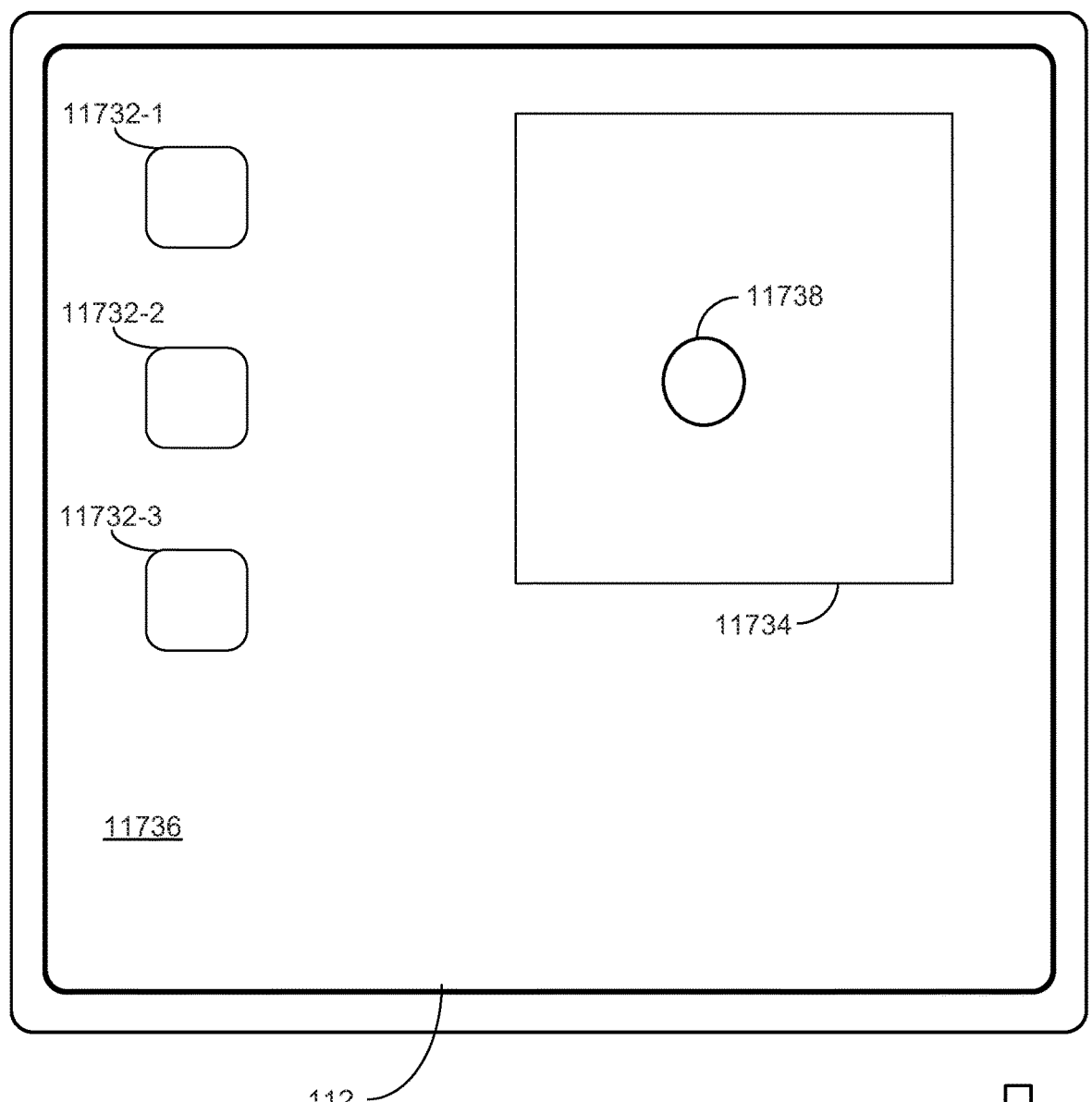
Figure 5W:
Figure 6A:
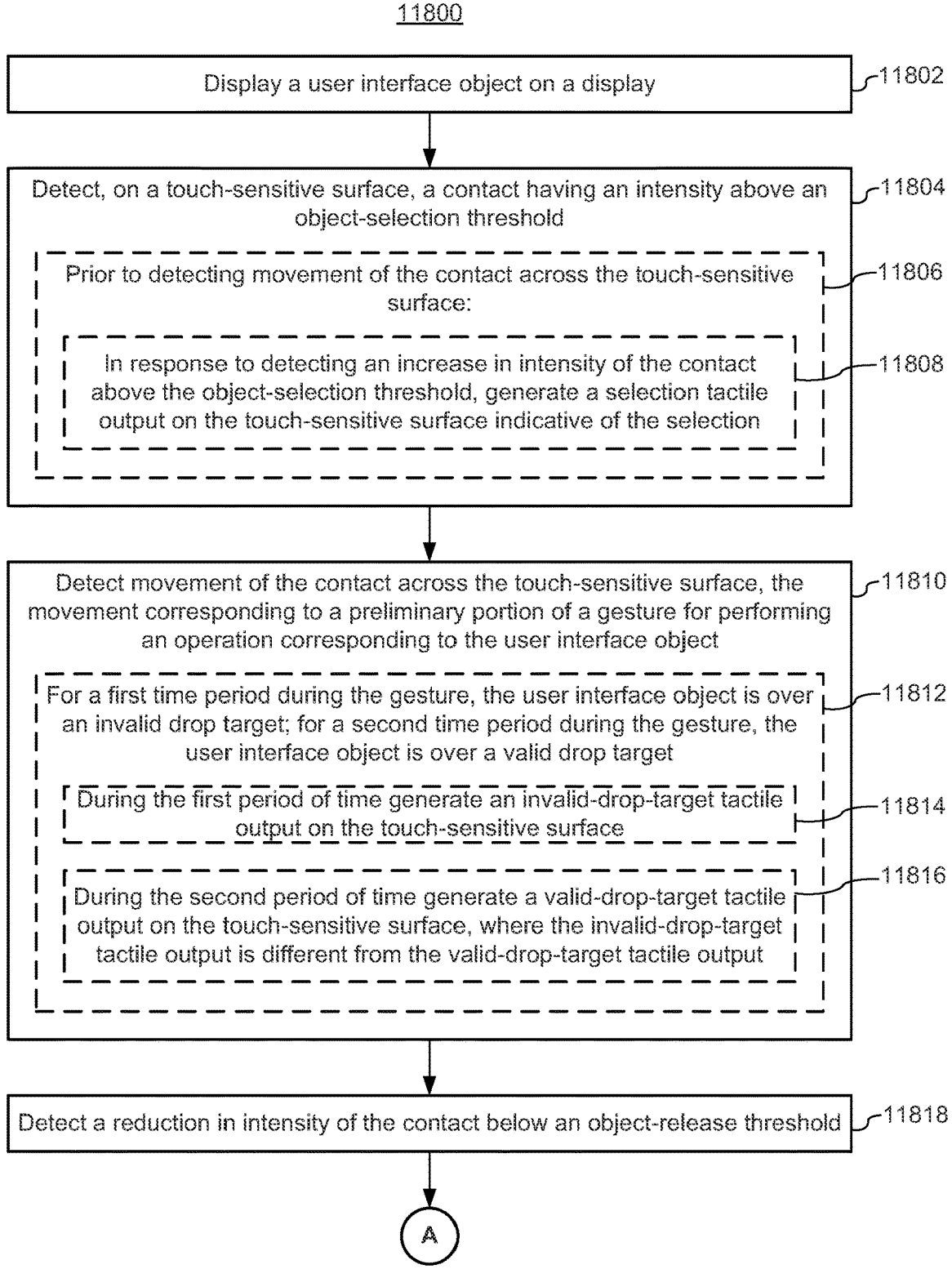
FIGS. 6A-6B are flow diagrams illustrating a method of selecting a tactile output corresponding to a change in intensity of a contact in accordance with some embodiments.
Figure 6B:
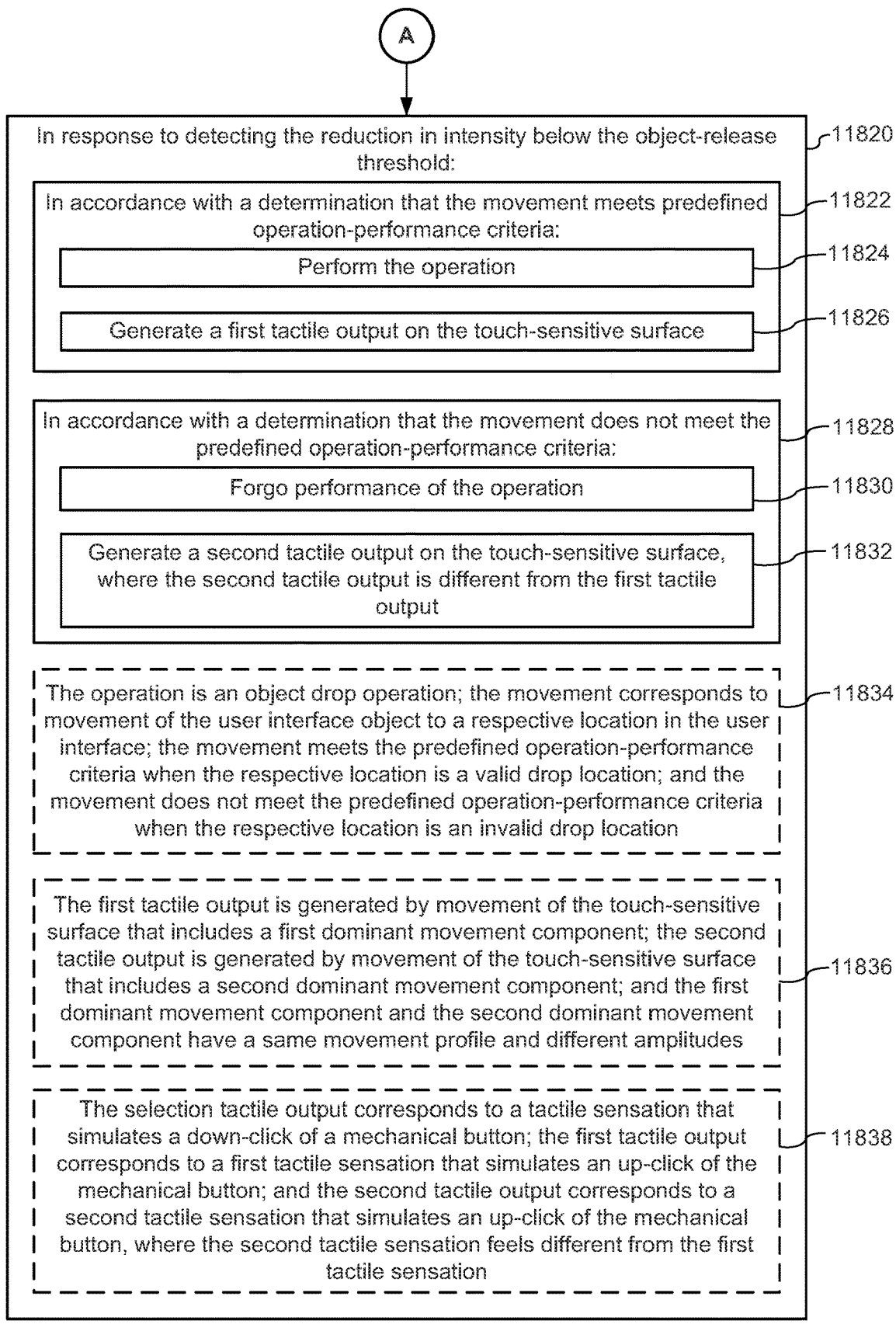

FIGS. 5P-5W illustrate an example of the user interfaces described above, with reference to FIGS. 5A-5O, implemented on a device (e.g., device 100) with a touch-sensitive display 112. FIG. 5P illustrates user interface 11736 (e.g., a home menu or screen interface, a desktop user interface, a drawing input area within a drawing or graphics application) displayed on touch-sensitive display 112 of a device. One or more user interface objects 11732 are, optionally displayed in user interface 11736. In FIG. 5P, user interface objects 11732-1 through 11732-3 are displayed in user interface 11736. A user interface object 11732 is, for example, an application shortcut or launch icon, a shape or object within a drawing or graphics program, or other icon, widget, or object. One or more windows 11734 are, optionally, displayed in user interface 11736 as well. A window 11734 is, for example, an application window corresponding to a respective application. Contact 11738 is detected on touch-sensitive display at a location over user interface object 11732-2.

The device includes one or more sensors that detect the intensity of contacts with touch-sensitive display 112. In FIG. 5P, the intensity of contact 11738 is detected to be below an object-selection threshold. The intensity of contact 11738 below the object-selection threshold is represented by the empty background in contact 11738 as shown in FIG. 5P.

The intensity of contact 11738 is increased by, for example, the user applying more pressure on touch-sensitive display 112 with contact 11738. The change in intensity of contact 11738 is detected by the contact intensity sensors in the device. In response to the detection of an increase in the intensity of contact 11738 above the object-selection threshold (with the intensity that is above the object-selection threshold represented by the densely dotted background in contact 11738 and the intensity meter shown in FIG. 5Q), a user interface object over which contact 11738 is positioned is selected. In FIG. 5Q, contact 11738 is positioned over user interface object 11732-2, and thus user interface object 11732-2 is selected. User interface object 11736-2 is, optionally, visually highlighted (for example, with a different color; with thicker borders, as shown in FIG. 5Q) to indicate the selection. In some embodiments, a tactile output indicative of the selection of user interface object 11732-2 is generated on touch-sensitive display 112. The tactile output indicative of the selection is, optionally, generated in accordance with a movement profile associated with selection of a user interface object. In some embodiments, the selection tactile output corresponds to a tactile sensation that simulates a down-click of a mechanical button (for example, a click sensation of a pressing mouse button).

While the intensity of contact 11738 remains above an object-release threshold and user interface object 11732-2 remains selected, the user moves contact 11738 on touch-sensitive display 112. In response to detection of the movement of contact 11738, user interface object 11732-2 is moved across user interface 11736 in accordance with the movement of contact 11738; user interface object 11732-2 is dragged across user interface 11736 in accordance with the movement of contact 11738. For example, as shown in FIGS. 5R-5S, in response to movement of contact 11738 in direction 11740 on touch-sensitive display 112, user interface object 11732-2 moves in the same direction as contact 11738 to another position in user interface 11736. The new position of user interface object 11732-2, as shown in FIG. 5S, is over "empty space" in user interface 11736, away from window 11734 and other user interface objects 11732-1 and 11732-3.

While user interface object 11732-2 is located at the new position in user interface 11736, as shown in FIG. 5S, the user reduces the intensity of contact 11738, such as by reducing the pressure on touch-sensitive display 112 with contact 11738 (including, for example, lifting contact 11738 off of touch-sensitive display 112). As shown in FIG. 5T, the intensity of contact 11738 is reduced below the object-release threshold, with the intensity below the object-release threshold represented by the sparsely dotted background in contact 11738 and the intensity meter. In response to the reduction in intensity of contact 11738 below the object-release threshold, an attempt to relocate (or "drop") user interface object 11732-2 at the new position is made. The "empty space" in user interface 11736 is a valid drop location, as that empty space is not already occupied by a user interface object 11732 or a window 11734, and thus the relocation of user interface object 11732-2 to the new position is successful. As a result, user interface object 11732-2 is dropped at the new position in user interface 11736 and de-selected (i.e., released from selection). A tactile output is generated on touch-sensitive display 112, along with the dropping of user interface object 532-2, in response to detection of the reduction in intensity of contact 11738 below the object-release threshold.

Returning to FIG. 5Q, selected user interface object 11732-2 moves in response to detection of movement of contact 11738, as described above. FIGS. 5U-5V show user interface object 11732-2 moving in direction 11742 in user interface 11736 to a new position that is over window 11734, in response to detection of movement of contact 11738 in direction 11742 on touch-sensitive display 112; user interface object 11732-2 is dragged across user interface 11736 in accordance with the movement of contact 11738.

While user interface object 11732-2 is located at the new position over window 11734, as shown in FIG. 5V, the user reduces the intensity of contact 11738, such as by reducing the pressure on touch-sensitive display 112 with contact 11738 (including, for example, completely releasing contact 11738 from touch-sensitive display 112). As shown in FIG. 5W, the intensity of contact 11738 has been reduced below the object-release threshold. In response to the reduction in intensity of contact 11738 below the object-release threshold, an attempt to relocate user interface object 11732-2 at the new position is made. The position over window 11734 within user interface 11736 is an invalid drop location, as the position is already occupied by window 11734, and thus the relocation of user interface object 11732-2 at the new position is unsuccessful. As a result, user interface object 11732-2 is returned to its original location and de-selected. A tactile output that is different from the tactile output generated for the successful drop of user interface object 11732-2, described above with reference to FIG. 5T, is generated on touch-sensitive display 112, along with the return of user interface object 11732-2 to its original position, in response to detection of the reduction in intensity of contact 11738 below the object-release threshold.

FIGS. 6A-6B are flow diagrams illustrating a method 11800 of selecting a tactile output corresponding to a change in intensity of a contact in accordance with some embodiments. The method 11800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch screen display and the touch-sensitive surface is on the display. In some embodiments, the display is separate from the touch-sensitive surface. Some operations in method 11800 are, optionally, combined and/or the order of some operations is, optionally, changed.

As described below, the method 11800 provides an intuitive way to relocate a user interface object. The method reduces the cognitive burden on a user when relocating user interface objects, thereby creating a more efficient human-machine interface. For battery-operated electronic devices, enabling a user to relocate a user interface object faster and more efficiently conserves power and increases the time between battery charges.

The device displays (11802) a user interface object on the display. FIG. 5A, for example, shows user interface objects 11702-1 through 11702-3 displayed on display 450. As another example, FIG. 5P shows user interface objects 11732-1 through 11732-3 displayed on touch-sensitive display 112.

The device detects (11804), on the touch-sensitive surface, a contact (e.g., a finger contact or a stylus contact) having an intensity above an object-selection threshold (e.g., "$IT_L$"). The device can, using the one or more sensors, detect an intensity of a contact on the touch-sensitive surface (e.g., touchpad 355). In FIG. 5B, for example, contact 11708 which has an intensity greater than an object-selection threshold, is detected. Similarly, in FIG. 5Q, contact 11738, which has an intensity greater than an object-selection threshold, is detected.

In some embodiments, prior to detecting movement of the contact across the touch-sensitive surface (11806), in response to detecting an increase in intensity of the contact above the object-selection threshold, the device generates (11808) a selection tactile output on the touch-sensitive surface indicative of the selection. The contact that is detected as having an intensity above the object-selection threshold has the intensity above the object-selection threshold as a result of an increase in intensity of the contact from below the object-selection threshold to above the object-selection threshold. When the increase in intensity above the object-selection threshold is detected prior to movement of the contact across the touch-sensitive surface, a user interface object is selected and a selection tactile output is generated in response.

For example, in FIG. 5A, contact 11708 on touch-sensitive surface 451 has an intensity below the object-selection threshold, and a focus selector (e.g., cursor 11706) is positioned over user interface object 11702-2 in accordance with the position of contact 11708 on touch-sensitive surface 451. When, prior to movement of contact 11708 across touch-sensitive surface 451, the intensity of contact 11708 is detected to have increased above the object-selection threshold, as shown in FIG. 5B, user interface object 11702-2 is selected and a tactile output associated with selection of a user interface object is generated on touch-sensitive surface 451. The tactile output indicates to the user that user interface object 502-2 has been selected. Similarly, a tactile output is generated in response to detection of the increase in the intensity of contact 11738 above the object-selection threshold.

The device detects (11810) movement of the contact across the touch-sensitive surface, the movement corresponding to a preliminary portion of a gesture for performing an operation corresponding to the user interface object. For example, the movement is part of an operation to relocate an icon representing a file stored on the device, which will be completed if the icon is moved to a valid drop target and dropped onto the valid drop target (e.g., in response to detecting a liftoff of the contact or a reduction in intensity/pressure of the contact on the touch sensitive surface below an object-release threshold, such as "$IT_1$" or "$IT_L$"). For example, in FIGS. 5C-5D, contact 11708 moves in direction 11710 on touch-sensitive surface 451, and the movement is detected by the device. In FIGS. 5F-5G, contact 11708 moves in direction 11714 on touch-sensitive surface 451, and the movement is detected by the device. In FIGS. 5I-5K, contact 11708 moves in direction 11718 and then 11720 on touch-sensitive surface 451. In response to the detection of the respective movement of contact 11708, user interface object 11702-2 is moved in user interface 11700 in accordance with the detected movement of contact 11708. The movement is part of a gesture to relocate user interface object 11702-2 in user interface 11700. As another example, in FIGS. 5Q-5R, movement of contact 11738 in direction 11740 is detected, and in FIGS. 5U-5V, movement of contact 11738 in direction 11742 is detected.

In some embodiments, for a first time period during the gesture, the user interface object is over an invalid drop target, and for a second time period during the gesture, the user interface object is over a valid drop target (11812). The device, during the first period of time, generates (11814) an invalid-drop-target tactile output on the touch-sensitive surface. The device, during the second period of time, generates (11816) a valid-drop-target tactile output on the touch-sensitive surface, where the invalid-drop-target tactile output is different from the valid-drop-target tactile output. In some situations, when a user interface object is moved, the user interface object is over a valid drop target or location for a time period and is over an invalid drop target or location for another time period (e.g., as illustrated in FIGS. 5I-5K). During the time period when the user interface object is over a valid drop target or location, a tactile output is generated on touch-sensitive surface 451. During the time period when the user interface object is over an invalid drop target or location, a different tactile output is generated on touch-sensitive surface 451.

For example, in FIGS. 5I-5K, user interface object 11702-2 is moved in accordance with the movement of contact 11708 on touch-sensitive surface 451. In FIG. 5J, user interface object 11702-2 moves over window 11704, an invalid drop target. In FIG. 5K, user interface object 11702-2 moves over empty space in user interface 11700, a valid drop target. During the period when user interface object 11702-2 is moving over window 11704, a tactile output is generated. During the period when user interface object 11702-2 is moving over empty space in user interface 11700, a tactile output different from that generated for the period when user interface object 11702-2 is moving over window 11704 is generated. The tactile outputs is different with respect to amplitude and/or movement profile. For example, the touch-sensitive surface optionally provides a high frequency periodic tactile output (e.g., a slight buzzing) while user interface object 11702-2 is over an invalid drop target and either does not provide any tactile output or provides a low frequency periodic tactile output (e.g., a periodic ping) while user interface object 11702-2 is over a valid drop target.

The device detects (11818) a reduction in intensity of the contact below an object-release threshold. When user interface object 11702-2 is moved to the target location for the drop, the user reduces the intensity of contact 11708 below the object-release threshold (e.g., reducing intensity of the contact while maintaining the contact or lifting the contact off of the touch-sensitive surface) to make the drop attempt, as shown in FIG. 5E, 5H, or 5L, for example. As another example, when user object 11732-2 is moved to the target location for the drop, the user reduces the intensity of contact 11738 below the object-release threshold (e.g., reducing intensity of the contact while maintaining the contact or lifting the contact off of the touch-sensitive surface) to make the drop attempt, as shown in FIG. 5T or 5W.

In response to detecting the reduction in intensity below the object-release threshold (11820), in accordance with a determination that the movement meets predefined operation-performance criteria (11822), the device performs (11824) the operation and generates (11826) a first tactile output on the touch-sensitive surface. In accordance with a determination that the movement does not meet the predefined operation-performance criteria (11828), the device forgoes (11830) performance of the operation and generates (11832) a second tactile output on the touch-sensitive surface, where the second tactile output is different from the first tactile output. For example, in response to the reduction in intensity of contact 11708 or 11738 below the object-release threshold (e.g., a reduction in intensity of the contact while maintaining the contact or lifting the contact off of the touch-sensitive surface), an attempt to drop user interface object 11702-2 or 11732-2, respectively is made. Whether the drop is performed (e.g., if the drop is successful or not) depends on whether one or more predefined operation-performance criteria are satisfied. In some embodiments, for a drop operation, a criterion for operation performance is whether the drop target/location is valid. If user interface object 11702-2 or 11732-2 is over a valid drop target (and thus a determination is made that the predefined operation-performance criteria for a drop are satisfied), such as empty space in user interface 11700 or 11736, the drop is performed, as shown in FIG. 5E, 5L, or 5T, respectively, and a tactile output associated with a successful drop is generated on touch-sensitive surface 451 or touch-sensitive display 112. If user interface object 11702-2 or 11732-2 is over an invalid drop target (and thus a determination is made that the predefined operation-performance criteria for a drop are not satisfied), such as window 11704 or 11734, the drop is not performed, as shown in FIG. 5H or 5W, respectively, and a tactile output associated with an unsuccessful drop is generated on touch-sensitive surface 451 or touch-sensitive display 112.

In some embodiments, the operation is an object drop operation (e.g., a file move operation such as dragging an icon representing a file to a new location in a file manager user interface), the movement corresponds to movement of the user interface object to a respective location in the user interface, the movement meets the predefined operation-performance criteria when the respective location is a valid drop location, and the movement does not meet the predefined operation-performance criteria when the respective location is an invalid drop location (11834). As described above, the movement of contact 11708 is, optionally, part of a gesture for performing a drag and drop operation in user interface object 11702-2 that corresponds to movement of user interface object 11702-2 to a new location in user interface 11700. When user interface object 11702-2 is moved to a valid drop target/location, the movement in the gesture is considered to satisfy the criteria for performing a drop operation, and the drop is performed, as shown in FIG. 5E or 5L, for example. On the other hand, when user interface object 11702-2 is moved to an invalid drop target/location, the movement in the gesture is considered to not satisfy the criteria for performing a drop operation, and the drop is not performed, as shown in FIG. 5H, for example. Similarly, movement of contact 11738 is, optionally, part of a gesture for performing a drag and drop operation in user interface object 11732-2 that corresponds to movement of user interface object 11732-2 to a new location in user interface 11736. When user interface object 11732-2 is moved to a valid drop target/location, the movement in the gesture is considered to satisfy the criteria for performing a drop operation; the drop is performed, as shown in FIG. 5T, for example. On the other hand, when user interface object 11732-2 is moved to an invalid drop target/location, the movement in the gesture is considered to not satisfy the criteria for performing a drop operation; the drop is not performed, as shown in FIG. 5W, for example.

In some embodiments, the first tactile output is generated by movement of the touch-sensitive surface that includes a first dominant movement component (e.g., movement corresponding to the initial impulse, ignoring any unintended resonance), the second tactile output is generated by movement of the touch-sensitive surface that includes a second dominant movement component, and the first dominant movement component and the second dominant movement component have a same movement profile (e.g., same waveform shape such as square, sine, squine, sawtooth or triangle; and/or approximately the same width/period) and different amplitudes (11836). The tactile output for a successful drop and the tactile output for an unsuccessful drop both have respective dominant movement components that have respective movement profiles (for example, the movement profiles depicted in FIGS. 5N and 5O, respectively). The two tactile outputs optionally have the same movement profile but different amplitudes, as shown in FIGS. 5N and 5O, for example. Thus, in some embodiments, the tactile outputs for a successful drop and an unsuccessful drop optionally differ in amplitude rather than in the movement profile; one sensation is a more intense version of the other sensation.

In some embodiments, the selection tactile output corresponds to a tactile sensation that simulates a down-click of a mechanical button, the first tactile output corresponds to a first tactile sensation that simulates an up-click of the mechanical button, and the second tactile output corresponds to a second tactile sensation that simulates an up-click of the mechanical button, where the second tactile sensation feels different (e.g., to a user of the device) from the first tactile sensation (11838). The selection tactile output corresponds to a simulation of, for example, a click-and-hold of a mouse button on mouse 350 or trackpad of device 300. The first tactile output corresponds to a tactile sensation that simulates a release of the mouse button (or trackpad button). The second tactile output corresponds to a tactile sensation that simulates the release of the mouse button (or trackpad button) in a way that is different from the first tactile output. The first and second tactile sensations optionally simulate the mouse button release differently by using, for example, different amplitudes and/or different movement profiles.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 11800 described above with respect to FIGS. 6A-6B. For example, the contacts, user interface objects, tactile outputs, intensity thresholds, and focus selectors described above with reference to method 11800 optionally have one or more of the characteristics of the contacts, gestures, user interface objects, tactile outputs, intensity thresholds, and focus selectors described herein with reference to other methods described herein (e.g., those listed in the fifth paragraph of the Description of Embodiments). For brevity, these details are not repeated here.

Figure 7:
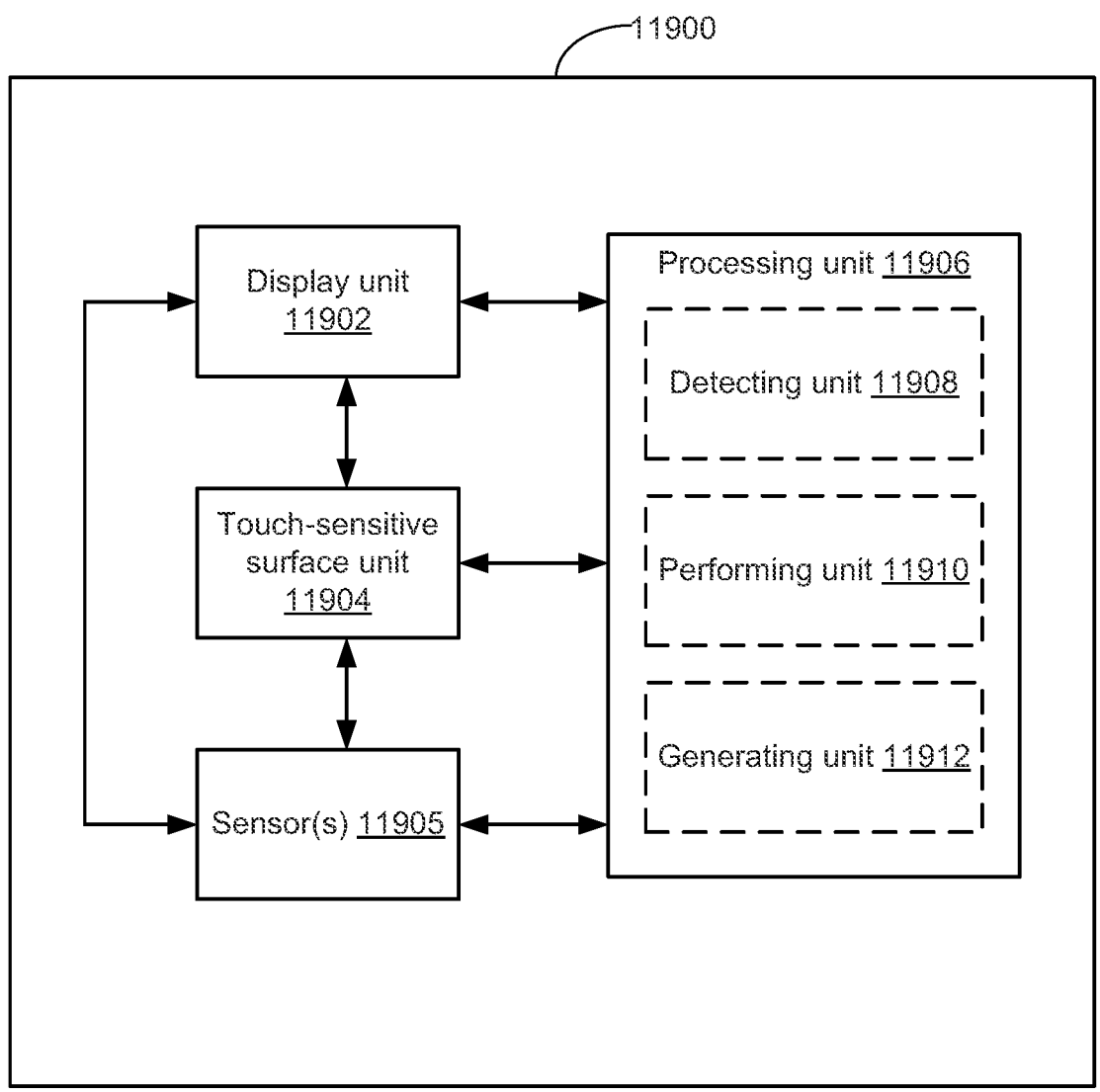
FIG. 7 is a functional block diagram of an electronic device in accordance with some embodiments.

In accordance with some embodiments, FIG. 7 shows a functional block diagram of an electronic device 11900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein. As shown in FIG. 7, an electronic device 11900 includes a display unit 11902 configured to display a user interface object, a touch-sensitive surface unit 11904 configured to receive contacts, one or more sensor units 11905 configured to detect intensity of contacts with the touch-sensitive surface unit 11904, and a processing unit 11906 coupled to the display unit 11902, the touch-sensitive surface unit 11904, and the sensor units 11905. In some embodiments, the processing unit 11906 includes a detecting unit 11908, a performing unit 11910, and a generating unit 11912.

The processing unit 11906 configured to: detect, on the touch-sensitive surface unit 11904, a contact having an intensity above an object-selection threshold (e.g., with the detecting unit 11908); detect movement of the contact across the touch-sensitive surface unit 11904, the movement corresponding to a preliminary portion of a gesture for performing an operation corresponding to the user interface object (e.g., with the detecting unit 11908); detect a reduction in intensity of the contact below an object-release threshold (e.g., with the detecting unit 11908); and in response to detecting the reduction in intensity below the object-release threshold: in accordance with a determination that the movement meets predefined operation-performance criteria: perform the operation (e.g., with the performing unit 11910); and generate a first tactile output on the touch-sensitive surface unit 11904 (e.g., with the generating unit 11912); and in accordance with a determination that the movement does not meet the predefined operation-performance criteria: forgo performance of the operation (e.g., with the performing unit 11910); and generate a second tactile output on the touch-sensitive surface unit 11904, wherein the second tactile output is different from the first tactile output (e.g., with the generating unit 11912).

In some embodiments, the operation is an object drop operation, the movement corresponds to movement of the user interface object to a respective location in the user interface, the movement meets the predefined operation-performance criteria when the respective location is a valid drop location, and the movement does not meet the predefined operation-performance criteria when the respective location is an invalid drop location.

In some embodiments, the processing unit 11906 is configured to, prior to detecting movement of the contact across the touch-sensitive surface unit 11904: in response to detecting an increase in intensity of the contact above the object-selection threshold, generate a selection tactile output on the touch-sensitive surface unit 11904 indicative of the selection (e.g., with the generating unit 11912).

In some embodiments, the selection tactile output corresponds to a tactile sensation that simulates a down-click of a mechanical button, the first tactile output corresponds to a first tactile sensation that simulates an up-click of the mechanical button, and the second tactile output corresponds to a second tactile sensation that simulates an up-click of the mechanical button, where the second tactile sensation feels different from the first tactile sensation.

In some embodiments, the first tactile output is generated by movement of the touch-sensitive surface unit 11904 that includes a first dominant movement component, the second tactile output is generated by movement of the touch-sensitive surface unit 11904 that includes a second dominant movement component, and the first dominant movement component and the second dominant movement component have a same movement profile and different amplitudes.

In some embodiments, for a first time period during the gesture, the user interface object is over an invalid drop target, for a second time period during the gesture, the user interface object is over a valid drop target, and the processing unit 11906 is configured to: during the first period of time generate an invalid-drop-target tactile output on the touch-sensitive surface unit 11904 (e.g., with the generating unit 11912), and during the second period of time generate a valid-drop-target tactile output on the touch-sensitive surface unit 11904, where the invalid-drop-target tactile output is different from the valid-drop-target tactile output (e.g., with the generating unit 11912).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6B are, optionally, implemented by components depicted in FIGS. 1A-1B or FIG. 7. For example, detection operations 11804, 11810, and 11818, performing operation 11824, forgoing operation 11830, and generating operations 11826 and 11832 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 3.

Performing Operations Based on Modified Inputs

Many electronic devices include a mouse or similar input device that provides left-click functionality and right-click functionality for activating different operations. As devices economize on the number of buttons and input devices, the left-click functionality and right-click functionality is, optionally, invoked using one input device, such as a trackpad. In existing methods, when either functionality is invoked using the one input device, the user is not given sufficient feedback indicating whether the activated operation was an operation not associated with a modifier input (e.g., a left-click operation) or an operation associated with a modifier input (e.g., a right-click operation). The embodiments below improve on the existing methods by providing different tactile output when device detects an input while a modifier input is detected than when the device detects a similar input while a modifier input is not detected. Thus, the device provides the user with tactile feedback indicating whether or not the modifier input was detected instead of or in addition to any visual or audible feedback indicating that the modifier input was detected. This additional (or alternative) feedback enables the user to operate the device more quickly and efficiently, thereby creating a more efficient human-machine interface.

FIGS. 8A-8V illustrate exemplary user interfaces for providing feedback corresponding to modifier inputs in accordance with some embodiments. The user interfaces in these figures are used to illustrate the processes described below, including the processes in FIGS. 9A-9B. FIGS. 8A-8V include intensity diagrams that show the current intensity of the contact on the touch-sensitive surface relative to a plurality of intensity thresholds including a first activation threshold (e.g., "$IT_L$") and a second activation threshold (e.g., "$IT_1$" or "$IT_L$"). In some embodiments, operations similar to those described below with reference to "$IT_L$" are performed with reference to a different intensity threshold (e.g., "$IT_D$").

FIG. 8A illustrates user interface 12000 (e.g., a desktop user interface) displayed on display 450 (e.g., display 340) of a device (e.g., device 300). One or more user interface objects 12002 are, optionally, displayed on user interface 12000. In FIG. 8A, user interface objects 12002-1 through 12002-3 are displayed on user interface 12000. A user interface object 12002 is, optionally, for example, an application shortcut or launch icon.

Cursor 12004 is also displayed on user interface 12000. In some embodiments, cursor 12004 is a mouse pointer. Cursor 12004 is an example of a focus selector. In FIG. 8A, cursor 12004 is displayed over user interface object 12002-2.

The device includes one or more sensors that detect the intensity of contacts with touch-sensitive surface 451 (e.g., touchpad 355) of the device. In FIG. 8A, the intensity of contact 12006 is detected to be below a first activation threshold (e.g., "$IT_L$").

The intensity of a contact (e.g., contact 12006) on touch-sensitive surface 451 is, optionally, increased or decreased by, for example, the user increasing or decreasing, respectively, the pressure on touch-sensitive surface 451 with the contact. The change in intensity of the contact is, optionally, detected by the sensors in the device.

Figure 8B:
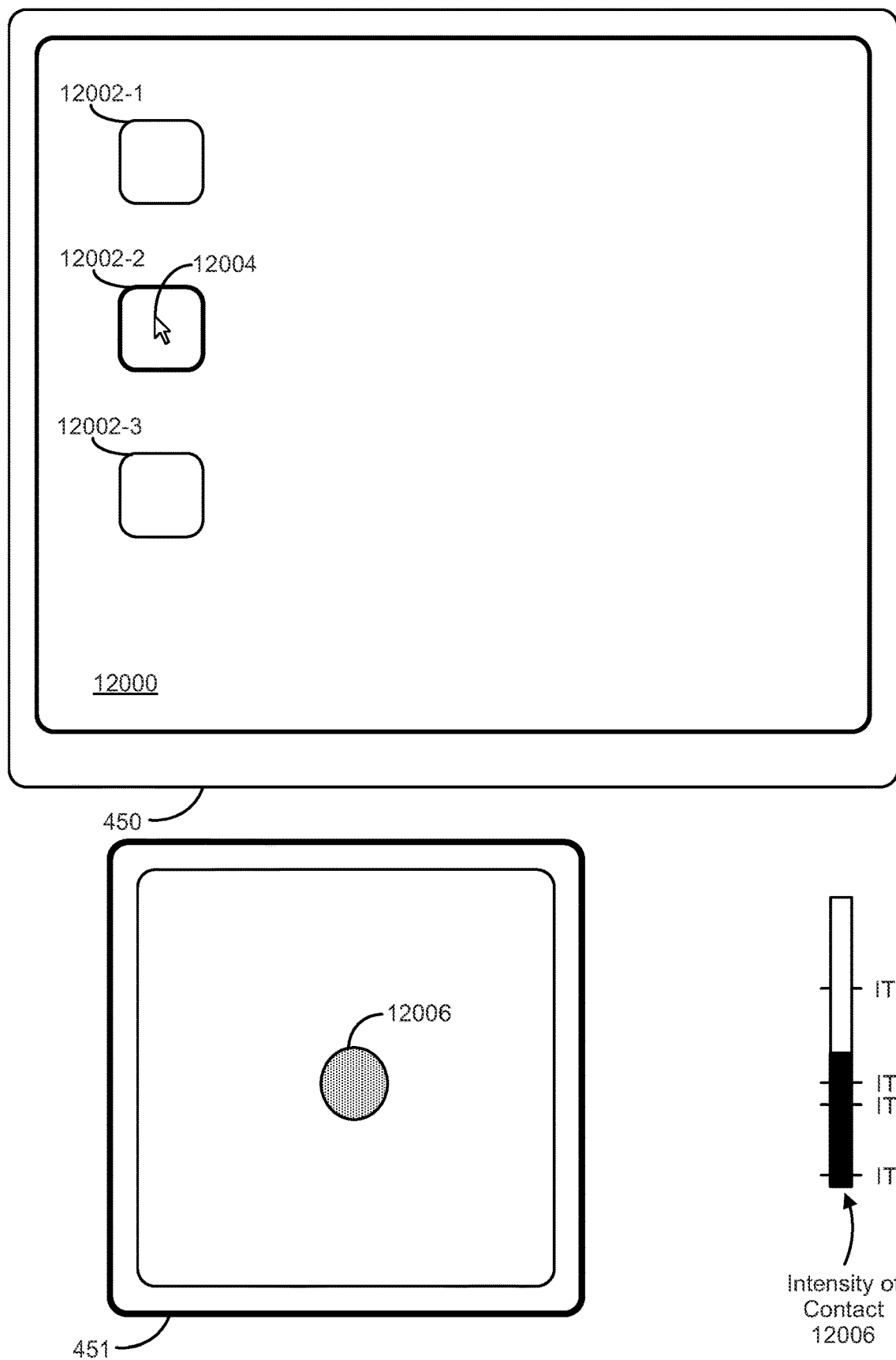

In FIG. 8B, the device detects an increase in intensity of contact 12006 above the first activation threshold. In some situations, after detecting the increase in intensity of contact 12006, a decrease in the intensity of contact 12006 (e.g., a liftoff of contact 12006 from touch-sensitive surface 451) below a second activation threshold (e.g., "$IT_1$") is be detected by the intensity sensors in the device. In some embodiments, the first activation threshold and the second activation threshold are different and the second activation threshold is lower than the first activation threshold (e.g., the first activation threshold is "$IT_L$" and the second activation threshold is "$IT_1$" or, alternatively, "$IT_0$"). In some other embodiments, the first activation threshold and the second activation threshold are the same (e.g., the first activation threshold is "$IT_L$" and the second activation threshold is also "$IT_L$").

Figure 8C:
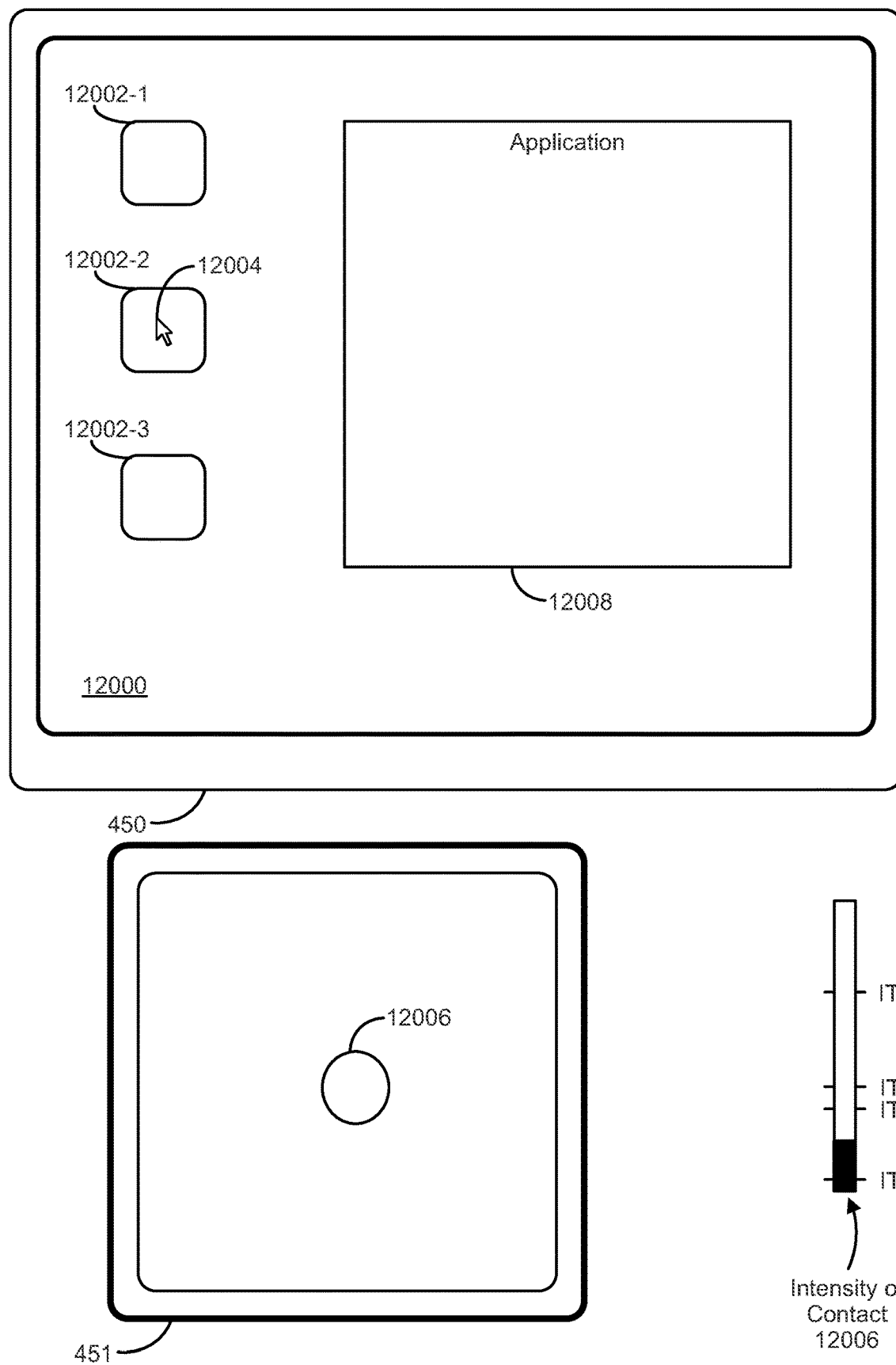

In response to the detection of the decrease in intensity of contact 12006 below the second activation threshold (e.g., "$IT_1$"), after detection of the increase in the intensity of contact 12006 above the first activation threshold (e.g., "$IT_L$"), one or more operations associated with user interface object 12002-2, over which cursor 12004 is positioned, are, optionally, performed. In some embodiments, the operation(s) include displaying a new application window associated with user interface object 12002-2. For example, if user interface object 12002-2 is an icon (e.g., an application launch or shortcut icon) corresponding to an application, window 12008 for the corresponding application is, optionally, displayed on user interface 12000, as shown in FIG. 8C.

In some embodiments, user interface object 12002-2 is visually highlighted in response to the detection of the increase then decrease in intensity, or in response to the detection of the increase in intensity. Examples of visual highlighting include a different color or thicker borders (as shown in FIG. 8C).

Additionally, in response to detection of the decrease in the intensity of contact 12006 below the second activation threshold, after detection of the increase in the intensity of contact 12006 above the first activation threshold, a tactile output is generated on touch-sensitive surface 451. The tactile output is, optionally, generated in accordance with a movement profile (e.g., movement profiles illustrated in FIGS. 8P-8Q) and/or an amplitude.

Figure 8D:
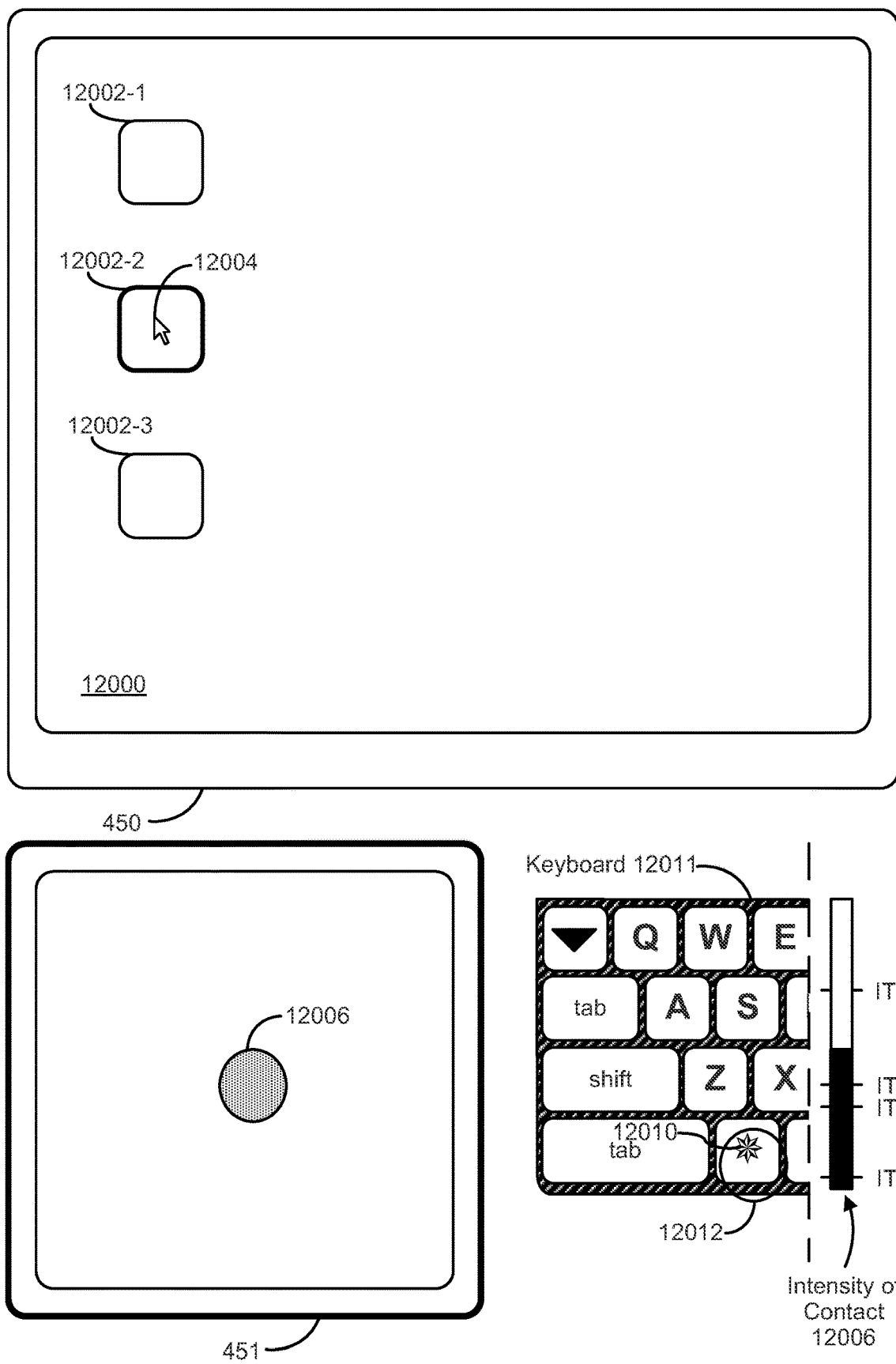
Figure 8E:
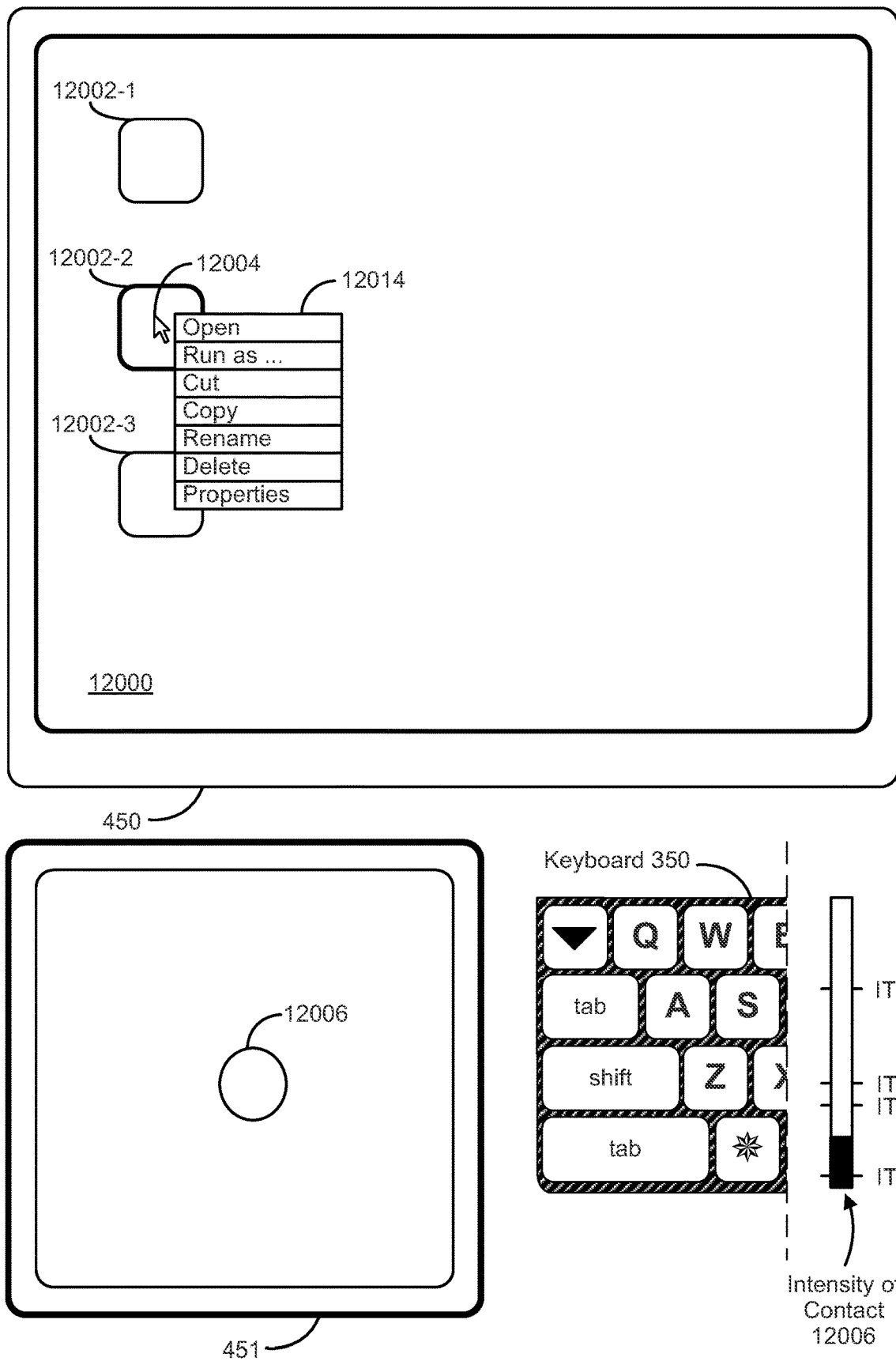

Returning to FIG. 8A, the intensity of contact 12006 is, optionally, increased above the first activation threshold concurrently with the detection of a modifier input. An example of a modifier input is a key press of a key (e.g., on a keyboard) assigned to be a modifier key. A key on keyboard 12011 (e.g., keyboard 350) is, optionally, pre-assigned to be a modifier key (e.g., as a default) or assigned by a user. FIG. 8D shows key press 12012 on key 12010 of keyboard 12011 concurrent with detection of an increase in the intensity of contact 12006 above the first activation threshold. After concurrent detection of the increase in the intensity of contact 12006 above the first activation threshold (e.g., "$IT_L$") and of key press 12012 on key 12010, the intensity of contact 12006 is decreased below a second activation threshold (e.g., "$IT_1$"), as shown in FIG. 8E (at which point continued pressing of key 12010 is optional). In response to detecting the decrease in the intensity of contact 12006 below the second activation threshold, after concurrent detection of the increase in the intensity of contact 12006 above the first activation threshold and key press 12012 of key 12010, an operation different from that performed when no modifier input is detected is performed. For example, FIG. 8E shows context menu 12014 displayed on user interface 12000 near cursor 12004 in response to the detection of the decrease in the intensity of contact 12006 below the second activation threshold, after concurrent detection of the increase in the intensity of contact 12006 above the first activation threshold and press 12012 of key 12010. The operation of displaying context menu 12014 is different from the operation of displaying application window 12008 (FIG. 8C) that was performed in response to detection of the decrease in the intensity of contact 12006 below the second activation threshold, after detection of the increase in the intensity of contact 12006 above the first activation threshold without concurrent detection of a press of key 12010. Context menu 12014 includes menu options associated with user interface object 12002-2, over which cursor 12004 is positioned, such as "rename," "properties," and so on. The menu options include options for performing operations on or with respect to user interface object 12002-2.

Figure 8F:
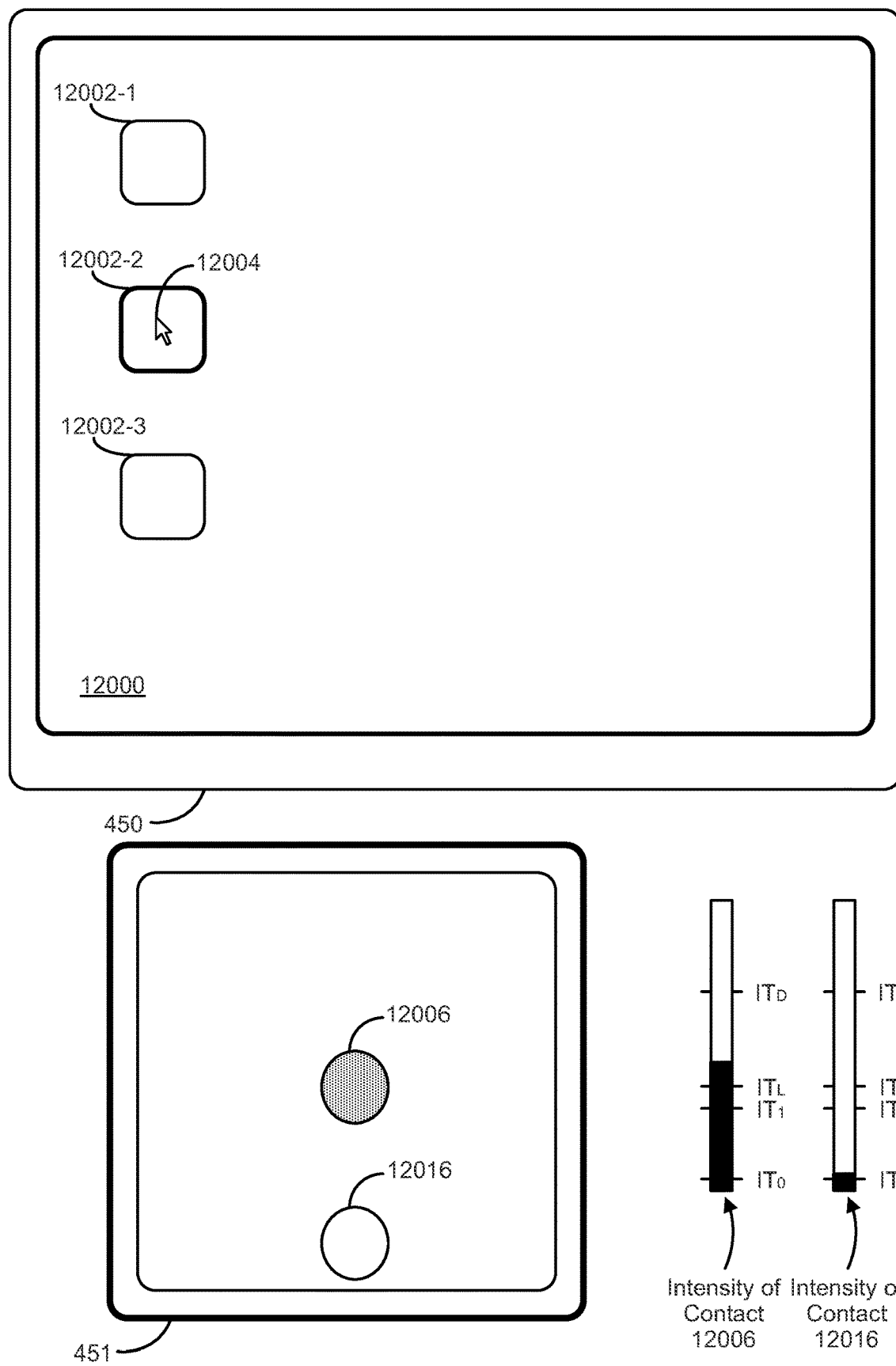
Figure 8G:
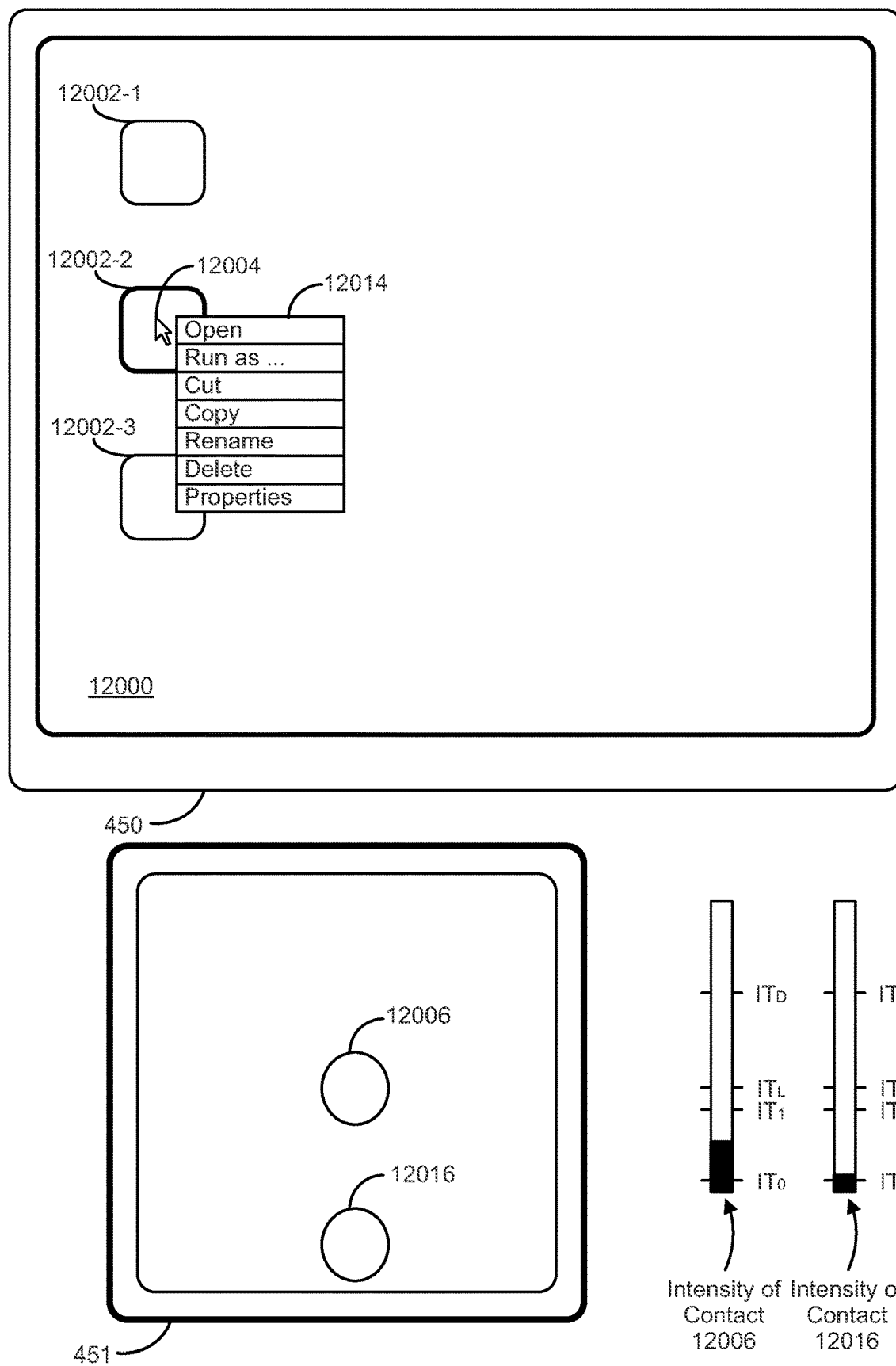

Another example of a modifier input is an additional contact that is detected on touch-sensitive surface 451 concurrently with contact 12006. FIG. 8F shows contact 12016 detected on touch-sensitive surface 451 concurrently with the detection of an increase in the intensity of contact 12006 above the first activation threshold (e.g., "$IT_L$") and a subsequent decrease in the intensity of contact 12006 below the second activation threshold (e.g., "$IT_1$"), as shown in FIG. 8G. In response to detection of the decrease in the intensity of contact 12006 below the second activation threshold, after concurrent detection of the increase in the intensity of contact 12006 above the first activation threshold and contact 12016, context menu 12014 is displayed on user interface 12000, as shown in FIG. 8G.

Figure 8H:
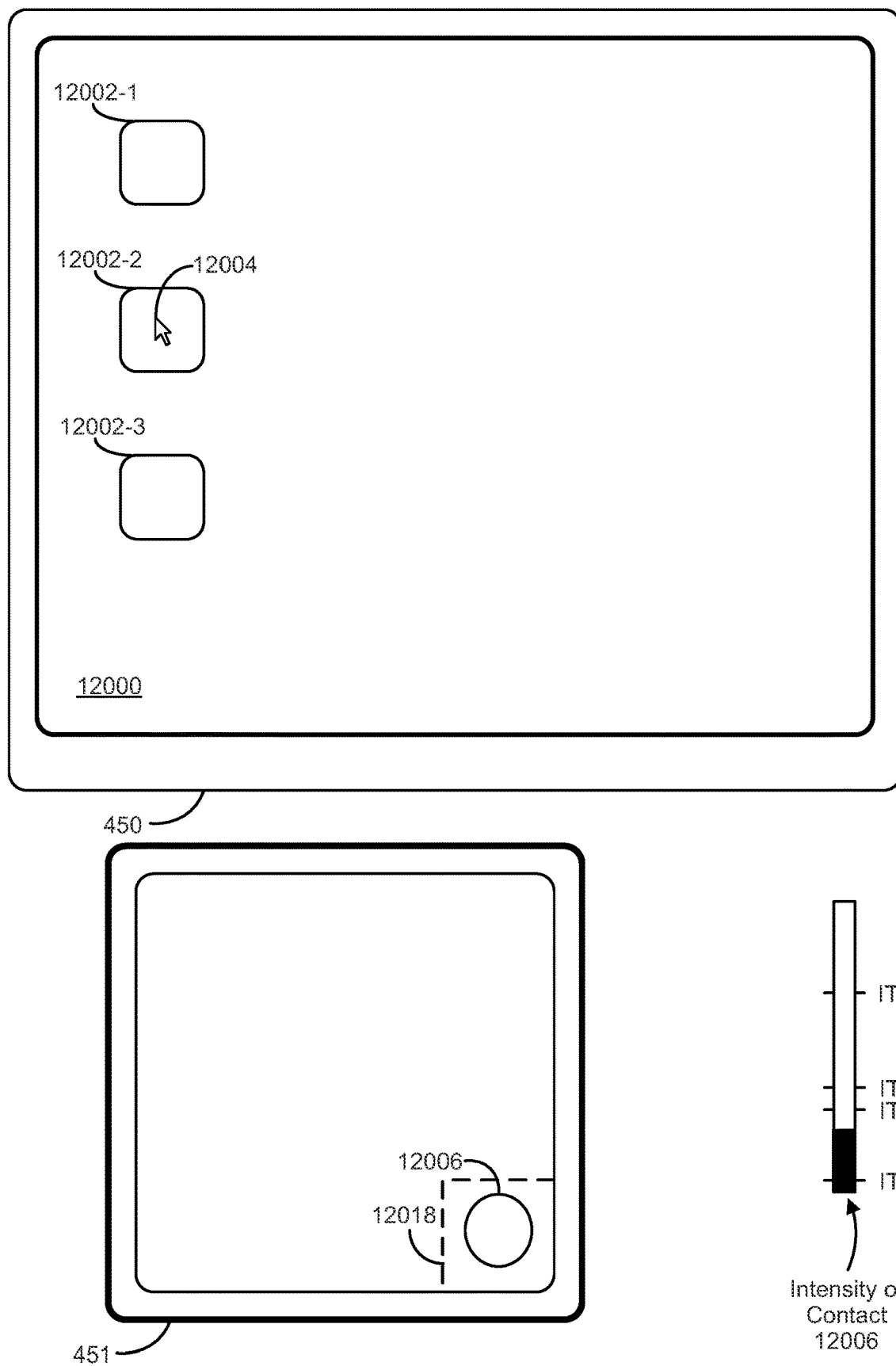
Figure 8I:
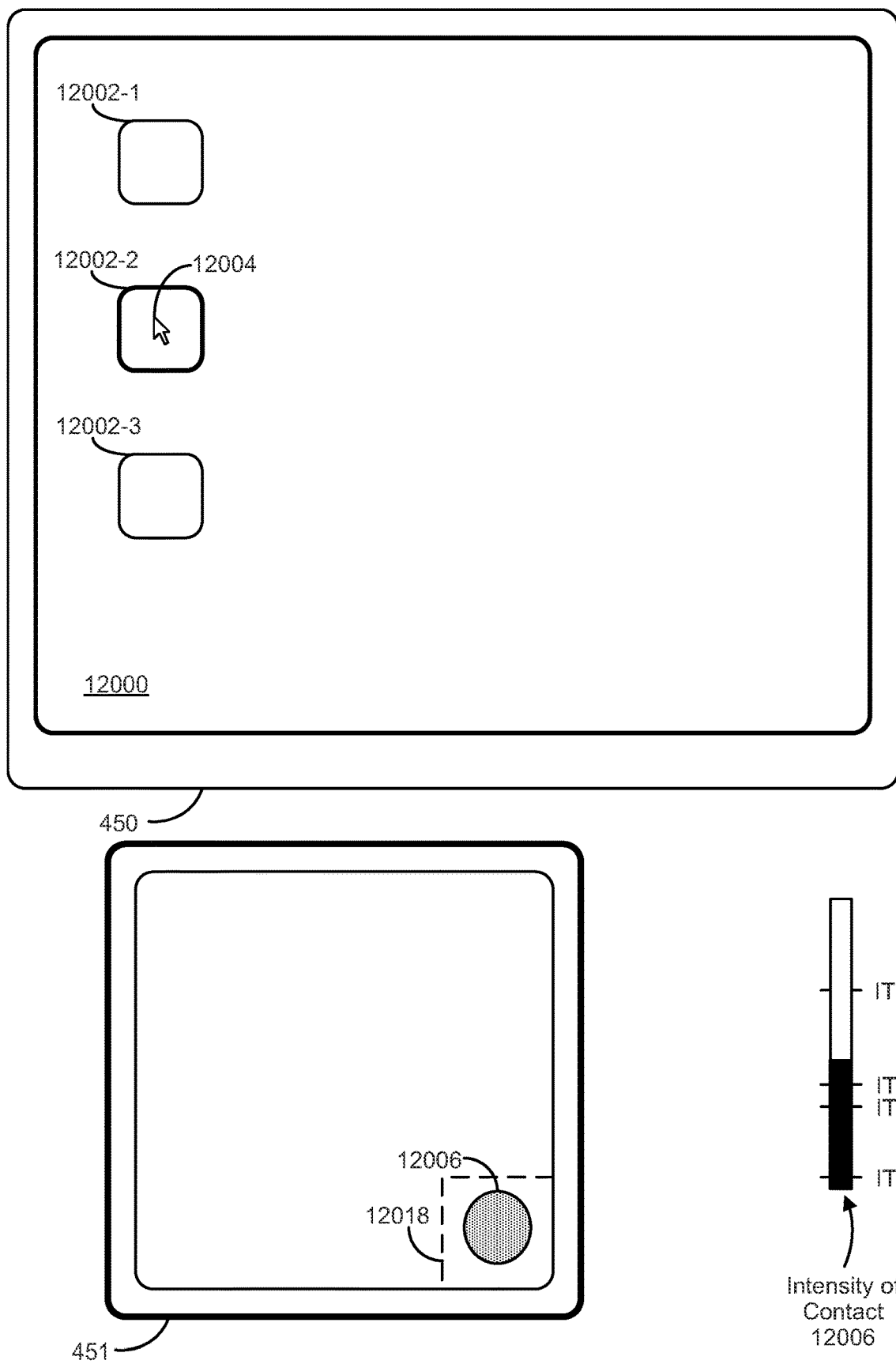
Figure 8J:
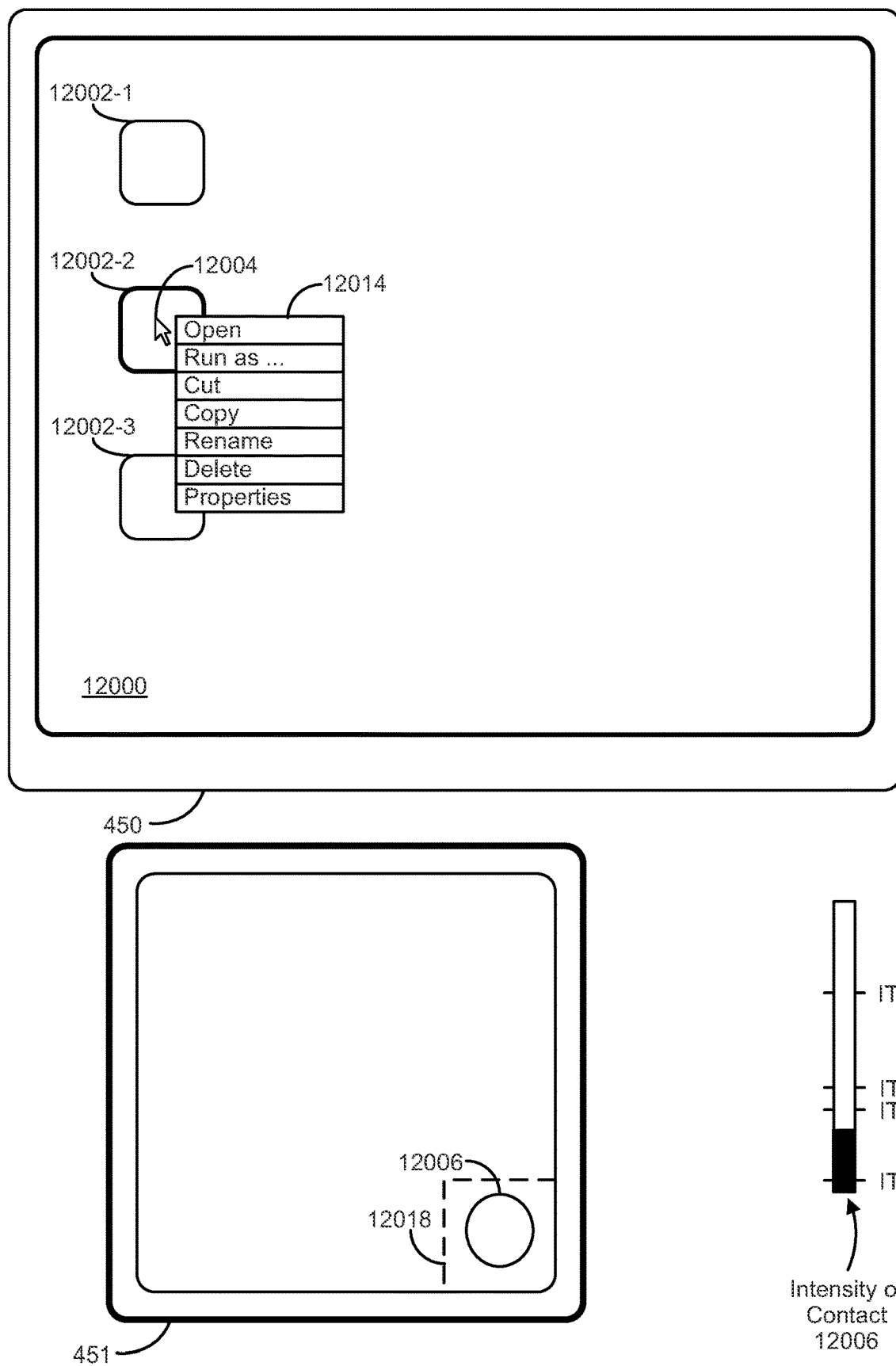

A further example of a modifier input is detection of the contact 12006 at a specific area on touch-sensitive surface 451, as opposed to an arbitrary location on touch-sensitive surface 451 outside of the specific area on the touch-sensitive surface. FIG. 8H shows contact 12006 detected in area 12018 on touch-sensitive surface 451, at an intensity below the first activation threshold. An increase in the intensity of contact 12006 in area 12018 above the first activation threshold (e.g., "$IT_L$") is detected, as shown in FIG. 8I. Then, a decrease in the intensity of contact 12006 in area 12018 below the second activation threshold (e.g., "$IT_L$") is detected, as shown in FIG. 8J. In response to detection of the decrease in the intensity of contact 12006 in area 12018 below the second activation threshold, after detection of the increase in the intensity of contact 12006 in area 12018 above the first activation threshold, context menu 12014 is displayed on user interface 12000, as shown in FIG. 8J. Here, intensity of contact 12006 in a defined area (e.g., area 12018) on touch-sensitive surface 451 modified the input of contact 12006.

In some embodiments, the defined area (e.g., area 12018) on touch-sensitive surface 451 for modifying the input is predefined, or it is, optionally, defined by the user (e.g., from a predefined set of choices). Further, it should be appreciated that the size and location of area 12018 as shown in FIGS. 8H-8J are merely an illustrative example, and other sizes and/or locations for area 12018 are possible.

Additionally, in response to detection of the decrease in the intensity of contact 12006 below the second activation threshold (e.g., "$IT_1$"), after concurrent detection of the increase in the intensity of contact 12006 above the first activation threshold (e.g., "$IT_L$") and a modifier input (e.g., press 12012 of modifier key 12010, contact 12016, detecting contact 12006 in area 12018 on touch-sensitive surface 451), a tactile output (e.g., a "modifier-active tactile output") is generated on touch-sensitive surface 451. This tactile output (e.g., a "modifier-active tactile output") corresponds to a different tactile sensation from the tactile sensation corresponding to a tactile output (e.g., a "no-modifier tactile output") generated in response to detection of the decrease in intensity of contact 12006 below the second activation threshold without detection of a modifier input when the increase in intensity of contact 12006 above the first activation threshold is detected, as illustrated in FIGS. 8A-8C.

Thus, when an increase in the intensity of contact 12006 above the first activation threshold and a subsequent decrease in the intensity of contact 12006 below the second activation threshold are detected, the operation that is performed depends on whether a modifier input is detected while the increase in intensity above the first activation threshold is detected. In some embodiments, the operation(s) performed in response to detection of the intensity decrease, after detection of the intensity increase without a modifier input, correspond to operations associated with a left-click of a mouse (or similar input device), and the operation(s) performed in response to detection of the intensity decrease, after detection of the intensity increase with a modifier input, correspond to operations associated with a right-click of a mouse (or similar input device). Left-click operations include, for example, activating an application launch or shortcut icon, displaying an application window corresponding to an application associated with an icon, selecting an icon or other user interface object, and so on. Right-click operations include, for example, displaying a context menu (e.g., context menu 12014 or 12024).

In some other embodiments, the association is, optionally, reversed; the operation(s) performed in response to detection of the intensity decrease, after detection of the intensity increase without a modifier input, correspond to operations associated with a right-click of a mouse (or similar input device), and the operation(s) performed in response to detection of the intensity decrease, after detection of the intensity increase with a modifier input, correspond to operations associated with a left-click of a mouse (or similar input device).

Further, the tactile output that is generated in response to the detection of the decrease in the intensity of contact 12006, after detection of the increase in the intensity of contact 12006, depends on the detection of, or lack of, a modifier input along with the detection of the intensity increase. In some embodiments, the tactile output generated when a modifier input is detected (e.g., a "modifier-active tactile output") is different from the tactile output generated when no modifier input is detected (e.g., a "no-modifier tactile output") in amplitude, movement profile, or both.

Figure 8K:
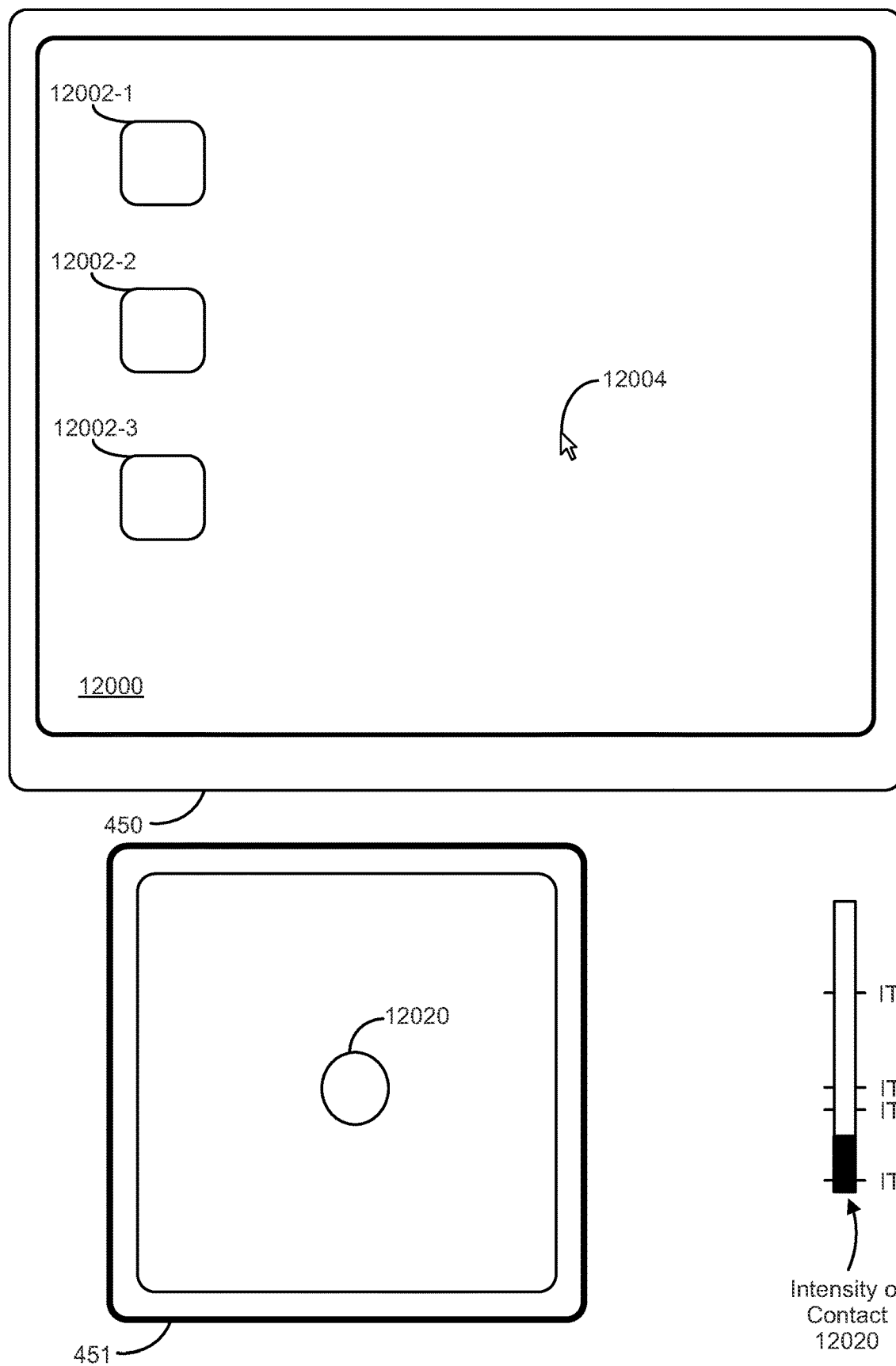
Figure 8L:
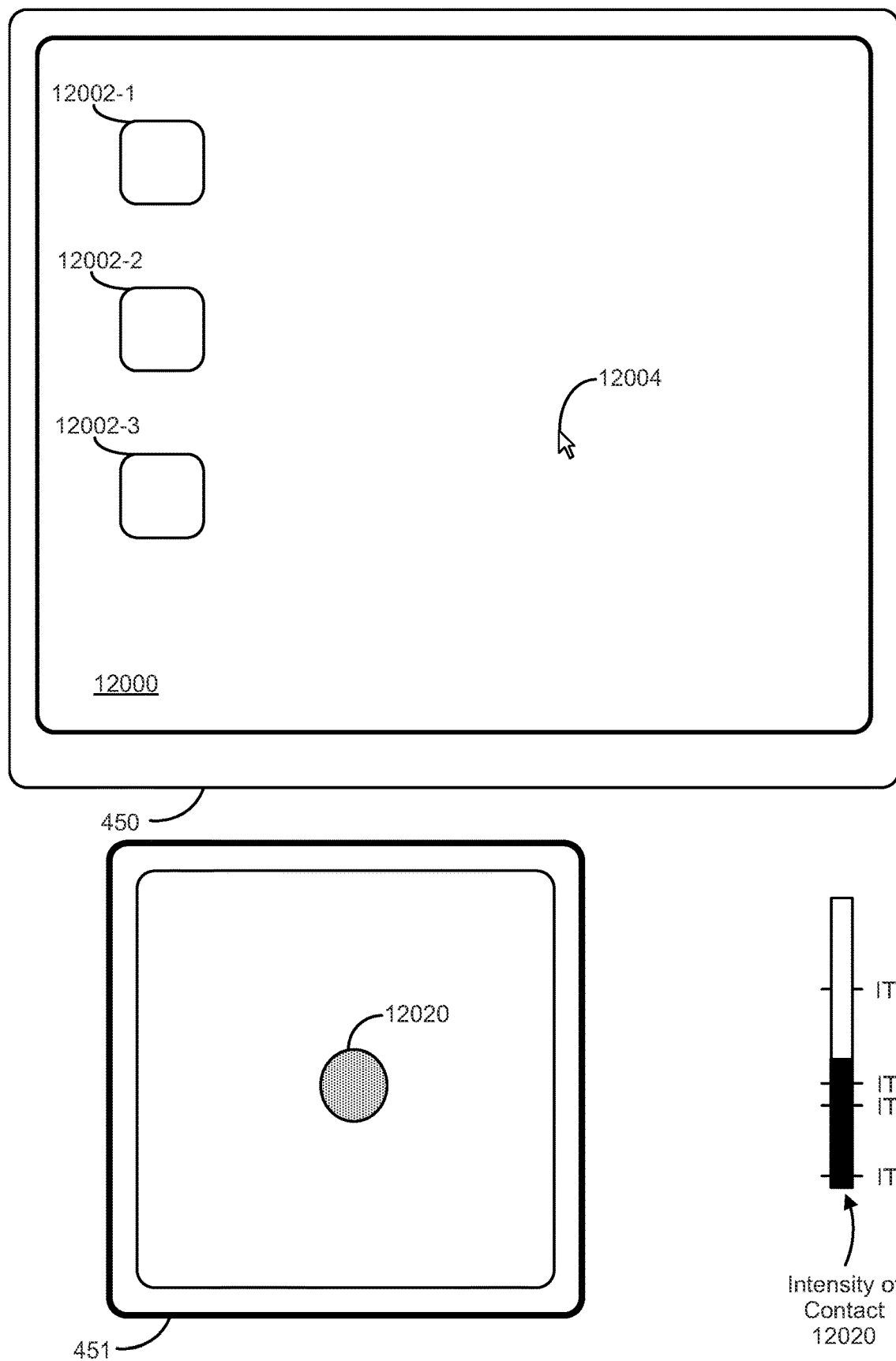
Figure 8M:
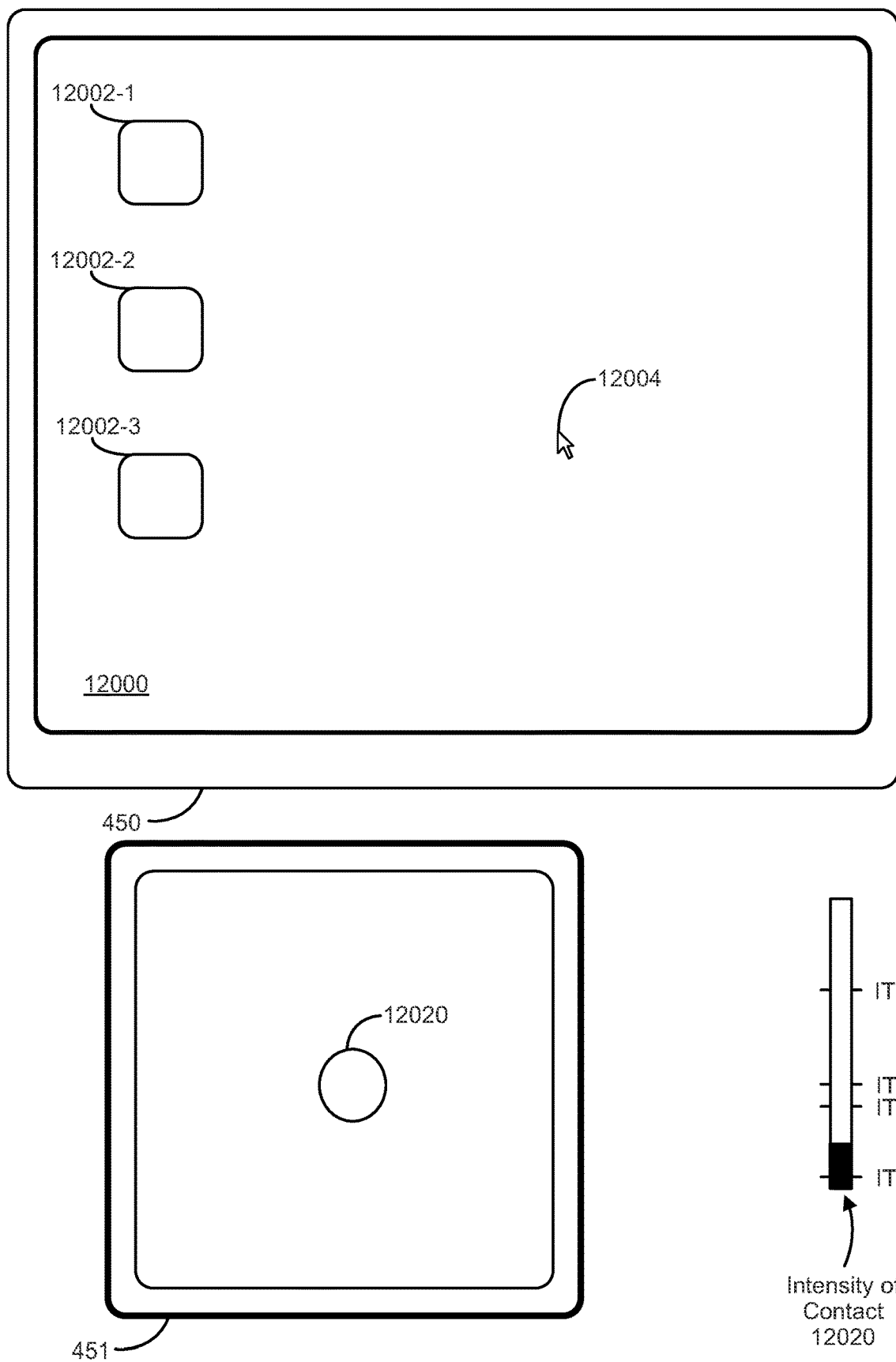

In some embodiments, the operation that is performed, if any, in response to detection of the decrease in intensity of a contact after detection of the increase in intensity of the contact depends on the position of the focus selector (e.g., cursor 12004) when the increase in intensity is detected, as well as whether a modifier input was detected. In the examples described above with reference to FIGS. 8A-8J, cursor 12004 is positioned over user interface object 12002-2. FIG. 8K shows cursor 12004 positioned over "empty space" on user interface 12000, away from user interface objects 12002. Contact 12020 is detected on touch-sensitive surface 451 at an intensity less than the first activation threshold (e.g., "$IT_L$"). In FIG. 8L, the device detects an increase in intensity of contact 12020 above the first activation threshold (e.g., "$IT_L$"). Then, the device detects a decrease in intensity of contact 12020 below the second activation threshold (e.g., "$IT_1$"), as shown in FIG. 8M. In response to the decrease of the intensity below the second activation threshold, no operation is performed. In some embodiments, left-clicks that occur when the focus selector is over empty space are ignored, and thus contact 12020 that increases and decreases in intensity with no modifier input while cursor 12004 is over empty space does not cause the device to perform an operation.

Figure 8N:
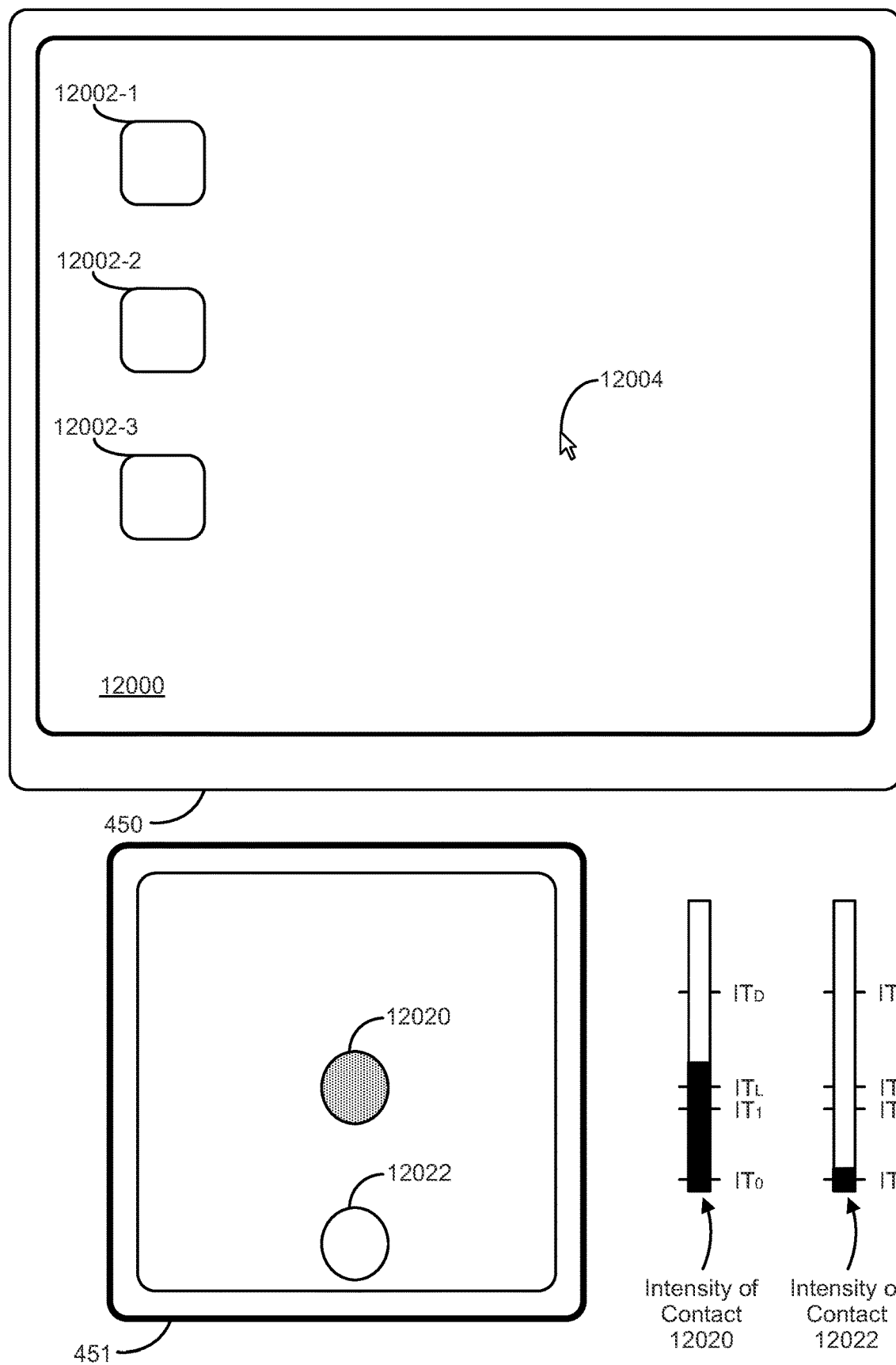
Figure 8O:
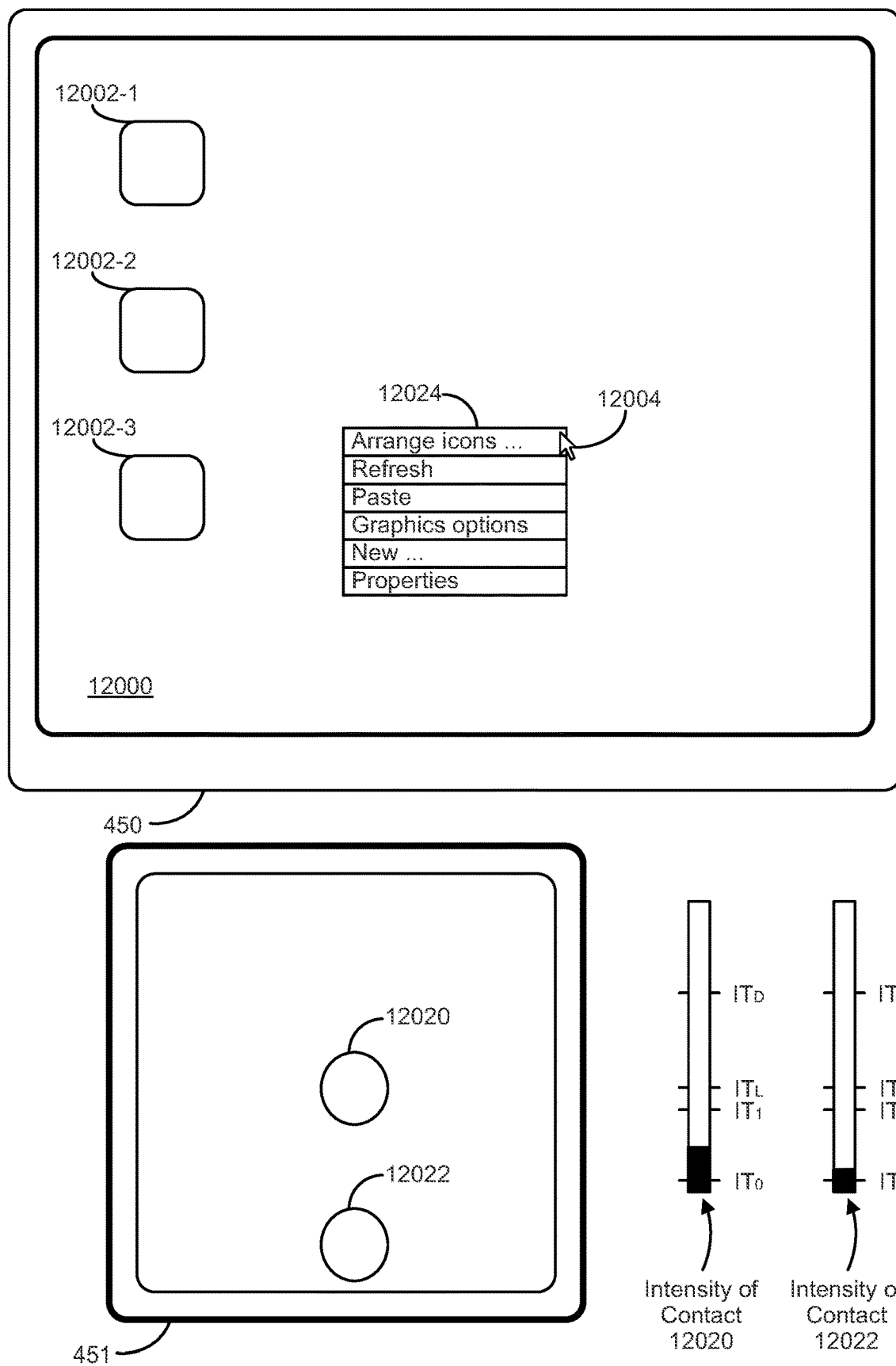

On the other hand, FIG. 8N shows a modifier input (e.g., contact 12022) detected concurrently with detection of an increase of the intensity of contact 12020 above the first activation threshold. Subsequently, the device detects a decrease in intensity of contact 12020 below the second activation threshold (e.g., "$IT_1$"), as shown in FIG. 8O. In response to the decrease of the intensity below the second activation threshold, context menu 12024 is displayed on user interface 12000. Context menu 12024 optionally includes different options than context menu 12014 (FIG. 8E, 8G, or 8J), as the context is changed by the positioning of cursor 12004 over empty space on user interface 12000 instead of user interface object 12002-2. In some embodiments, right-clicks that occur when the focus selector is over empty space activate displaying of a context menu, and thus contact 12020 that increases and decreases in intensity with a modifier input while cursor 12004 is over empty space cause the device to display a context menu (e.g., context menu 12024).

Figure 8P:
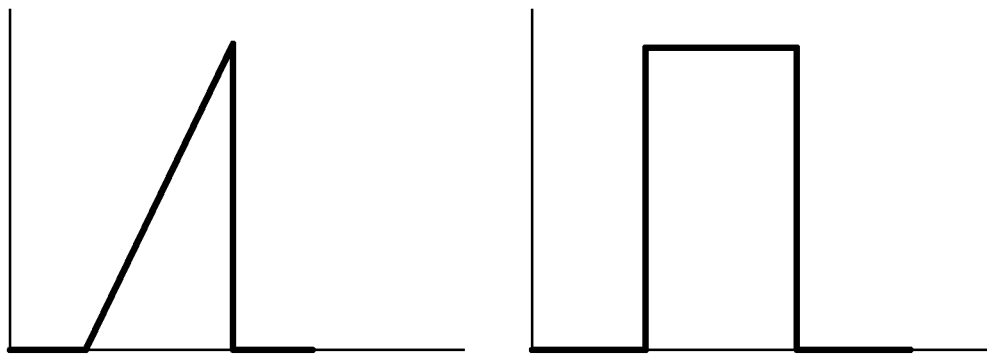
Figure 8Q:
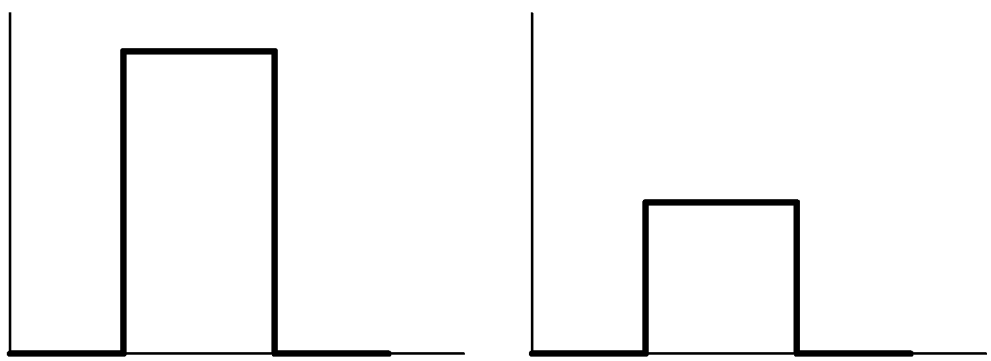

As described above, different tactile outputs are, optionally, generated depending on whether a modifier input was detected. FIGS. 8P-8Q illustrate example waveforms of movement profiles for generating these tactile outputs. FIG. 8P illustrates dominant movement components of two different tactile outputs with two different movement profiles (e.g., a sawtooth waveform on the left and a square waveform on the right). In some embodiments, one of the movement profiles (e.g., the sawtooth waveform) corresponds to a tactile output (e.g., a "modifier-active tactile output") for an increase and subsequent decrease in intensity detected while a modifier input is detected; and the other movement profile (e.g., the square waveform) corresponds to a tactile output (e.g., a "no-modifier tactile output") for an increase and subsequent decrease in intensity detected without detecting a modifier input. FIG. 8Q illustrates dominant movement components of two different tactile outputs with two different amplitudes (e.g., a high amplitude square waveform on the left and a low amplitude square waveform on the right). In some embodiments, one of the amplitudes (e.g., the high amplitude square waveform) corresponds to a tactile output (e.g., a "modifier-active tactile output") for an increase and subsequent decrease in intensity detected while a modifier input is detected; and the other amplitude (e.g., the low amplitude square waveform) corresponds to a tactile output (e.g., a "no-modifier tactile output") for an increase and subsequent decrease in intensity detected without detecting a modifier input. In some embodiments both the amplitude and the movement profile of the tactile output are selected in accordance with a determination as to on whether or not the modifier input was detected when the device detected the increase prior to detecting the subsequent decrease in intensity of the contact.

Figure 8R:
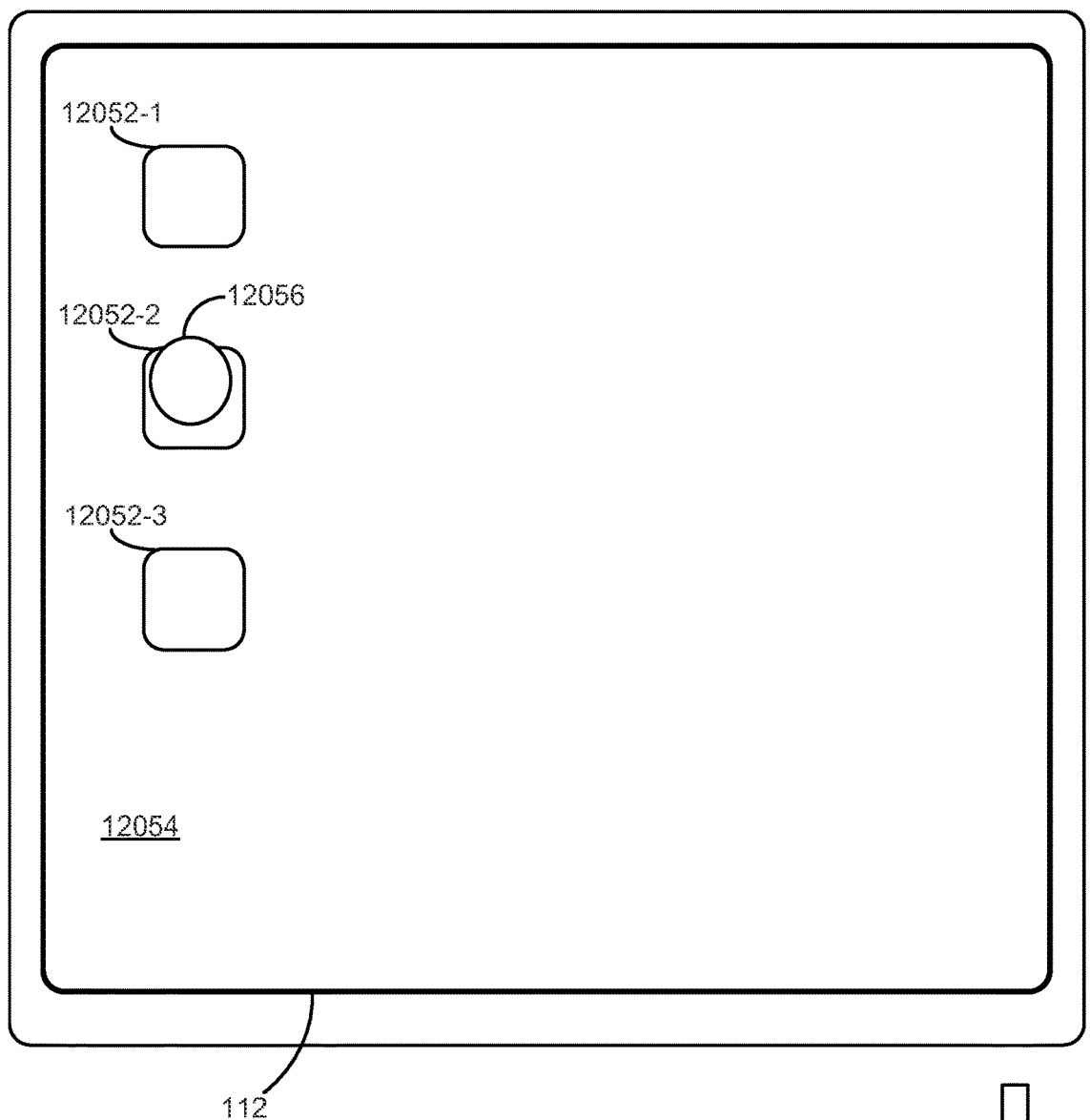
Figure 8R:
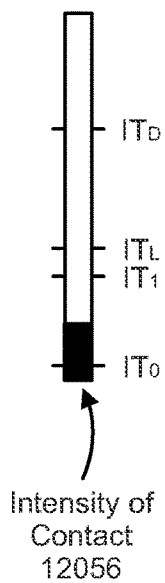
Figure 8S:
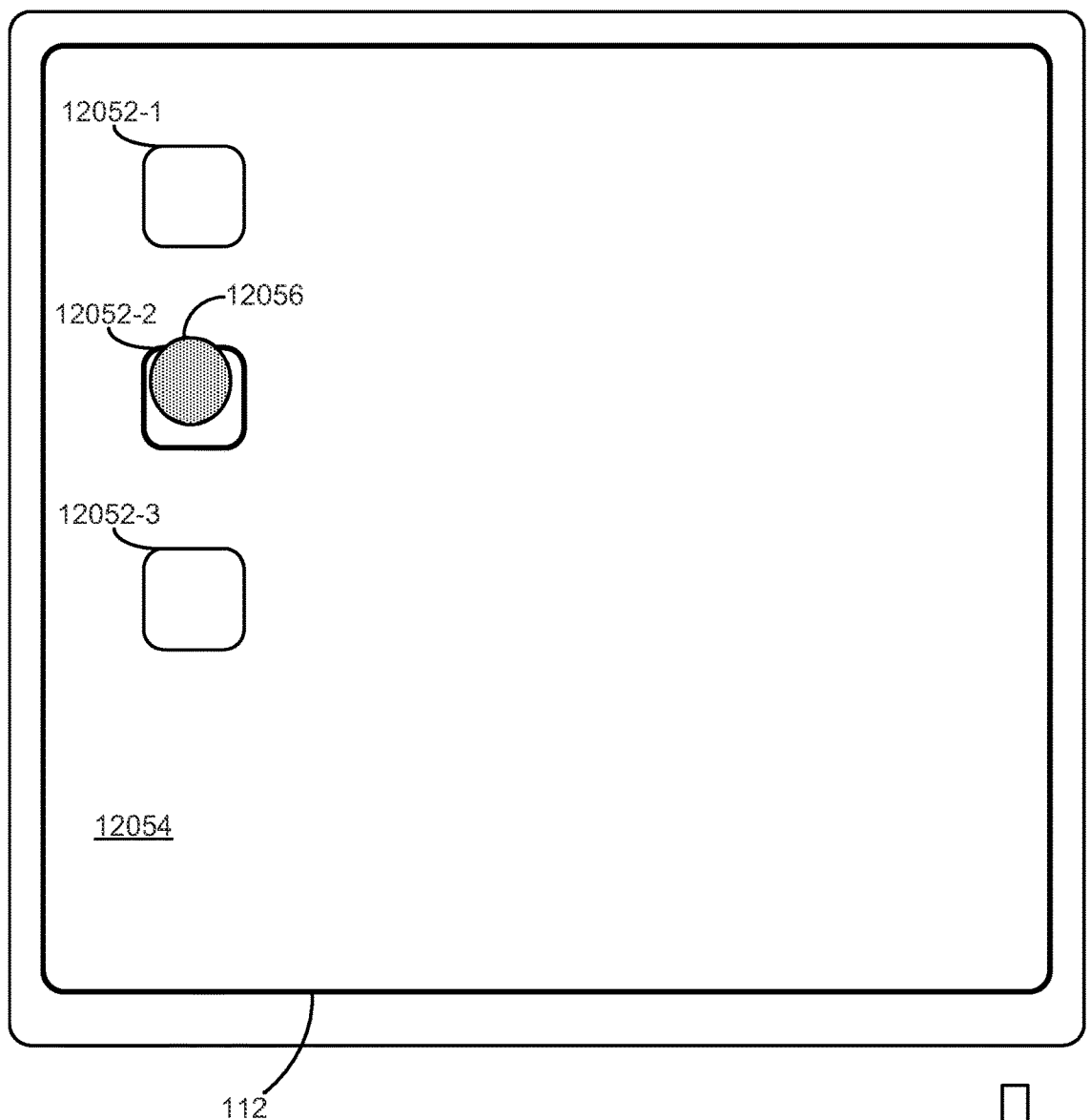
Figure 8S:
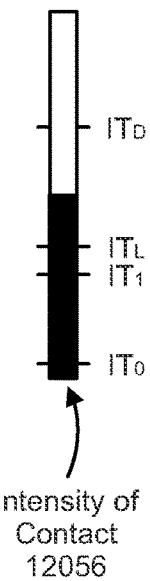
Figure 8T:
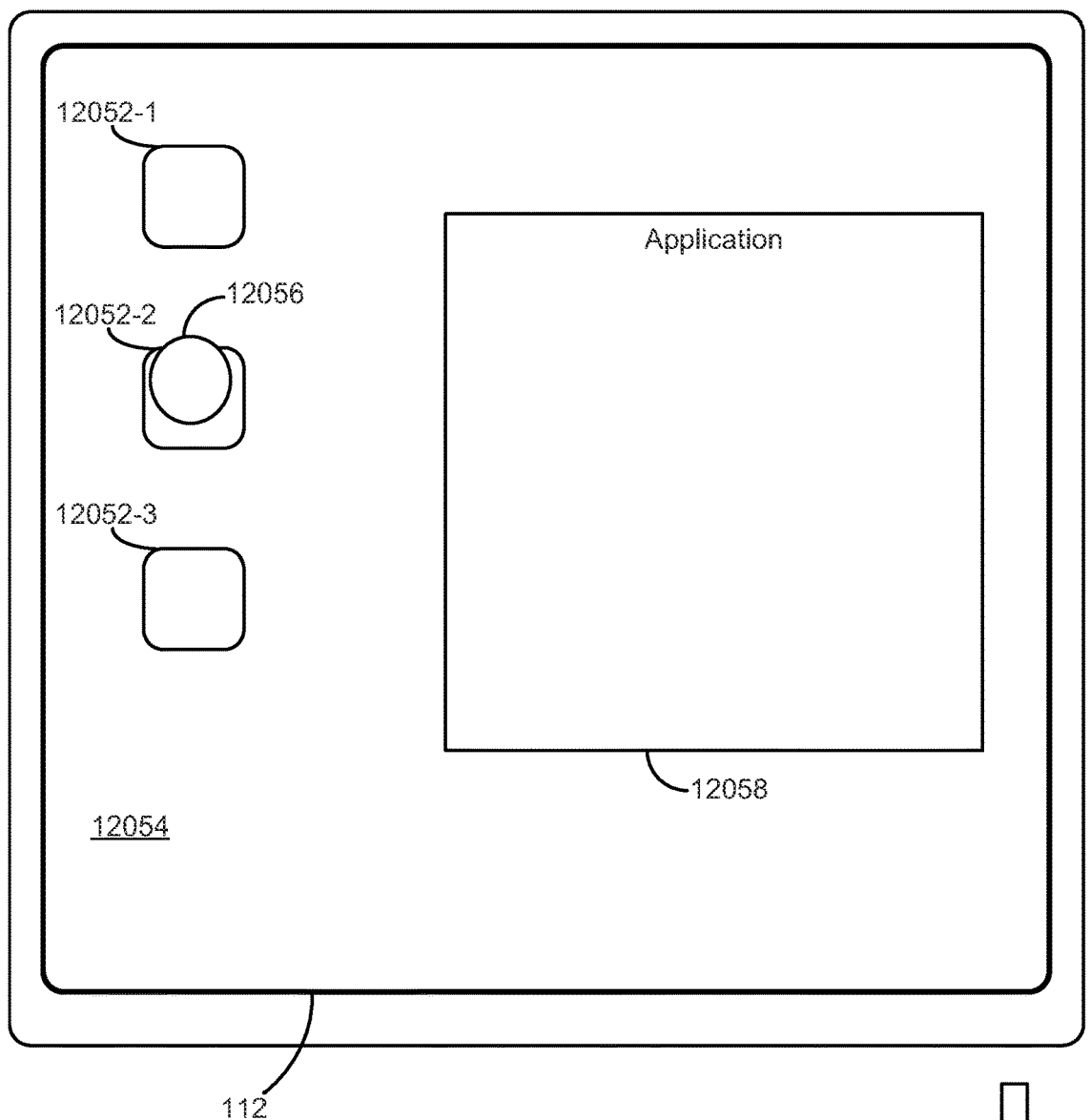
Figure 8T:
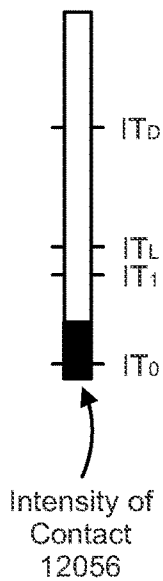
Figure 8U:
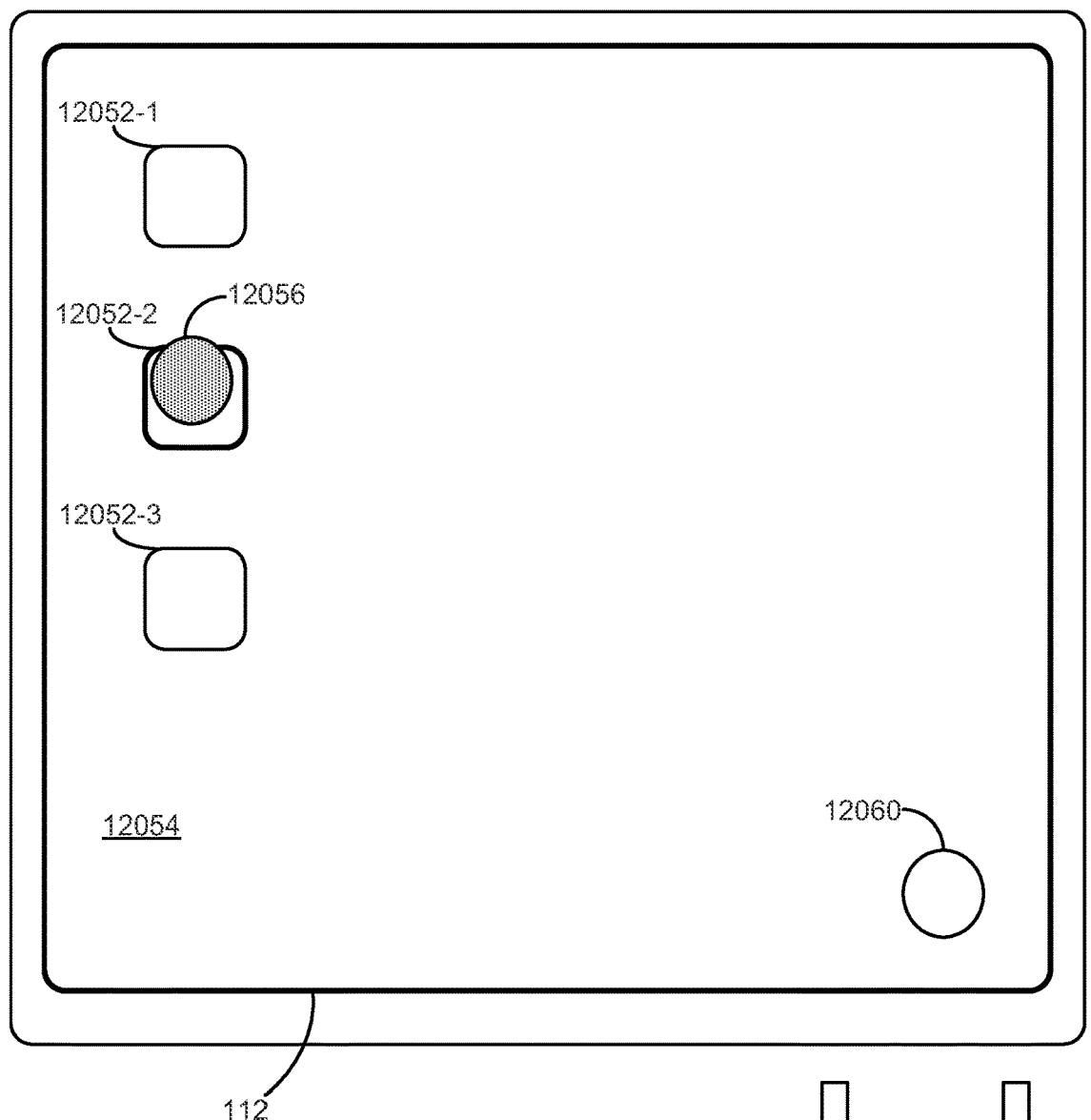
Figure 8U:
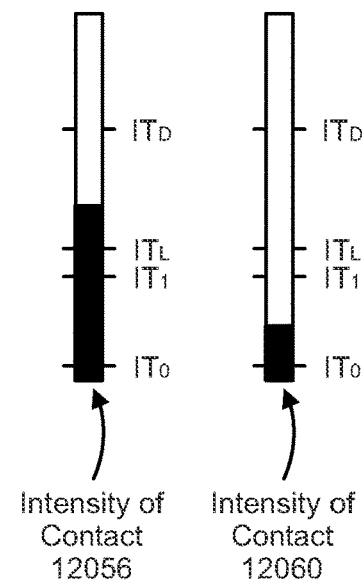
Figure 8V:
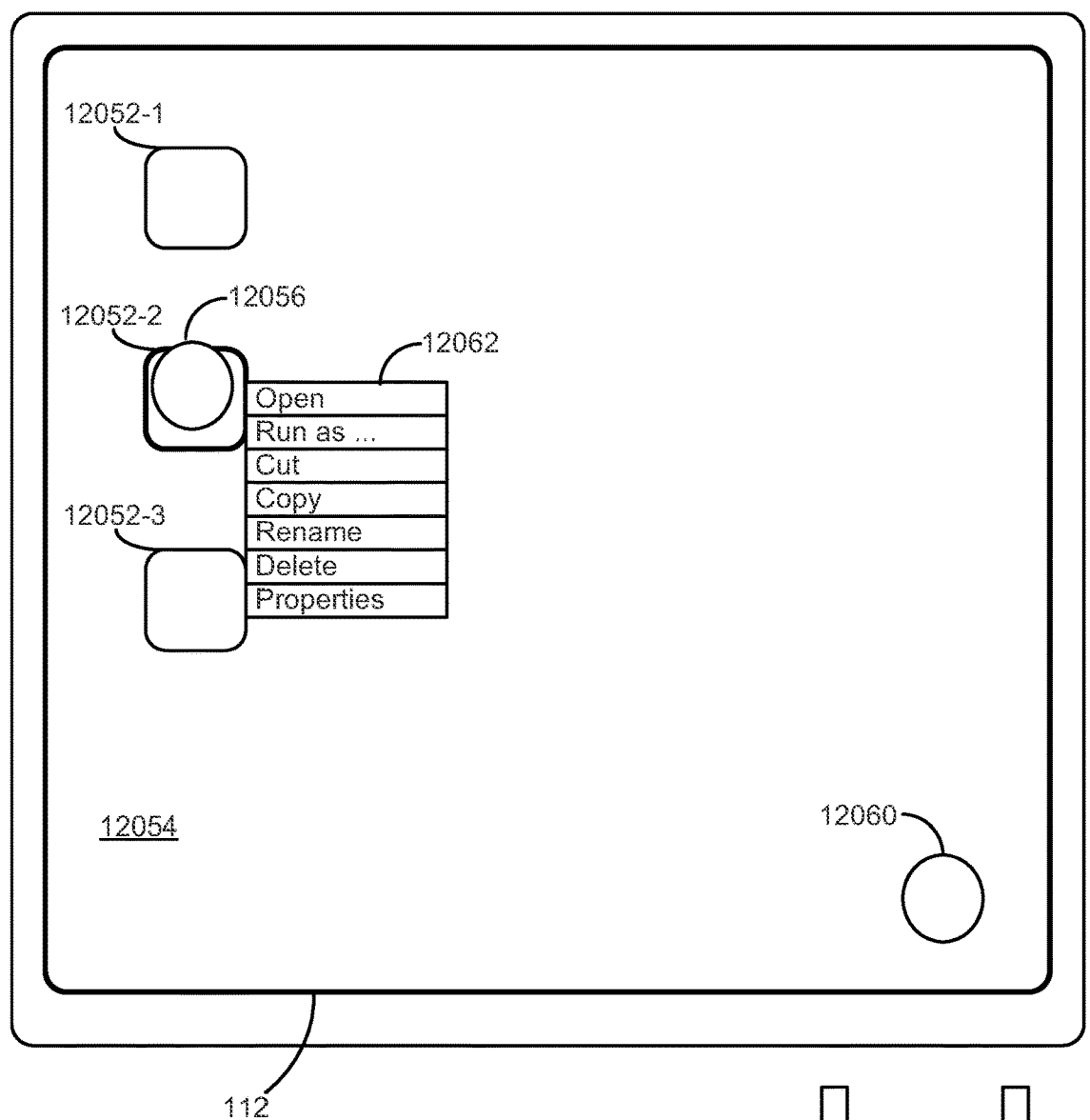
Figure 8V:
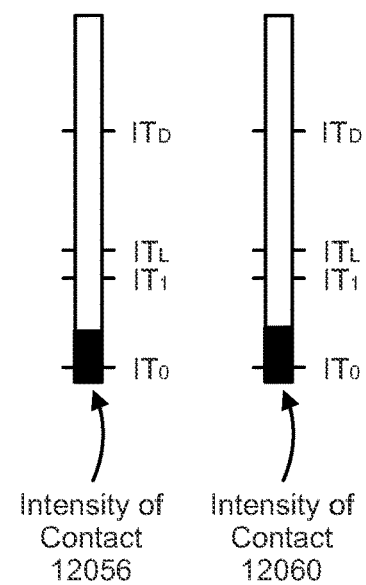
Figure 9A:
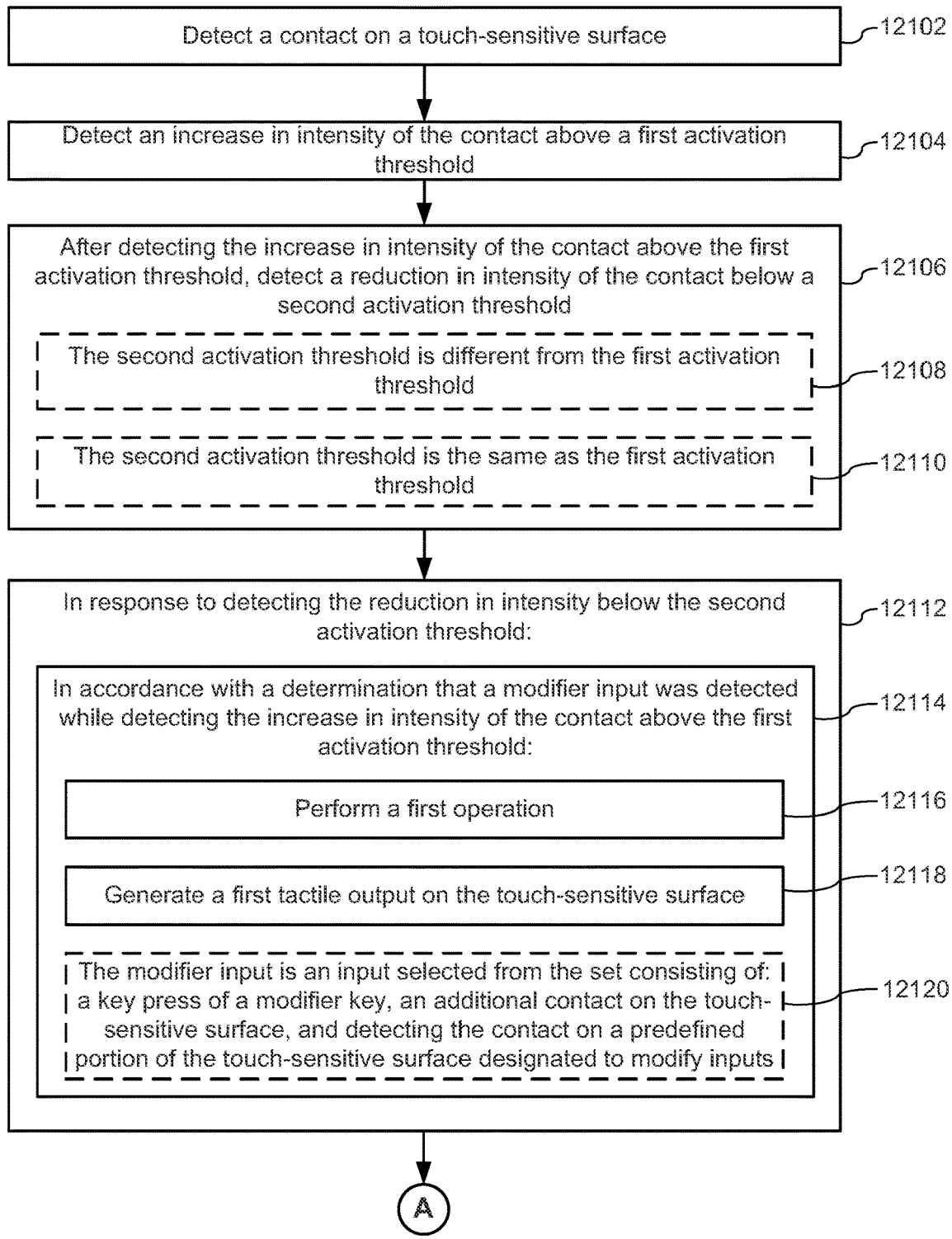
FIGS. 9A-9B are flow diagrams illustrating a method of providing feedback corresponding to modifier inputs in accordance with some embodiments.
Figure 9B:
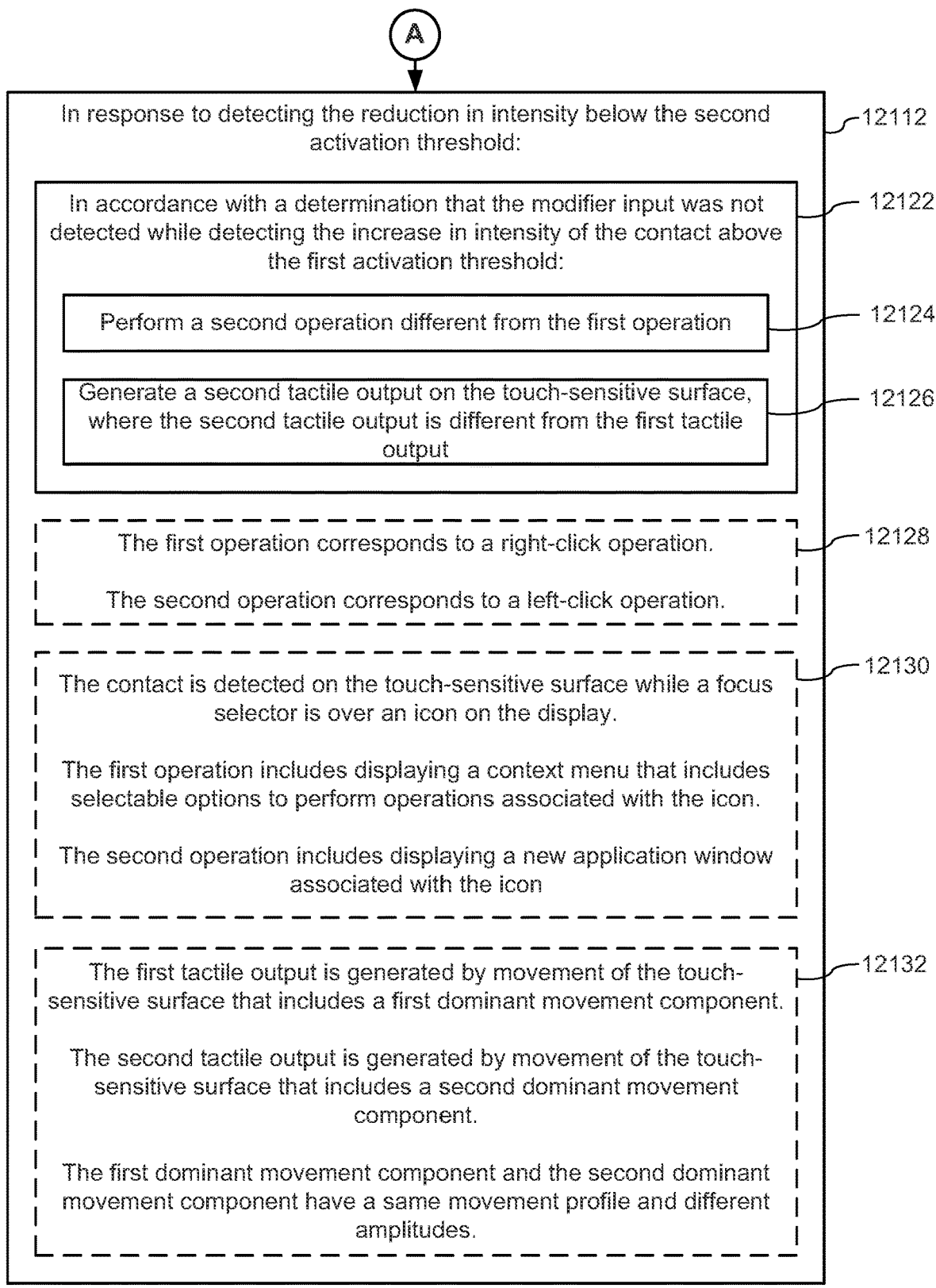

FIGS. 8R-8V illustrate an example of the user interfaces described above, with reference to FIGS. 8A-8Q, implemented on a device (e.g., device 100) with a touch-sensitive display 112. FIG. 8R shows user interface 12054 and user interface objects 12052 displayed in user interface 12054, on touch-sensitive display 112 of a device. User interface objects 12052 are similar to user interface objects 12002 described above; the details are not repeated here.

FIG. 8R also shows contact 12056 detected on user interface object 12052-2. Contact 12056 as shown in FIG. 8R has an intensity that is below the first activation threshold (e.g., "$IT_L$"). An increase of the intensity of contact 12056 above the first activation threshold is detected, as shown in FIG. 8S. After the detection of the increase, a decrease in the intensity of contact 12056 below the second activation threshold (e.g., "$IT_1$") is detected, as shown in FIG. 8T.

In response to the detection of the decrease in intensity of contact 12056 below the second activation threshold, after detection of the increase in the intensity of contact 12056 above the first activation threshold, one or more operations associated with user interface object 12052-2, over which contact 12056 is detected, are, optionally, performed. For example, if user interface object 12052-2 is an icon (e.g., an application launch or shortcut icon) corresponding to an application, window 12058 for the corresponding application is displayed in user interface 12054, as shown in FIG. 8T.

Additionally, in response to detection of the decrease in the intensity of contact 12056 below the second activation threshold, after detection of the increase in the intensity of contact 12056 above the first activation threshold, a tactile output (e.g., a "no-modifier tactile output") is generated on touch-sensitive display 112. The tactile output is, optionally, generated in accordance with a movement profile (e.g., movement profiles illustrated in FIGS. 8P-8Q).

Returning to FIG. 8R, the intensity of contact 12056 is, optionally, increased above the first activation threshold concurrently with the detection of a modifier input. An example of a modifier input is an additional contact that is detected on touch-sensitive display 112 concurrently with contact 12056. FIG. 8U shows contact 12060 detected on touch-sensitive display 112 concurrently with the detection of an increase in the intensity of contact 12056 above the first activation threshold (e.g., "$IT_L$"). Then, a decrease in the intensity of contact 12056 below the second activation threshold (e.g., "$IT_1$") is detected, as shown in FIG. 8V. In response to detection of the decrease in the intensity of contact 12056 below the second activation threshold, after concurrent detection of the increase in the intensity of contact 12056 above the first activation threshold and contact 12060, context menu 12062, which is similar to context menu 12014) is displayed in user interface 12054, as shown in FIG. 8V. In some embodiments, additional contact 12060 is determined to be a modifier input when contact 12060 is detected in a predefined region (e.g., a region in the top right, top left, bottom right, or bottom left corner) of touch-sensitive display 112.

Additionally, in response to detecting the decrease in the intensity of contact 12056 below the second activation threshold, after concurrent detection of the increase in the intensity of contact 12056 above the first activation threshold and a modifier input (e.g., contact 12060), the device generates a tactile output (e.g., a "modifier-active tactile output") on touch-sensitive display 112. In some embodiments, this tactile output (e.g., a "modifier-active tactile output") corresponds to a different tactile sensation from the tactile sensation corresponding to a tactile output (e.g., a "no-modifier tactile output") generated in response to detection of the decrease in intensity of contact 12056 below the second activation threshold without detection of a modifier input when the increase in intensity of contact 12056 above the first activation threshold is detected.

FIGS. 9A-9B are flow diagrams illustrating a method 12100 of providing feedback corresponding to modifier inputs in accordance with some embodiments. The method 12100 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 12100 are, optionally, combined and/or the order of some operations is, optionally, changed.

As described below, the method 12100 provides an intuitive way to perform operations based on modified inputs. The method reduces the cognitive burden on a user when providing feedback corresponding to modifier inputs, thereby creating a more efficient human-machine interface. For battery-operated electronic devices, enabling a user to perform operations based on modified inputs faster and more efficiently conserves power and increases the time between battery charges.

The device detects (12102) a contact (e.g., a finger contact) on the touch-sensitive surface. For example, contact 12006 (FIG. 8A or 8H) or 12020 (FIG. 8K) is, optionally, detected on touch-sensitive surface 451. As another example, contact 12056 is, optionally, detected on touch-sensitive display 112.

The device detects (12104) an increase in intensity of the contact above a first activation threshold (e.g., "$IT_L$"). In some embodiments, the first activation threshold is an "increasing-intensity" activation threshold that indicates a threshold at which a tactile output is generated when the intensity of the contact is increasing. The intensity of contact 12006, for example, is, optionally, increased from a level below the first activation threshold (e.g., FIGS. 8A and 8H) to a level above the first activation threshold (e.g., FIG. 8B, 8D, 8F, or 8I), and the increase is detected. Similarly, the intensity of contact 12020 is, optionally, increased from a level below the first activation threshold to a level above the first activation threshold (FIGS. 8K-8L, 8N). As another example, the intensity of contact 12056 is, optionally, increased from a level below the first activation threshold to a level above the first activation threshold (FIGS. 8R-8S, 8U).

After detecting the increase in intensity of the contact above the first activation threshold, the device detects (12106) a reduction in intensity of the contact below a second activation threshold (e.g., "$IT_1$"). In some embodiments, the second activation threshold is a "decreasing-intensity" activation threshold that indicates a threshold at which a tactile output is generated when the intensity of the contact is decreasing. The intensity of contact 12006, for example, is, optionally, decreased to a level below the second activation threshold (e.g., FIG. 8C, 8E, 8G, or 8J), and the increase is detected. Similarly, the intensity of contact 12020 is, optionally, decreased to a level below the second activation threshold (FIGS. 8M, and 8O). As another example, the intensity of contact 12056 is, optionally, decreased to a level below the second activation threshold (FIGS. 8T, and 8V).

In some embodiments, the second activation threshold is (12108) different from the first activation threshold (e.g., the first activation threshold is "$IT_L$" and the second activation threshold is "$IT_1$"). In some embodiments, the second activation threshold is (12110) the same as the first activation threshold (e.g., the first activation threshold is "$IT_L$" and the second activation threshold is also "$IT_L$").

In response to detecting the reduction in intensity of the contact below the second activation threshold (12112), in accordance with a determination that a modifier input was detected while detecting the increase in intensity of the contact above the first activation threshold (12114), the device performs a first operation (12116) and generates (12118) a first tactile output on the touch-sensitive surface. For example, in FIG. 8D, modifier key 12010 is pressed when the increase in intensity of contact 12006 is detected. When the decrease in the intensity of contact 12006 is detected (FIG. 8E), context menu 12014 is displayed and a first tactile output (e.g., a "modifier-active tactile output") is generated in response. Similar results occur with other examples of modifier inputs (for example, contact 12016, FIG. 8G; contact 12006 in area 12018, FIG. 8J; contact 12022, FIG. 8O). As another example, in FIG. 8U, additional contact 12060 is detected when the increase in intensity of contact 12056 is detected. When the decrease in the intensity of contact 12056 is detected (FIG. 8V), context menu 12062 is displayed and a first tactile output (e.g., a "modifier-active tactile output") is generated in response. In some embodiments, the combination of the intensity increase-decrease and the modifier input is associated with a right-click of a mouse or similar input device; the combination activates operations associated with the right-click.

In some embodiments, the modifier input is (12120) an input selected from the set consisting of: a key press of a modifier key, an additional contact on the touch-sensitive surface, and detecting the contact on a predefined portion of the touch-sensitive surface designated to modify inputs (e.g., a predefined "right click" region on a touchpad or a predefined region of a touch-sensitive mouse that corresponds to a "right mouse button"). The modifier input is, optionally, for example, press 12012 of modifier key 12010 (FIG. 8D), additional contact 12016 (FIG. 8F) or 12022 (FIG. 8N) or 12060 (FIG. 8U), or intensity of contact 12006 in area 12018 on touch-sensitive surface 451.

In response to detecting (12112) the reduction in intensity of the contact below the second activation threshold (e.g., "$IT_1$"), in accordance with a determination that the modifier input was not detected (12122) while detecting the increase in intensity of the contact above the first activation threshold (e.g., "$IT_L$"), the device performs (12124) second operation different from the first operation and generates (12126) a second tactile output (e.g., a "no-modifier tactile output") on the touch-sensitive surface, where the second tactile output is different from the first tactile output. For example, in FIG. 8B, there is no modifier input when the increase in intensity of contact 12006 is detected, and thus when the decrease in the intensity of contact 12006 is detected (FIG. 8C), window 12008 is displayed and a second tactile output (e.g., a "no-modifier tactile output") is generated in response. As another example, in FIG. 8S, there is no modifier input when the increase in intensity of contact 12056 is detected, and thus when the decrease in the intensity of contact 12056 is detected (FIG. 8T), window 12058 is displayed and a second tactile output (e.g., a "no-modifier tactile output") is generated in response. In some embodiments, the combination of the intensity increase-decrease and the lack of a modifier input is associated with a left-click of a mouse or similar input device; the combination activates operations associated with the left-click.

In some embodiments, the first operation corresponds (12128) to a right-click operation (e.g., an operation corresponding to clicking on the rightmost button of a two or three button mouse or trackpad, sometimes called a "right-click mouse operation"), and the second operation corresponds to a left-click operation (e.g., an operation corresponding to clicking on the leftmost button of a two or three button mouse or trackpad, sometimes called a "left-click mouse operation"). For example, the displaying of context menu 12014 or 12024 or 12062 is a right-click operation, and the displaying of window 12008 (FIG. 8C) is a left-click operation.

In some embodiments, the contact is detected on the touch-sensitive surface while a focus selector is over an icon on the display, the first operation includes (12130) displaying a context menu that includes selectable options to perform operations associated with the icon, and the second operation includes displaying a new application window associated with the icon (e.g., launching an application or, if the application has already been launched, opening a new window of the application that includes a document associated with the icon). For example, in FIGS. 8A-8J, contact 12006 is detected on touch-sensitive surface 451 while cursor 12004 is displayed over user interface object 12002-2. When there is no modifier input detected, window 12008 of an application associated with user interface object 12002-2 is displayed, as shown in FIG. 8C. When a modifier input is detected, context menu 12014 is displayed, as shown in FIGS. 8E, 8G, and 8J. Context menu 12014 includes selectable options to perform operations associated with user interface object 12002-2. Analogously, in FIGS. 8R-8V, contact 12056 is detected over user interface object 12052-2 on touch-sensitive display 112. When there is no modifier input detected, window 12058 of an application associated with user interface object 12052-2 is displayed, as shown in FIG. 8T. When a modifier input is detected, context menu 12062 is displayed, as shown in FIG. 8V. Context menu 12062 includes selectable options to perform operations associated with user interface object 12052-2.

In some embodiments, the first tactile output is (12132) generated by movement of the touch-sensitive surface that includes a first dominant movement component (e.g., movement corresponding to the initial impulse, ignoring any unintended resonance), the second tactile output is generated by movement of the touch-sensitive surface that includes a second dominant movement component, and the first dominant movement component and the second dominant movement component have a same movement profile (e.g., same waveform shape such as square, sine, squine, sawtooth, triangle, or approximately the same width/period) and different amplitudes, as shown in FIG. 8Q. Thus, in some embodiments, the tactile outputs with and without the modifier input optionally differs in amplitude rather than in the movement profile, so that one tactile sensation is a stronger version of the other tactile sensation. In contrast, in some embodiments, the tactile output (e.g., a "modifier-active tactile output") generated when a modifier input was detected and the tactile output (e.g., a "no-modifier tactile output") generated when a modifier input was not detected both have respective dominant movement components that have different respective movement profiles (for example, the movement profiles depicted in FIG. 8P) with either the same maximum amplitude or different maximum amplitudes.

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 12100 described above with respect to FIGS. 9A-9B. For example, the contacts, gestures, user interface objects, tactile outputs, intensity thresholds, and focus selectors described above with reference to method 12100 optionally has one or more of the characteristics of the contacts, gestures, user interface objects, tactile outputs, intensity thresholds, and focus selectors described herein with reference to other methods described herein (e.g., those listed in the fifth paragraph of the Description of Embodiments). For brevity, these details are not repeated here.

Figure 10:
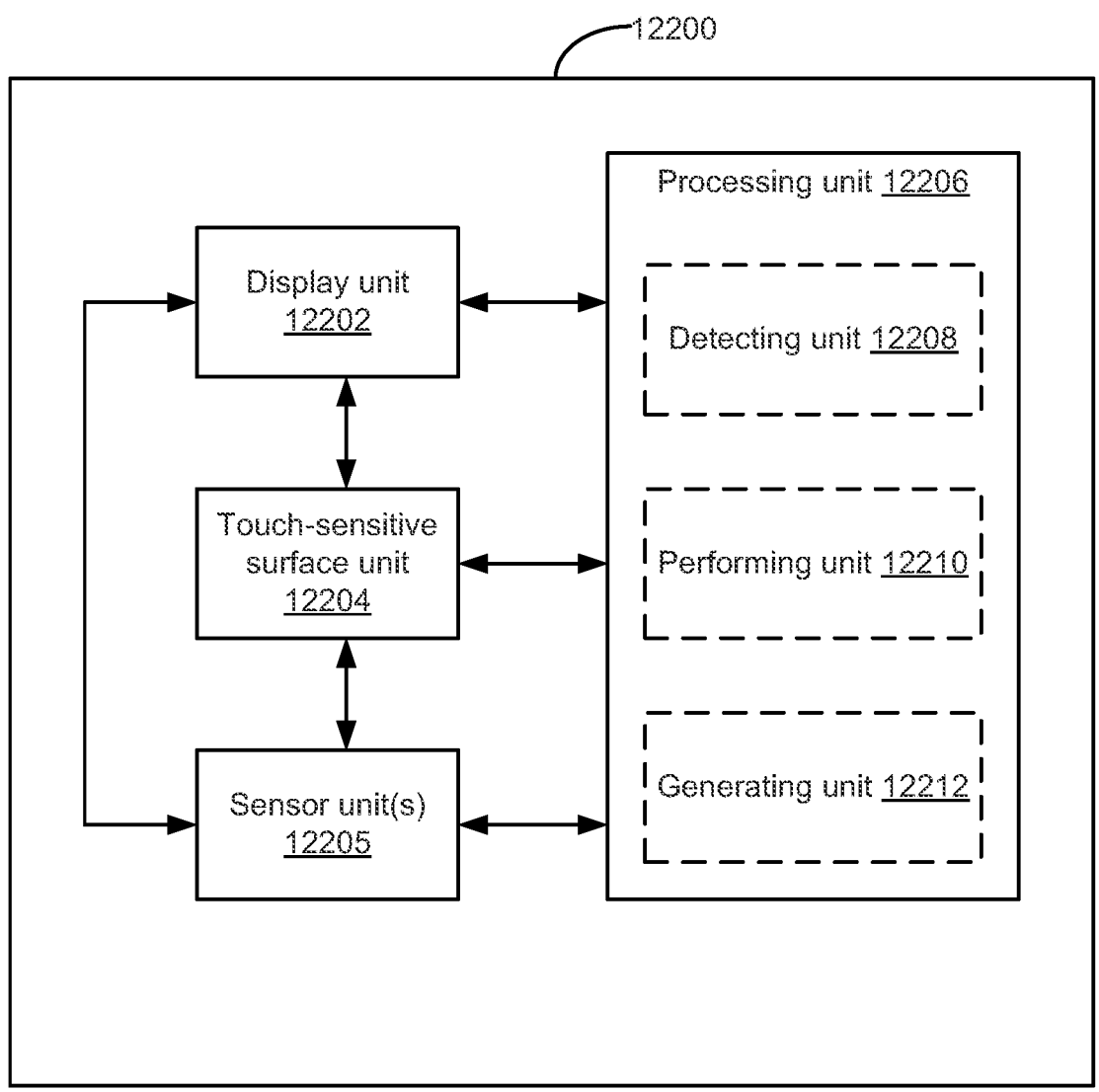
FIG. 10 is a functional block diagram of an electronic device in accordance with some embodiments.

In accordance with some embodiments, FIG. 10 shows a functional block diagram of an electronic device 12200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 12200 includes a display unit 12202, a touch-sensitive surface unit 12204 configured to receive contacts, one or more sensor units 12205 configured to detect intensity of contacts with the touch-sensitive surface unit 12204, and a processing unit 12206 coupled to the display unit 12202, the touch-sensitive surface unit 12204 and the sensor units 12205. In some embodiments, the processing unit 12206 includes a detecting unit 12208, a performing unit 12210, and a generating unit 12212.

The processing unit 12206 is configured to: detect a contact on the touch-sensitive surface unit 12204 (e.g., with the detecting unit 12208); detect an increase in intensity of the contact above a first activation threshold (e.g., with the detecting unit 12208); after detecting the increase in intensity of the contact above the first activation threshold, detect a reduction in intensity of the contact below a second activation threshold (e.g., with the detecting unit 12208); and in response to detecting the reduction in intensity of the contact below the second activation threshold: in accordance with a determination that a modifier input was detected while detecting the increase in intensity of the contact above the first activation threshold: perform a first operation (e.g., with the performing unit 12210) and generate a first tactile output on the touch-sensitive surface unit 12204 (e.g., with the generating unit 12212); and in accordance with a determination that the modifier input was not detected while detecting the increase in intensity of the contact above the first activation threshold: perform a second operation different from the first operation (e.g., with the performing unit 12210) and generate a second tactile output on the touch-sensitive surface unit 12204, wherein the second tactile output is different from the first tactile output (e.g., with the generating unit 12212).

In some embodiments, the modifier input is an input selected from the set consisting of: a key press of a modifier key, an additional contact on the touch-sensitive surface unit 12204, and detection of the contact on a predefined portion of the touch-sensitive surface unit 12204 designated to modify inputs.

In some embodiments, the first operation corresponds to a right-click operation, and the second operation corresponds to a left-click operation.

In some embodiments, the contact is detected on the touch-sensitive surface unit 12204 while a focus selector is over an icon on the display unit 12202, the first operation includes displaying a context menu that includes selectable options to perform operations associated with the icon, and the second operation includes displaying a new application window associated with the icon.

In some embodiments, the second activation threshold is different from the first activation threshold.

In some embodiments, the second activation threshold is the same as the first activation threshold.

In some embodiments, the first tactile output is generated by movement of the touch-sensitive surface unit 12204 that includes a first dominant movement component, the second tactile output is generated by movement of the touch-sensitive surface unit 12204 that includes a second dominant movement component, and the first dominant movement component and the second dominant movement component have a same movement profile and different amplitudes.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9B are, optionally, implemented by components depicted in FIGS. 1A-1B or FIG. 10. For example, detection operations 12102, 12104, and 12106, performing operations 12116 and 12124, and generating operations 12118 and 12126 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Feedback for Changing Activation States of a User Interface

Many electronic devices have graphical user interfaces that include user interface objects, such as virtual buttons and switches. In some circumstances, a user activates a user interface object to perform an operation or adjust a parameter or property. To make a virtual button or switch easier to use, the virtual object optionally mimics the behavior of the corresponding physical object. For example, haptic sensations are, in some circumstances, felt when a virtual switch is operated, with the haptic sensations mimicking the sensations of the corresponding physical switch, such as mimicking the clicks of a physical actuator mechanism (e.g., a mouse button) that activates the switch. But physical objects, such as real buttons and switches, will, in some circumstances provide excessive tactile feedback in some circumstances, and too little feedback in others. In such situations, a virtual object that just mimicked sensations of the corresponding physical object would also provide too much (or too little) feedback. But a virtual object does not have to be provided with haptic feedback that just mimics tactile sensations from the corresponding physical object. The embodiments described below provide tactile feedback that corresponds to changes in activation states of a virtual button, switch or other user interface object, rather than tactile feedback that corresponds 1:1 to tactile sensations that would be felt by a user when using a physical control to perform similar operations. When tactile sensations are provided for activation state changes of the virtual button or switch, the user can better discern the activation state of the virtual button without being distracted or confused by too much or too little tactile feedback. This improved haptic feedback for virtual objects enables the user to operate the device more quickly and efficiently, thereby creating a more efficient human-machine interface.

FIGS. 11A-11N illustrate exemplary user interfaces for providing feedback for changing activation states of a user interface object in accordance with some embodiments. The user interfaces in these figures are used to illustrate the processes described below, including the processes in FIGS. 12A-12B. FIGS. 11A-11N include intensity diagrams that show the current intensity of the contact on the touch-sensitive surface relative to a plurality of intensity thresholds including a light press intensity threshold (e.g., "$IT_L$") and a deep press intensity threshold (e.g., "$IT_D$"). In some embodiments, operations similar to those described below with reference to "$IT_L$" and "$IT_D$" are performed with reference to different intensity thresholds.

FIG. 11A illustrates an example of a user interface that includes one or more user interface objects. Image editor user interface 12300 is displayed on display 450 (e.g., display 340) of a device (e.g., device 300). Image 12302 is displayed in image editor user interface 12300 for editing in accordance with user commands. One or more user interface objects (for example, buttons, sliders, rocker switches) optionally include control user interface objects such as rocker switches 12304 and status user interface objects such as value indicators 12306 displayed in image editor user interface 12300. The user interface objects in FIG. 11A-11G are configured to enable a user to issue commands for editing image 12302 and the user interface objects in FIG. 11H-11N are configured to enable a user to issue commands for editing image 12322. For example, one or more rocker switches 12304, for modifying respective parameters of image 12302, are displayed in image editor user interface 12300. Values representing respective parameters are, optionally, displayed in respective value indicators 12306. Rocker switch 12304-1 enables a user to modify the brightness of image 12302, for example, and the brightness value (for example, represented by integers, with 0 as the middle value between the upper and lower bounds) is displayed in value indicator 12306-1. Clearly, a middle value of 0 is merely exemplary. For example, an upper bound of 100 and a lower bound of 0 would have a middle value of 50 (not shown), etc. Cursor 12308 is also displayed in user interface 12300. In some embodiments, cursor 12308 is a mouse pointer. Cursor 12308 is an example of a focus selector.

A respective rocker switch 12304 optionally has a "minus" portion for reducing the value of a parameter associated with the rocker switch, indicated by the minus sign, and a "plus" portion for increasing the value of a parameter associated with the rocker switch, indicated by a plus sign. A rocker switch 12304 is, optionally, activated when a focus selector (e.g., cursor 12308) is positioned over a portion of the rocker switch and an intensity of a contact associated with the focus selector changes. In some embodiments, the corresponding value decreases or increases depending on the portion over which the focus selector is positioned. When the focus selector is positioned over the "minus" portion, the corresponding value decreases when the rocker switch is activated. When the focus selector is positioned over the "plus" portion, the corresponding value increases when the rocker switch is activated. In FIG. 11A, cursor 12308 is positioned over the "minus" portion of rocker switch 12304-1.

While rocker switch 12304-1 is not activated, rocker switch 12304-1 is displayed in a neutral position, as shown FIG. 11A. When rocker switch 12304-1 is activated, rocker switch 12304-1 is displayed as if either the "minus" portion (if cursor 12308 is positioned over the "minus" portion when rocker switch 12304-1 is activated, thus rocker switch 12304-1 is activated to decrease the value) or the "plus" portion (if cursor 12308 is positioned over the "plus" portion when rocker switch 12304-1 is activated, thus rocker switch 12304-1 is activated to increase the value) is depressed, as shown in FIG. 11B (for the "minus" portion being depressed) and FIG. 11E (for the "plus" portion being depressed), respectively. In some embodiments, when rocker switch 12304-1 is activated, an animation showing a transition of rocker switch 12304-1 from the neutral position to either depressed position is displayed; and when rocker switch 12304-1 is deactivated, an animation showing a transition of rocker switch 12304-1 from either depressed position to the neutral position is displayed.

FIG. 11A shows contact 12310 detected on touch-sensitive surface 451 (e.g., touchpad 355) of the device at an intensity that is above a contact detection threshold (e.g., "$IT_0$") and below a light press intensity threshold (e.g., "$IT_L$") for activating rocker switch 12304-1. While contact 12310 continues to be detected on touch-sensitive surface 451 and cursor 12308 is positioned over the "minus" portion of rocker switch 12304-1, the intensity of contact 12310 is, in some circumstances, increased to a first intensity that is above the light press intensity threshold (e.g., "$IT_L$") for activating rocker switch 12304-1, and the increase in intensity is detected, as shown in FIG. 11B. In response to the detection of the increase in intensity, rocker switch 12304-1 is activated and the brightness value in value indicator 12306-1 decreases. The brightness of image 12302 changes in accordance with the change in the brightness value. In some embodiments, the brightness value decreases at a relatively slow rate (e.g., −1 in value per second). In some embodiments, rocker switch 12304-1 is animated to show the "minus" portion being depressed. In some embodiments, the brightness value continues to decrease as long as the intensity of contact 12310 does not decrease below the light press intensity threshold (e.g., "$IT_L$").

The intensity of contact 12310 is, in some circumstances, increased further. While contact 12310 continues to be detected on touch-sensitive surface 451 and cursor 12308 is still positioned over the "minus" portion of rocker switch 12304-1, the device detects an increase in intensity of contact 12310 from the first intensity (e.g., an intensity between $IT_L$ and $IT_D$) to a second, higher intensity that is above a deep press intensity threshold (e.g., "$IT_D$"). In response to this increase in intensity, rocker switch 12304-1 changes to a further activation state, as shown in FIG. 11C where the portion of the rocker switch under focus selector 12308 is pushed "into" the display, and the brightness value of image 12302 decreases at a rate that is faster (e.g., −10 per second) than the rate of decrease at the first intensity, and the brightness of image 12302 changes in accordance with the change in the brightness value, as shown in FIG. 11C.

The intensity of contact 12310 is, in some circumstances, then decreased below the light press intensity threshold (e.g., "$IT_L$") quickly (e.g., from the second intensity above $IT_D$ to an intensity below $IT_L$ in 0.05 seconds or less). In response to the detection of the decrease in intensity below the light press intensity threshold (e.g., "$IT_L$"), the brightness value stops changing, and the brightness of image 12302 stops changing, as shown in FIG. 11D. Depending on the rate at which the intensity decreased from the second intensity to an intensity below the light press intensity threshold (e.g., "$IT_L$"), the brightness value optionally stops changing immediately in response to the detection of the intensity decrease, or the rate of change in the brightness value optionally first decreases to a slower rate (e.g., the rate at the first intensity) before the brightness values stops changing.

Rocker switch 12304-1 includes multiple activation states. In some embodiments, the activation states for rocker switch 12304-1 are different brightness levels as the brightness value changes. In some embodiments, when the brightness value is decreasing at the "slow" rate (e.g., −1 per second), each brightness value increment based on the rate of decrease (e.g., −1, −2, −3, so forth) is considered to be an activation state, and when the brightness value is decreasing at the "fast" rate (e.g., −10 per second), each brightness value increment based on the rate of decrease (e.g., each −10th increment) is considered to be an activation state. In some of these embodiments, at each activation state, a tactile output is, optionally, generated on touch-sensitive surface 451. For example, when the value decreases from −1 to −2, then to −3 and then to −13, tactile outputs are, optionally, generated at −2, −3, and −13.

In some other embodiments, the activation states are the different rates at which the brightness value changes. For example, the "slow" rate is one activation state, the "fast" rate is another activation state, and cessation of activation of rocker switch 12304-1 (e.g., a rate of 0 per second) is another activation state of the rocker switch. A tactile output is, optionally, generated whenever the rate of decrease or increase for the brightness value changes or when rocker switch 12304-1 is activated or ceases to be activated. For example, when the brightness value is not changing, rocker switch 12304-1 is in a first ("neutral") activation state; when the brightness value is decreasing at the "slow" rate (e.g., −1 per second), rocker switch 12304-1 is in a second ("light press") activation state; and when the brightness value is decreasing at the "fast" rate (e.g., −10 per second), rocker switch 12304-1 is in a third ("deep press") activation state. At each activation state, a tactile output is, optionally, generated on touch-sensitive surface 451. For example, when the activation state changes from the first ("neutral") activation state shown in FIG. 11A to the second ("light press") activation state shown in FIG. 11B, the device generates a tactile output corresponding to the change in activation state. As another example, when the activation state changes from the second ("light press") activation state shown in FIG. 11B to the third ("deep press") activation state shown in FIG. 11C, the device generates a tactile output corresponding to the change in activation state.

In some embodiments, the tactile output generated in response to a change in activation state optionally varies depending on whether the change in activation state was in response to an increase or a decrease in the intensity of contact 12310. A tactile output generated for an activation state change in response to an increase in intensity is, optionally, different from a tactile output generated for an activation state change in response to a decrease in intensity. The tactile outputs are, optionally, different in movement profile, amplitude, or both. In some embodiments, a tactile output generated for an activation state change in response to an increase in intensity corresponds to a tactile sensation that simulates a down-click (e.g., press-and-hold) of a physical button (e.g., a mouse button), and a tactile output generated for an activation state change in response to a decrease in intensity corresponds to a tactile sensation that simulates an up-click (e.g., release from a press-and-hold) of a physical button.

Returning to FIG. 11D, cursor 12308 has been moved (e.g., from location 12308-a to location 12308-b) to the "plus" portion of rocker switch 12304-1 (e.g., in accordance with movement of contact 12310 across touch-sensitive surface 451 while contact 12310 has an intensity between $IT_0$ and $IT_L$ from location 12310-a to location 12310-b in FIG. 11D). The intensity of contact 12310 is increased to the second intensity quickly (e.g., the intensity of contact 12310-b increases from an intensity below the $IT_L$ in FIG. 11D to the second intensity that is above $IT_D$ in FIG. 11E in 0.05 seconds or less), as shown in FIG. 11E. In response to the increase in intensity, the brightness value increases at the "fast" rate (e.g., +10 per second). As shown in FIG. 11D, rocker switch 12304-1 is in the neutral activation state and transitions directly to the deep press activation state in FIG. 11E in response to a rapid increase in intensity of contact 12310 to an intensity above $IT_D$.

Figure 11F:
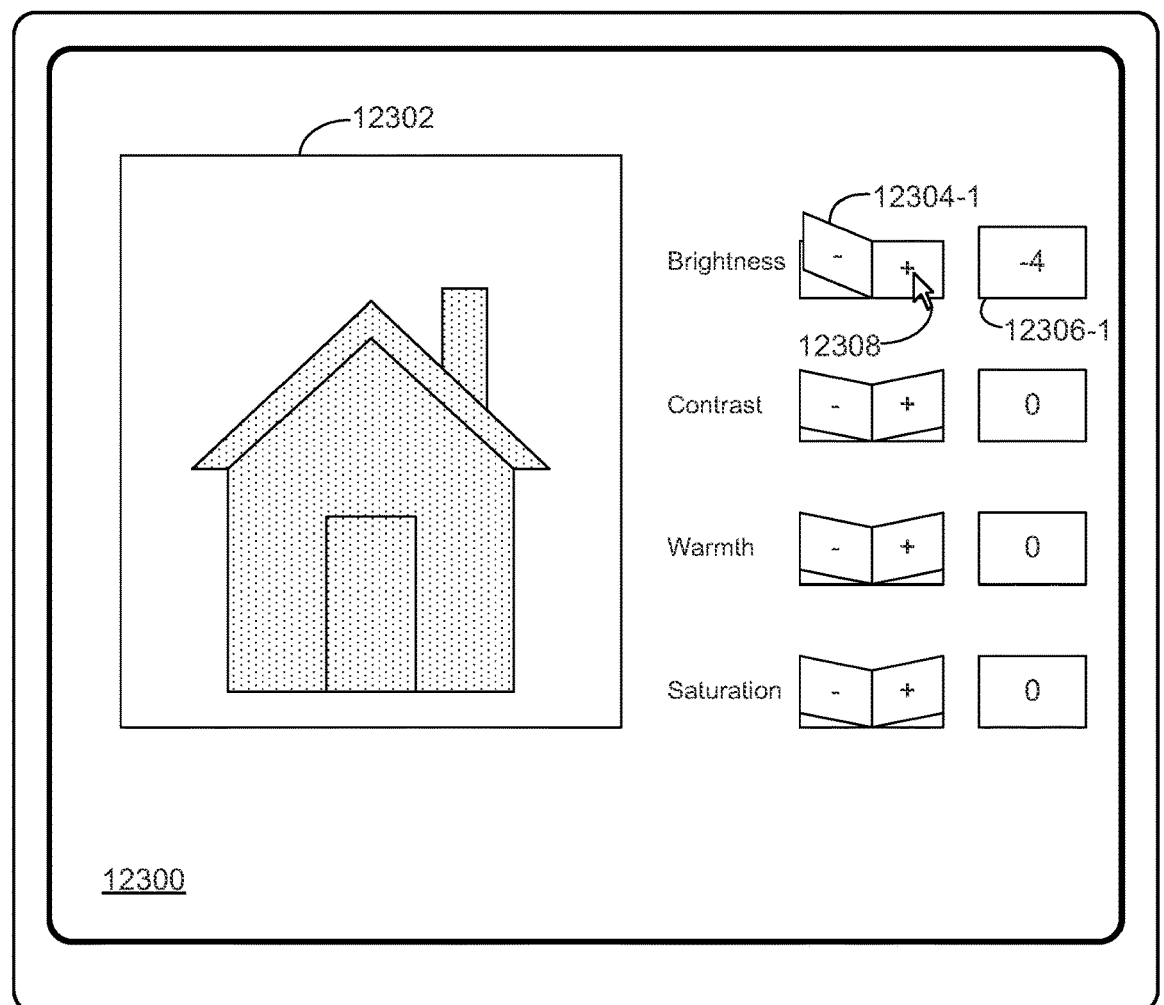
Figure 11F:
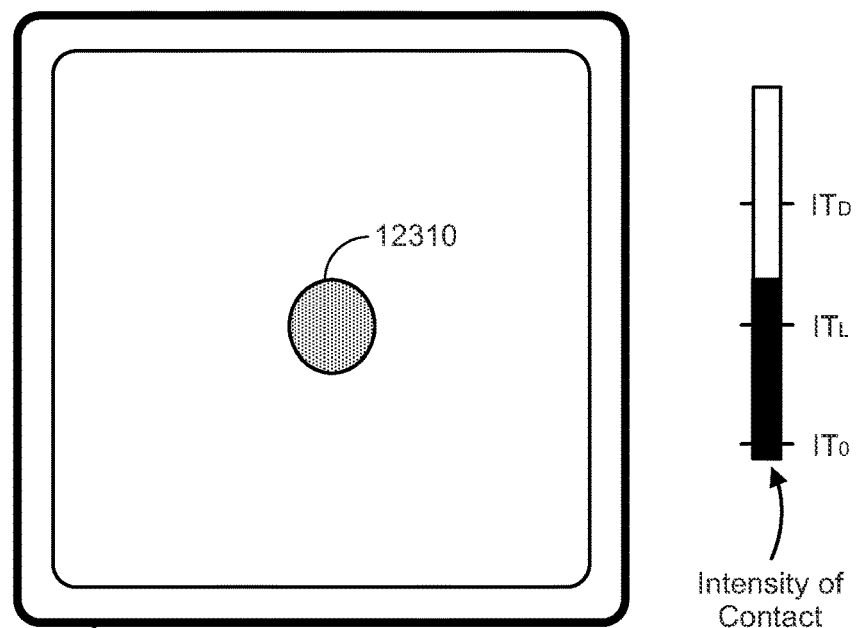

As shown in FIG. 11F, the intensity of contact 12310 is subsequently decreased from the second intensity (e.g., an intensity above $IT_D$) to the first intensity (e.g., an intensity between $IT_L$ and $IT_D$). In response to detecting the intensity decrease to the first intensity, the brightness value increases at the "slow" rate (e.g., +1 per second), as shown in FIG. 11F and rocker switch 12304-1 is shown in the light press activation state.

Figure 11G:
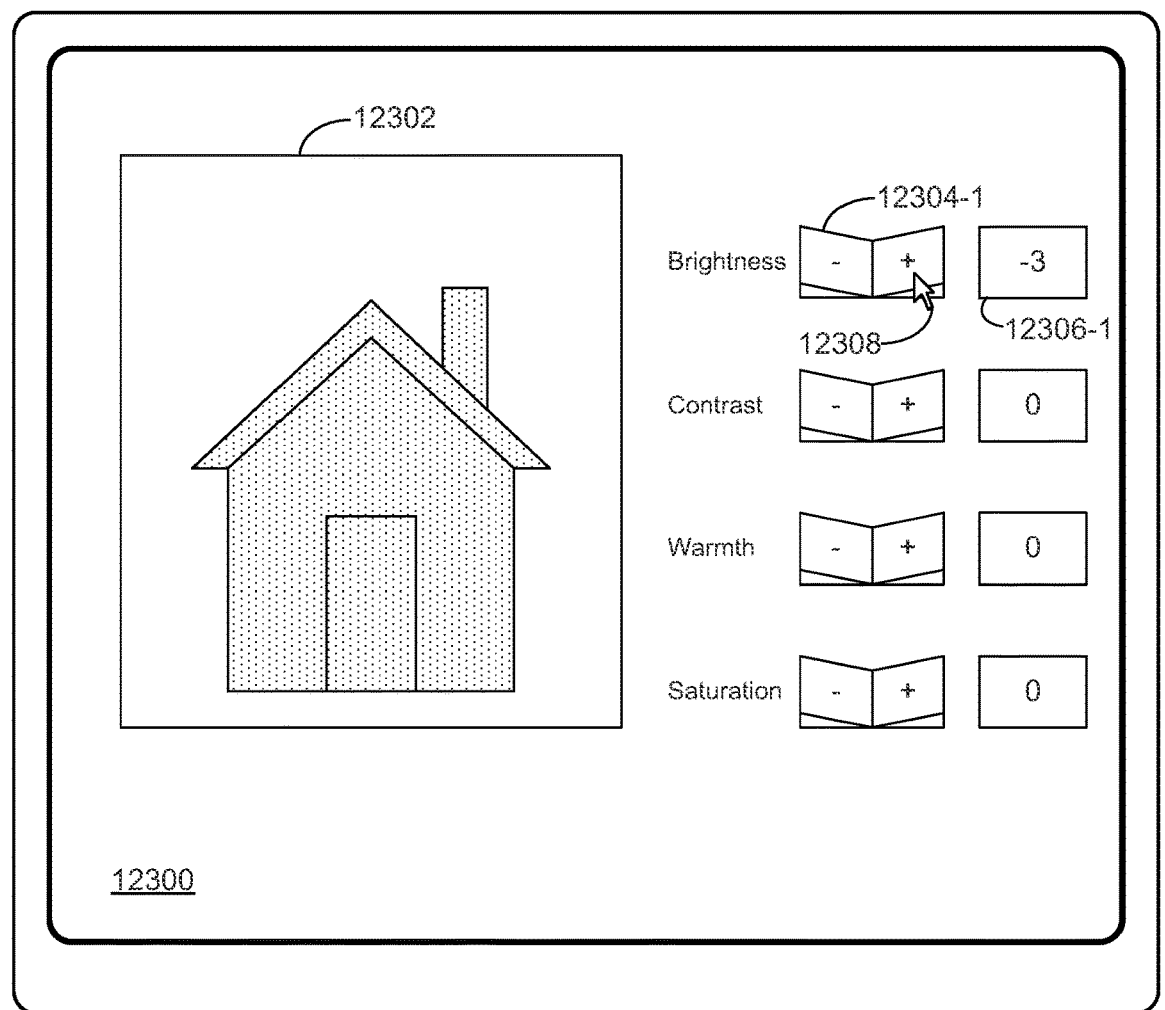
Figure 11G:
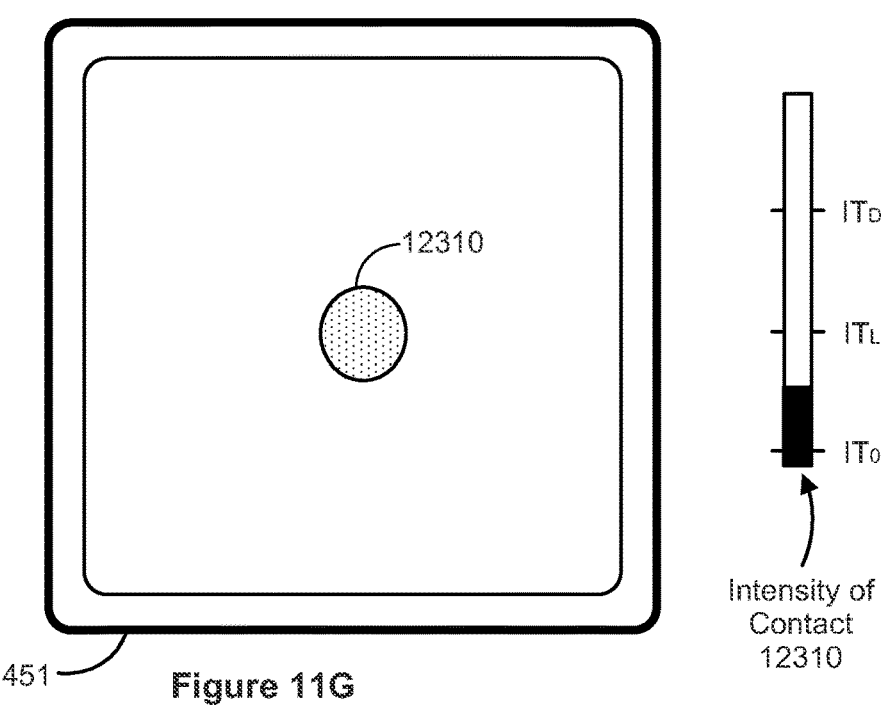

As shown in FIG. 11G, the intensity of contact 12310 is subsequently decreased further, from the first intensity (e.g., an intensity between $IT_L$ and $IT_D$) to an intensity below the light press intensity threshold (e.g., "$IT_L$"). In response to the further decrease in intensity of contact 12310, the brightness value stops increasing (e.g., the rate of change becomes 0 per second), as shown in FIG. 11G and rocker switch 12304-1 is shown in the neutral activation state.

As described above, the activation states of rocker switch 12304-1 optionally correspond to the increments of change in the value, in accordance with the rate of change, or the different rates of change. A tactile output is, optionally, generated whenever one activation state changes to another (e.g., one increment to the next or one rate of change to the next).

Figure 11H:
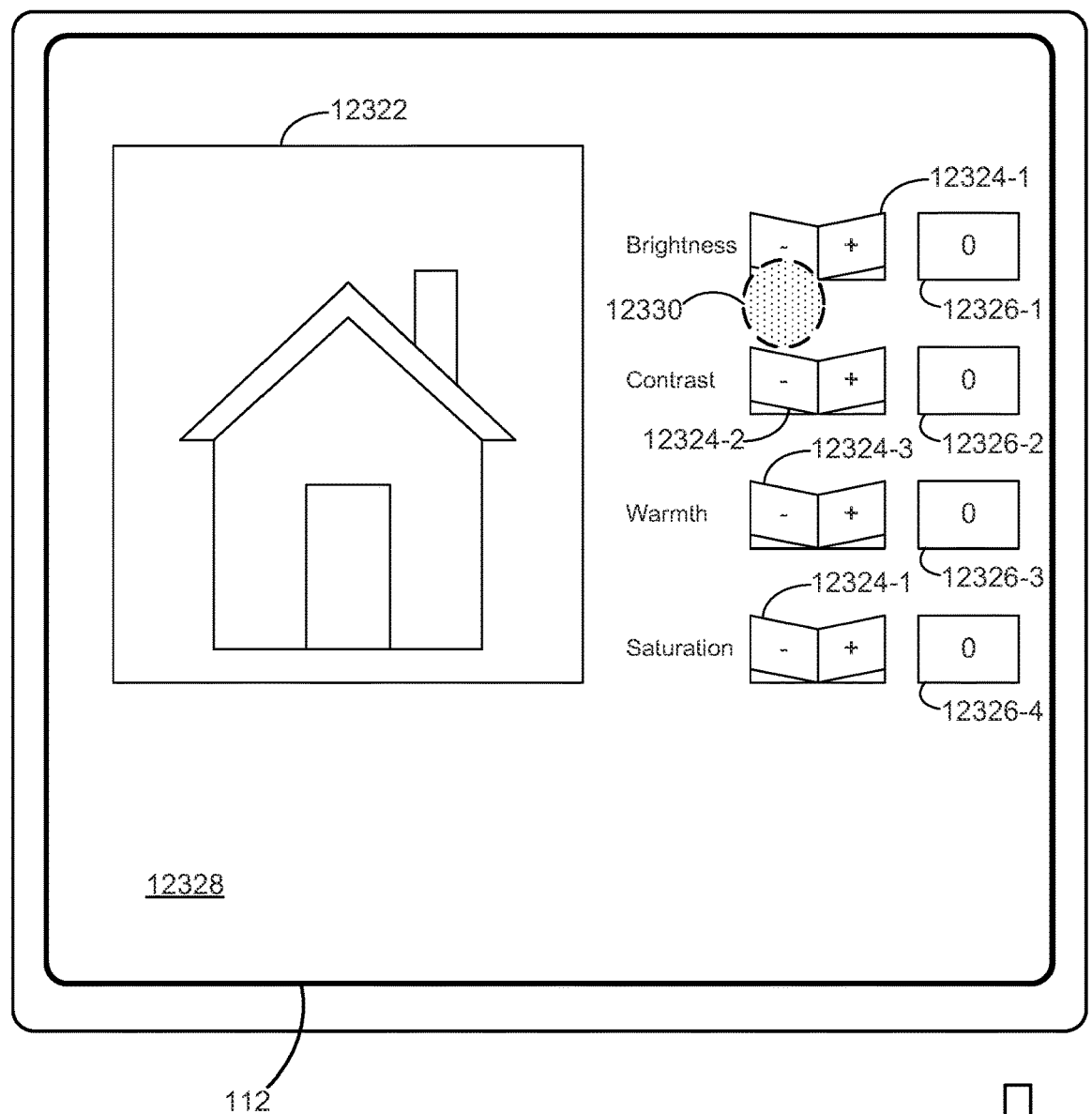
Figure 11H:
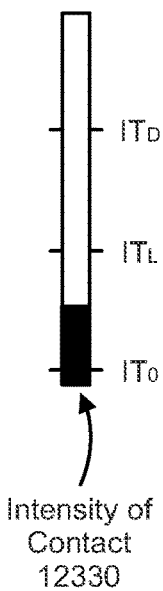
Figure 11I:
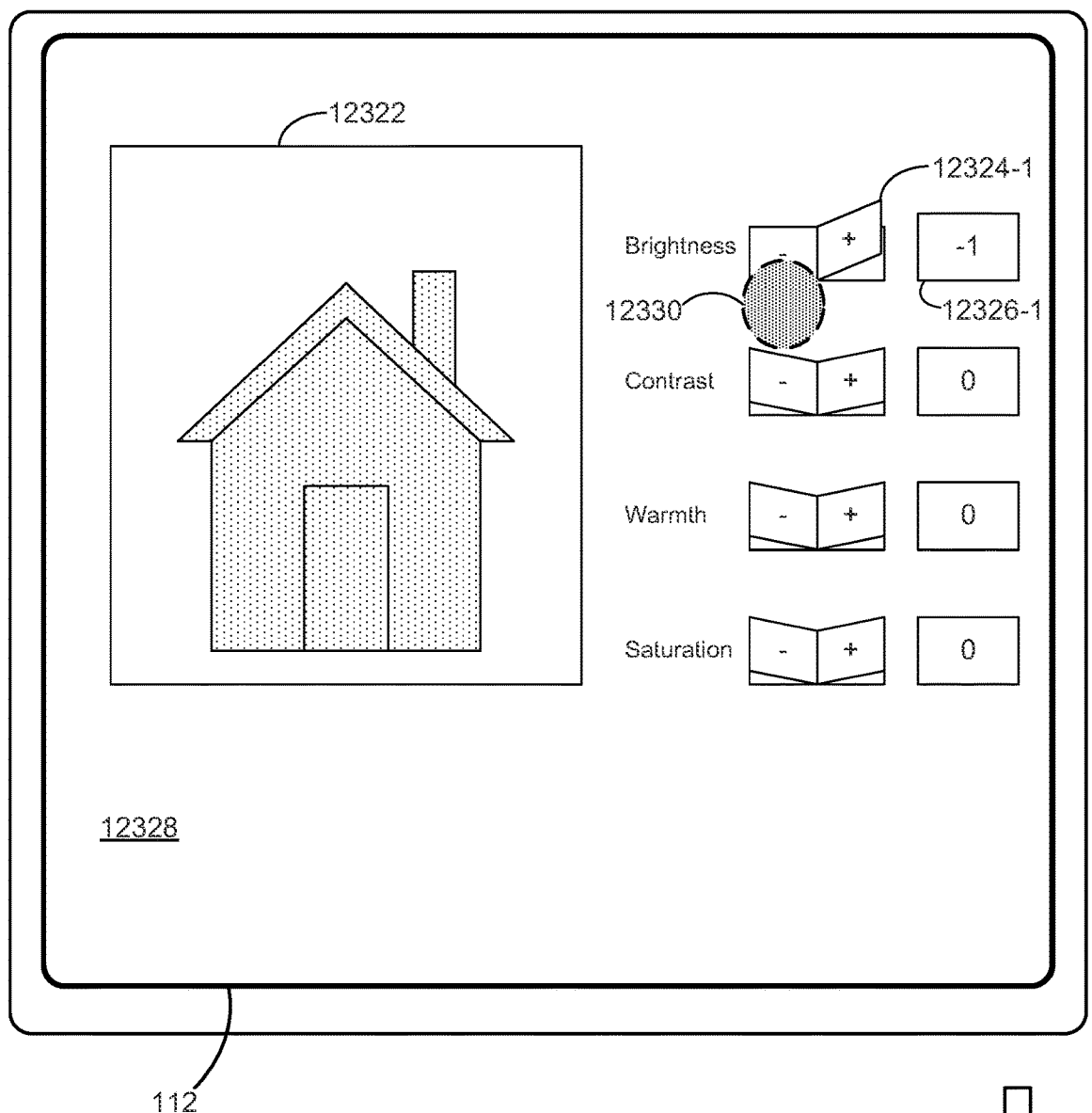
Figure 11I:
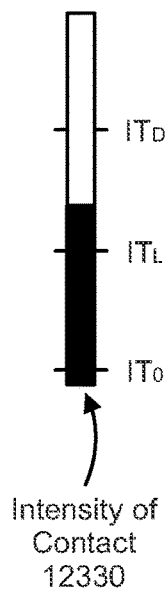
Figure 11J:
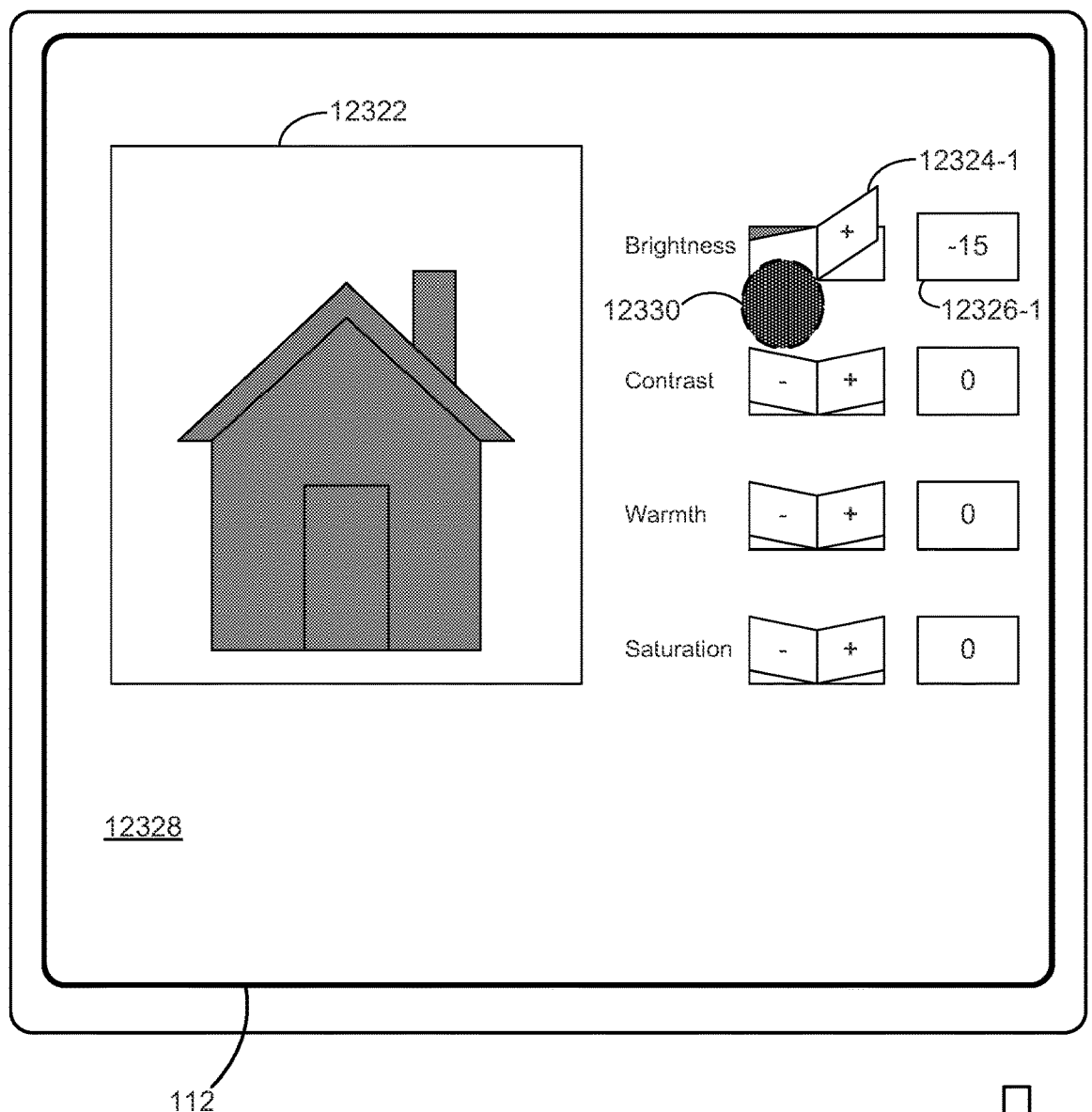
Figure 11J:
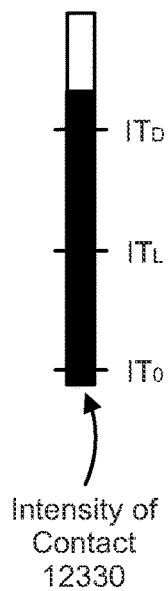
Figure 11K:
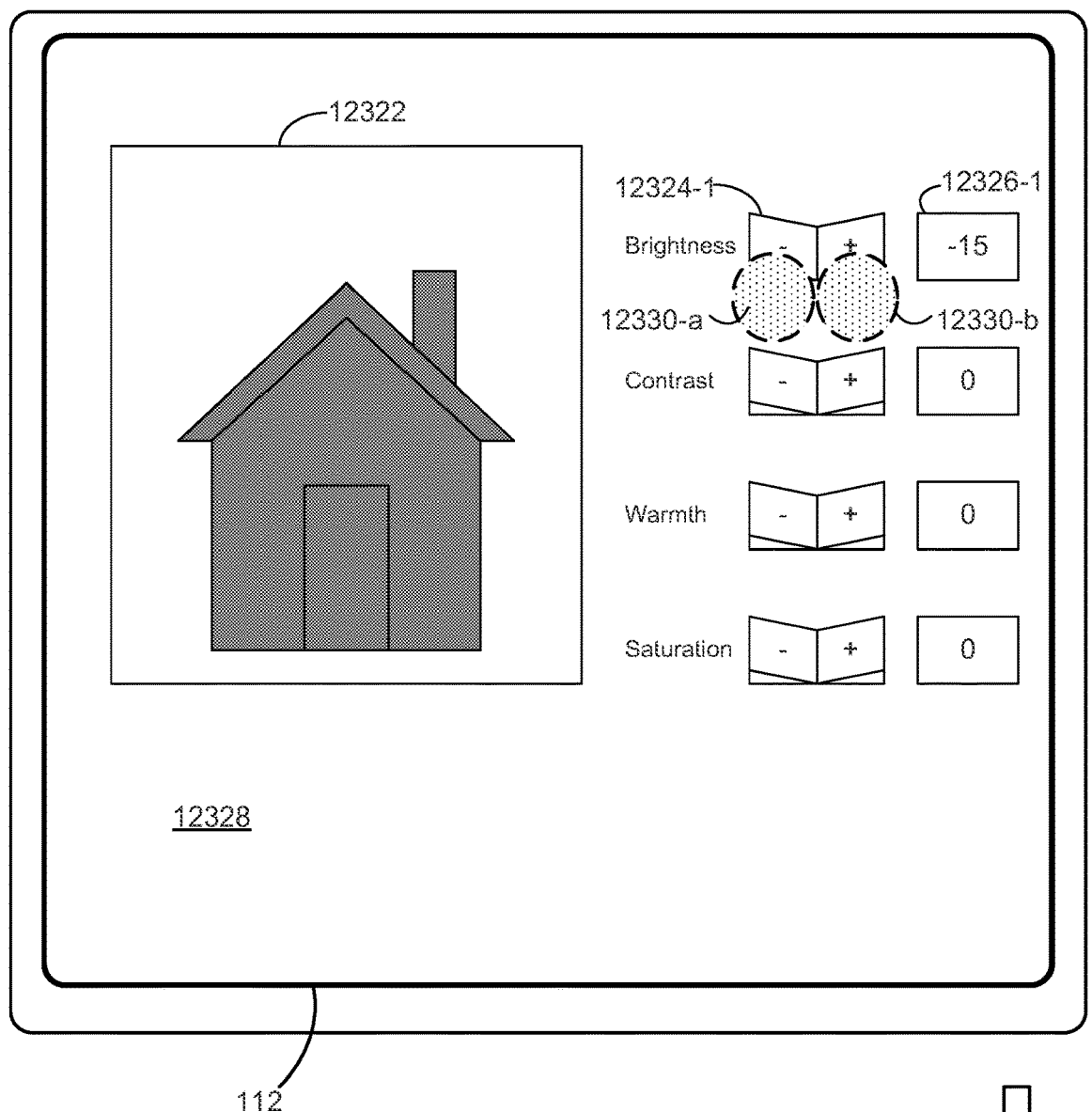
Figure 11K:
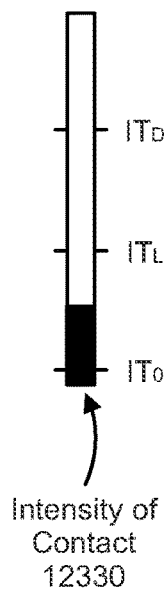
Figure 11L:
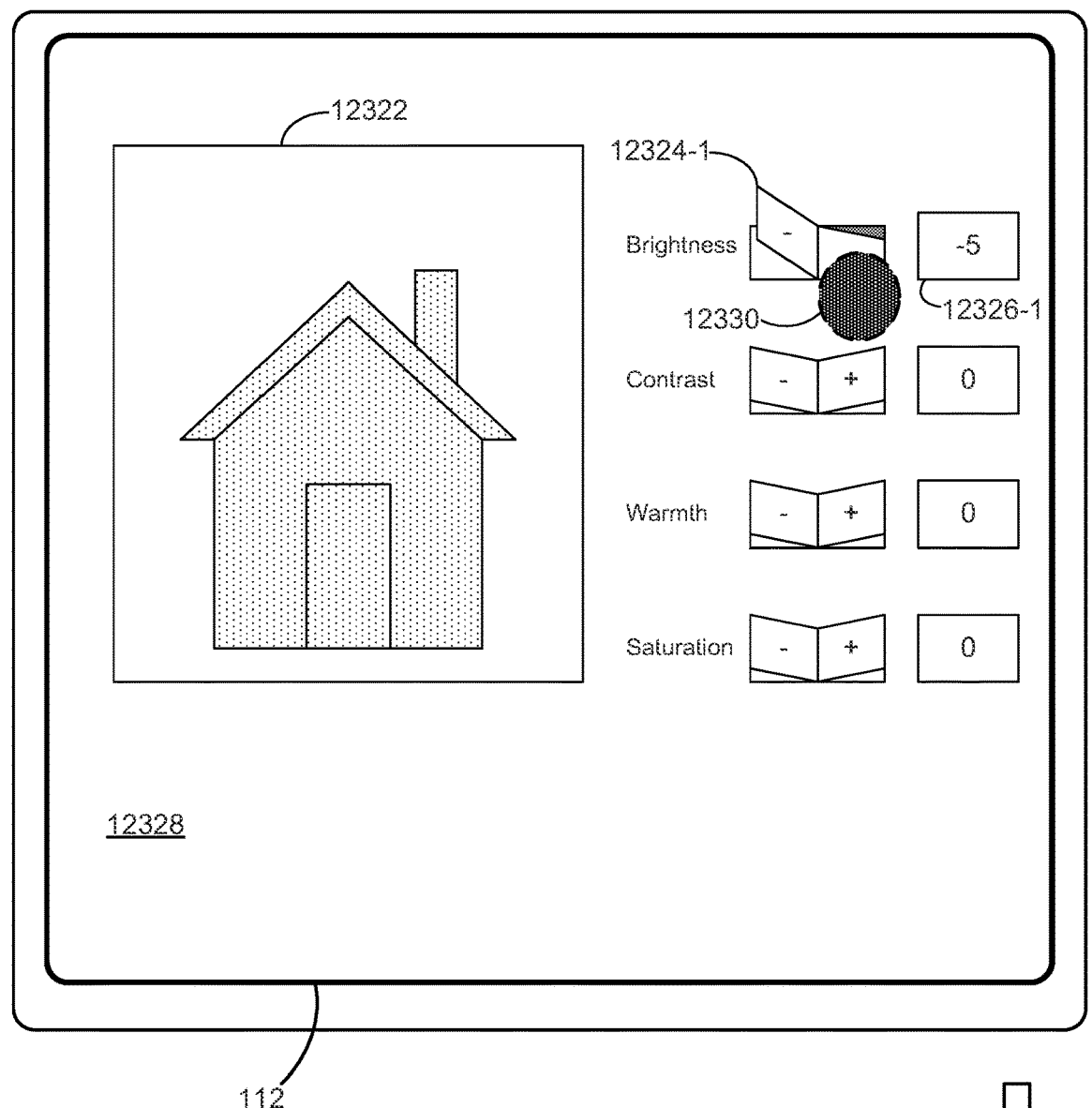
Figure 11L:
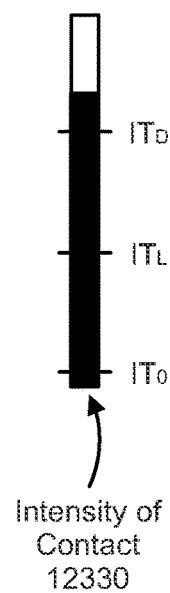
Figure 11M:
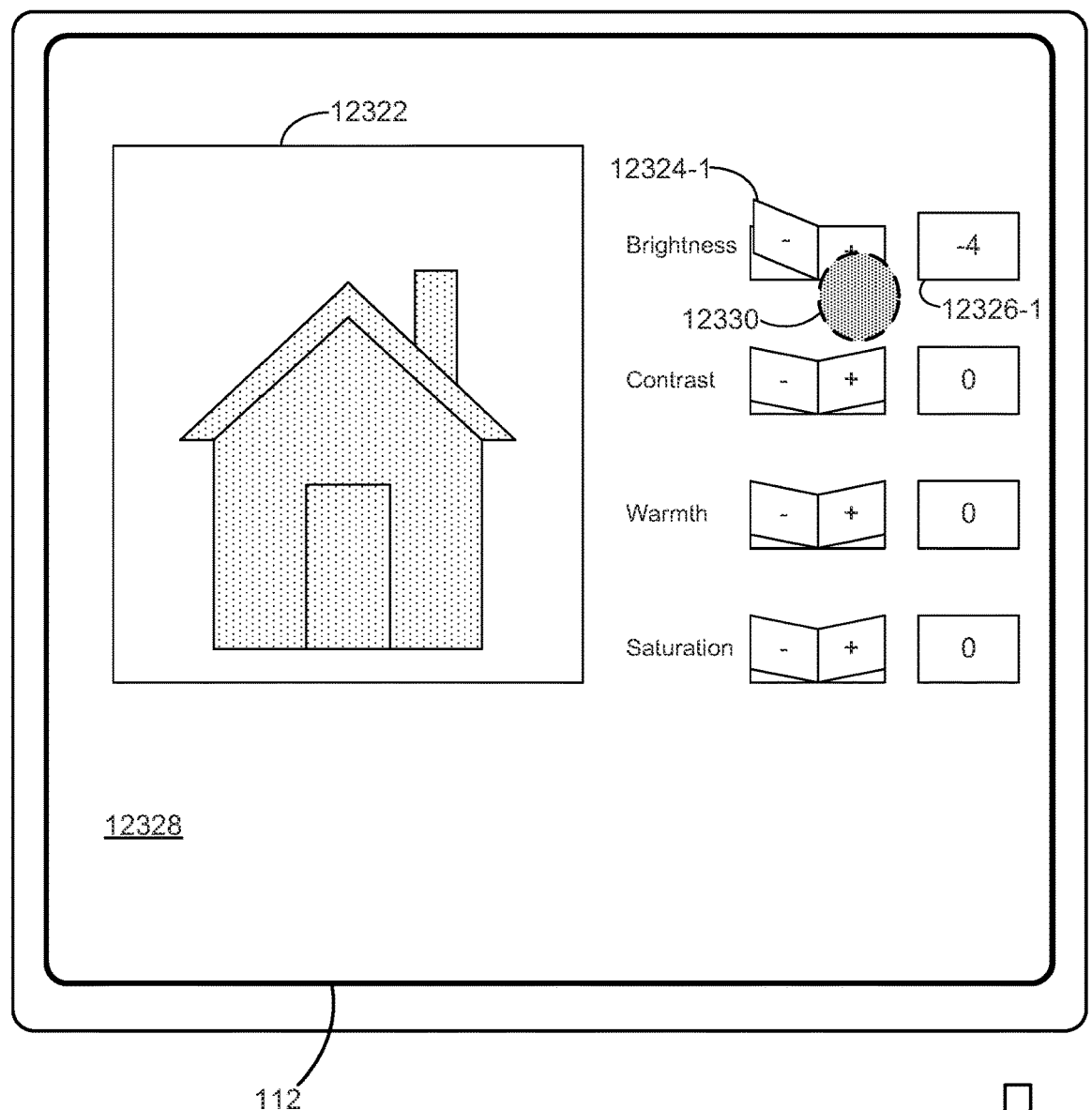
Figure 11M:
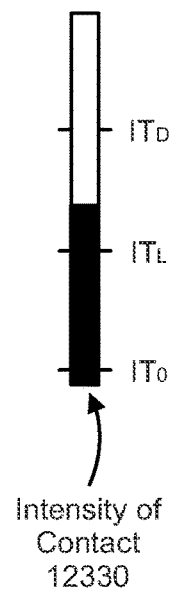
Figure 11N:
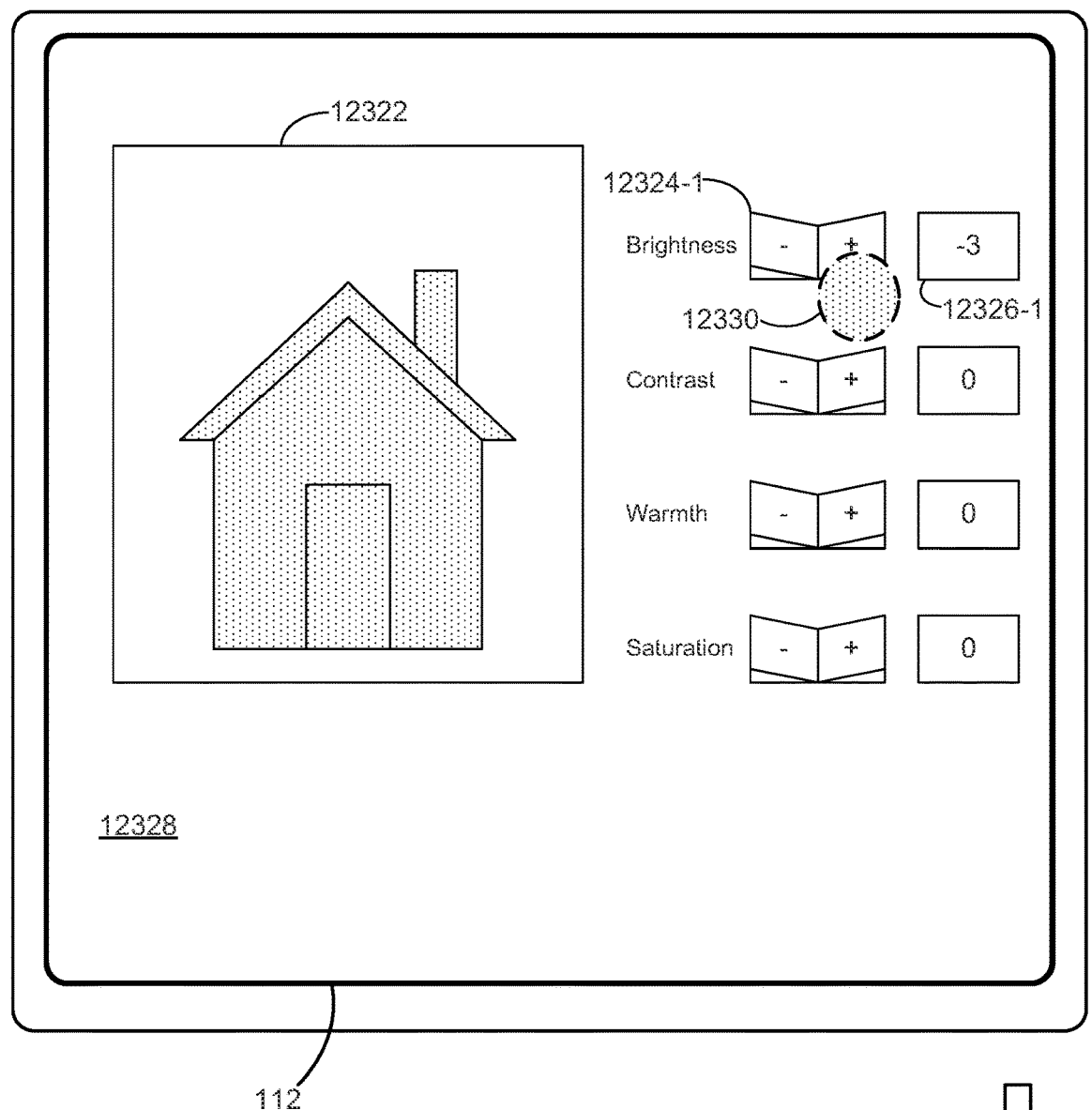
Figure 11N:
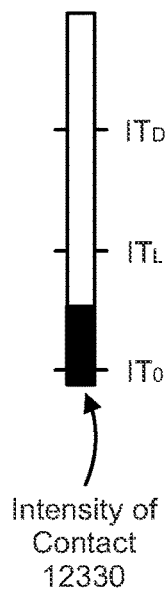
Figure 12A:
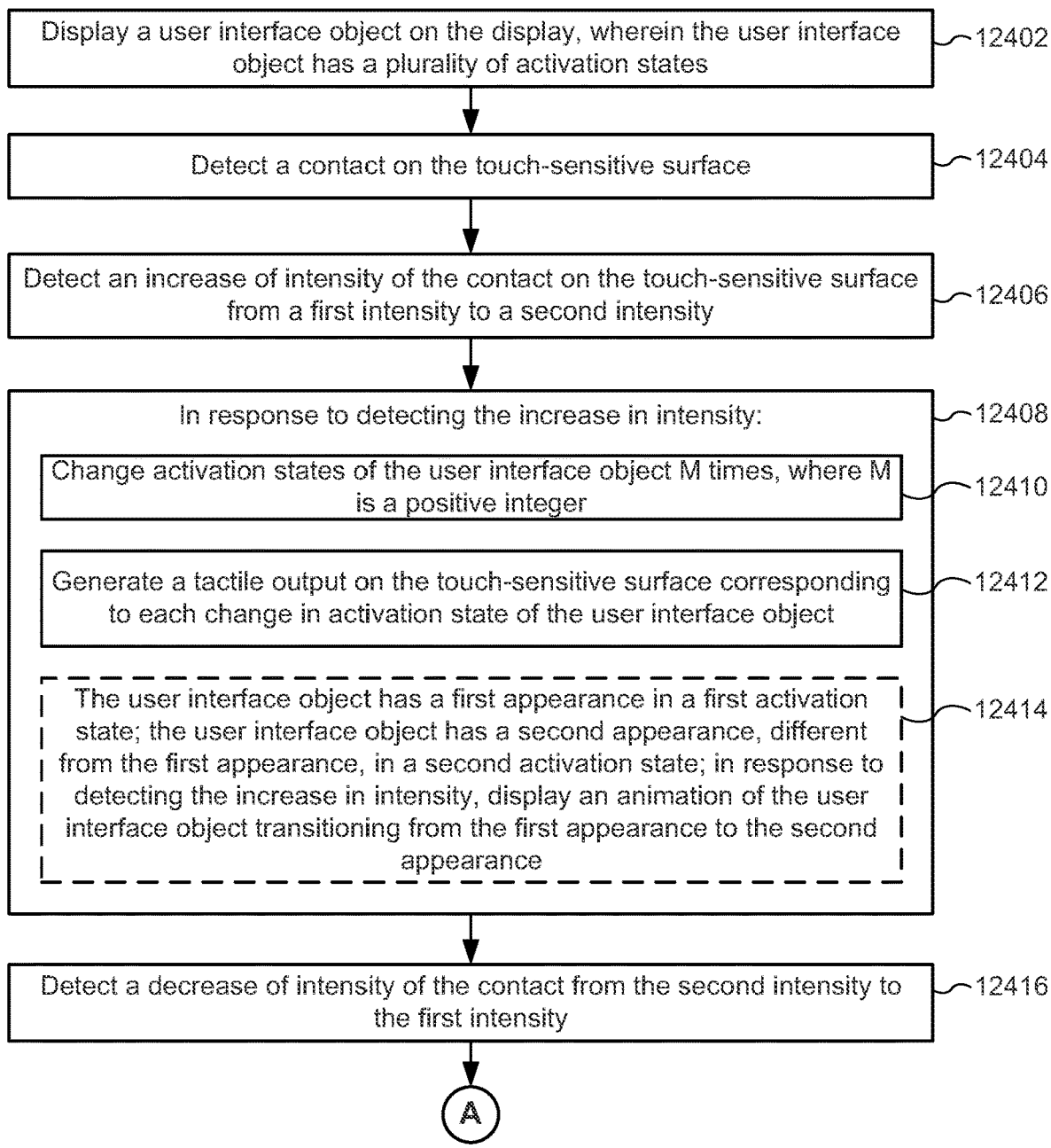
FIGS. 12A-12B are flow diagrams illustrating a method of providing feedback for changing activation states of a user interface object in accordance with some embodiments.
Figure 12B:
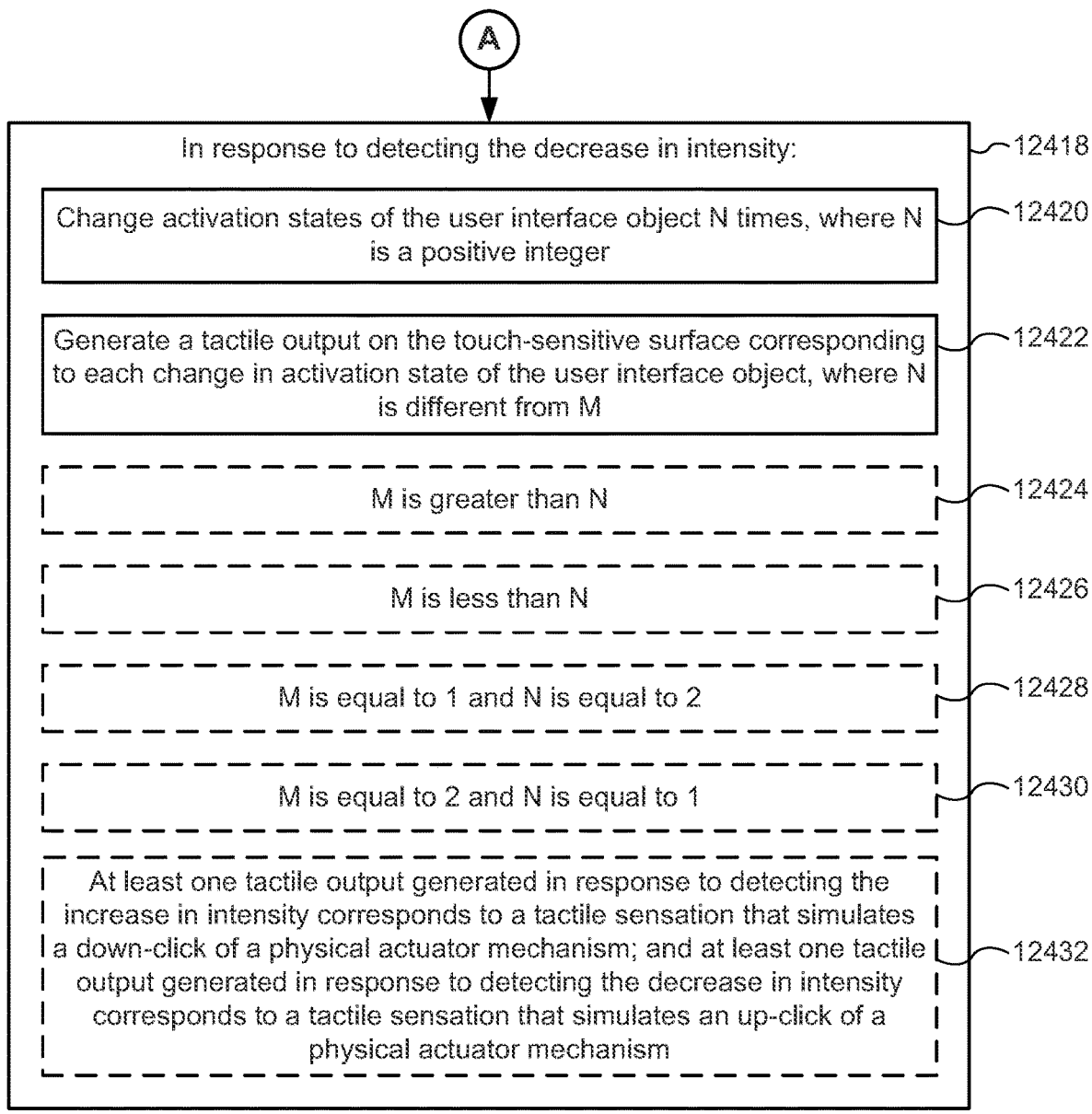

FIGS. 11H-11N illustrate an example of the user interfaces described above, with reference to FIGS. 11A-11G, implemented on a device (e.g., device 100) with a touch-sensitive display 112. FIG. 11H illustrates image editor user interface 12328 displayed on touch-sensitive display 112 of a device. Image 12322 is displayed in image editor user interface 12328 for editing in accordance with user commands. One or more user interface objects (for example, buttons, sliders, rocker switches) optionally include control user interface objects such as rocker switches 12324 and status user interface objects such as value indicators 12326 displayed in image editor user interface 12328. The user interface objects in FIGS. 11H-11N are configured to enable a user to issue commands for editing image 12322. For example, one or more rocker switches 12324, for modifying respective parameters of image 12322, are displayed in image editor user interface 12328. Values representing respective parameters are, optionally, displayed in respective value indicators 12326. Rocker switch 12324-1 enables a user to modify the brightness of image 12322 in accordance with changes in intensity of contact 12330 while a focus selector is over rocker switch 12324-1, for example, and the brightness value (for example, represented by integers, with 0 as the middle value between the upper and lower bounds) is displayed in value indicator 12326-1. Contact 12330 is an example of a focus selector.

A respective rocker switch 12324 optionally has a "minus" portion for reducing the value of a parameter associated with the rocker switch, indicated by the minus sign, and a "plus" portion for increasing the value of a parameter associated with the rocker switch, indicated by a plus sign. A rocker switch 12324 is, optionally activated when a contact is positioned over a portion of the rocker switch and an intensity of a contact associated with the focus selector changes. In some embodiments, the corresponding value decreases or increases depending on the portion over which the contact is positioned. When the contact is positioned over the "minus" portion, the corresponding value decreases when the rocker switch is activated. When the contact is positioned over the "plus" portion, the corresponding value increases when the rocker switch is activated. In FIG. 11H, contact 12330 is positioned over the "minus" portion of rocker switch 12324-1.

While rocker switch 12324-1 is not activated, rocker switch 12324-1 is displayed in a neutral position, as shown FIG. 11H. When rocker switch 12324-1 is activated, rocker switch 12324-1 is displayed as if either the "minus" portion (if contact 12330 is positioned over the "minus" portion when rocker switch 12324-1 is activated, thus rocker switch 12324-1 is activated to decrease the value) or the "plus" portion (if contact 12330 is positioned over the "plus" portion when rocker switch 12324-1 is activated, thus rocker switch 12324-1 is activated to increase the value) is depressed, as shown in FIG. 11I (for the "minus" portion being depressed) and FIG. 11L (for the "plus" portion being depressed), respectively. In some embodiments, when rocker switch 12324-1 is activated, an animation showing a transition of rocker switch 12324-1 from the neutral position to either depressed position is displayed; and when rocker switch 12324-1 is deactivated, an animation showing a transition of rocker switch 12324-1 from either depressed position to the neutral position is displayed.

FIG. 11H shows contact 12330 detected on touch-sensitive display 112 at an intensity that is above a contact detection threshold (e.g., "$IT_0$") and below a light press intensity threshold (e.g., "$IT_L$") for activating rocker switch 12324-1. While contact 12330 continues to be detected on touch-sensitive display 112 over the "minus" portion of rocker switch 12324-1, the intensity of contact 12330 is, in some circumstances, increased to a first intensity that is above the light press intensity threshold (e.g., "$IT_L$") for activating rocker switch 12324-1, and the increase in intensity is detected, as shown in FIG. 11I. In response to the detection of the increase in intensity, rocker switch 12324-1 is activated and the brightness value in value indicator 12326-1 decreases. The brightness of image 12322 changes in accordance with the change in the brightness value. In some embodiments, the brightness value decreases at a relatively slow rate (e.g., -1 in value per second). In some embodiments, rocker switch 12324-1 is animated to show the "minus" portion being depressed. In some embodiments, the brightness value continues to decrease as long as the intensity of contact 12330 does not decrease below the light press intensity threshold (e.g., "$IT_L$").

The intensity of contact 12330 is, in some circumstances, increased further. While contact 12330 continues to be detected on touch-sensitive display 112 over the "minus" portion of rocker switch 12324-1, the device detects an increase in intensity of contact 12330 from the first intensity (e.g., an intensity between $IT_L$ and $IT_D$) to a second, higher intensity that is above a deep press intensity threshold (e.g., "$IT_D$"). In response to this increase in intensity, rocker switch 12324-1 changes to a further activation state, as shown in FIG. 11J where the portion of the rocker switch under contact 12330 is pushed "into" the display, and the brightness value of image 12322 decreases at a rate that is faster (e.g., −10 per second) than the rate of decrease at the first intensity, and the brightness of image 12322 changes in accordance with the change in the brightness value, as shown in FIG. 11J.

The intensity of contact 12330 is, in some circumstances, then decreased below the light press intensity threshold (e.g., "$IT_L$") quickly (e.g., from the second intensity above $IT_D$ to an intensity below $IT_L$ in 0.05 seconds or less). In response to the detection of the decrease in intensity below the light press intensity threshold (e.g., "$IT_L$"), the brightness value stops changing, and the brightness of image 12322 stops changing, as shown in FIG. 11K. Depending on the rate at which the intensity decreased from the second intensity to an intensity below the light press intensity threshold (e.g., "$IT_L$"), the brightness value optionally stops changing immediately in response to the detection of the intensity decrease, or the rate of change in the brightness value optionally first decreases to a slower rate (e.g., the rate at the first intensity) before the brightness values stops changing.

Rocker switch 12324-1 includes multiple activation states. In some embodiments, the activation states for rocker switch 12324-1 are different brightness levels as the brightness value changes. In some embodiments, when the brightness value is decreasing at the "slow" rate (e.g., −1 per second), each brightness value increment based on the rate of decrease (e.g., −1, −2, −3, so forth) is considered to be an activation state, and when the brightness value is decreasing at the "fast" rate (e.g., −10 per second), each brightness value increment based on the rate of decrease (e.g., each −10th increment) is considered to be an activation state. In some of these embodiments, at each activation state, a tactile output is, optionally, generated on touch-sensitive display 112. For example, when the value decreases from −1 to −2, then to −3 and then to −13, tactile outputs are, optionally, generated at −2, −3, and −13.

In some other embodiments, the activation states are the different rates at which the brightness value changes. For example, the "slow" rate is one activation state, the "fast" rate is another activation state, and cessation of activation of rocker switch 12324-1 (e.g., a rate of 0 per second) is another activation state. A tactile output is, optionally, generated whenever the rate of decrease or increase for the brightness value changes or when rocker switch 12324-1 is activated or ceases to be activated. For example, when the brightness value is not changing, rocker switch 12324-1 is in a first ("neutral") activation state; when the brightness value is decreasing at the "slow" rate (e.g., −1 per second), rocker switch 12324-1 is in a second ("light press") activation state; and when the brightness value is decreasing at the "fast" rate (e.g., −10 per second), rocker switch 12324-1 is in a third ("deep press") activation state. At each activation state, a tactile output is, optionally, generated on touch-sensitive display 112. For example, when the activation state changes from the first ("neutral") activation state shown in FIG. 11H to the second ("light press") activation state shown in FIG. 11I, the device generates a tactile output corresponding to the change in activation state. As another example, when the activation state changes from the second ("light press") activation state shown in FIG. 11I to the third ("deep press") activation state shown in FIG. 11J, the device generates a tactile output corresponding to the change in activation state.

In some embodiments, the tactile output generated in response to a change in activation state optionally varies depending on whether the change in activation state was in response to an increase or a decrease in the intensity of contact 12330. A tactile output generated for an activation state change in response to an increase in intensity is, optionally, different from a tactile output generated for an activation state change in response to a decrease in intensity. The tactile outputs is, optionally, different in movement profile, amplitude, or both. In some embodiments, a tactile output generated for an activation state change in response to an increase in intensity corresponds to a tactile sensation that simulates a down-click (e.g., press-and-hold) of a physical button (e.g., a mouse button), and a tactile output generated for an activation state change in response to a decrease in intensity corresponds to a tactile sensation that simulates an up-click (e.g., release from a press-and-hold) of a physical button.

Returning to FIG. 11K, contact 12330 has been moved (e.g., from location 12330-*a* to location 12330-*b* while contact 12330 has an intensity between $IT_0$ and $IT_L$) to the "plus" portion of rocker switch 12324-1. The intensity of contact 12330 is increased to the second intensity quickly (e.g., the intensity of contact 12330 increases from an intensity below $IT_L$ of contact 12330-*b* in FIG. 11K to the second intensity that is above $IT_D$ in FIG. 11L in 0.05 seconds or less), as shown in FIG. 11L. In response to the increase in intensity, the brightness value increases at the "fast" rate (e.g., +10 per second). As shown in FIG. 11K, rocker switch 12324-1 is in the neutral activation state and transitions directly to the deep press activation state in FIG. 11L in response to a rapid increase in intensity of contact 12330 to an intensity above $IT_D$.

As shown in FIG. 11M, the intensity of contact 12330 is subsequently decreased from the second intensity (e.g., an intensity above $IT_D$) to the first intensity (e.g., an intensity between $IT_L$ and $IT_D$). In response to detecting the intensity decrease to the first intensity, the brightness value increases at the "slow" rate (e.g., +1 per second), as shown in FIG. 11M and rocker switch 12324-1 is shown in the light press activation state.

As shown in FIG. 11N, the intensity of contact 12330 is subsequently decreased further, from the first intensity (e.g., an intensity between $IT_L$ and $IT_D$) to an intensity below the light press intensity threshold (e.g., "$IT_L$"). In response to the further decrease in intensity of contact 12330, the brightness value stops increasing (e.g., the rate of change becomes 0 per second), as shown in FIG. 11N, and rocker switch 12324-1 is shown in the neutral activation state.

As described above, the activation states of rocker switch 12324-1 optionally correspond to the increments of change in the value, in accordance with the rate of change, or the different rates of change. A tactile output is, optionally, generated whenever one activation state changes to another (e.g., one increment to the next or one rate of change to the next).

FIGS. 12A-12B are flow diagrams illustrating a method 12400 of providing feedback for changing activation states of a user interface object in accordance with some embodiments. The method 12400 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 12400 are, optionally, combined and/or the order of some operations is, optionally, changed.

As described below, the method 12400 provides a more efficient way to provide feedback when changing activation states of a user interface object. The method reduces the cognitive burden on a user when changing activation states of a user interface object, thereby creating a more efficient human-machine interface. For battery-operated electronic devices, enabling a user to change activation states of a user interface object faster and more efficiently conserves power and increases the time between battery charges.

The device displays (12402) a user interface object on the display, where the user interface object has a plurality of activation states. FIG. 11A, for example, shows rocker switches 12304, for adjusting parameters of an image, displayed in image editor user interface 12300 on a display 450 that is separate from a touch-sensitive surface 451 on which contacts are detected. As another example, FIG. 11H shows rocker switches 12324, for adjusting parameters of an image, displayed in image editor user interface 12328 on a touch-sensitive display 112 on which contacts are detected. A respective rocker switch 12304 or 12324 has multiple activation states, which are, optionally, the increments of change in the corresponding parameter value or the rates of change in the parameter value (e.g., a neutral activation state, a light press activation state and a deep press activation state).

The device detects (12404) a contact (e.g., a finger contact) on the touch-sensitive surface. As shown in FIG. 11A, for example, contact 12310 is detected on touch-sensitive surface 451. As another example, FIG. 11H shows contact 12330 detected on touch-sensitive display 112.

The device detects (12406) an increase of intensity of the contact on the touch-sensitive surface from a first intensity (e.g., an intensity between $IT_L$ and $IT_D$) to a second intensity (e.g., an intensity above $IT_D$). FIGS. 11A-11C shows an increase in the intensity of contact 12310 from an intensity below a light press intensity threshold (e.g., "$IT_L$") for activating rocker switch 12304-1, to a first intensity that is higher than the light press intensity threshold (e.g., "$IT_L$"), and then to a second intensity that is higher than the first intensity. As another example, in FIGS. 11D-11E, the device detects an increase in the intensity of contact 12310, from an intensity below the light press intensity threshold (e.g., "$IT_L$"), quickly (e.g., intensity increases from the below-threshold intensity to the second intensity in 0.05 seconds or less) to a second intensity that is higher than the first intensity. In FIGS. 11H-11J, the device detects an increase in the intensity of contact 12330 from an intensity below a light press intensity threshold (e.g., "$IT_L$") for activating rocker switch 12324-1, to a first intensity that is higher than the light press intensity threshold (e.g., "$IT_L$"), and then to a second intensity that is higher than the first intensity. As another example, in FIGS. 11K-11L, the device detects an increase in the intensity of contact 12330, from an intensity below the light press intensity threshold (e.g., "$IT_L$"), quickly (e.g., intensity increases from the below-threshold intensity to the second intensity in 0.05 seconds or less) to a second intensity that is higher than the first intensity.

In response to detecting the increase in intensity (12408), the device changes (12410) activation states of the user interface object M times, where M is a positive integer, and generates (12412) a tactile output on the touch-sensitive surface corresponding to each change in activation state of the user interface object. For example, in FIG. 11A-11C or 11H-11J, in response to the detection of the increase in intensity from below the light press intensity threshold (e.g., "$IT_L$") to the first intensity (e.g., an intensity between $IT_L$ and $IT_D$) and then to the second intensity (e.g., an intensity above $IT_D$), the rocker switch changes from a neutral activation state (corresponding to no change in brightness of the image) to a light press activation state (corresponding to a slow rate of change in brightness of the image) and then to a deep press activation state (corresponding to a fast rate of change in brightness of the image). Here, the activation state (in this case, the rate of change) changes two times, and two tactile outputs are generated.

As another example, in FIG. 11D-11E or 11K-11L, in response to the detection of the rapid increase in intensity from below the light press intensity threshold (e.g., "$IT_L$") to the second intensity (e.g., an intensity above $IT_D$), the rocker switch changes from the neutral activation state (corresponding to no change in brightness of the image) to the deep press activation state (corresponding to a fast rate of change in brightness of the image), skipping the light press activation state (corresponding to a slow rate of change in brightness of the image). Here, the activation state (in this case, the rate of change) changes once, and one tactile output is generated, even though the device has detected a change in intensity of the contact that has the same magnitude as the change in intensity of contact 12310 between FIGS. 11A and 11C.

In some embodiments, the user interface object has a first appearance in a first activation state; the user interface object has a second appearance, different from the first appearance, in a second activation state; and in response to detecting the increase in intensity, the device displays (12414) an animation of the user interface object transitioning from the first appearance to the second appearance. Rocker switch 12304-1 appears in a plurality of activation states in FIGS. 11A-11G, for example, rocker switch 12304-1 appears in a neutral position when the rate of change is 0 (e.g., rocker switch 12304-1 is in a neutral activation state as shown in FIGS. 11A, 11D and 11G) and appears with either the "minus" portion or the "plus" portion depressed when the rate is non-zero (e.g., rocker switch 12304-1 is in a light press activation state as shown in FIGS. 11B and 11F or in a deep press activation state as shown in FIGS. 11C and 11E). When rocker switch 12304-1 is activated or deactivated (e.g., the rate of change changes), an animation showing a transition from the neutral position to a depressed position, or vice versa, respectively, is, optionally, displayed. Rocker switch 12324-1 appears in a plurality of activation states in FIGS. 11H-11N, for example, rocker switch 12324-1 appears in a neutral position when the rate of change is 0 (e.g., rocker switch 12324-1 is in a neutral activation state as shown in FIGS. 11H, 11K and 11N) and appears with either the "minus" portion or the "plus" portion depressed when the rate is non-zero (e.g., rocker switch 12324-1 is in a light press activation state as shown in FIGS. 11I and 11M or in a deep press activation state as shown in FIGS. 11J and 11L). When rocker switch 12324-1 is activated or deactivated (e.g., the rate of change changes), an animation showing a transition from the neutral position to a depressed position, or vice versa, respectively, is, optionally, displayed.

The device detects (12416) a decrease of intensity of the contact from the second intensity to the first intensity. As shown in FIGS. 11C-11D, for example, a quick decrease in the intensity of contact 12310 from the second intensity to below the light press intensity threshold (e.g., "$IT_L$") is detected. As another example, in FIGS. 11E-11G, a decrease in the intensity of contact 12310 from the second intensity to the first intensity and then to below the light press intensity threshold (e.g., "$IT_L$") is detected. As further examples, in FIGS. 11J-11K, for example, a quick decrease in the intensity of contact 12330 from the second intensity to below the light press intensity threshold (e.g., "$IT_L$") is detected. In FIGS. 11L-11N, a decrease in the intensity of contact 12330 from the second intensity to the first intensity and then to below the light press intensity threshold (e.g., "$IT_L$") is detected.

In response to the detection of the decrease in intensity (12418), the device changes (12420) activation states of the user interface object N times, where N is a positive integer, and generates (12424) a tactile output on the touch-sensitive surface corresponding to each change in activation state of the user interface object, where N is different from M. For example, in FIGS. 11C-11D or FIGS. 11J-11K, in response to the detection of the decrease in intensity, the rate of change in the brightness value changes from the "fast" rate (e.g., the deep press activation state of rocker switch 12324-1) to 0 (e.g., the neutral activation state of rocker switch 12324-1), and one tactile output is generated, whereas two tactile outputs were generated in response to detecting the increase in intensity in FIGS. 11A-11C and 11H-11J, respectively. As another example, in FIG. 11E-11G or 11L-11N, in response to the detection of the decrease in intensity, the rate of change in the brightness value changes from 0 (e.g., the neutral activation state of rocker switch 12324-1) to the "slow" rate (e.g., the light press activation state of rocker switch 12324-1) and then the "fast" rate (e.g., the deep press activation state of rocker switch 12324-1), and two tactile outputs are generated, whereas just one tactile output was generated in response to detecting the increase in intensity in FIGS. 11D-11E and 11K-11L, respectively.

In some embodiments, a distinct tactile output is a tactile output that was generated to provide feedback corresponding to a user interface event (e.g., a change in the activation state of the user interface object, such as activation of a button or other control). In some embodiments, the touch-sensitive surface is moved by an actuator in accordance with a separate waveform for each user interface event. The waveforms for different user interface events optionally overlap, but a waveform that was generated to provide a tactile feedback for a particular user interface event (e.g., activation of a button or change in activation state of a control such as a rocker switch) will still generate a distinct tactile output. In some embodiments, an activation state of a user interface object corresponds to an operational state of an application on the electronic device, and changing activation states of the user interface object changes operational states of the application. If the user interface object is an adjustable control interface such as a multi-state button, rocker-switch or slider, the activation states of the button/switch/slider are typically displayed by changing the visual appearance of the adjustable control interface (e.g., as a change in shading of a button, a change in rotation of a rocker switch or a change in position of a slider). Additionally, when the activation state of the button/switch/slider is changed, operation of an application associated with the button/switch/slider is changed accordingly. For example, if a rocker switch controls the brightness of an image, the activation states of the rocker switch correspond to different brightness levels of the image, and when the rocker switch changes from a first activation state to a second activation state, the brightness of the image changes from a first brightness level corresponding to the first activation state of the rocker switch to a second brightness level corresponding to the second activation state of the rocker switch. In some embodiments, activation states correspond to image property levels (e.g., hue, saturation, exposure, brightness, contrast), content navigation states (e.g., channel selection, forward navigation, backward navigation, frame-by-frame navigation), system property adjustments (e.g., volume control, screen brightness, date/time settings), rates of change (e.g., the rate at which an adjustable parameter value increases or decreases, speed of forward or backward seeking through video or audio), or other adjustable properties.

In some embodiments, M is (12424) greater than N. In FIG. 11A-11D or 11H-11K, for example, the number of changes in activation state in response to the detection of the increase in intensity of the contact (e.g., a change from the neutral activation state to the light press activation state and a change from the light press activation state to the deep press activation state shown in FIGS. 11A-11C and 11H-11J) is greater than the number of changes in activation state in response to the detection of the decrease in intensity of the contact (e.g., a change from the deep press activation state to the neutral activation state shown in FIGS. 11C-11D and FIGS. 11J-11K).

In some embodiments, M is (12426) less than N. In FIG. 11D-11G or 11K-11N, for example, the number of changes in activation state in response to the detection of the increase in intensity of the contact (e.g., a change from the neutral activation state to the deep press activation state shown in FIGS. 11D-11E and 11K-11L) is less than the number of changes in activation state in response to the detection of the decrease in intensity of the contact (e.g., a change from the deep press activation state to the light press activation state and a change from the light press activation state to the neutral activation state shown in FIGS. 11E-11G and 11L-11N).

In some embodiments, M is (12428) equal to 1 and N is equal to 2. In FIG. 11D-11G or 11K-11N, for example, there is one change in activation state in response to the detection of the increase in intensity and two changes in activation state in response to the detection of the decrease in intensity.

In some embodiments, M is equal to 2 and N is (12430) equal to 1. In FIG. 11A-11D or 11H-11K, for example, there are two changes in activation state in response to the detection of the increase in intensity and one change in activation state in response to the detection of the decrease in intensity.

In some embodiments, at least one tactile output generated in response to detecting the increase in intensity corresponds (12432) to a tactile sensation that simulates a down-click of a physical actuator mechanism (e.g., a simulation of the physical "down-click sensation" generated by the mechanical button apparatus of a physical button when a user activates the physical button), and at least one tactile output generated in response to detecting the decrease in intensity corresponds to a tactile sensation that simulates an up-click of a physical actuator mechanism (e.g., a simulation of the physical "up-click sensation" generated by the mechanical button apparatus of a physical button when a user activates the physical button). For example, the tactile outputs generated for the activation state changes in response to the detection of the increase in intensity of contact 12310 or 12330 correspond to tactile sensations that simulate a down-click, and the tactile outputs generated for the activation state changes in response to the detection of the decrease in intensity of contact 12310 or 12330 correspond to tactile sensations that simulate an up-click.

While M and N have been discussed herein as positive integers, in some circumstances M is zero (e.g., no activation states of the user interface object are changed in response to detecting the increase in intensity of the contact) and/or N is zero (e.g., no activation states of the user interface object are changed in response to detecting the decrease in intensity of the contact). Additionally, while M has been described as being different from N, in some circumstances M is equal to N (e.g., the number of activation states that are changed in response to detecting the increase in intensity of the contact is the same as the number of activation states that are changed in response to detecting the decrease in intensity of the contact).

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 12400 described above with respect to FIGS. 12A-12B. For example, the contacts, user interface objects, tactile outputs, intensity thresholds, focus selectors, and animations described above with reference to method 12400 optionally has one or more of the characteristics of the contacts, user interface objects, tactile outputs, intensity thresholds, focus selectors, and animations described herein with reference to other methods described herein (e.g., those listed in the fifth paragraph of the Description of Embodiments). For brevity, these details are not repeated here.

Figure 13:
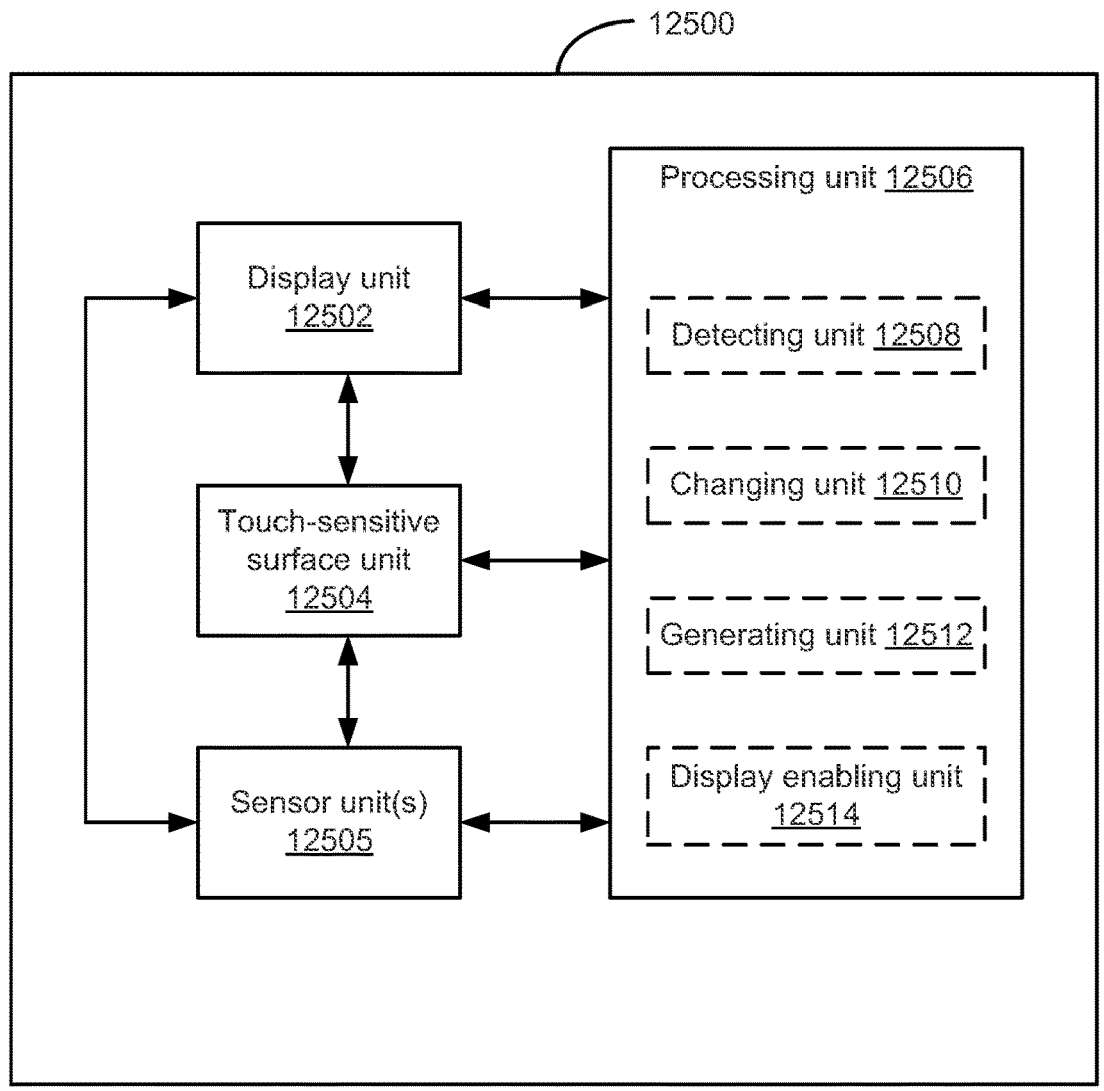
FIG. 13 is a functional block diagram of an electronic device in accordance with some embodiments.

In accordance with some embodiments, FIG. 13 shows a functional block diagram of an electronic device 12500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 12500 includes a display unit 12502 configured to display a user interface object, where the user interface object has a plurality of activation states; a touch-sensitive surface unit 12504 configured to receive contacts; one or more sensor units 12505 configured to detect intensity of contacts with the touch-sensitive surface unit 12504; and a processing unit 12506 coupled to the display unit 12502, the touch-sensitive surface unit 12504, and the sensor units 12505. In some embodiments, the processing unit 12506 includes a detecting unit 12508, a changing unit 12510, a generating unit 12512, and a display enabling unit 12514.

The processing unit 12506 is configured to: detect a contact on the touch-sensitive surface unit 12504 (e.g., with the detecting unit 12508); detect an increase of intensity of the contact on the touch-sensitive surface unit 12504 from a first intensity to a second intensity (e.g., with the detecting unit 12508); in response to detecting the increase in intensity: change activation states of the user interface object M times, where M is a positive integer (e.g., with the changing unit 12510), and generate a tactile output on the touch-sensitive surface unit 12504 corresponding to each change in activation state of the user interface object (e.g., with the generating unit 12512); detect a decrease of intensity of the contact from the second intensity to the first intensity (e.g., with the detecting unit 12508); and in response to detecting the decrease in intensity: change activation states of the user interface object N times, where N is a positive integer (e.g., with the changing unit 12510), and generate a tactile output on the touch-sensitive surface unit 12504 corresponding to each change in activation state of the user interface object, where N is different from M (e.g., with the generating unit 12512).

In some embodiments, the user interface object has a first appearance in a first activation state, the user interface object has a second appearance, different from the first appearance, in a second activation state, and the processing unit 12506 is configured to: in response to detecting the increase in intensity, enable display of an animation of the user interface object transitioning from the first appearance to the second appearance (e.g., with the display enabling unit 12514).

In some embodiments, M is greater than N.

In some embodiments, M is less than N.

In some embodiments, M is equal to 1 and N is equal to 2.

In some embodiments, M is equal to 2 and N is equal to 1.

In some embodiments, at least one tactile output generated (e.g., with the generating unit 12512) in response to detecting the increase in intensity corresponds to a tactile sensation that simulates a down-click of a physical actuator mechanism, and at least one tactile output generated (e.g., with the generating unit 12512) in response to detecting the decrease in intensity corresponds to a tactile sensation that simulates an up-click of a physical actuator mechanism.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12B are, optionally, implemented by components depicted in FIGS. 1A-1B or FIG. 13. For example, detection operations 12404, 12406, 12416, changing operations 12410, 12420, and generating operations 12412, 12422 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Feedback for Changing Activation States of a User Interface Object

Many electronic devices have graphical user interfaces that include user interface objects, such as buttons and switches. In some circumstances, a user activates a user interface object to perform an operation or adjust a parameter or property. In some devices, a tactile sensation is, in some circumstances, perceived by the user for corresponding physical inputs, such as clicks of a physical actuator mechanism (e.g., a mouse button) that activate a switch. To make a virtual button or switch easier to use, the virtual object optionally mimics the behavior of the corresponding physical object. For example, haptic sensations is, in some circumstances, felt when a virtual switch is operated, with the haptic sensations mimicking the sensations of the corresponding physical switch, such as mimicking the clicks of a physical actuator mechanism (e.g., a mouse button) that activates the switch. But physical objects, such as real buttons and switches, provide, in some circumstances, excessive tactile feedback in some situations, and too little feedback in others. In such situations, a virtual object that just mimicked sensations of the corresponding physical object would also provide too much (or too little) feedback. But a virtual object does not have to be provided with haptic feedback that just mimics tactile sensations from the corresponding physical object. The embodiments described below provide tactile feedback that is not tied to actuations of a physical actuator mechanism. For example, tactile sensations related to activation state changes are, optionally, provided. When tactile sensations not tied to physical actuations are provided for, the user can better discern the activation state of the virtual button without being distracted by too much or too little tactile feedback. If a user interface object goes through two or more activation state changes in rapid succession, haptic feedback does not need to be provided for each change in activation state, whereas the corresponding physical object would provide more tactile feedback. Also, the number of times that haptic feedback is provided as a contact increases in intensity does not have to be the same as the number of times that haptic feedback is provided as the contact decreases in intensity. This asymmetry in the number of times that haptic feedback is provided as a contact increases in intensity or decreases in intensity is, in some embodiments, dependent on how rapidly the contact intensity changes, and, in other embodiments, independent of how rapidly the contact intensity changes. This additional (or alternative) feedback enables the user to operate the device more quickly and efficiently, thereby creating a more efficient human-machine interface.

FIGS. 14A-14N illustrate exemplary user interfaces for providing feedback for changing activation states of a user interface object in accordance with some embodiments. The user interfaces in these figures are used to illustrate the processes described below, including the processes in FIGS. 15A-15C. FIGS. 14A-14N include intensity diagrams that show the current intensity of the contact on the touch-sensitive surface relative to a plurality of intensity thresholds including a light press intensity threshold (e.g., "$IT_L$") and a deep press intensity threshold (e.g., "$IT_D$"). In some embodiments, operations similar to those described below with reference to "$IT_L$" and "$IT_D$" are performed with reference to different intensity thresholds.

FIG. 14A illustrates an example of a user interface that includes one or more user interface objects. Image editor user interface 12600 is displayed on display 450 (e.g., display 340) of a device (e.g., device 300). Image 12602 is displayed in image editor user interface 12600 for editing in accordance with user commands. One or more user interface objects (for example, buttons, sliders, rocker switches) optionally include control user interface objects such as rocker switches 12604 and status user interface objects such as value indicators 12606 displayed in image editor user interface 12600. The user interface objects in FIGS. 14A-14G are configured to enable a user to issue commands for editing image 12602. For example, one or more rocker switches 12604, for modifying respective parameters of image 12602, are displayed in image editor user interface 12600. Values representing respective parameters are, optionally displayed in respective value indicators 12606. Rocker switch 12604-1 is, optionally, used to modify the brightness of image 12602, for example, and the brightness level (for example, represented by integers, with 0 as the middle value between the upper and lower bounds) is displayed in value indicator 12606-1. Cursor 12608 is also displayed on user interface 12600. In some embodiments, cursor 12608 is a mouse pointer. Cursor 12608 is an example of a focus selector.

A respective rocker switch 12604 optionally has a "minus" portion for reducing the value of a parameter associated with the rocker switch, indicated by the minus sign, and a "plus" portion for increasing the value of a parameter associated with the rocker switch, indicated by a plus sign. A rocker switch 12604 is, optionally, activated when a focus selector (e.g., cursor 12608) is positioned over either portion of the rocker switch and an intensity of a contact associated with the focus selector changes. In some embodiments, the corresponding value decreases or increases depending on the portion over which the focus selector is positioned. When the focus selector is positioned over the "minus" portion, the corresponding value decreases when the rocker switch is activated. When the focus selector is positioned over the "plus" portion, the corresponding value increases when the rocker switch is activated. In FIG. 14A, cursor 12608 is positioned over the "minus" portion of rocker switch 12604-1.

When rocker switch 12604-1 is not activated, rocker switch 12604-1 is displayed in a neutral position, as shown FIG. 14A. When rocker switch 12604-1 is activated, rocker switch 12604-1 is displayed as if either the "minus" portion (if cursor 12608 is positioned over the "minus" portion when rocker switch 12604-1 is activated, thus rocker switch 12604-1 is activated to decrease the value) or the "plus" portion (if cursor 12608 is positioned over the "plus" portion when rocker switch 12604-1 is activated, thus rocker switch 12604-1 is activated to increase the value) is depressed. For example, FIG. 14B shows the "minus" portion of rocker switch 12604-1 being depressed. In some embodiments, when rocker switch 12604-1 is activated, an animation showing a transition of rocker switch 12604-1 from the neutral position to either depressed position is, optionally, displayed; and when rocker switch 12604-1 is deactivated, an animation showing a transition of rocker switch 12604-1 from either depressed position to the neutral position is, optionally, displayed.

FIG. 14A shows contact 12610 detected on touch-sensitive surface 451 (e.g., touchpad 355) of the device at an intensity that is above a contact detection threshold (e.g., "$IT_0$") and below a light press intensity threshold (e.g., "$IT_L$") for activating rocker switch 12604-1. While contact 12610 continues to be detected on touch-sensitive surface 451 and cursor 12608 is positioned over the "minus" portion of rocker switch 12604-1, the intensity of contact 12610 is, in some circumstances, increased to a light press intensity that is above the light press intensity threshold (e.g., "IT$_L$") for activating rocker switch 12604-1, and the increase in intensity is detected, as shown in FIG. 14B. In response to the detection of the increase in intensity, rocker switch 12604-1 is activated and the brightness level in value indicator 12606-1 decreases. The brightness of image 12602 changes in accordance with the change in the brightness level. In some embodiments, the rate of change in the brightness level is a relatively slow rate (e.g., 1 brightness level per time step). In some embodiments, rocker switch 12604-1 is animated to show the "minus" portion being depressed. The brightness level continues to decrease as long as the intensity of contact 12610 does not decrease below the light press intensity threshold (e.g., "IT$_L$").

The intensity of contact 12610 is, in some circumstances, increased further. While contact 12610 continues to be detected on touch-sensitive surface 451 and cursor 12608 is still positioned over the "minus" portion of rocker switch 12604-1, the device detects an increase in intensity of contact 12610 from the light press intensity (e.g., an intensity between IT$_L$ and IT$_D$) to a second, higher intensity that is above a deep press intensity threshold (e.g., "IT$_D$"). In response to this increase in intensity, rocker switch 12604-1 changes to a further activation state, as shown in FIG. 14C where the portion of the rocker switch under focus selector 12608 is pushed "into" the display, and brightness level decreases at a "medium" rate that is faster (e.g., 5 brightness levels per time step) than the rate of change at the light press intensity, and the brightness of image 12602 changes in accordance with the change in the brightness level, as shown in FIG. 14C.

The intensity of contact 12610 is, in some circumstances, increased even further. While contact 12610 continues to be detected on touch-sensitive surface 451 and cursor 12608 is still positioned over the "minus" portion of rocker switch 12604-1, the intensity of contact 12610 is increased from the first deep press intensity (e.g., an intensity above IT$_D$ shown in FIG. 14C) to a second deep press intensity (e.g., an intensity above IT$_D$ shown in FIG. 14D) that is higher than the first deep press intensity. In response to this increase in intensity, rocker switch 12604-1 changes to a further activation state, as shown in FIG. 14D where the portion of the rocker switch under focus selector 12608 is pushed even further "into" the display than shown in FIG. 14C, and brightness level decreases at a "fast" rate that is faster (e.g., 10 brightness levels per time step) than the rate of change at the first deep press intensity, and the brightness of image 12602 changes in accordance with the change in the brightness level, as shown in FIG. 14D.

From the second deep press intensity, the intensity of contact 12610 is, in some circumstances, increased even further. Depending on the implementation, the rate at which the brightness level changes optionally does or does not change further in response to the detection of the increase in intensity, as the rate of change at the second deep press intensity is, optionally, a predefined lower-bound (or upper-bound, for a rate of change where the brightness level increases) rate of change.

The intensity of contact 12610 is, optionally, decreased from the second deep press intensity to the first deep press intensity (e.g., an intensity above IT$_D$ but below the second deep press intensity). While contact 12610 continues to be detected on touch-sensitive surface 451 and cursor 12608 is still positioned over the "minus" portion of rocker switch 12604-1, the device detects a decrease in intensity of contact 12610 from the second deep press intensity to the first deep press intensity, as shown in FIG. 14E. In response to this decrease in intensity, rocker switch 12604-1 continues to be activated, and brightness level decreases at the rate that corresponds to the first deep press intensity (e.g., 5 brightness levels per time unit), and the brightness of image 12602 changes in accordance with the change in the brightness level, as shown in FIG. 14E.

The intensity of contact 12610 is, optionally, further decreased from the first deep press intensity to the light press intensity (e.g., an intensity between IT$_L$ and IT$_D$). While contact 12610 continues to be detected on touch-sensitive surface 451 and cursor 12608 is still positioned over the "minus" portion of rocker switch 12604-1, the device detects a decrease in the intensity of contact 12610 from the first deep press intensity to the light press intensity, as shown in FIG. 14F. In response to this decrease in intensity, rocker switch 12604-1 continues to be activated, and brightness level decreases at the rate corresponding to the light press intensity (e.g., 1 brightness level per time unit), and the brightness of image 12602 changes in accordance with the change in the brightness level, as shown in FIG. 14F.

The intensity of contact 12610 is, optionally, further decreased from the light press intensity (e.g., an intensity between IT$_L$ and IT$_D$) to an intensity below the light press intensity threshold (e.g., "IT$_L$"). While contact 12610 continues to be detected on touch-sensitive surface 451 and cursor 12608 is still positioned over the "minus" portion of rocker switch 12604-1, the device detects a decrease in intensity of contact 12610 from the light press intensity to an intensity below the light press intensity threshold (e.g., "IT$_L$"), as shown in FIG. 14G. In response to detecting this decrease in intensity, rocker switch 12604-1 is deactivated, and the brightness level stops decreasing, as shown in FIG. 14G. The brightness of image 12602 stops changing in accordance with the brightness level ceasing to decrease.

A user interface object, such as rocker switch 12604-1, optionally has multiple activation states. For example, the activation states for rocker switch 12604-1 are the different rates at which the brightness level changes. For example, when rocker switch 12604-1 is in a "neutral activation state," while the contact has an intensity below a light press intensity threshold (e.g., an intensity below IT$_L$), the brightness level is not changing, as shown in FIG. 14A; when rocker switch 12604-1 is in a "light press activation state," while the contact has the light press intensity (e.g., an intensity between IT$_L$ and IT$_D$), the brightness level is changing at a slow rate, as shown in FIG. 14B; when rocker switch 12604-1 is in a "first deep press activation state," while the contact has the first deep press intensity (e.g., an intensity above IT$_D$), the brightness level is changing at a medium rate, as shown in FIG. 14C; and when rocker switch 12604-1 is in a "second deep press activation state," while the contact has the second deep press intensity (e.g., an intensity above IT$_D$ that is above the first deep press intensity), the brightness level is changing at a fast rate, as shown in FIG. 14D. Alternatively, the activation states of a rocker switch correspond to values of a parameter (e.g., a first activation state corresponds to 0, a second activation state corresponds to 1, a third activation state corresponds to 2, and so on).

When the intensity of contact 12610 changes, rocker switch 12604-1 optionally changes from the activation state at the starting intensity (e.g., a neutral activation state, as shown in FIG. 14A) to the activation state at the destination intensity (e.g., a second deep press activation state, as shown in FIG. 14D). For example, when the intensity of contact 12610 changes from an intensity below the light press intensity threshold (e.g., "IT$_L$") to the second deep press intensity (e.g., an intensity above $IT_D$ that is above the first deep press intensity), the activation state of rocker switch 12604-1 changes from a rate of 0 brightness levels per time step to a rate of 10 brightness levels per time step. As another example, when the intensity of contact 12610 changes from the second deep press intensity to the first deep press intensity (e.g., as illustrated in FIGS. 14D-14E), the activation state of rocker switch 12604-1 changes from a rate of 10 brightness levels per time step to 5 brightness levels per time step. Thus, the changes in the rate of change for the brightness level, described above with reference to FIGS. 14A-14G, are changes in the activation state of rocker switch 12604-1.

In some embodiments, from the activation state at the starting intensity, rocker switch 12604-1 optionally changes to zero or more intermediate activation states on the way to changing to the activation state at the destination intensity. For example, when the intensity of contact 12610 increases from below the light press intensity threshold (e.g., "$IT_L$") to the second deep press intensity, from the activation state at the intensity below the light press intensity threshold (e.g., "$IT_L$"), rocker switch 12604-1 changes to the activation state at the light press intensity (e.g., corresponding to the light press activation state) and then to the activation state at the first deep press intensity (e.g., corresponding to the first deep press activation state), on the way to changing to the activation state at the second deep press intensity (e.g., the second deep press activation state). The activation states at the first and second intensities (e.g., the light press activation state and the first deep press activation state) are the intermediate activation states between the activation state at the intensity below the light press intensity threshold (e.g., "$IT_L$") and the activation state at the second deep press intensity.

In some embodiments, the number of intermediate activation states between a starting activation state and a destination activation state for an increase in intensity is different than the number of intermediate activation states between a starting activation state and a destination activation state for a decrease in intensity. For example, referring back to FIGS. 14A-14G described above, on the decrease in intensity of contact 12610 shown in FIGS. 14D-14G, on the way to changing from the rate of change at the second deep press intensity to the rate at the neutral activation state, rocker switch 12604-1 optionally skips either or both of the rates at the light press intensity (e.g., corresponding to the light press activation state) and at the first deep press intensity (e.g., corresponding to the first deep press activation state), while those rates are not skipped on the increase in intensity shown in FIGS. 14A-14D. In some other embodiments, the intermediate activation states are not skipped, but the transitions to these states is, in some circumstances, not be noticeable to the user because of the speed of the increase or decrease in intensity leads to transitions between activation states in such quick succession that the user will, in some circumstances, perceive the entire activation state sequence as merely a transition from the starting activation state to the destination activation state. In some embodiments, the device is pre-configured to skip intermediate activations states on the increase or decrease in intensity. In some other embodiments, intermediate activation states are skipped if the intensity increases or decreases at a rate that exceeds a threshold (e.g., a rate corresponding to transitioning between the intensity below $IT_L$ and the intensity above $IT_D$ in less than 0.5, 0.25, 0.1, 0.05 seconds or some other reasonable amount of time). In the latter case, the user has some control over whether intermediate activations states are skipped, as the user controls how fast the intensity increases or decreases.

In response to the increase in the intensity of contact 12610, one or more distinct tactile outputs are, optionally, generated on touch-sensitive surface 451. For example, as the intensity increases from below the light press intensity threshold (e.g., "$IT_L$") to the second deep press intensity, as described above with reference to FIGS. 14A-14D, one or more distinct tactile outputs are, optionally, generated on touch-sensitive surface 451. For convenience, the number of tactile outputs generated in response to the detection of the increase in intensity is referred to below as the variable "M."

In response to the decrease in the intensity of contact 12610, one or more distinct tactile outputs are, optionally, generated on touch-sensitive surface 451. For example, as the intensity decreases from the second deep press intensity to an intensity below the light press intensity threshold (e.g., "$IT_L$"), as described above with reference to FIGS. 14D-14G, one or more distinct tactile outputs are, optionally, generated on touch-sensitive surface 451. For convenience, the number of distinct tactile outputs generated in response to the detection of the decrease in intensity is referred to below as the variable "N." In some circumstances, M and N are the same and in some circumstances, M and N are different—for example, the number of tactile outputs generated in response to the detection of the decrease in intensity is, in some circumstances, the same as or different than the number of tactile outputs generated in response to the detection of the increase in intensity.

For example, the M tactile outputs are, optionally, tactile outputs generated at increments of the brightness level or increments of the change in brightness level as the brightness level changes in response to the detection of the increase in the intensity of contact 12610. For example, a tactile output is, optionally, generated at each of the 10's in the brightness level or at each 10th level from the starting level. Similarly, the N tactile outputs are, optionally, tactile outputs generated at increments of the brightness level or increments of the change in brightness level as the brightness level changes in response to the detection of the decrease in intensity of contact 12610. In this example, the tactile outputs are not necessarily generated in response to transitions in activation state.

In some embodiments, the M or N tactile outputs are generated for changes or transitions in activation state; the tactile outputs mark the changes or transitions in activation state. For example, a tactile output is, optionally, generated at each change in the rate of change in the brightness level as the intensity of contact 12610 increases (e.g., each of the M tactile outputs correspond to respective changes in activation state), and a tactile output is, optionally, generated at each change in the rate of change in the brightness level as the intensity of contact 12610 decreases (e.g., each of the N tactile outputs correspond to respective changes in activation state). In some embodiments, when a change or transition in activation state is skipped or not noticeable to the user (e.g., because the rate of increase or decrease in the intensity of contact 12610 occurs faster than a rate of change threshold), generation of one or more corresponding tactile sensations is, optionally forgone (e.g., the one or more corresponding tactile sensations associated with corresponding changes in activation state are not generated by the device even though the changes in activation state occur).

In some embodiments, a tactile output varies depending on whether the tactile output was generated in response to an increase or a decrease in the intensity of contact 12610. A tactile output generated in response to detection of an increase in the intensity of contact 12610 is, optionally, different from a tactile output generated in response to detection of a decrease in the intensity of contact 12610. The tactile outputs are, optionally, different in movement profile, amplitude, or both. In some embodiments, a tactile output generated in response to detection of an increase in the intensity of contact 12610 corresponds to a tactile sensation that simulates a down-click (e.g., press-and-hold) of a physical button (e.g., a mouse button), and a tactile output generated in response to detection of a decrease in the intensity of contact 12610 corresponds to a tactile sensation that simulates an up-click (e.g., release from a press-and-hold) of the physical button.

Figure 14H:
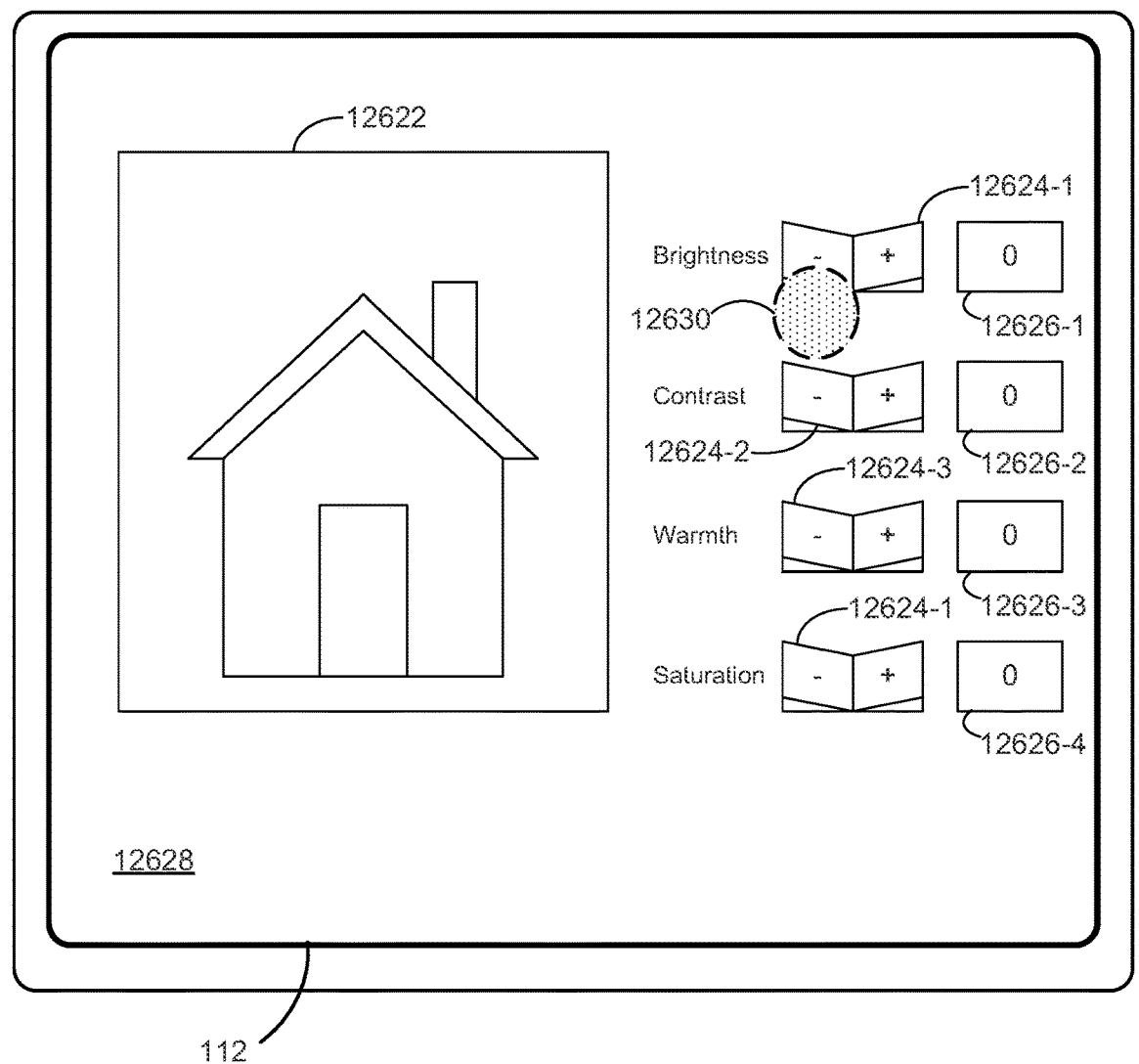
Figure 14H:
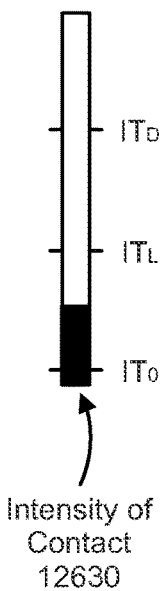
Figure 14I:
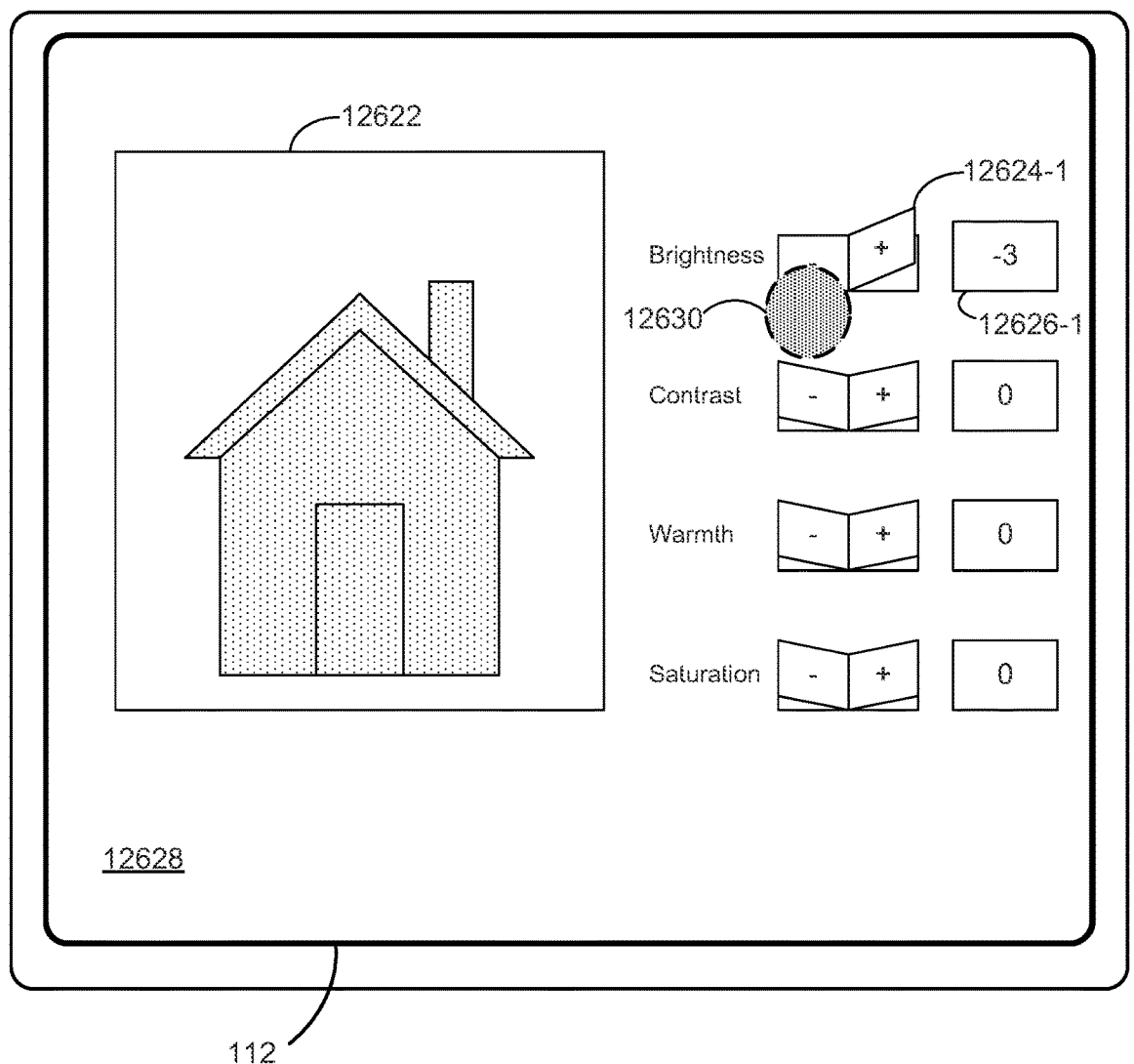
Figure 14I:
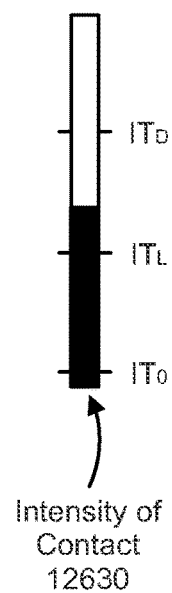
Figure 14J:
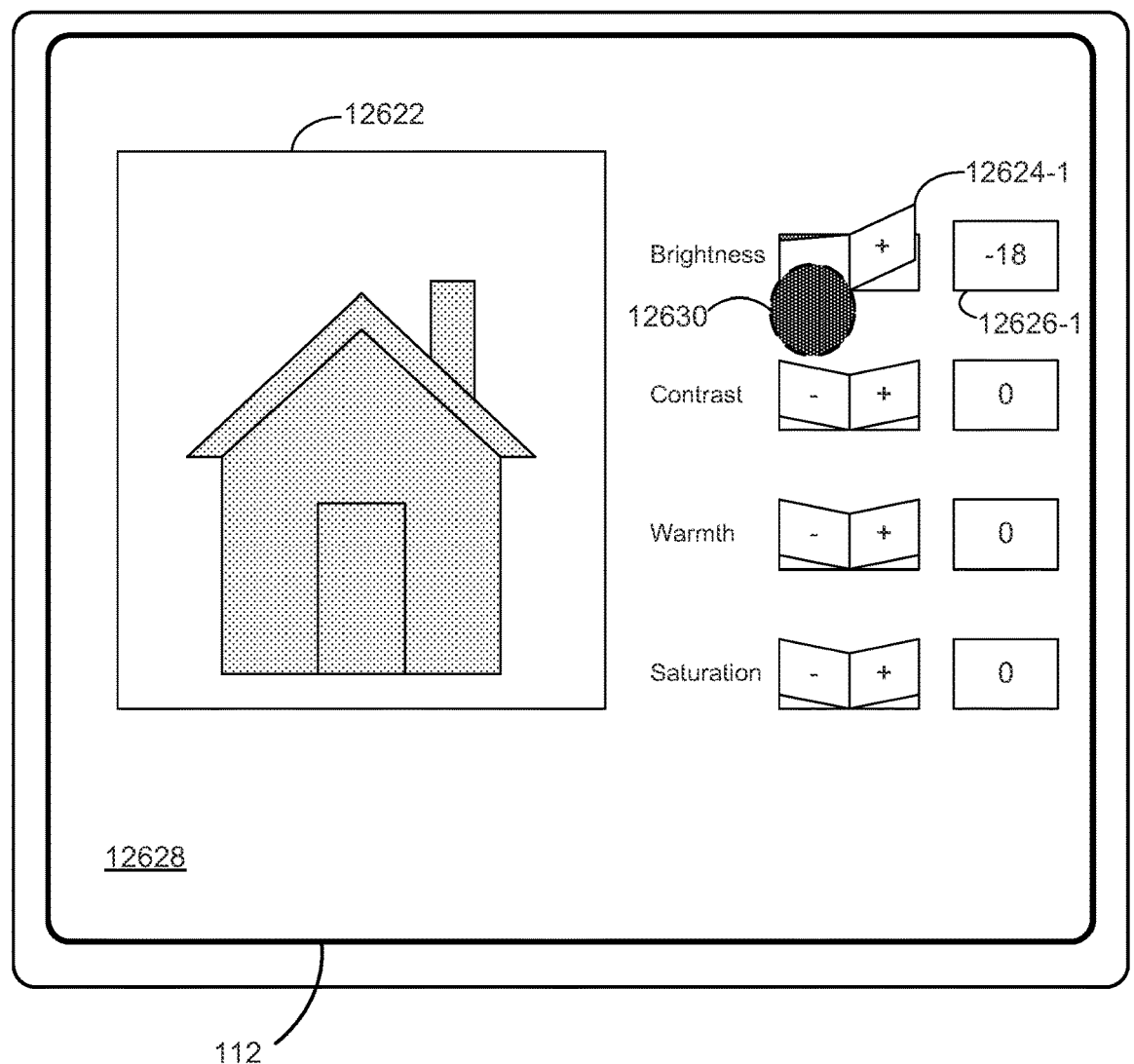
Figure 14J:
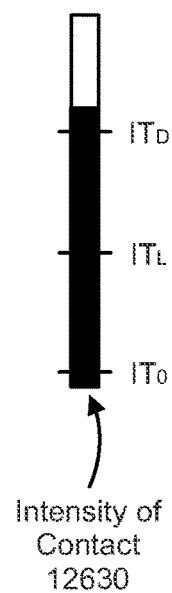
Figure 14K:
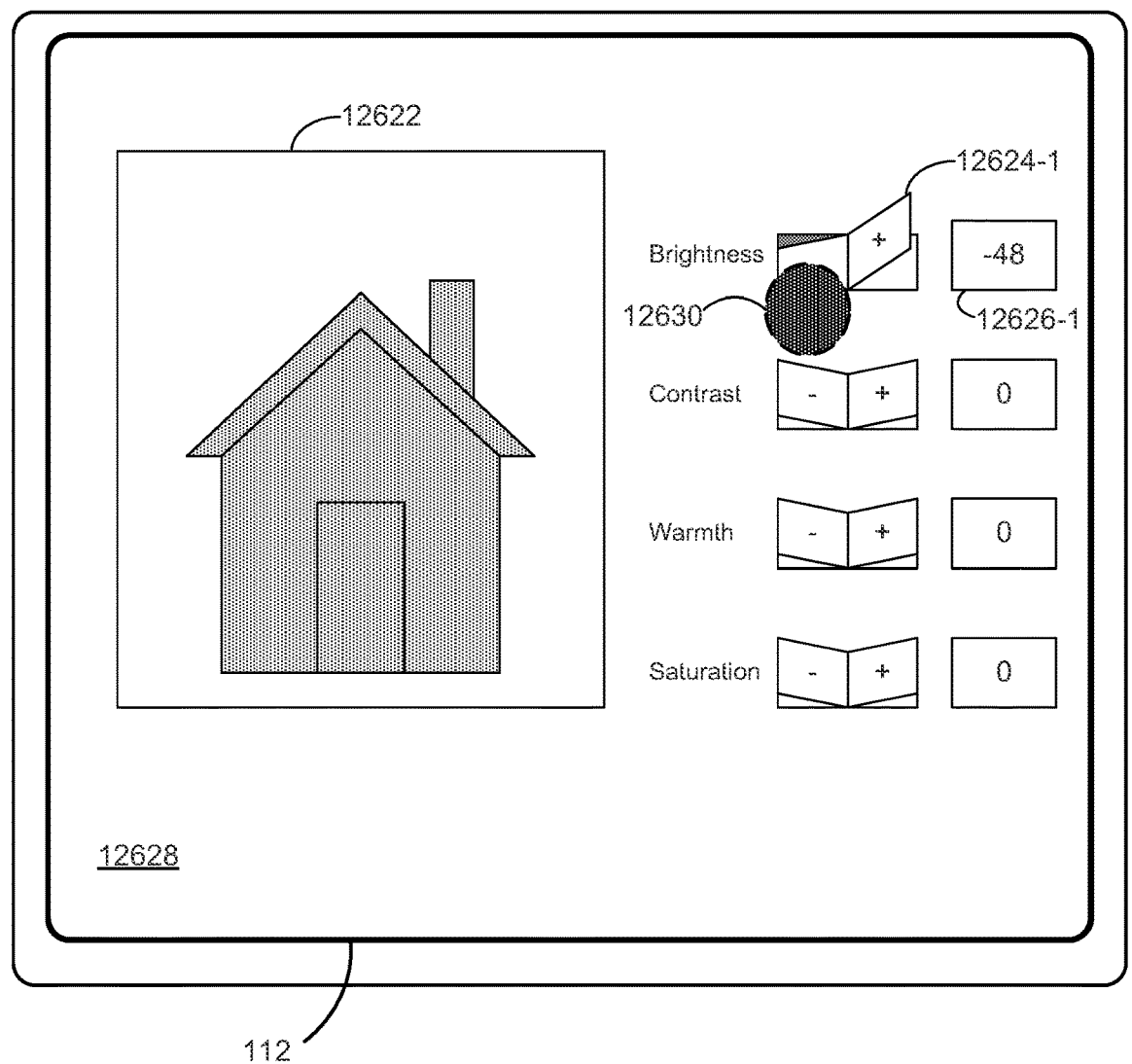
Figure 14K:
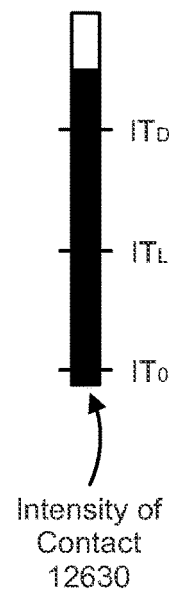
Figure 14L:
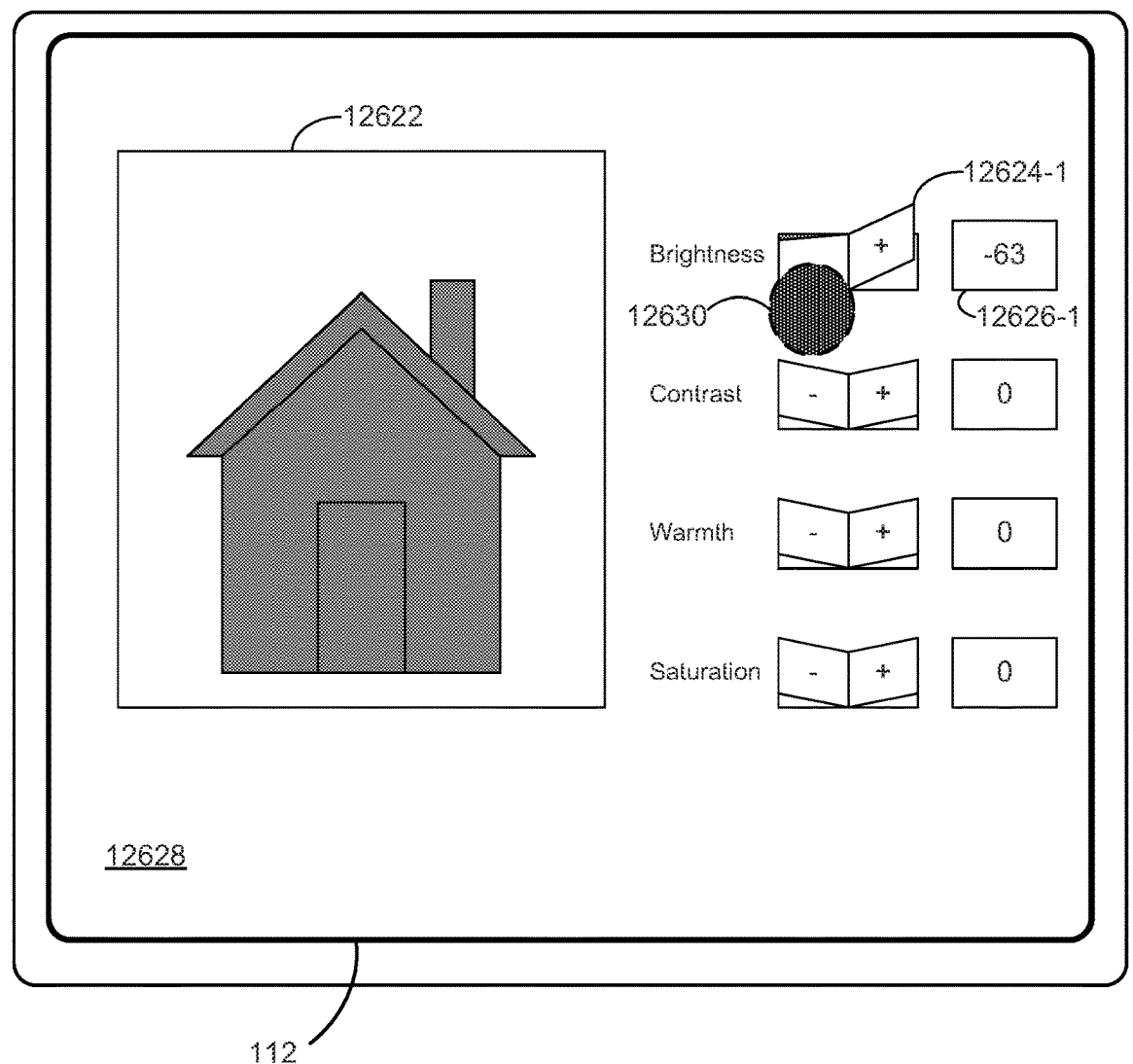
Figure 14L:
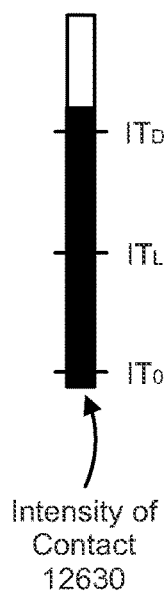
Figure 14M:
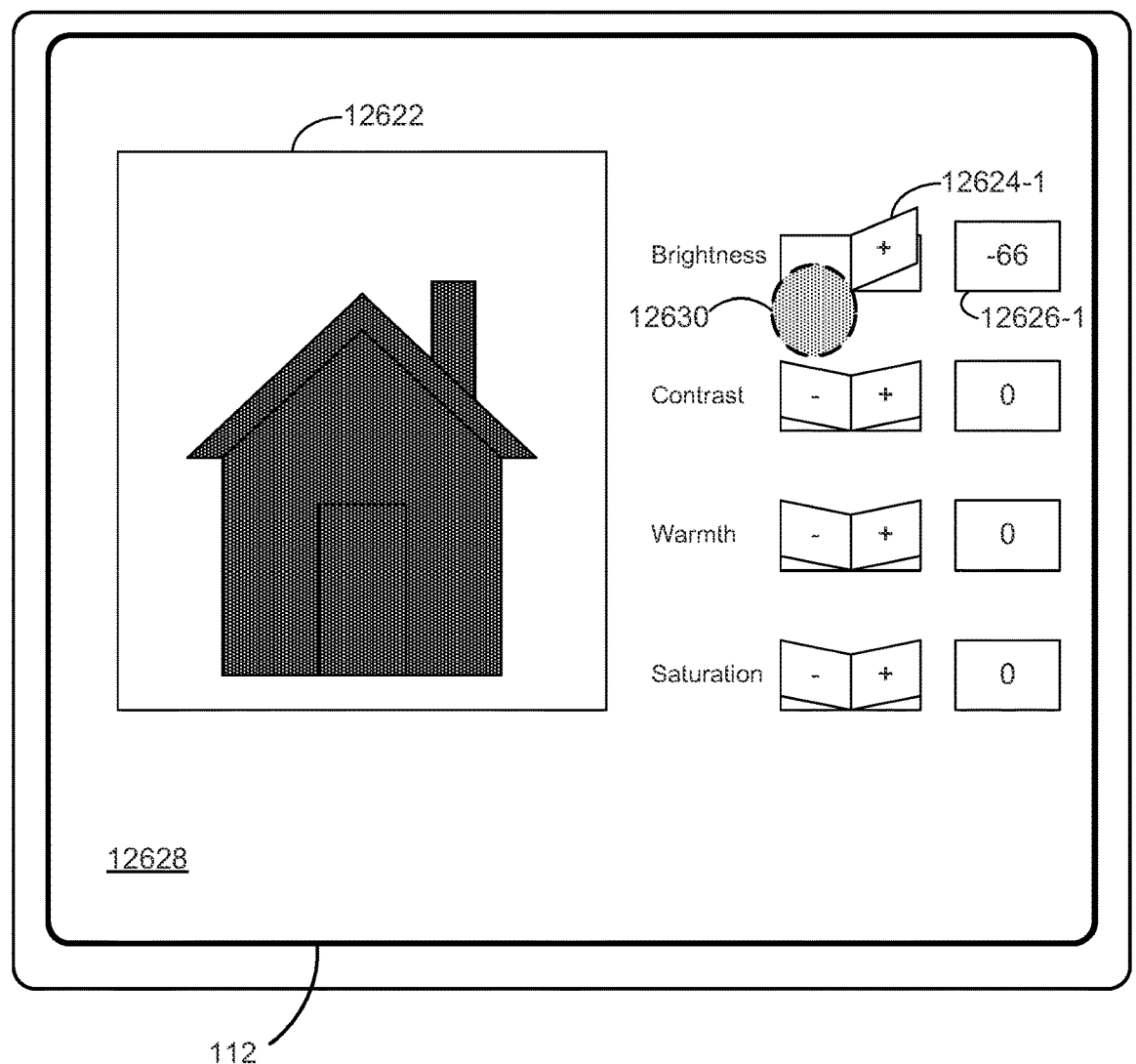
Figure 14M:
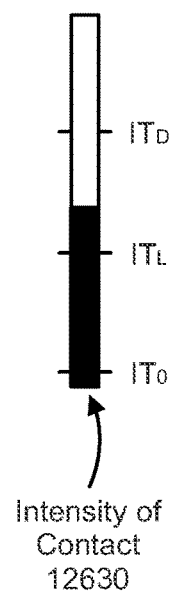
Figure 14N:
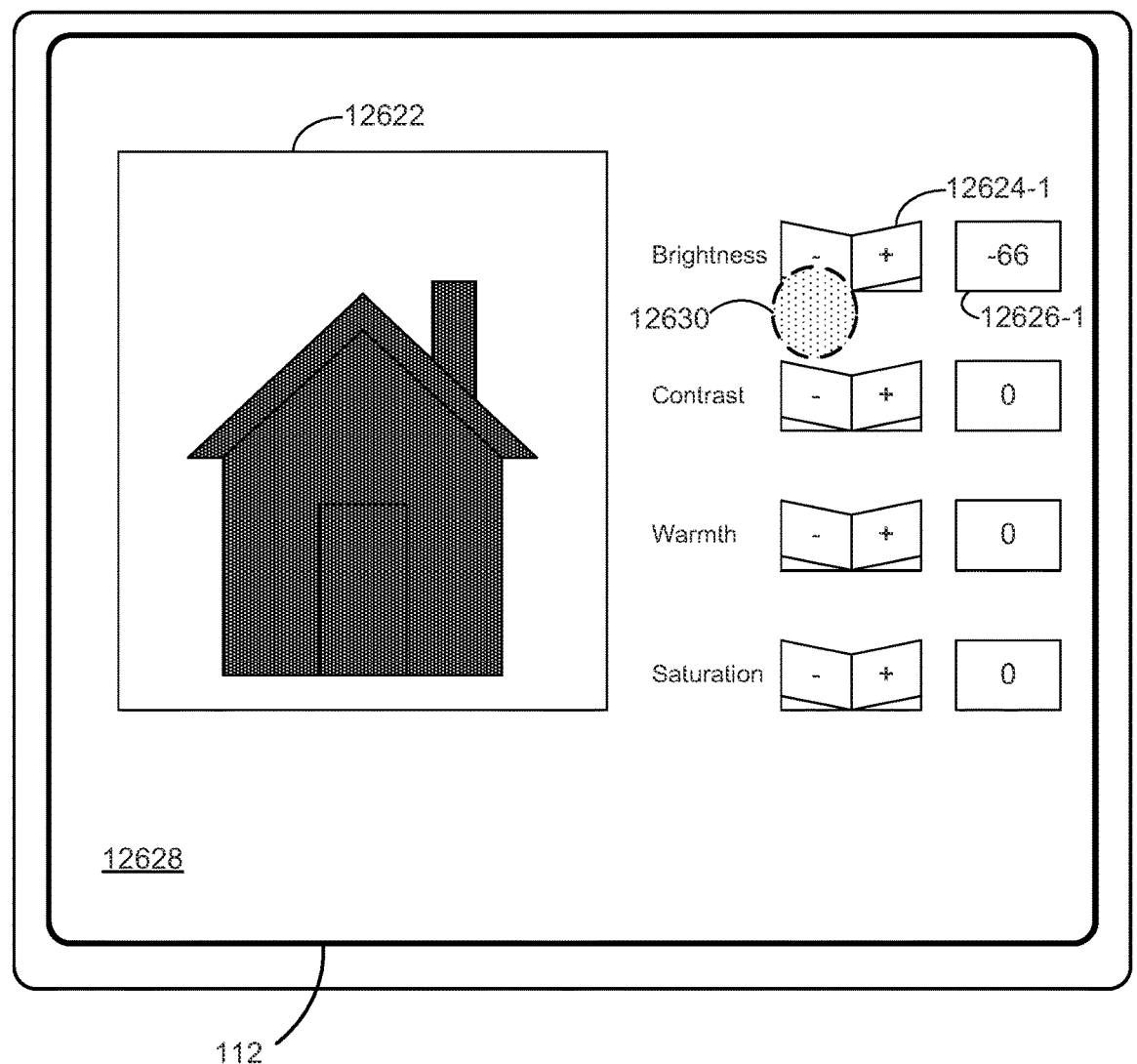
Figure 14N:
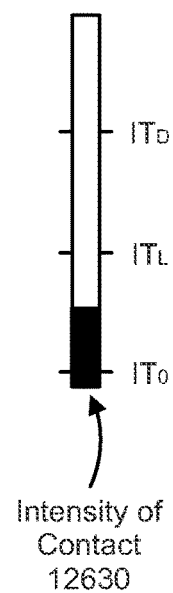
Figure 15A:
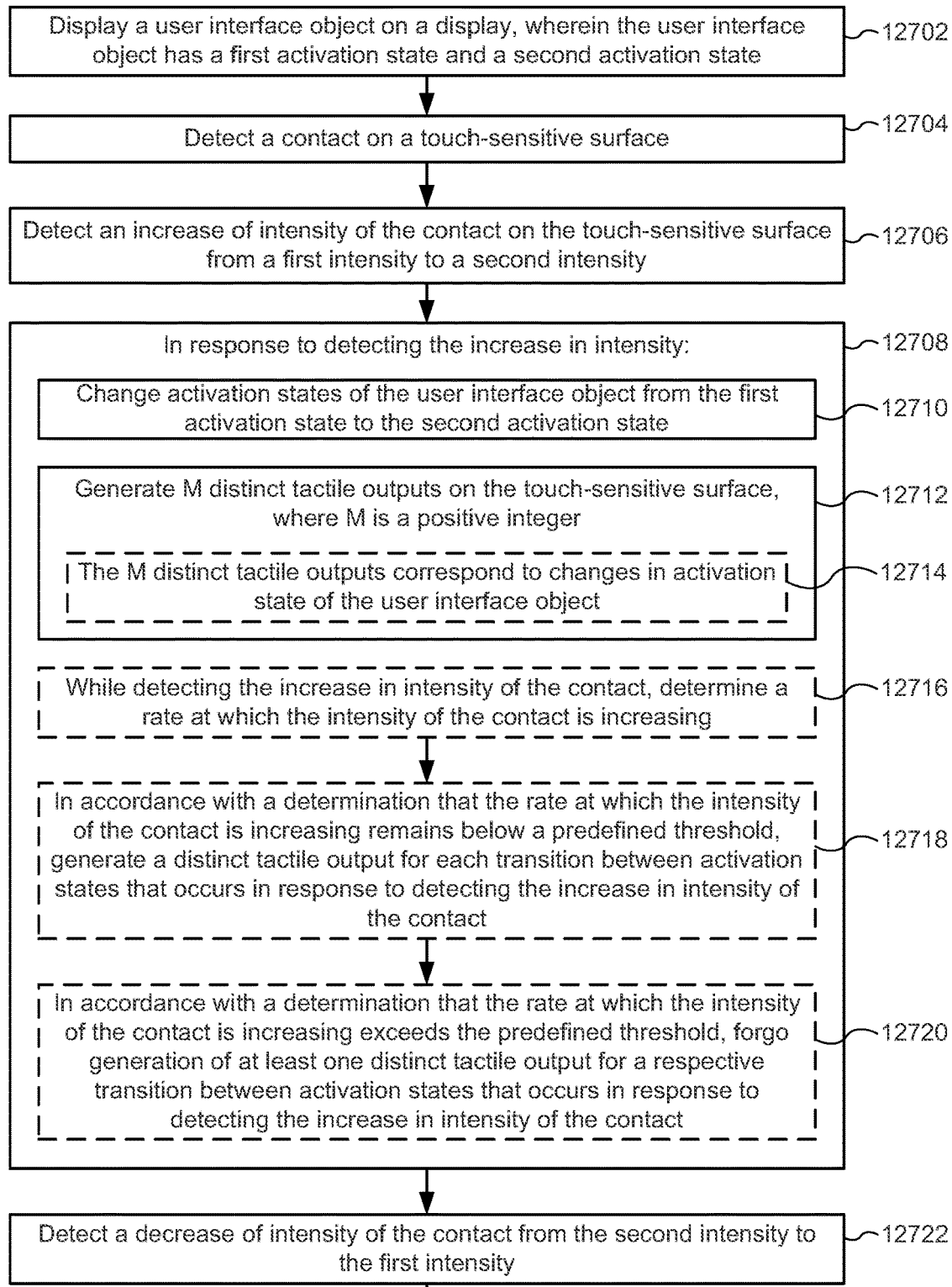
FIGS. 15A-15C are flow diagrams illustrating a method of providing feedback for changing activation states of a user interface object in accordance with some embodiments.
Figure 15B:
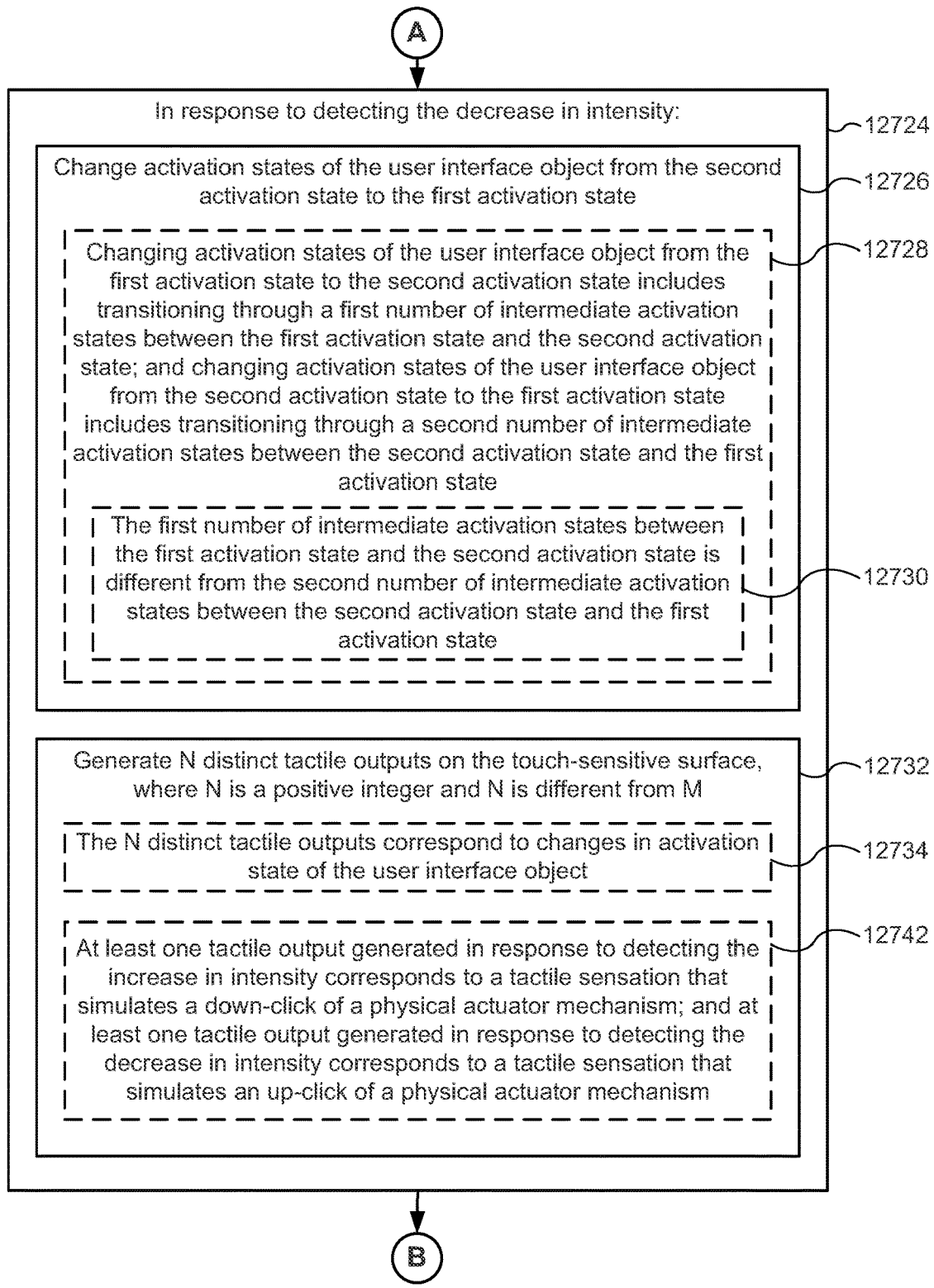
Figure 15C:
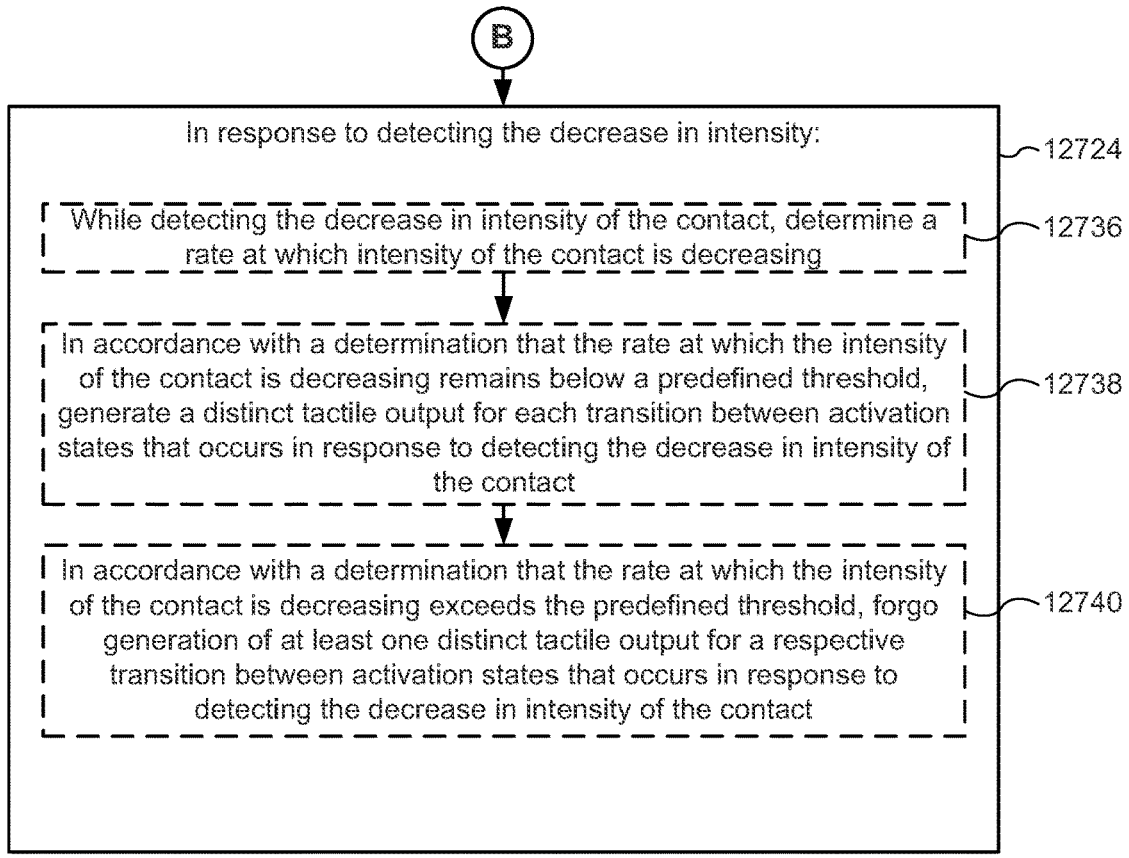

FIG. 14H-14N illustrate an example of the user interfaces described above, with reference to FIGS. 14A-14G, implemented on a device (e.g., device 100) with a touch-sensitive display 112. FIG. 14H illustrates image editor user interface 12628 displayed on touch-sensitive display 112 of a device. Image 12622 is displayed in image editor user interface 12628 for editing in accordance with user commands. One or more user interface objects (for example, buttons, sliders, rocker switches) optionally include control user interface objects such as rocker switches 12604 and status user interface objects such as value indicators 12606 displayed in image editor user interface 12628. The user interface objects in FIG. 14H-14N are configured to enable a user to issue commands for editing image 12622. For example, one or more rocker switches 12624, for modifying respective parameters of image 12622, are displayed in image editor user interface 12628. Values representing respective parameters are, optionally, displayed in respective value indicators 12626. Rocker switch 12624-1 is, optionally, used to modify the brightness of image 12622, for example, and the brightness value (for example, represented by integers, with 0 as the middle value between the upper and lower bounds) is displayed in value indicator 12626-1.

A respective rocker switch 12624 optionally has a "minus" portion, for reducing the value of a parameter associated with the rocker switch indicated by the minus sign, and a "plus" portion for increasing the value of a parameter associated with the rocker switch, indicated by a plus sign. A rocker switch 12624 is, optionally, activated when a contact is positioned over either portion of the rocker switch and an intensity of a contact associated with the focus selector changes. In some embodiments, the corresponding value decreases or increases depending on the portion over which the contact is positioned. When the contact is positioned over the "minus" portion, the corresponding value decreases when the rocker switch is activated. When the contact is positioned over the "plus" portion, the corresponding value increases when the rocker switch is activated. In FIG. 14H, contact 12630 is positioned over the "minus" portion of rocker switch 12624-1.

When rocker switch 12624-1 is not activated, rocker switch 12624-1 is displayed in a neutral position, as shown FIG. 14H. When rocker switch 12624-1 is activated, rocker switch 12624-1 is displayed as if either the "minus" portion (if contact 12630 is positioned over the "minus" portion when rocker switch 12624-1 is activated, thus rocker switch 12624-1 is activated to decrease the value) or the "plus" portion (if contact 12630 is positioned over the "plus" portion when rocker switch 12624-1 is activated, thus rocker switch 12624-1 is activated to increase the value) is depressed. For example, FIG. 14I shows the "minus" portion of rocker switch 12624-1 being depressed. In some embodiments, when rocker switch 12624-1 is activated, an animation showing a transition of rocker switch 12624-1 from the neutral position to either depressed position is, optionally, displayed; and when rocker switch 12624-1 is deactivated, an animation showing a transition of rocker switch 12624-1 from either depressed position to the neutral position is, optionally, displayed.

FIG. 14H shows contact 12630 detected on touch-sensitive display 112 at an intensity that is above a contact detection threshold (e.g., "$IT_0$") and below a light press intensity threshold (e.g., "$IT_L$") for activating rocker switch 12624-1. While contact 12630 continues to be detected on touch-sensitive display 112 over the "minus" portion of rocker switch 12624-1, the intensity of contact 12630 is, in some circumstances, increased to a light press intensity that is above the light press intensity threshold (e.g., "$IT_L$") for activating rocker switch 12624-1, and the increase in intensity is detected, as shown in FIG. 14I. In response to the detection of the increase in intensity, rocker switch 12624-1 is activated and the brightness level in value indicator 12626-1 decreases. The brightness of image 12622 changes in accordance with the change in the brightness level. In some embodiments, the rate of change in the brightness level is a relatively slow rate (e.g., 1 brightness level per time step). In some embodiments, rocker switch 12624-1 is animated to show the "minus" portion being depressed. The brightness level continues to decrease as long as the intensity of contact 12630 does not decrease below the light press intensity threshold (e.g., "$IT_L$").

The intensity of contact 12630 is, in some circumstances, increased further. While contact 12630 continues to be detected on touch-sensitive display 112 over the "minus" portion of rocker switch 12624-1, the device detects an increase in intensity of contact 12630 from the light press intensity (e.g., an intensity between $IT_L$ and $IT_D$) to a second, higher intensity that is above a deep press intensity threshold (e.g., "$IT_D$"). In response to this increase in intensity, rocker switch 12624-1 changes to a further activation state, as shown in FIG. 14J where the portion of the rocker switch under the focus selector (e.g., contact 12630) is pushed "into" the display, and brightness level decreases at a "medium" rate that is faster (e.g., 5 brightness levels per time step) than the rate of change at the light press intensity, and the brightness of image 12622 changes in accordance with the change in the brightness level, as shown in FIG. 14J.

The intensity of contact 12630 is, in some circumstances, increased even further. While contact 12630 continues to be detected on touch-sensitive display 112 over the "minus" portion of rocker switch 12624-1, the intensity of contact 12630 is increased from the first deep press intensity (e.g., an intensity above $IT_D$) shown in FIG. 14J) to a second deep press intensity (e.g., an intensity above $IT_D$) shown in FIG. 14K) that is higher than the first deep press intensity. In response to this increase in intensity, rocker switch 12624-1 changes to a further activation state, as shown in FIG. 14K where the portion of the rocker switch under contact 12630 is pushed even further "into" the display than shown in FIG. 14J, and brightness level decreases at a "fast" rate that is faster (e.g., 10 brightness levels per time step) than the rate of change at the first deep press intensity, and the brightness of image 12622 changes in accordance with the change in the brightness level, as shown in FIG. 14K.

From the second deep press intensity, the intensity of contact 12630 is, in some circumstances, increased even further. Depending on the implementation, the rate at which the brightness level changes optionally do or do not change further in response to the detection of the increase in intensity, as the rate of change at the second deep press intensity is, optionally, a predefined lower-bound (or upper-bound, for a rate of change where the value increases) rate of change.

The intensity of contact 12630 is, optionally, decreased from the second deep press intensity to the first deep press intensity (e.g., an intensity above $IT_D$) but below the second deep press intensity). While contact 12630 continues to be detected on touch-sensitive display 112 over the "minus" portion of rocker switch 12624-1, the device detects a decrease in intensity of contact 12630 from the second deep press intensity to the first deep press intensity, as shown in FIG. 14L. In response to this decrease in intensity, rocker switch 12624-1 continues to be activated, and brightness level decreases at the rate that corresponds to the first deep press intensity (e.g., 5 brightness levels per time unit), and the brightness of image 12622 changes in accordance with the change in the brightness level, as shown in FIG. 14L.

The intensity of contact 12630 is, optionally, further decreased from the first deep press intensity to the light press intensity (e.g., an intensity between $IT_L$ and $IT_D$). While contact 12630 continues to be detected on touch-sensitive display 112 over the "minus" portion of rocker switch 12624-1, the device detects a decrease in the intensity of contact 12630 from the first deep press intensity to the light press intensity, as shown in FIG. 14M. In response to this decrease in intensity, rocker switch 12624-1 continues to be activated, and brightness level decreases at the rate corresponding to at the light press intensity (e.g., 1 brightness level per time unit), and the brightness of image 12622 changes in accordance with the change in the brightness level, as shown in FIG. 14M.

The intensity of contact 12630 is, optionally, further decreased from the light press intensity (e.g., an intensity between $IT_L$ and $IT_D$) to an intensity below the light press intensity threshold (e.g., "$IT_L$"). While contact 12630 continues to be detected on touch-sensitive display 112 over the "minus" portion of rocker switch 12624-1, the device detects a decrease in intensity of contact 12630 from the light press intensity to an intensity below the light press intensity threshold (e.g., "$IT_L$"), as shown in FIG. 14N. In response to detecting this decrease in intensity, rocker switch 12624-1 is deactivated, and the brightness level stops decreasing, as shown in FIG. 14N. The brightness of image 12622 stops changing in accordance with the brightness level ceasing to decrease.

A user interface object, such as rocker switch 12624-1, optionally has multiple activation states. For example, the activation states for rocker switch 12624-1 are the different rates at which the brightness level changes. For example, when rocker switch 12624-1 is in a "neutral activation state," while the contact has an intensity below a light press intensity threshold (e.g., an intensity below $IT_L$), the brightness level is not changing, as shown in FIG. 14H; when rocker switch 12624-1 is in a "light press activation state," while the contact has the light press intensity (e.g., an intensity between $IT_L$ and $IT_D$), the brightness level is changing at a slow rate, as shown in FIG. 14I; when rocker switch 12624-1 is in a "first deep press activation state," while the contact has the first deep press intensity (e.g., an intensity above $IT_D$), the brightness level is changing at a medium rate, as shown in FIG. 14J; and when rocker switch 12624-1 is in a "second deep press activation state," while the contact has the second deep press intensity (e.g., an intensity above $IT_D$ that is above the first deep press intensity), the brightness level is changing at a fast rate, as shown in FIG. 14K. Alternatively, the activation states of a rocker switch correspond to values of a parameter (e.g., a first activation state corresponds to 0, a second activation state corresponds to 1, a third activation state corresponds to 2, and so on).

When the intensity of contact 12630 changes, rocker switch 12624-1 optionally changes from the activation state at the starting intensity (e.g., a neutral activation state, as shown in FIG. 14H) to the activation state at the destination intensity (e.g., a second deep press activation state, as shown in FIG. 14K). For example, when the intensity of contact 12630 changes from an intensity below the light press intensity threshold (e.g., "$IT_L$") to the second deep press intensity (e.g., an intensity above $IT_D$ that is above the first deep press intensity), the activation state of rocker switch 12624-1 changes from a rate of 0 brightness levels per time step to a rate of 10 brightness levels per time step. As another example, when the intensity of contact 12630 changes from the second deep press intensity to the first deep press intensity (e.g., as illustrated in FIGS. 14K-14L), the activation state of rocker switch 12624-1 changes from a rate of 10 brightness levels per time step to a rate of 5 brightness levels per time step. Thus, the changes in the rate of change for the brightness level, described above with reference to FIGS. 14H-14N, are changes in the activation state of rocker switch 12624-1.

In some embodiments, from the activation state at the starting intensity, rocker switch 12624-1 optionally changes to zero or more intermediate activation states on the way to changing to the activation state at the destination intensity. For example, when the intensity of contact 12630 increases from below the light press intensity threshold (e.g., "$IT_L$") to the second deep press intensity, from the activation state at the intensity below the light press intensity threshold (e.g., "$IT_L$"), rocker switch 12624-1 changes to the activation state at the light press intensity (e.g., corresponding to the light press activation state) and then to the activation state at the first deep press intensity (e.g., corresponding to the first deep press activation state), on the way to changing to the activation state at the second deep press intensity (e.g., the second deep press activation state). The activation states at the first and second intensities (e.g., the light press activation state and the first deep press activation state) are the intermediate activation states between the activation state at the intensity below the light press intensity threshold (e.g., "$IT_L$") and the activation state at the second deep press intensity.

In some embodiments, the number of intermediate activation states between a starting activation state and a destination activation state for an increase in intensity is different than the number of intermediate activation states between a starting activation state and a destination activation state for a decrease in intensity. For example, referring back to FIGS. 14H-14N described above, on the decrease in intensity of contact 12630 shown in FIGS. 14K-14N, on the way to changing from the rate of change at the second deep press intensity to the rate at the neutral activation state, rocker switch 12624-1 optionally skips either or both of the rates at the light press intensity (e.g., corresponding to the light press activation state) and at the first deep press intensity (e.g., corresponding to the first deep press activation state), while those rates are not skipped on the increase in intensity shown in FIGS. 14H-14K. In some other embodiments, the intermediate activation states are not skipped, but the transitions to these states are, in some circumstances, not be noticeable to the user because of the speed of the increase or decrease in intensity leads to transitions between activation states in such quick succession that the user perceives, in some circumstances, the entire activation state sequence as merely a transition from the starting activation state to the destination activation state. In some embodiments, the device is pre-configured to skip intermediate activations states on the increase or decrease in intensity. In some other embodiments, intermediate activation states are skipped if the intensity increases or decreases at a rate that exceeds a threshold (e.g., the intensity changes from below the light press intensity threshold to the second deep press intensity in less than a predefined amount of time such as 0.05 seconds). In the latter case, the user has some control over whether intermediate activations states are skipped, as the user controls how fast the intensity increases or decreases.

In response to the increase in the intensity of contact 12630, one or more distinct tactile outputs are, optionally, generated on touch-sensitive display 112. For example, as the intensity increases from below the light press intensity threshold (e.g., "$IT_L$") to the second deep press intensity, as described above with reference to FIGS. 14H-14K, one or more distinct tactile outputs are, optionally, generated on touch-sensitive display 112. For convenience, the number of tactile outputs generated in response to the detection of the increase in intensity is referred to below as the variable "M."

In response to the decrease in the intensity of contact 12630, one or more distinct tactile outputs are, optionally, generated on touch-sensitive display 112. For example, as the intensity decreases from the second deep press intensity to an intensity below the light press intensity threshold (e.g., "$IT_L$"), as described above with reference to FIGS. 14K-14N, one or more distinct tactile outputs are, optionally, generated on touch-sensitive display 112. For convenience, the number of distinct tactile outputs generated in response to the detection of the decrease in intensity is referred to below as the variable "N." In some circumstances, M and N are the same and in some circumstances, M and N are different—for example, the number of tactile outputs generated in response to the detection of the decrease in intensity is, optionally, the same as or different than the number of tactile outputs generated in response to the detection of the increase in intensity.

For example, the M tactile outputs are, optionally, tactile outputs generated at increments of the brightness level or increments of the change in brightness level as the brightness level changes in response to the detection of the increase in the intensity of contact 12630. For example, a tactile output is, optionally, generated at each of the 10's in the brightness level or at each 10th level from the starting level. Similarly, the N tactile outputs are, optionally, tactile outputs generated at increments of the brightness level or increments of the change in brightness level as the brightness level changes in response to the detection of the decrease in intensity of contact 12630. In this example, the tactile outputs are not necessarily generated in response to transitions in activation state.

In some embodiments, the M or N tactile outputs are generated for changes or transitions in activation state; the tactile outputs mark the changes or transitions in activation state. For example, a tactile output is, optionally, generated at each change in the rate of change in the brightness level as the intensity of contact 12630 increases (e.g., each of the M tactile outputs correspond to respective changes in activation state), and a tactile output is, optionally, generated at each change in the rate of change in the brightness level as the intensity of contact 12630 decreases (e.g., each of the N tactile outputs correspond to respective changes in activation state). In some embodiments, when a change or transition in activation state is skipped or not noticeable to the user (e.g., because the rate of increase or decrease in the intensity of contact 12630 occurs faster than a rate of change threshold), generation of one or more corresponding tactile sensations is, optionally, forgone (e.g., the one or more corresponding tactile sensations associated with corresponding changes in activation state are not generated by the device even though the changes in activation state occur).

In some embodiments, a tactile output varies depending on whether the tactile output was generated in response to an increase or a decrease in the intensity of contact 12630. A tactile output generated in response to detection of an increase in the intensity of contact 12630 is, optionally, different from a tactile output generated in response to detection of a decrease in the intensity of contact 12630. The tactile outputs are, optionally, different in movement profile, amplitude, or both. In some embodiments, a tactile output generated in response to detection of an increase in the intensity of contact 12630 corresponds to a tactile sensation that simulates a down-click (e.g., press-and-hold) of a physical button (e.g., a mouse button), and a tactile output generated in response to detection of a decrease in the intensity of contact 12630 corresponds to a tactile sensation that simulates an up-click (e.g., release from a press-and-hold) of the physical button.

FIGS. 15A-15C are flow diagrams illustrating a method 12700 of providing feedback for changing activation states of a user interface object in accordance with some embodiments. The method 12700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 12700 are, optionally, combined and/or the order of some operations is, optionally, changed.

As described below, the method 12700 provides an intuitive way to provide feedback for change activation states of a user interface object. The method reduces the cognitive burden on a user when changing activation states of a user interface object, thereby creating a more efficient human-machine interface. For battery-operated electronic devices, enabling a user to change activation states of a user interface object faster and more efficiently conserves power and increases the time between battery charges.

The device displays (12702) a user interface object on the display, where the user interface object has a first activation state and a second activation state. FIG. 14A, for example, shows rocker switches 12604, for adjusting parameters of an image, displayed in image editor user interface 12600. A respective rocker switch 12604 has at least two activation states (e.g., a neutral activation state, a light press activation state, a first deep press activation state and/or a second deep press activation state), which optionally include various rates of change in the parameter value. As another example, FIG. 14H shows rocker switches 12624 displayed in image editor user interface 12628. A respective rocker switch 12624 has at least two activation states, which optionally include various rates of change in the parameter value. A respective rocker switch 12624 has at least two activation states (e.g., a neutral activation state, a light press activation state, a first deep press activation state and/or a second deep press activation state).

The device detects (12704) a contact (e.g., a finger contact) on the touch-sensitive surface. As shown in FIG. 14A, for example, contact 12610 is detected on touch-sensitive surface 451. Also, as shown in FIG. 14H, contact 12630 is detected on touch-sensitive display 112.

The device detects (12706) an increase of intensity of the contact on the touch-sensitive surface from a first intensity to a second intensity. FIGS. 14A-14D show an increase in the intensity of contact 12610 from an intensity below a light press intensity threshold (e.g., "$IT_L$") for activating rocker switch 12604-1, to an intensity above a deep press intensity threshold (e.g., "$IT_D$") and higher than additional intensities (e.g., a light press intensity that is between $IT_L$ and $IT_D$) that are also above the threshold. FIGS. 14H-14K shows an increase in the intensity of contact 12630 from an intensity below a light press intensity threshold (e.g., "$IT_L$") for activating rocker switch 12624-1, to an intensity above a deep press intensity threshold (e.g., "$IT_D$") and higher than additional intensities that are also above the threshold (e.g., a light press intensity that is between $IT_L$ and $IT_D$).

In response to detecting the increase in intensity (12708), the device changes (12710) activation states of the user interface from the first activation state to the second activation state, and generates (12712) M distinct tactile outputs on the touch-sensitive surface, where M is a positive integer. For example, in FIG. 14A-14D or 14H-14K, in response to the detection of the increase in intensity from below the light press intensity threshold (e.g., "$IT_L$") to an intensity above a deep press intensity threshold (e.g., "$IT_D$"), the rate of change in brightness level changes from zero, to a "fast" rate (e.g., 10 brightness levels per time step). The activation state for rocker switch 12604-1 or 12624-1 changes from the activation state corresponding to the zero rate (e.g., the neutral activation state), through zero or more intermediate activation states (e.g., the light press activation state and/or the first deep press activation state), to the activation state corresponding to the "fast" rate (e.g., the second deep press activation state). In response to the detection of the increase in intensity, M tactile outputs are, optionally, generated. The M tactile outputs are, optionally, generated at predefined increments of the brightness level (e.g., whenever the ones digit in the brightness level is 0) or at predefined increments of the change in the brightness level (e.g., every 10th increment from the starting brightness level), as the brightness of the image (e.g., 12602 or 12622) changes in accordance with the rate of change of brightness level corresponding to the current activation state of rocker switch 12604-1 or 12624-1.

In some embodiments, the M distinct tactile outputs correspond to changes in activation state of the user interface object (12714). The M tactile sensations are, optionally, generated whenever the activation state of rocker switch 12604-1 or 12624-1 (e.g., the rate of change for the brightness level) changes.

In some embodiments, while detecting the increase in intensity of the contact, the device determines (12716) a rate at which the intensity of the contact is increasing. In accordance with a determination that the rate at which the intensity of the contact is increasing remains below a predefined threshold (e.g., a rate corresponding to transitioning between the first intensity and the second intensity in less than 0.5, 0.25, 0.1, 0.05 seconds or some other reasonable amount of time), the device generates (12718) a distinct tactile output for each transition between activation states that occurs in response to detecting the increase in intensity of the contact. In accordance with a determination that the rate at which the intensity of the contact is increasing exceeds the predefined threshold (e.g., a rate corresponding to transitioning between the first intensity and the second intensity in less than 0.5, 0.25, 0.1, 0.05 seconds or some other reasonable amount of time), the device forgoes (12720) generation of at least one distinct tactile output for a respective transition between activation states that occurs in response to detecting the increase in intensity of the contact. For example, as the intensity of contact 12610 increases from below the light press intensity threshold (e.g., "$IT_L$") to an intensity above a deep press intensity threshold (e.g., "$IT_D$"), as depicted in FIGS. 14A-14D, a speed of the intensity increase is, optionally, determined. As another example, as the intensity of contact 12630 increases from below the light press intensity threshold (e.g., "$IT_L$") to an intensity above a deep press intensity threshold (e.g., "$IT_D$"), as depicted in FIGS. 14H-14K, a speed of the intensity increase is, optionally, determined. If the speed of the intensity increase is below the predefined threshold, a tactile output is generated for each transition between activation states along the way. If the speed of the intensity increase is above the predefined threshold, generation of one or more of the tactile outputs is, optionally, forgone, for example the tactile outputs corresponding to transitions between intermediate activation states (e.g., a transitions between the light press activation state and the first deep press activation state).

The device detects (12722) a decrease of intensity of the contact from the second intensity to the first intensity. As shown in FIGS. 14D-14G, for example, a decrease in the intensity of contact 12610 from an intensity above a deep press intensity threshold (e.g., "$IT_D$") to an intensity below the light press intensity threshold (e.g., "$IT_L$") is detected. As shown in FIGS. 14K-14N, for example, a decrease in the intensity of contact 12630 from an intensity above a deep press intensity threshold (e.g., "$IT_D$") to an intensity below the light press intensity threshold (e.g., "$IT_L$") is detected.

In response to detecting the decrease in intensity (12724), the device changes (12726) activation states of the user interface object from the second activation state (e.g., the second deep press activation state) to the first activation state (e.g., the neutral activation state), and generates (12732) N distinct tactile outputs on the touch-sensitive surface, where N is a positive integer and N is different from M. For example, in FIG. 14D-14G or 14K-14N, in response to the detection of the decrease in intensity from an intensity above a deep press intensity threshold (e.g., "$IT_D$") to an intensity below the light press intensity threshold (e.g., "$IT_L$"), the rate of change in brightness level changes from the "fast" rate (e.g., 10 per time step) to zero. The activation state for rocker switch 12604-1 or 12624-1 changes from the activation state corresponding to the "fast" rate, through zero or more intermediate activation states (e.g., a first deep press activation state and/or a light press activation state), to the activation state corresponding to the zero rate. In response to the detection of the decrease in intensity, N tactile outputs are, optionally, generated. The N tactile outputs are, optionally, generated at predefined increments of the brightness level (e.g., whenever the ones digit in the brightness level is 0), at predefined increments of the change in the brightness level (e.g., every 10th increment from the starting level), or when the brightness start level starts changing and stops changing, as the brightness level changes in accordance with the rate of change corresponding to the current activation state of rocker switch 12604-1 or 12624-1. In some circumstances N is different from M (e.g., as the brightness level has optionally changed less on the decrease in intensity, or the tactile outputs are, optionally, predefined to be generated at different points than the increments in the level or in the change in level). For example, when the increase in intensity of the contact is below the predefined threshold and the decrease in intensity of the contact is above the predefined threshold (e.g., a rate corresponding to transitioning between the first intensity and the second intensity in less than 0.5, 0.25, 0.1, 0.05 seconds or some other reasonable amount of time), the device generates tactile outputs corresponding to each the transitions between the neutral activation state, the light press activation state, the first deep press activation state and the second deep press activation state when the intensity of the contact is increasing, but the device generates tactile outputs for only a subset of these transitions (e.g., only the transition between the second deep press activation state and the neutral activation state).

In some embodiments, changing activation states of the user interface object from the first activation state to the second activation state includes transitioning through a first number of intermediate activation states between the first activation state and the second activation state; and changing activation states of the user interface object from the second activation state to the first activation state includes transitioning through a second number of intermediate activation states between the second activation state and the first activation state (12728). For example, in FIG. 14A-14D or 14H-14K, the transition from the neutral activation state to the second deep press activation state includes intermediate transitions to the light press activation state and the first deep press activation state. In FIG. 14D-14G or 14K-14N, the transition from the second deep press activation state to the neutral activation state includes intermediate transitions to the first deep press activation state and the light press activation state.

In some embodiments, the first number of intermediate activation states between the first activation state and the second activation state is different from the second number of intermediate activation states between the second activation state and the first activation state (12730). For example, the increase in intensity of contact 12610 or 12630 is, in some circumstances, at a speed below the predefined threshold, and the decrease in intensity of contact 12610 or 12630 is, in some circumstances, above the predefined threshold, and as a result the intermediate activations states on the decrease in intensity are skipped (e.g., processing the transition between the first deep press activation state and the second deep press activation state shown in FIGS. 14C-14D and skipping the transition between the second deep press activation threshold to the first deep press activation shown in FIGS. 14D-14E).

In some embodiments, the N distinct tactile outputs correspond to changes in activation state of the user interface object (12734). The N tactile sensations are, optionally, generated whenever the activation state of rocker switch 12604-1 or 12624-1 (e.g., the rate of change for the brightness level) changes.

In some embodiments, while detecting the decrease in intensity of the contact, the device determines (12736) a rate at which intensity of the contact is decreasing. In accordance with a determination that the rate at which the intensity of the contact is decreasing remains below a predefined threshold (e.g., a rate corresponding to transitioning between the first intensity and the second intensity in less than 0.5, 0.25, 0.1, 0.05 seconds or some other reasonable amount of time), the device generates (12738) a distinct tactile output for each transition between activation states that occurs in response to detecting the decrease in intensity of the contact. In accordance with a determination that the rate at which the intensity of the contact is decreasing exceeds the predefined threshold, the device forgoes (12740) generation of at least one distinct tactile output for a respective transition between activation states that occurs in response to detecting the decrease in intensity of the contact. For example, as the intensity of contact 12610 or 12630 decreases from an intensity above a deep press intensity threshold (e.g., "$IT_D$") to an intensity below the light press intensity threshold (e.g., "$IT_L$"), as depicted in FIG. 14D-14G or 14K-14N, respectively, a speed of the intensity decrease is, optionally, determined. In some embodiments, if the speed of the intensity decrease is below the predefined threshold, a tactile output is generated for each transition between activation states along the way. If the speed of the intensity decrease is above the predefined threshold, generation of one or more of the tactile outputs is, optionally, forgone, for example the tactile outputs corresponding to transitions between intermediate activation states, such as the light press activation state and the first deep press activation state illustrated in FIGS. 14B-14C.

In some embodiments, at least one tactile output generated in response to detecting the increase in intensity of the contact (e.g., 12610 or 12630) corresponds to a tactile sensation that simulates a down-click of a physical actuator mechanism (e.g., a tactile sensation that simulates the physical "down-click sensation" generated by the mechanical button apparatus of a physical button when a user activates the physical button), and at least one tactile output generated in response to detecting the decrease in intensity of the contact (e.g., 12610 or 12630) corresponds to a tactile sensation that simulates an up-click of a physical actuator mechanism (e.g., a tactile sensation that simulates the physical "up-click sensation" generated by the mechanical button apparatus of a physical button when a user activates the physical button).

As used herein, a distinct tactile output is a tactile output that was generated to provide feedback corresponding to a user interface event (e.g., a change in the activation state of the user interface object, such as activation of a button or other control). In some embodiments, the touch-sensitive surface is moved by an actuator in accordance with a separate waveform for each user interface event. The waveforms for different user interface events optionally overlap, but a waveform that was generated to provide a tactile feedback for a particular user interface event (e.g., activation of a button or change in activation state of a control such as a rocker switch) will still generate a distinct tactile output. As used herein, an activation state of a user interface object corresponds to an operational state of an application on the electronic device, and changing activation states of the user interface object changes operational states of the application. If the user interface object is an adjustable control interface such as a multi-state button, rocker-switch or slider, the activation states of the button/switch/slider are typically displayed by changing the visual appearance of the adjustable control interface (e.g., as a change in shading of a button, a change in rotation of a rocker switch or a change in position of a slider). Additionally, when the activation state of the button/switch/slider is changed, operation of an application associated with the button/switch/slider is changed accordingly. For example, if a rocker switch controls the brightness of an image, the activation states of the rocker switch correspond to different brightness levels of the image, and when the rocker switch changes from a first activation state to a second activation state, the brightness of the image changes from a first brightness level corresponding to the first activation state of the rocker switch to a second brightness level corresponding to the second activation state of the rocker switch. In some embodiments, activation states correspond to image property levels (e.g., hue, saturation, exposure, brightness, contrast), content navigation states (e.g., channel selection, forward navigation, backward navigation, frame-by-frame navigation), system property adjustments (e.g., volume control, screen brightness, date/time settings), rates of change, and other adjustable properties.

While M and N have been discussed herein as positive integers, in some circumstances M is zero (e.g., tactile outputs are generated in response to detecting the increase in intensity of the contact) and/or N is zero (e.g., no tactile outputs are generated in response to detecting the decrease in intensity of the contact). Additionally, while M has been described as being different from N, in some circumstances M is equal to N (e.g., the number of tactile outputs that are generated in response to detecting the increase in intensity of the contact is the same as the number of tactile outputs that are generated in response to detecting the decrease in intensity of the contact).

It should be understood that the particular order in which the operations in FIGS. 15A-15C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 12700 described above with respect to FIGS. 15A-15C. For example, the contacts, user interface objects, tactile outputs, intensity thresholds, focus selectors, animations described above with reference to method 12700 optionally have one or more of the characteristics of the contacts, user interface objects, tactile outputs, intensity thresholds, focus selectors, animations described herein with reference to other methods described herein (e.g., those listed in the fifth paragraph of the Description of Embodiments). For brevity, these details are not repeated here.

Figure 16:
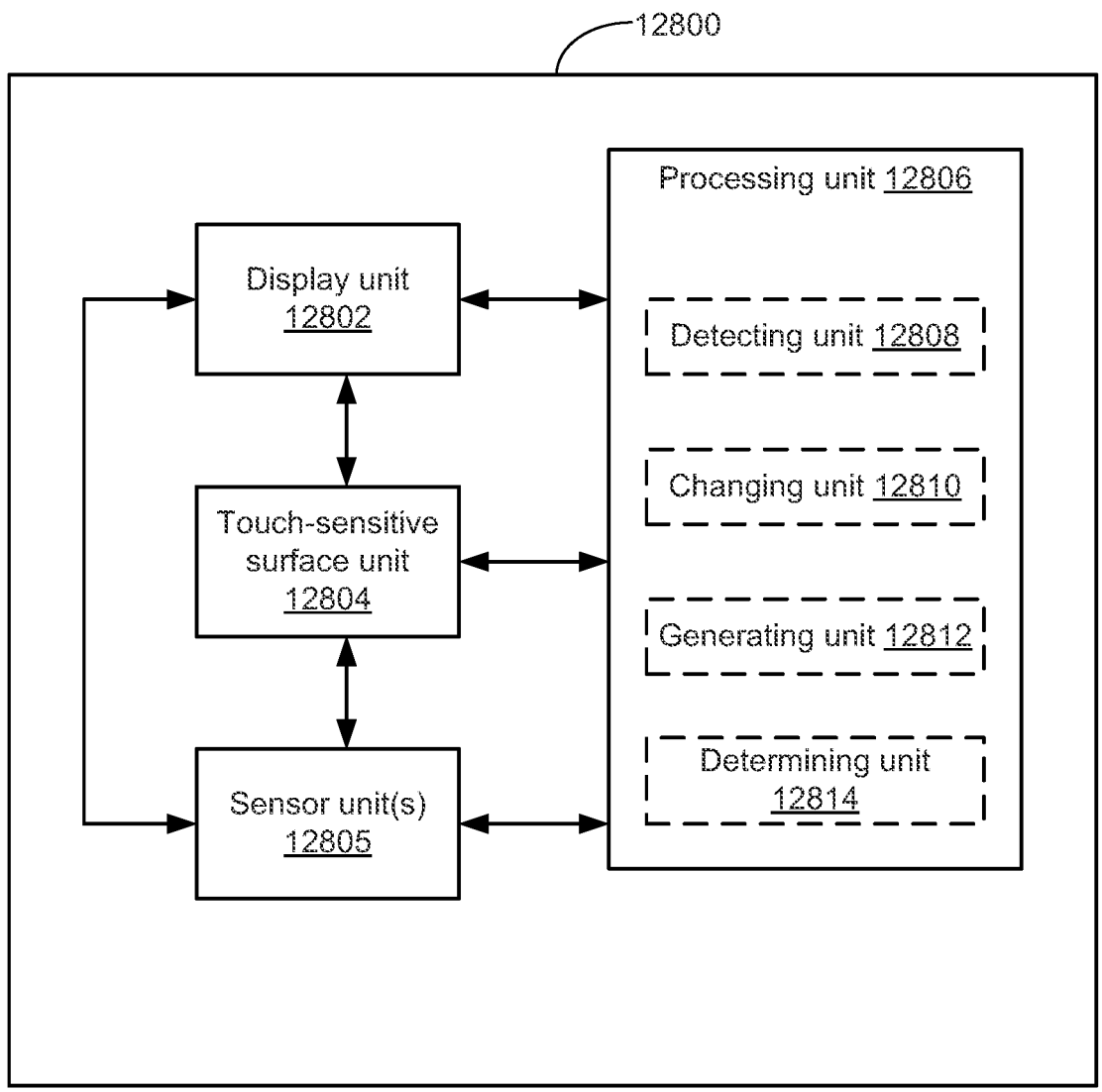
FIG. 16 is a functional block diagram of an electronic device in accordance with some embodiments.

In accordance with some embodiments, FIG. 16 shows a functional block diagram of an electronic device 12800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 12800 includes a display unit 12802 configured to display a user interface object, wherein the user interface object has a first activation state and a second activation state; a touch-sensitive surface unit 12804 configured to receive contacts; one or more sensor units 12805 configured to detect intensity of contacts with the touch-sensitive surface unit 12804; and a processing unit 12806 coupled to the display unit 12802, the touch-sensitive surface unit 12804 and the sensor units 12805. In some embodiments, the processing unit 12806 includes a detecting unit 12808, a changing unit 12810, a generating unit 12812, and a determining unit 12814.

The processing unit 12806 is configured to: detect a contact on the touch-sensitive surface unit 12804 (e.g., with the detecting unit 12808); detect an increase of intensity of the contact on the touch-sensitive surface unit 12804 from a first intensity to a second intensity (e.g., with the detecting unit 12808); in response to detecting the increase in intensity: change activation states of the user interface object from the first activation state to the second activation state (e.g., with the changing unit 12810); and generate M distinct tactile outputs on the touch-sensitive surface unit 12804, where M is a positive integer (e.g., with the generating unit 12812); detect a decrease of intensity of the contact from the second intensity to the first intensity (e.g., with the detecting unit 12808); and in response to detecting the decrease in intensity: change activation states of the user interface object from the second activation state to the first activation state (e.g., with the changing unit 12810); and generate N distinct tactile outputs on the touch-sensitive surface unit 12804 (e.g., with the generating unit 12812), where N is a positive integer and N is different from M.

In some embodiments, changing activation states of the user interface object from the first activation state to the second activation state includes transitioning through a first number of intermediate activation states between the first activation state and the second activation state; and changing activation states of the user interface object from the second activation state to the first activation state includes transitioning through a second number of intermediate activation states between the second activation state and the first activation state.

In some embodiments, the first number of intermediate activation states between the first activation state and the second activation state is different from the second number of intermediate activation states between the second activation state and the first activation state.

In some embodiments, the processing unit 12806 is configured to: while detecting the increase in intensity of the contact, determine a rate at which the intensity of the contact is increasing (e.g., with the determining unit 12814); in accordance with a determination that the rate at which the intensity of the contact is increasing remains below a predefined threshold, generate a distinct tactile output for each transition between activation states that occurs in response to detecting the increase in intensity of the contact (e.g., with the generating unit 12812); and in accordance with a determination that the rate at which the intensity of the contact is increasing exceeds the predefined threshold, forgo generation of at least one distinct tactile output for a respective transition between activation states that occurs in response to detecting the increase in intensity of the contact (e.g., with the generating unit 12812).

In some embodiments, the processing unit 12806 is configured to: while detecting the decrease in intensity of the contact, determine a rate at which intensity of the contact is decreasing (e.g., with the determining unit 12814); in accordance with a determination that the rate at which the intensity of the contact is decreasing remains below a predefined threshold, generate a distinct tactile output for each transition between activation states that occurs in response to detecting the decrease in intensity of the contact (e.g., with the generating unit 12812); and in accordance with a determination that the rate at which the intensity of the contact is decreasing exceeds the predefined threshold, forgo generation of at least one distinct tactile output for a respective transition between activation states that occurs in response to detecting the decrease in intensity of the contact (e.g., with the generating unit 12812).

In some embodiments, the M distinct tactile outputs correspond to changes in activation state of the user interface object.

In some embodiments, the N distinct tactile outputs correspond to changes in activation state of the user interface object.

In some embodiments, at least one tactile output generated in response to detecting the increase in intensity corresponds to a tactile sensation that simulates a down-click of a physical actuator mechanism; and at least one tactile output generated in response to detecting the decrease in intensity corresponds to a tactile sensation that simulates an up-click of a physical actuator mechanism.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 15A-15C are, optionally, implemented by components depicted in FIGS. 1A-1B or FIG. 16. For example, detection operations 12704, 12706, and 12722, changing operations 12710 and 12726, and generating operations 12712 and 12732 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A method, comprising:
at an electronic device with a touch-sensitive surface and a display:
detecting a contact on the touch-sensitive surface of the electronic device, including a first portion of a gesture made with the contact, a second portion of the gesture that follows the first portion, and lift-off of the contact from the touch-sensitive surface during or after the second portion of the gesture;
in response to detecting the second portion of the gesture made with the contact:
in accordance with a determination that a modifier input was detected while detecting the first portion of the gesture made with the contact, wherein the modifier input includes an additional input that is detected concurrently with the first portion of the gesture made with the contact:
performing a first operation; and
generating a first tactile output on the touch-sensitive surface; and
in accordance with a determination that the modifier input was not detected while detecting the first portion of the gesture made with the contact:
performing a second operation that includes an activation operation different from the first operation; and
generating a second tactile output on the touch-sensitive surface, wherein the second tactile output is different from the first tactile output.

2. The method of claim 1, wherein the modifier input is an input selected from the set consisting of: a key press of a modifier key, and an additional contact on the touch-sensitive surface.

3. The method of claim 2, wherein:
the first operation corresponds to a right-click operation and includes displaying a menu listing a plurality of distinct operations; and
the second operation corresponds to a left-click operation.

4. The method of claim 1, wherein:
detecting the first portion of the gesture made with the contact includes detecting an increase in intensity of the contact above a first activation threshold; and
detecting the second portion of the gesture made with the contact includes, after detecting the increase in intensity of the contact above the first activation threshold, detecting a reduction in intensity of the contact below a second activation threshold.

5. The method of claim 4, including:
in response to detecting the reduction in intensity of the contact below the second activation threshold:
in accordance with a determination that the modifier input was detected while detecting the increase in intensity of the contact above the first activation threshold:
performing the first operation; and
generating the first tactile output on the touch-sensitive surface; and
in accordance with a determination that the modifier input was not detected while detecting the increase in intensity of the contact above the first activation threshold:
performing the second operation different from the first operation; and
generating the second tactile output on the touch-sensitive surface,
wherein the second tactile output is different from the first tactile output.

6. The method of claim 5, wherein the second activation threshold is different from the first activation threshold.

7. The method of claim 5, wherein the second activation threshold is the same as the first activation threshold.

8. The method of claim 5, wherein:
the contact is detected on the touch-sensitive surface while a focus selector is over an icon on the display;
the first operation includes displaying a context menu that includes selectable options to perform operations associated with the icon; and
the second operation includes displaying a new application window associated with the icon.

9. The method of claim 5, wherein:
the first tactile output is generated by movement of the touch-sensitive surface that includes a first dominant movement component;
the second tactile output is generated by movement of the touch-sensitive surface that includes a second dominant movement component; and
the first dominant movement component and the second dominant movement component have a same movement profile and different amplitudes.

10. The method of claim 1, wherein:
the first operation corresponds to a right-click operation; and
the second operation corresponds to a left-click operation.

11. The method of claim 1, wherein:
the contact is detected on the touch-sensitive surface while a focus selector is over an icon on the display;
the first operation includes displaying a context menu that includes selectable options to perform operations associated with the icon; and
the second operation includes displaying a new application window associated with the icon.

12. The method of claim 1, wherein:
the first tactile output is generated by movement of the touch-sensitive surface that includes a first dominant movement component;
the second tactile output is generated by movement of the touch-sensitive surface that includes a second dominant movement component; and
the first dominant movement component and the second dominant movement component have a same movement profile and different amplitudes.

13. The method of claim 1, wherein:
the first operation corresponds to an operation associated with a right-click of a mouse or other input device; and
the second operation corresponds to an operation associated with a left-click of a mouse or other input device.

14. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
detecting a contact on the touch-sensitive surface of the electronic device, including a first portion of a gesture made with the contact, a second portion of the gesture that follows the first portion, and lift-off of the contact from the touch-sensitive surface during or after the second portion of the gesture;
in response to detecting the second portion of the gesture made with the contact:
in accordance with a determination that a modifier input was detected while detecting the first portion of the gesture made with the contact, wherein the modifier input includes an additional input that is detected concurrently with the first portion of the gesture made with the contact:
performing a first operation; and
generating a first tactile output on the touch-sensitive surface; and
in accordance with a determination that the modifier input was not detected while detecting the first portion of the gesture made with the contact:
performing a second operation that includes an activation operation different from the first operation; and
generating a second tactile output on the touch-sensitive surface, wherein the second tactile output is different from the first tactile output.

15. The electronic device of claim 14, wherein the modifier input is an input selected from the set consisting of: a key press of a modifier key, and an additional contact on the touch-sensitive surface.

16. The electronic device of claim 15, wherein:
the first operation corresponds to a right-click operation and includes displaying a menu listing a plurality of distinct operations; and
the second operation corresponds to a left-click operation.

17. The electronic device of claim 14, wherein:
detecting the first portion of the gesture made with the contact includes detecting an increase in intensity of the contact above a first activation threshold; and
detecting the second portion of the gesture made with the contact includes, after detecting the increase in intensity of the contact above the first activation threshold, detecting a reduction in intensity of the contact below a second activation threshold.

18. The electronic device of claim 17, wherein the one or more programs include instructions for:
in response to detecting the reduction in intensity of the contact below the second activation threshold:
in accordance with a determination that the modifier input was detected while detecting the increase in intensity of the contact above the first activation threshold:
performing the first operation; and
generating the first tactile output on the touch-sensitive surface; and in accordance with a determination that the modifier input was not detected while detecting the increase in intensity of the contact above the first activation threshold:
performing the second operation different from the first operation; and
generating the second tactile output on the touch-sensitive surface,
wherein the second tactile output is different from the first tactile output.

19. The electronic device of claim 18, wherein the second activation threshold is different from the first activation threshold.

20. The electronic device of claim 18, wherein the second activation threshold is the same as the first activation threshold.

21. The electronic device of claim 18, wherein:
the contact is detected on the touch-sensitive surface while a focus selector is over an icon on the display;
the first operation includes displaying a context menu that includes selectable options to perform operations associated with the icon; and
the second operation includes displaying a new application window associated with the icon.

22. The electronic device of claim 18, wherein:
the first tactile output is generated by movement of the touch-sensitive surface that includes a first dominant movement component;
the second tactile output is generated by movement of the touch-sensitive surface that includes a second dominant movement component; and
the first dominant movement component and the second dominant movement component have a same movement profile and different amplitudes.

23. The electronic device of claim 14, wherein:
the first operation corresponds to a right-click operation; and
the second operation corresponds to a left-click operation.

24. The electronic device of claim 14, wherein:
the contact is detected on the touch-sensitive surface while a focus selector is over an icon on the display;
the first operation includes displaying a context menu that includes selectable options to perform operations associated with the icon; and
the second operation includes displaying a new application window associated with the icon.

25. The electronic device of claim 14, wherein:
the first tactile output is generated by movement of the touch-sensitive surface that includes a first dominant movement component;
the second tactile output is generated by movement of the touch-sensitive surface that includes a second dominant movement component; and
the first dominant movement component and the second dominant movement component have a same movement profile and different amplitudes.

26. The electronic device of claim 14, wherein:
the first operation corresponds to an operation associated with a right-click of a mouse or other input device; and
the second operation corresponds to an operation associated with a left-click of a mouse or other input device.

27. A non-transitory computer readable storage medium storing one or more programs, the one or more programs comprising instructions, which when executed by an electronic device with a display, and a touch-sensitive surface, cause the electronic device to:

detect a contact on the touch-sensitive surface of the electronic device, including a first portion of a gesture made with the contact, a second portion of the gesture that follows the first portion, and lift-off of the contact from the touch-sensitive surface during or after the second portion of the gesture;
in response to detecting the second portion of the gesture made with the contact:
in accordance with a determination that a modifier input was detected while detecting the first portion of the gesture made with the contact, wherein the modifier input includes an additional input that is detected concurrently with the first portion of the gesture made with the contact:
perform a first operation; and
generate a first tactile output on the touch-sensitive surface; and
in accordance with a determination that the modifier input was not detected while detecting the first portion of the gesture made with the contact:
perform a second operation that includes an activation operation different from the first operation; and
generate a second tactile output on the touch-sensitive surface, wherein the second tactile output is different from the first tactile output.

28. The non-transitory computer readable storage medium of claim 27, wherein the modifier input is an input selected from the set consisting of: a key press of a modifier key, and an additional contact on the touch-sensitive surface.

29. The non-transitory computer readable storage medium of claim 28, wherein:
the first operation corresponds to a right-click operation and includes displaying a menu listing a plurality of distinct operations; and
the second operation corresponds to a left-click operation.

30. The non-transitory computer readable storage medium of claim 27, wherein:
detecting the first portion of the gesture made with the contact includes detecting an increase in intensity of the contact above a first activation threshold; and
detecting the second portion of the gesture made with the contact includes, after detecting the increase in intensity of the contact above the first activation threshold, detecting a reduction in intensity of the contact below a second activation threshold.

31. The non-transitory computer readable storage medium of claim 30, wherein the one or more programs include instructions for:
in response to detecting the reduction in intensity of the contact below the second activation threshold:
in accordance with a determination that the modifier input was detected while detecting the increase in intensity of the contact above the first activation threshold:
performing the first operation; and
generating the first tactile output on the touch-sensitive surface; and
in accordance with a determination that the modifier input was not detected while detecting the increase in intensity of the contact above the first activation threshold:
performing the second operation different from the first operation; and
generating the second tactile output on the touch-sensitive surface, wherein the second tactile output is different from the first tactile output.

32. The non-transitory computer readable storage medium of claim 31, wherein the second activation threshold is different from the first activation threshold.

33. The non-transitory computer readable storage medium of claim 31, wherein the second activation threshold is the same as the first activation threshold.

34. The non-transitory computer readable storage medium of claim 28, wherein:
the contact is detected on the touch-sensitive surface while a focus selector is over an icon on the display;
the first operation includes displaying a context menu that includes selectable options to perform operations associated with the icon; and
the second operation includes displaying a new application window associated with the icon.

35. The non-transitory computer readable storage medium of claim 31, wherein:
the first tactile output is generated by movement of the touch-sensitive surface that includes a first dominant movement component;
the second tactile output is generated by movement of the touch-sensitive surface that includes a second dominant movement component; and
the first dominant movement component and the second dominant movement component have a same movement profile and different amplitudes.

36. The non-transitory computer readable storage medium of claim 27, wherein:
the first operation corresponds to a right-click operation; and
the second operation corresponds to a left-click operation.

37. The non-transitory computer readable storage medium of claim 27, wherein:
the contact is detected on the touch-sensitive surface while a focus selector is over an icon on the display;
the first operation includes displaying a context menu that includes selectable options to perform operations associated with the icon; and
the second operation includes displaying a new application window associated with the icon.

38. The non-transitory computer readable storage medium of claim 27, wherein:
the first tactile output is generated by movement of the touch-sensitive surface that includes a first dominant movement component;
the second tactile output is generated by movement of the touch-sensitive surface that includes a second dominant movement component; and
the first dominant movement component and the second dominant movement component have a same movement profile and different amplitudes.

39. The non-transitory computer readable storage medium of claim 27, wherein:
the first operation corresponds to an operation associated with a right-click of a mouse or other input device; and
the second operation corresponds to an operation associated with a left-click of a mouse or other input device.

* * * * *